United States Patent
Bae et al.

(10) Patent No.: US 12,448,429 B2
(45) Date of Patent: Oct. 21, 2025

(54) T CELL RECEPTORS SPECIFIC TO B-CELL MATURATION ANTIGEN FOR TREATMENT OF CANCER

(71) Applicant: Dana-Farber Cancer Institute, Inc., Boston, MA (US)

(72) Inventors: Jooeun Bae, West Roxbury, MA (US); Nikhil C. Munshi, Needham, MA (US); Kenneth C. Anderson, Wellesley, MA (US)

(73) Assignee: Dana-Farber Cancer Institute, Inc., Boston, MA (US)

( * ) Notice: Subject to any disclaimer, the term of this patent is extended or adjusted under 35 U.S.C. 154(b) by 1004 days.

(21) Appl. No.: 17/430,938

(22) PCT Filed: Mar. 5, 2020

(86) PCT No.: PCT/US2020/021273
§ 371 (c)(1),
(2) Date: Aug. 13, 2021

(87) PCT Pub. No.: WO2020/181142
PCT Pub. Date: Sep. 10, 2020

(65) Prior Publication Data
US 2022/0118018 A1 Apr. 21, 2022

Related U.S. Application Data

(60) Provisional application No. 62/814,622, filed on Mar. 6, 2019.

(51) Int. Cl.

| | | |
|---|---|---|
| A61K 35/17 | (2025.01) | |
| A61K 39/00 | (2006.01) | |
| A61K 40/11 | (2025.01) | |
| A61K 40/32 | (2025.01) | |
| A61K 40/42 | (2025.01) | |
| A61P 35/00 | (2006.01) | |
| C07K 14/725 | (2006.01) | |
| C12N 5/0783 | (2010.01) | |
| C12N 5/10 | (2006.01) | |
| C12N 5/16 | (2006.01) | |
| C12N 15/63 | (2006.01) | |

(52) U.S. Cl.
CPC .. *C07K 14/7051* (2013.01); *A61K 39/001117* (2018.08); *A61K 40/11* (2025.01); *A61K 40/32* (2025.01); *A61K 40/4215* (2025.01); *A61P 35/00* (2018.01); *C12N 5/0636* (2013.01); *A61K 35/17* (2013.01); *A61K 2239/48* (2023.05); *C12N 5/16* (2013.01); *C12N 15/63* (2013.01)

(58) Field of Classification Search
CPC ............ A61K 39/4611; A61K 39/4632; A61K 2239/48; C12N 5/0636; C12N 2510/00; A61P 35/00
See application file for complete search history.

(56) References Cited

U.S. PATENT DOCUMENTS

| | | | |
|---|---|---|---|
| 4,407,957 | A | 10/1983 | Lim |
| 4,522,811 | A | 6/1985 | Eppstein et al. |
| 4,638,045 | A | 1/1987 | Kohn et al. |
| 4,806,621 | A | 2/1989 | Kohn et al. |
| 4,879,231 | A | 11/1989 | Stroman et al. |
| 4,929,555 | A | 5/1990 | Cregg et al. |
| 4,946,929 | A | 8/1990 | D'Amore et al. |
| 5,010,167 | A | 4/1991 | Ron et al. |
| 5,019,379 | A | 5/1991 | Domb et al. |
| 5,328,470 | A | 7/1994 | Nabel et al. |
| 5,399,665 | A | 3/1995 | Barrera et al. |
| 5,512,600 | A | 4/1996 | Mikos et al. |
| 5,514,378 | A | 5/1996 | Mikos et al. |
| 5,543,158 | A | 8/1996 | Gref et al. |
| 5,643,786 | A | 7/1997 | Cohen et al. |
| 5,696,175 | A | 12/1997 | Mikos et al. |
| 5,716,404 | A | 2/1998 | Vacanti et al. |
| 5,736,372 | A | 4/1998 | Vacanti et al. |
| 5,770,417 | A | 6/1998 | Vacanti et al. |
| 5,798,113 | A | 8/1998 | Dionne et al. |
| 5,800,828 | A | 9/1998 | Dionne et al. |
| 5,804,178 | A | 9/1998 | Vacanti et al. |
| 5,827,516 | A | 10/1998 | Urban et al. |
| 5,837,752 | A | 11/1998 | Shastri et al. |
| 5,902,599 | A | 5/1999 | Anseth et al. |
| 6,095,148 | A | 8/2000 | Shastri et al. |
| 6,123,727 | A | 9/2000 | Vacanti et al. |
| 6,506,577 | B1 | 1/2003 | Deming et al. |
| 6,534,633 | B1 | 3/2003 | Weidanz et al. |
| 6,632,922 | B1 | 10/2003 | Deming et al. |
| 6,686,446 | B2 | 2/2004 | Deming et al. |

(Continued)

FOREIGN PATENT DOCUMENTS

| | | |
|---|---|---|
| JP | 2003-511419 | 3/2023 |
| WO | WO 1997/32603 | 9/1997 |

(Continued)

OTHER PUBLICATIONS

ABB89050 (2005).*
AAA61087 (1993).*
Dogan et al., Blood Cancer Journal, 2020, 10:73, pp. 1-13.*
Friedman et al., Human Gene Therapy, 2018, 29(5): 585-601.*
Martin et al., BioTechniques, 2019, 66(4): 167-170.*
Smith et al, Nat Commun, May 2015, 5:5223, pp. 1-28.*
Aggen et al., "Single-chain VαVβ T-cell receptors function without mispairing with endogenous TCR chains," Gene therapy, Apr. 2012, 19(4):365-74.

(Continued)

*Primary Examiner* — Hong Sang
(74) *Attorney, Agent, or Firm* — Mueting Raasch Group

(57) ABSTRACT

This disclosure relates to T cell receptors (e.g., T cell receptors comprising alpha chains and beta chains) specific to B-cell maturation antigen (BCMA), T cells comprising same, and methods of use thereof.

11 Claims, 39 Drawing Sheets

Specification includes a Sequence Listing.

(56) References Cited

U.S. PATENT DOCUMENTS

| | | | |
|---|---|---|---|
| 6,818,732 | B2 | 11/2004 | Deming et al. |
| 7,026,443 | B1 | 4/2006 | Sette et al. |
| 9,487,573 | B2 | 11/2016 | Parkhurst et al. |
| 9,822,162 | B2 | 11/2017 | Hinrichs et al. |
| 9,872,900 | B2 | 1/2018 | Ciaramella et al. |
| 10,377,808 | B2 | 8/2019 | Blankenstein et al. |
| 10,450,372 | B2 | 10/2019 | Hanada et al. |
| 10,526,407 | B2 | 1/2020 | Alten et al. |
| 11,517,591 | B2 | 12/2022 | Bae et al. |
| 2004/0072246 | A1 | 4/2004 | Martin et al. |
| 2007/0020297 | A1 | 1/2007 | Wheeler et al. |
| 2007/0116718 | A1 | 5/2007 | Weidanz et al. |
| 2007/0269451 | A1 | 11/2007 | Crowe et al. |
| 2010/0129439 | A1 | 5/2010 | Alexis et al. |
| 2015/0297695 | A1 | 10/2015 | Bae et al. |
| 2016/0008451 | A1 | 1/2016 | Stary et al. |
| 2016/0317647 | A1 | 11/2016 | Ciaramella et al. |
| 2017/0002984 | A1 | 1/2017 | Beausoleil |
| 2017/0333524 | A1* | 11/2017 | Baker ............... C07K 14/7051 |
| 2018/0021258 | A1 | 1/2018 | Graham et al. |
| 2018/0245242 | A1 | 8/2018 | Schendel et al. |
| 2020/0352995 | A1 | 11/2020 | Bae et al. |

FOREIGN PATENT DOCUMENTS

| | | | |
|---|---|---|---|
| WO | WO 1998/39482 | | 9/1998 |
| WO | WO 1999/18129 | | 4/1999 |
| WO | WO 1999/45954 | | 9/1999 |
| WO | WO 2000/23087 | | 4/2000 |
| WO | WO 2001/026680 | | 4/2001 |
| WO | WO 2002/066516 | | 8/2002 |
| WO | WO 2002/070003 | | 9/2002 |
| WO | WO 2005/037995 | | 4/2005 |
| WO | WO 2009/051837 | | 4/2009 |
| WO | WO 2011/119484 | | 9/2011 |
| WO | WO 2015/059690 | | 4/2015 |
| WO | WO 2015/158671 | | 10/2015 |
| WO | WO 2017/031104 | | 2/2017 |
| WO | WO 2017/173349 | | 10/2017 |
| WO | WO-2017173256 | A1 * | 10/2017 ....... A61K 39/39558 |
| WO | WO 2018/102795 | | 6/2018 |
| WO | WO 2018/151836 | | 8/2018 |
| WO | WO 2020/181142 | | 9/2020 |

OTHER PUBLICATIONS

Aguado et al., "Controlled-release vaccines—biodegradable polylactide/polyglycolide (PL/PG) microspheres as antigen vehicles," Immunobiology, Feb. 1992, 184(2-3): 113-25.

Akagi et al, "Biodegradable Nanoparticles as Vaccine Adjuvants and Delivery Systems: Regulation of Immune Responses by Nanoparticle-Based Vaccine," Adv Polym Sci., Oct. 2011, 247:31-64.

Aleksic et al., "Different affinity windows for virus and cancer-specific T-cell receptors: Implications for therapeutic strategies," European Journal of Immunology, 2012, 3174-79.

Alexander et al., "Derivation of HLA-A11/Kb transgenic mice: functional CTL repertoire and recognition of human A11-restricted CTL epitopes," J. Immunol., Nov. 1997, 159(10): 4753-4761.

Altman et al., "Formation of functional peptide complexes of class II major histocompatibility complex proteins from subunits produced in *Escherichia coli*," Proc. Natl. Acad. Sci. USA, Nov. 1993, 90:10330-34.

Altman et al., "Phenotypic Analysis of Antigen-Specific T Lymphocytes," Mar. 1996, Science, 274:94-96.

Anderson et al., "Use of gene-modified T-cells as antigen presenting cells (T-APC) for vaccination against myeloma antigens," Database Accession No. XP002787229, Nov. 2007, 3 pages.

Bae et al., "BCMA peptide-engineered nanoparticles enhance induction and function of antigen-specific CD8cytotoxic T lymphocytes against multiple myeloma: clinical applications," Leukemia, 2019, 34(1):210-223.

Bae et al., "Histone deacetylase (HDAC) inhibitor ACY241 enhances anti-tumor activities of antigen-specific central memory cytotoxic T lymphocytes against multiple myeloma and solid tumors," Leukemia, 2018, 41 pages.

Bae et al., "Identification of novel myeloma-specific XBP1 peptides able to generate cytotoxic T lymphocytes: a potential therapeutic application in multiple myeloma," Leukemia, 2011, 1610-1619.

Bae et al., "Selective targeting of multiple myeloma by B cell maturation antigen (BCMA)-specific central memory CD8+ cytotoxic T lymphocytes: immunotherapeutic application in vaccination and adoptive immunotherapy, " Leukemia, 2019, 33(9):2208-26.

Barrera et al., "Synthesis and RGD Peptide Modification of a New Biodegradable Copolymer: Poly (lactic acid-colysine)," J. Am. Chem. Soc, 1993, 115:11010-11.

Borras et al., "Findings on T cell specificity revealed by synthetic combinatorial libraries," J. Immunol. Methods, 2002, 267(1):79-97.

Boussif et al., "A versatile vector for gene and oligonucleotide transfer into cells in culture and in vivo: Polyethylenimine," Proc. Natl. Acad. Sci., USA, 1995, 92:7297-7301.

Bramwell et al., "Particulate delivery systems for biodefense subunit vaccines," Adv. Drug Deliv. Rev., 2005, 57(9):1247-65.

Bullock et al., "Antigen Density Presented by Dendritic Cells in Vivo Differentially Affects the Number and Avidity of Primary, Memory, and Recall CD8 + T Cells," J. Immunol., 2003, 170:1822-1829.

Carter et al., "Single T cell sequencing demonstrates the functional role of αβ TCR pairing in cell lineage and antigen specificity," Frontiers in immunology, 2019:1516, 13 pages.

Celis et al., "Induction of anti-tumor cytotoxic T lymphocytes in normal humans using primary cultures and synthetic peptide epitopes," Proc. Natl. Acad. Sci. USA, 1994, 91:2105-09.

Chen et al., "Gene therapy for brain tumors: Regression of experimental gliomas by adenovirus-mediated gene transfer in vivo," Proc. Natl. Acad. Sci. USA, Apr. 1994, 91:3054-3057.

Cohen et al., "Enhanced antitumor activity of murine-human hybrid T-cell receptor (TCR) in human lymphocytes is associated with improved pairing and TCR/CD3 stability," Cancer research, Sep. 1, 2006, 66(17):8878-86.

Collins et al., Altered peptide ligand design: altering immune responses to class I MHC/peptide complexes, Immunlogical Reviews, 1998, 163:151-160.

Conlon et al., "A Mutation in the TRPC6 Cation Channel Causes Familial Focal Segmental Glomerulosclerosis," Science, 2005, 308:1801-1804.

Database Accession No. XP002787228, "Immunogenic peptide having a human leukocyte antigen binding motif #1924," EBI Accession No. GSP:AAY47313, Dec. 1999, 1 page.

Database Accession No. XP002787227, "WO2011119484. 2734100," Iogenetics LLC, Sep. 2011, 1 page.

Deming et al., "Facile synthesis of block copolypeptides of defined architecture," Nature, 1997, 390:386-89.

Dimopoulos et al., "International myeloma working group consensus statement and guidelines regarding the current role of imaging techniques in the diagnosis and monitoring of multiple Myeloma," Leukemia, 2009, 23(9):1545-56.

Falk et al., "Allele-specific motifs revealed by sequencing of self-peptides eluted from MHC molecules," Nature, May 1991, 351:290-296.

Falk et al., "Identification of Naturally Processed Viral Nonapeptides Allows Their Quantification in Infected Cells and Suggests an Allele-specific T Cell Epitope Forecast," J. Exp. Med., Aug. 1991, 174:425-434.

Freudenthal et al., "The distinct surface of human blood dendritic cells, as observed after an improved isolation method," Proc. Nat. Acad. Sci. USA, Oct. 1990, 57:7698-7702.

Getts et al., "Synthetic T cell receptor-based lymphocytes for cancer therapy," Advanced Drug Delivery Reviews, 2019, 141:47-54.

Gonzalez et al., "T cell receptor binding kinetics required for T cell activation depend on the density of cognate ligand on the antigen-presenting cell," Proc. Natl. Acad. Sci. USA, Feb. 2005, 102(3):4824-4829.

(56) References Cited

OTHER PUBLICATIONS

Haensler et al, "Polyamidoamine Cascade Polymers Mediate Efficient Transfection of Cells in Culture," Bioconjugate Chem., 1993, 4:372-379.

Hinnen et al., "Transformation of yeast," Proc. Nat. Acad. Sci. USA, Apr. 1978, 75(4):1929-33.

Hobo et al., "Immunogenicity of dendritic cells pulsed with MAGE3 Survivin and B-cell maturation antigen mRNA for vaccination of multiple myeloma patients," Cancer Immunol Immunother, 2013, 62(8): 1381-1392.

International Preliminary Report on Patentability in International Appln. No. PCT/US2018/049260, dated Mar. 3, 2020, 13 pages.

International Preliminary Report on Patentability in International Appln. No. PCT/US2020/021273, dated Sep. 16, 2021, 9 pages.

International Search Report and Written Opinion in International Appln. No. PCT/US2018/049260, dated Feb. 11, 2019, 24 pages.

International Search Report and Written Opinion in International Appln. No. PCT/US2020/021273, dated Jun. 4, 2020, 17 pages.

Ito et al., "Transformation of Intact Yeast Cells Treated with Alkali Cations," J. Bacteriol., Jan. 1983, 153:163-68.

Jiang et al, "Biodegradable poly(lactic-co-glycolic acid) microparticles for injectable delivery of vaccine antigens," Adv. Drug Deliv. Rev., 2005, 57(3):391-410.

Kabanov et al., "DNA Complexes with Polycations for the Delivery of Genetic Material into Cells," Bioconjugate Chem., 1995, 6:7-20.

Kalergis et al., "Altered Peptide Ligand-Mediated TCR Antagonism Can Be Modulated by a Change in a Single Amino Acid Residue Within the CDR3 β of MHC Class I-Restricted TCR," J Immunol., 2000, 165(1): 280-285.

Kawashima et al., "The Multi-epitope Approach for Immunotherapy for Cancer: Identification of Several CTL Epitopes from Various Tumor-Associated Antigens Expressed on Solid Epithelial Tumors," Human Immunol., 1998, 59:1-14.

Knies et al., "An optimized single chain TCR scaffold relying on the assembly with the native CD3-complex prevents residual mispairing with endogenous TCRs in human T-cells," Oncotarget, Apr. 19, 2016, 7(16):21199.

Kochenderfer et al., "Chemotherapy-refractory diffuse large B-cell lymphoma and indolent B-cell malignancies can be effectively treated with autologous T cells expressing an anti-CD19 chimeric antigen receptor," Journal of clinical oncology, Feb. 20, 2015, 33(6):540.

Kukowska-Latallo et al., "Efficient transfer of genetic material into mammalian cells using Starburst polyamidoamine dendrimers," Proc. Natl. Acad. Sci., USA, May 1996, 93:4897-4902.

Kwon et al, "Pseudopoly(amino acids): a study of the synthesis and characterization of poly(trans-4-hydroxy-N-acyl-L-proline esters)," Macromolecules, 1989, 22:3250-3255.

Kyle et al., "Criteria for diagnosis, staging, risk stratification and response assessment of multiple myeloma," Leukemia, 2009, 23:3-9.

Kyle et al., "Multiple Myeloma," Blood Journal, 2008, 111:2962-72.

Kyle et al., "Multiple Myeloma," N. Engl. J. Med., 2004, 351: 1860-73.

Langer, "Biomaterials in Drug Delivery and Tissue Engineering: One Laboratory's Experience," Acc. Chem. Res., 2000, 33:94-101.

Langer, "Selected advances in drug delivery and tissue engineering," J. Control Release, 1999, 62:7-11.

Lee et al., "T cells expressing CD19 chimeric antigen receptors for acute lymphoblastic leukaemia in children and young adults: a phase 1 dose-escalation trial," The Lancet, Feb. 7, 2015, 385(9967):517-28.

Legut et al., "Designer T-cells and T-cell receptors for customized cancer immunotherapies," Current Opinion in Pharmacology, 2018, 41:96-103.

Lemmel et al., "Differential quantitative analysis of MHC ligands by mass spectrometry using stable isotope labeling," Nat. Biotechnol., 2004, 22:450-454.

Li et al., "RNase H-dependent PCR-enabled T-cell receptor sequencing for highly specific and efficient targeted sequencing of T-cell receptor mRNA for single-cell and repertoire analysis," Nature protocols, Aug. 2019, 14(8):2571-94.

Lim et al., "A Self-Destroying Polycationic Polymer: Biodegradable Poly(4-hydroxy-L-proline ester)," J. Am. Chem. Soc, 1999, 121:5633-5639.

Lim et al., "Cationic Hyperbranched Poly(amino ester): A Novel Class of DNA Condensing Molecule with Cationic Surface, Biodegradable Three-Dimensional Structure, and Tertiary Amine Groups in the Interior," J. Am. Chem. Soc, 2001, 123:2460-61.

Lundegaard et al., "Prediction of epitopes using neural network based methods," Journal of Immunological Methods, 2011, 374(1-2):26-34.

Lustgarten et al., "Identification of Cross-Reactive Peptides Using Combinatorial Libraries Circumvents Tolerance against Her-2/neu-Immunodominant Epitope," J. Immun., 2006, 176:1796-1805.

Macatonia et al., "Suppression of immune responses by dendritic cells infected with HIV," Immunol., 1989, 67:285-289.

Mancebo et al., "Structure and Expression of the *Drosophila melanogaster* Gene for the U1 Small Nuclear Ribonucleoprotein Particle 70K Protein," Mol. Cell. Biol., 1990, 10(6):2492-2502.

Markowicz et al., "Granulocyte-macrophage colony-stimulating factor promotes differentiation and survival of human peripheral blood dendritic cells in vitro," J. Clin. Invest., 1990, 85:955-961.

Mehta-Damani et al., "Generation of antigen-specific CD8+ CTLs from naive precursors," J. Immunol., 1994, 153: 996-1003.

Monod et al., "IMGT/JunctionAnalysis: the first tool for the analysis of the immunoglobulin and T cell receptor complex V-J and V-D-J JUNCTIONs," Bioinformatics, Aug. 4, 2004, 20(suppl_1):i379-85.

Moss et al., "Sequence analysis of the human αβ T-cell receptor CDR3 region," Immunogenetics, May 1995, 42(1):10-8.

Niesvizky et al., "ACY-241, a novel, HDAC6 selective inhibitor: synergy with immunomodulatory (IMiD®) drugs in multiple myeloma (MM) cells and early clinical results (ACE-MM-200 Study)," Weill Cornell Medical College, New York City, NY, 2015, 3040:1 page.

O'Doherty et al., "Dendritic Cells Freshly Isolated from Human Blood Express CD4 and Mature into Typical Immostimulatory Dendritic Cells after Culture in Monocyte-conditioned Medium," J. Exp. Med., 1993, 178:1067-1078.

Ogg et al., "Quantitation of HIV-1-Specific Cytotoxic T Lymphocytes and Plasma Load of Viral RNA," Science, 1998, 279: 2103-2106.

Papisov, "Acyclic Polyacetals from Polysaccharides: Biomimetic Biomedical "Stealth" Polymers," ACS Symposium Series, 2001, 786:301-314.

Pinilla et al, "Rapid Identification of High Affinity Peptide Ligands Using Positional Scanning Synthetic Peptide Combinatorial Libraries," Biotechniques, 1992, 13(6): 901-5.

Purcell et al., "Immunoproteomics," Mol. Cell. Proteomics, 2004, 3:193-208.

Putnam et al., "Poly(4-hydroxy-L-proline ester): Low-Temperature Polycondensation and Plasmid DNA Complexation," Macromolecules, 1999, 32:3658-62.

Rajkumar et al., "International Myeloma Working Group updated criteria for the diagnosis of multiple myeloma," Lancet Oncology, 2014, 15(12):538-48.

Robins et al., "Comprehensive assessment of T-cell receptor β-chain diversity in αβ T cells," Blood, The Journal of the American Society of Hematology, Nov. 5, 2009, 114(19):4099-107.

Rotzxhke et al., "Isolation and analysis of naturally processed viral peptides as recognized by cytotoxic T cells," Nature, 1990, 348: 252-254.

Sreekrishna et al., "Invertase gene (SUC2) of *Saccharomyces cerevisiae* as a dominant marker for transformation of Pichia pastoris," Gene, 1987, 59:115-125.

Stevanović et al., "Complete regression of metastatic cervical cancer after treatment with human papillomavirus-targeted tumor-infiltrating T cells," Journal of Clinical Oncology, May 10, 2015 33(14):1543.

(56) References Cited

OTHER PUBLICATIONS

Storkus et al., "Identification of human melanoma peptides recognized by class I restricted tumor infiltrating T lymphocytes," J. Immunol., 1993, 151: 3719-27.

Storkus et al., "Identification of T-cell Epitopes: Rapid Isolation of Class I-Presented Peptides from Viable Cells by Mild Acid Elution," J. Immunother., 1993, 14:94-103.

Tang et al., "In Vitro Gene Delivery by Degraded Polyamidoamine Dendrimers," Bioconjugate Chem., 1996, 7:703-14.

Thomas et al., "Comparative accessory cell function of human peripheral blood dendritic cells and monocytes," J. Immunol., 1993, 151:6840-6852.

Tommaso et al., "Induction of Antigen-Specific Antibodies in Vaginal Secretions by Using a Nontoxic Mutant of Heat-Labile Enterotoxin as a Mucosal Adjuvant," Infect. Immunity, Mar. 1996, 64(3):974-979.

Tran et al., "Cancer immunotherapy based on mutation-specific CD4+ T cells in a patient with epithelial cancer," Science, May 9, 2014, 344(6184):641-5.

Tsai al., "Identification of subdominant CTL epitopes of the GP100 melanoma-associated tumor antigen by primary in vitro immunization with peptide-pulsed dendritic cells," J. Immunol., 1997, 158:1796-1802.

Turtle et al., "CD19 Car-T cells of defined CD4+: CD8+ composition in adult B cell ALL patients," The Journal of clinical investigation, Jun. 1, 2016, 126(6):2123-38.

Uhrich et al, "Polymeric Systems for Controlled Drug Release," Chem. Rev., 1999, 99:3181-3198.

Wang et al., "A Novel Biodegradable Gene Carrier Based on Polyphosphoester," J. Am. Chem. Soc, 2001, 123:9480-81.

Wentworth et al., "Differences and similarities in the A2.1-restricted cytotoxic T cell repertoire in humans and human leukocyte antigen-transgenic mice," J. Immunol., 1996, 26: 97-101.

Wentworth et al., "Identification of A2-restricted hepatitis C virus-specific cytotoxic T lymphocyte epitopes from conserved regions of the viral genome," Int. Immunol. 1996, 8: 651-59.

Wentworth et al., "In Vitro Introduction of Primary, Antigen-Specific CTL From Human Peripheral Blood Mononuclear Cells Stimulated With Synthetic Peptides," Mol. Immunol., 1995, 32:603-612.

Wong et al., "Comparative analysis of the CDR loops of antigen receptors," Frontiers in immunology, Oct. 15, 2019, 10:2454, 27 pages.

Wong et al., "Novel antibody-like single-chain TCR antibody Fc fusion protein," The Journal of Immunology, May 1, 2017, 198 (1 Supplement) 120.9, 5 pages (Abstract Only).

Yamamoto et al., "Mutants in the ADP-ribosyltransferase Cleft of Cholera Toxin Lack Diarrheagenicity but Retain Adjuvanticity," J. Exp. Med., 1997, 185:1203-1210.

Young et al., "Dendritic Cells Stimulate Primary Human Cytolytic Lymphocyte Responses in the Absence of CD4+ Helper T Cells," J. Exp. Med., 1990, 171: 1315-1332.

Zauner et al., "Polylysine-based transfection systems utilizing receptor-mediated delivery," Adv. Drug Del. Rev., 1998, 30:97-113.

Zhou et al., "Preparation of Poly(L-serine ester): A Structural Analogue of Conventional Poly(L serine)," Macromolecules, 1990, 23:3399-3406.

GenBank Accession No. AB052772.1, "*Homo sapiens* gene for BCMA, complete cds," Sep. 25, 2002, 2 pages.

\* cited by examiner

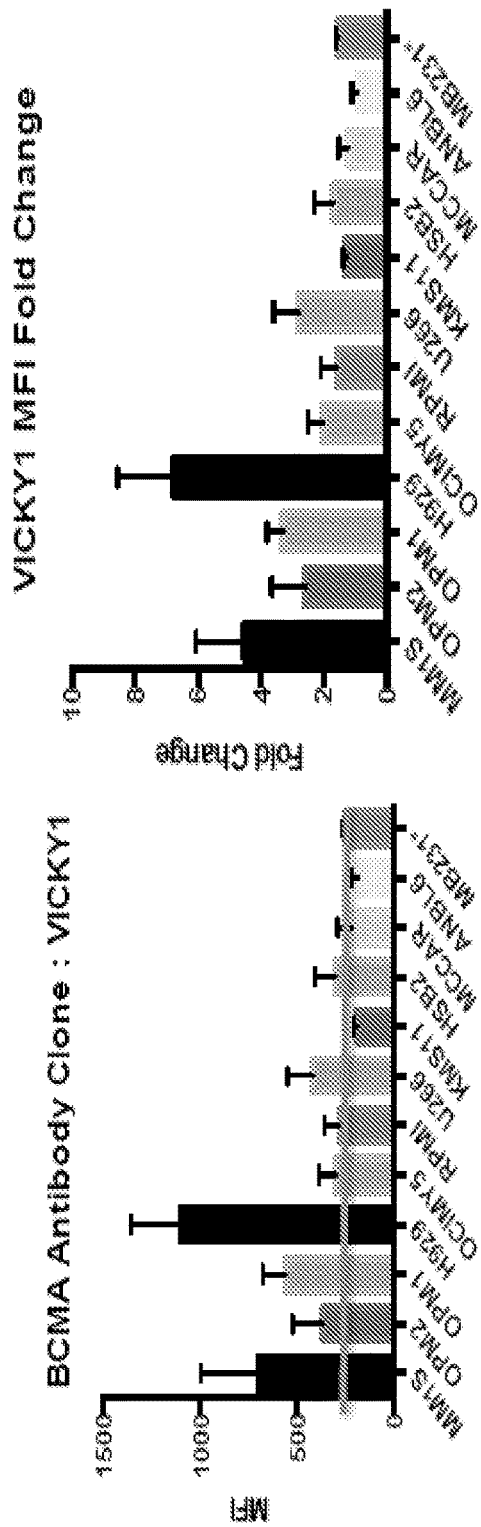
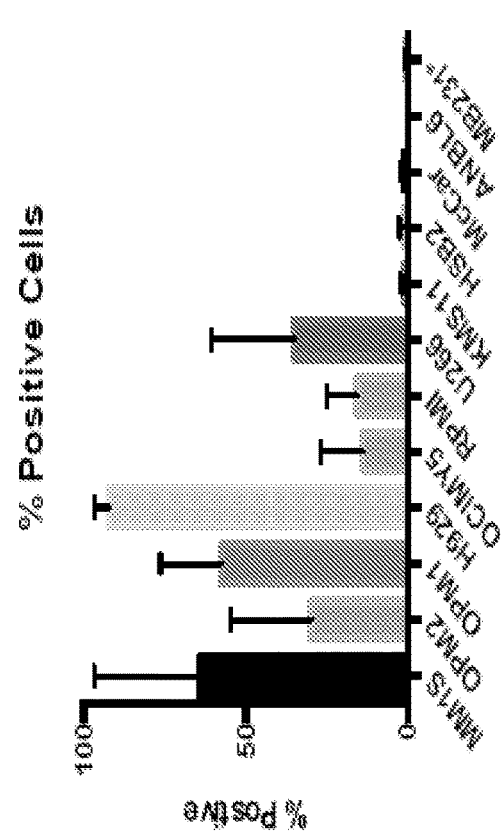
FIG. 1D
FIG. 1E
FIG. 1F

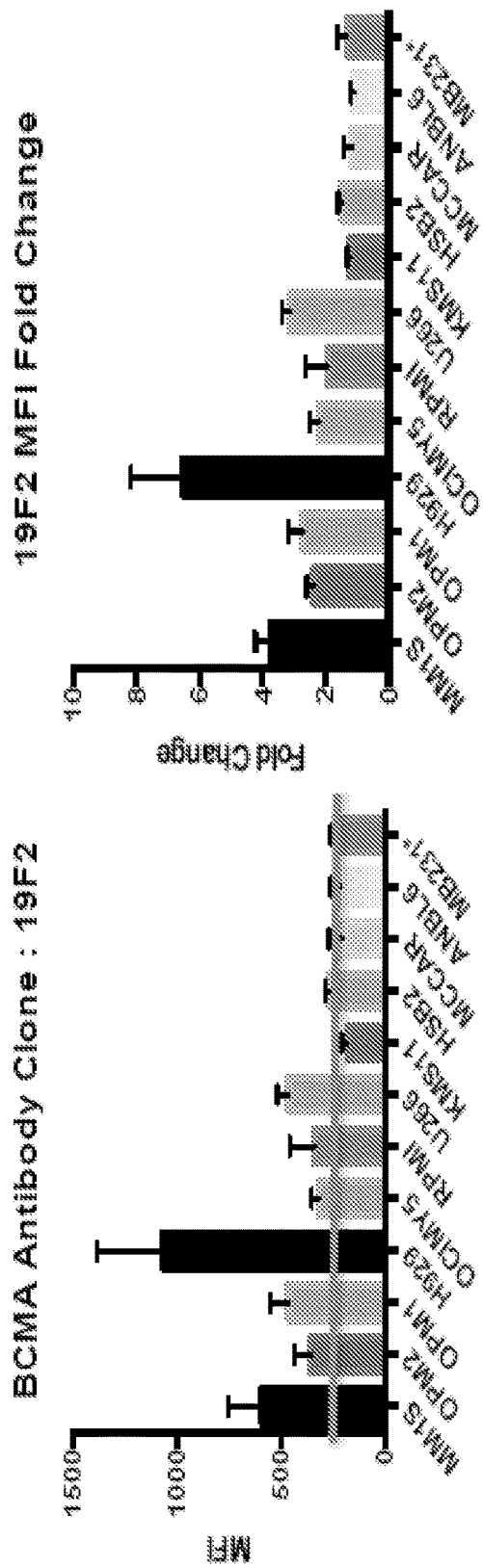
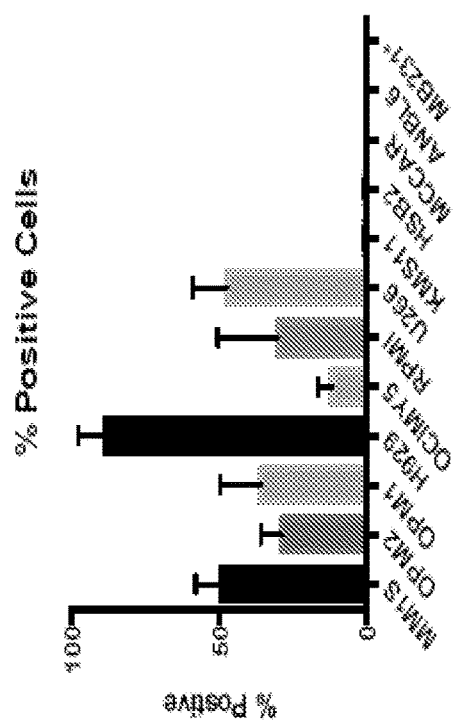
FIG. 1G
FIG. 1H
FIG. 1I

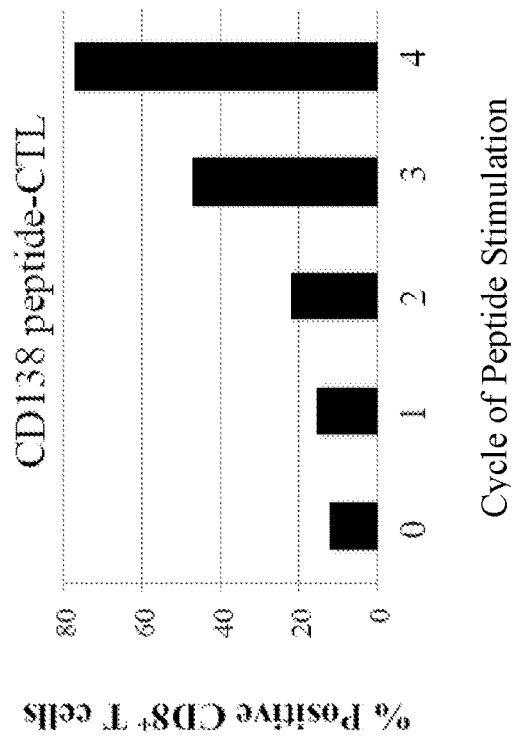
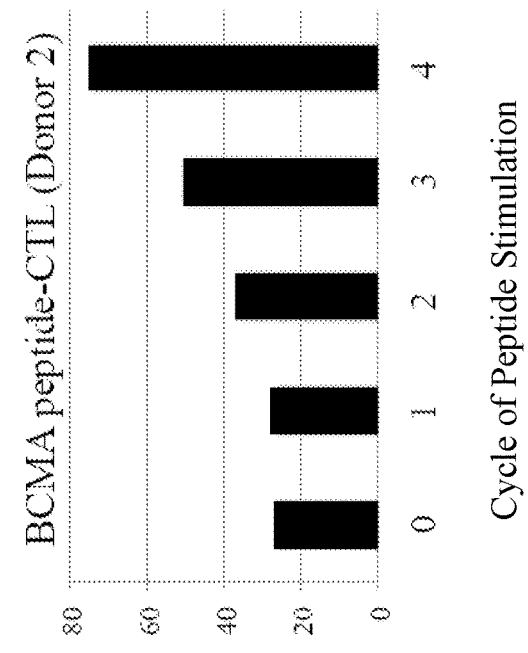
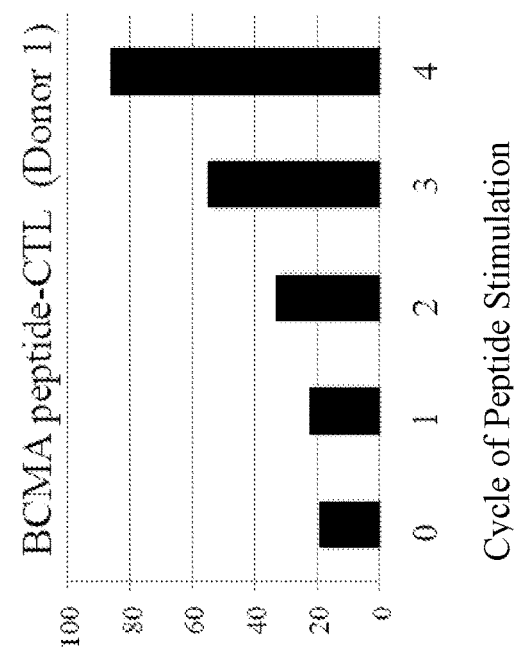
FIG. 5A
FIG. 5B
FIG. 5C

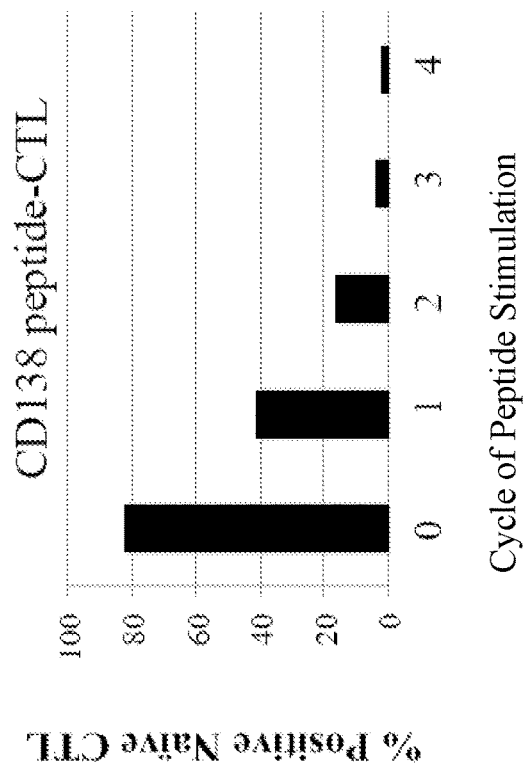
FIG. 6A
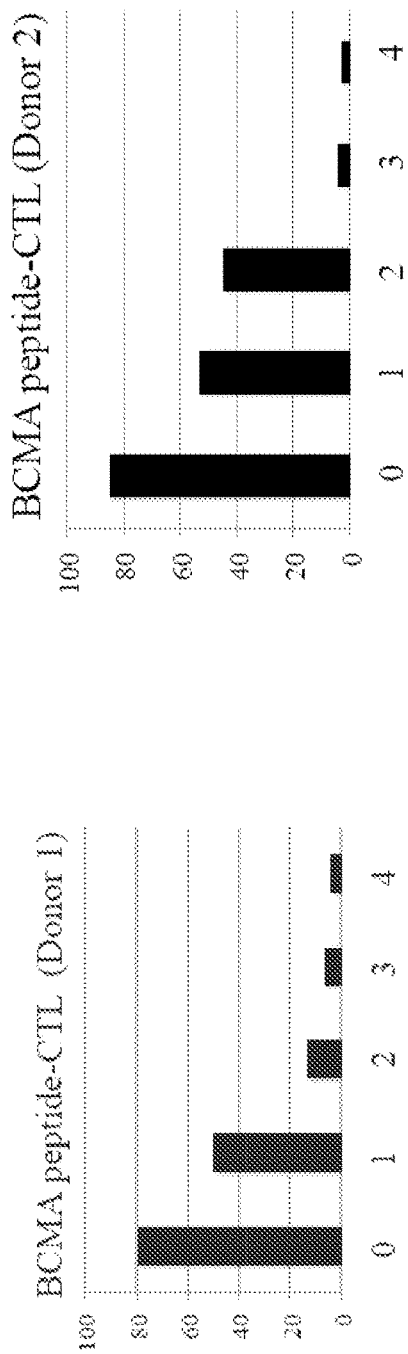
FIG. 6B
FIG. 6C

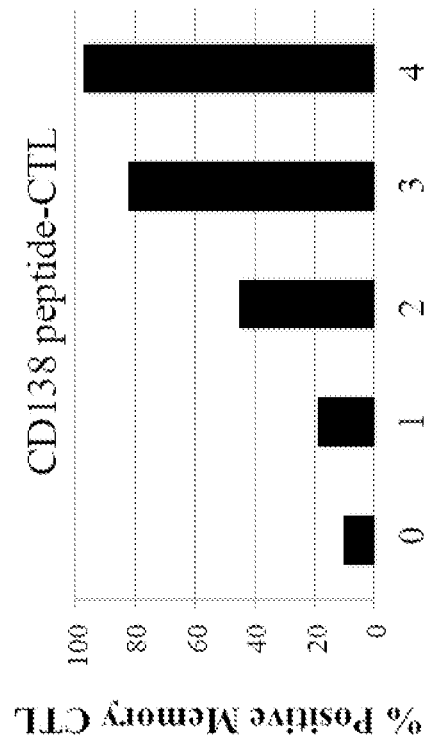
FIG. 7A
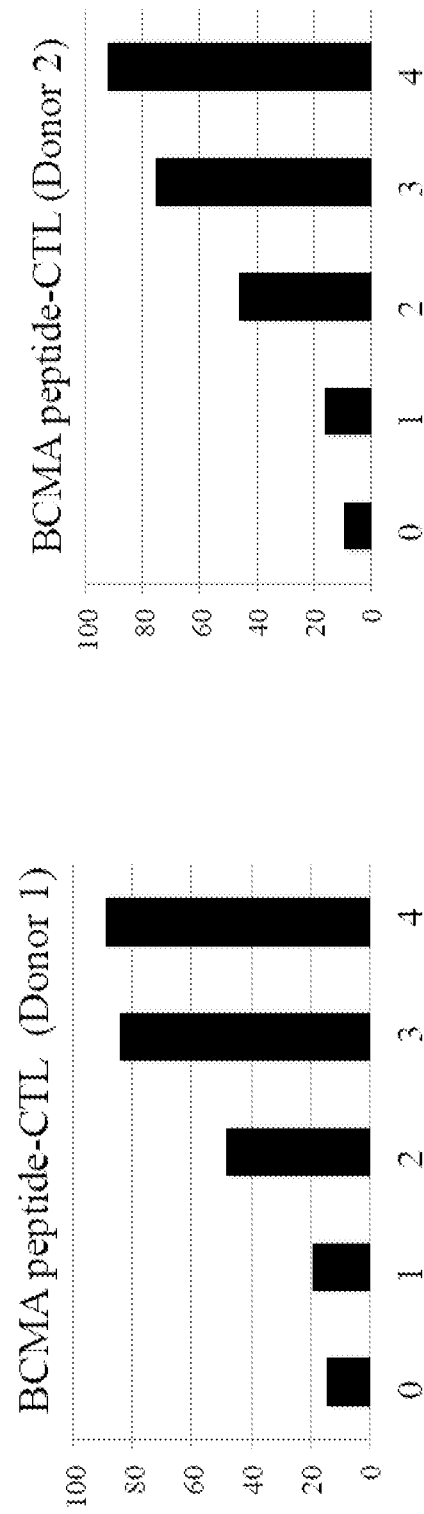
FIG. 7B
FIG. 7C

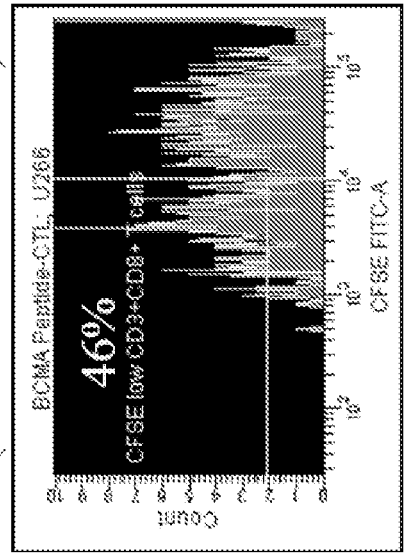
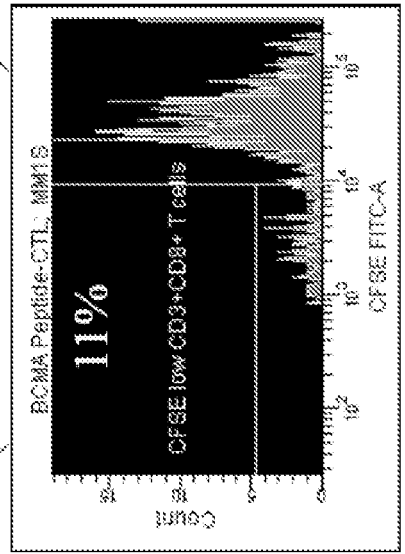
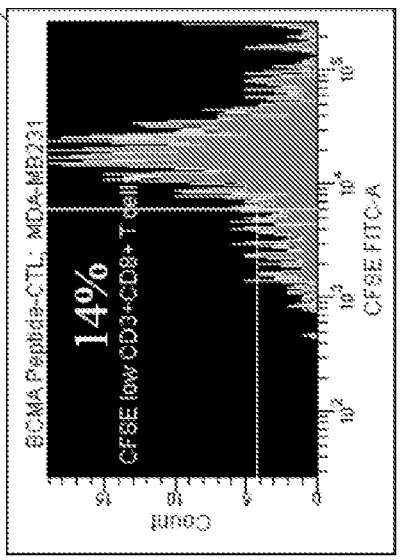
FIG. 11

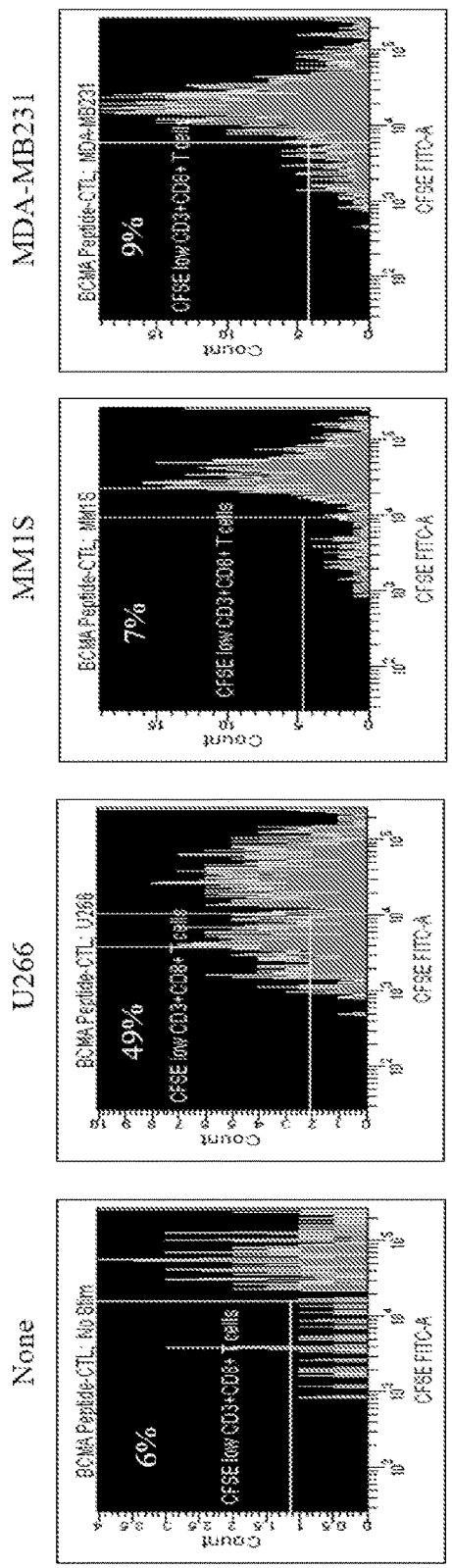
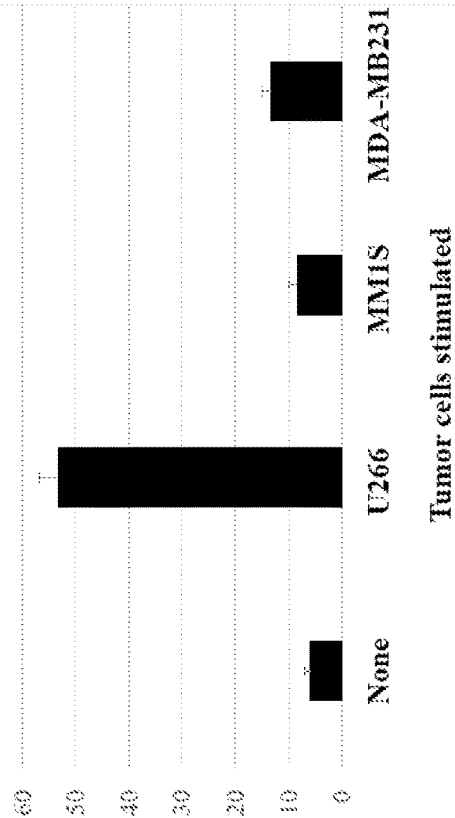
Heteroclitic BCMA$_{72-80}$ Peptide specific CTL co-cultured (5 days) with Tumor cells:
FIG. 14A FIG. 14B FIG. 14C FIG. 14D
FIG. 14E

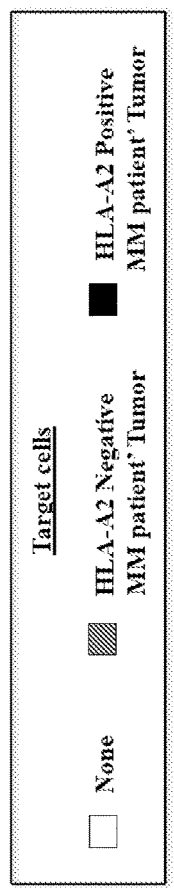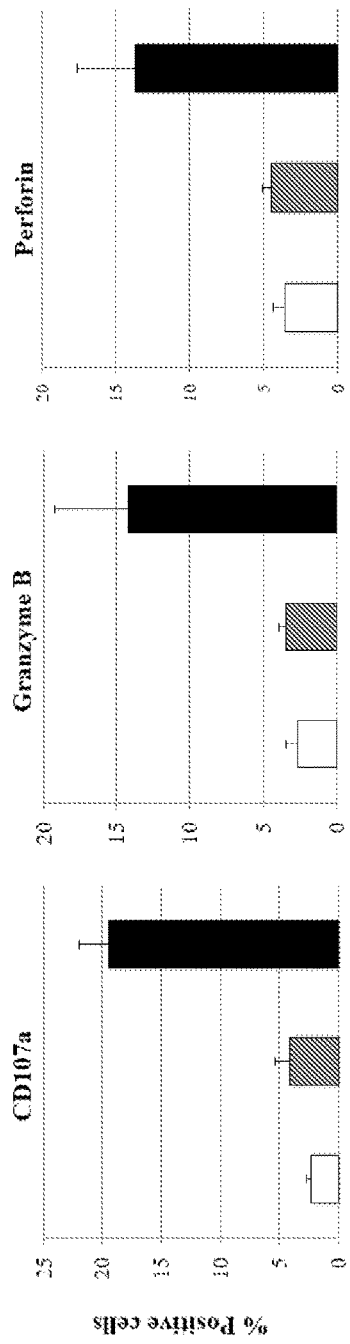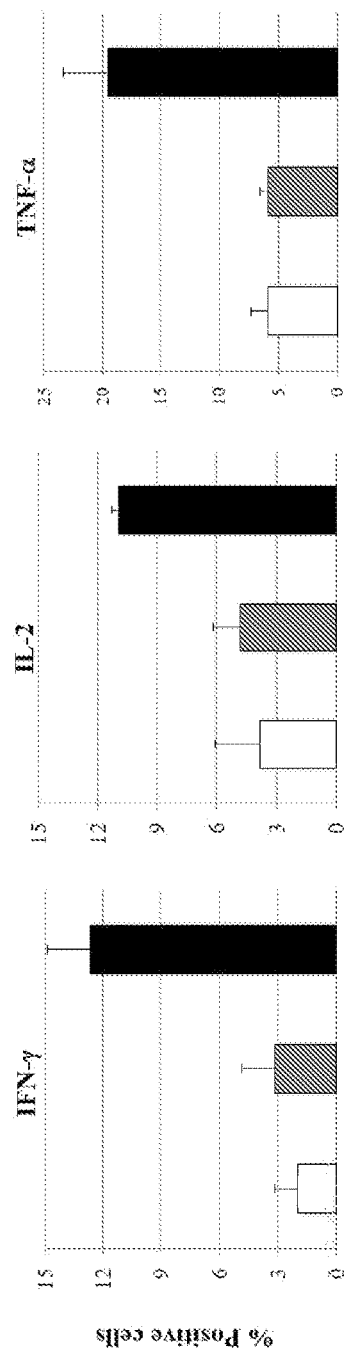
FIG. 15C, FIG. 15D, FIG. 15E, FIG. 15F, FIG. 15G, FIG. 15H

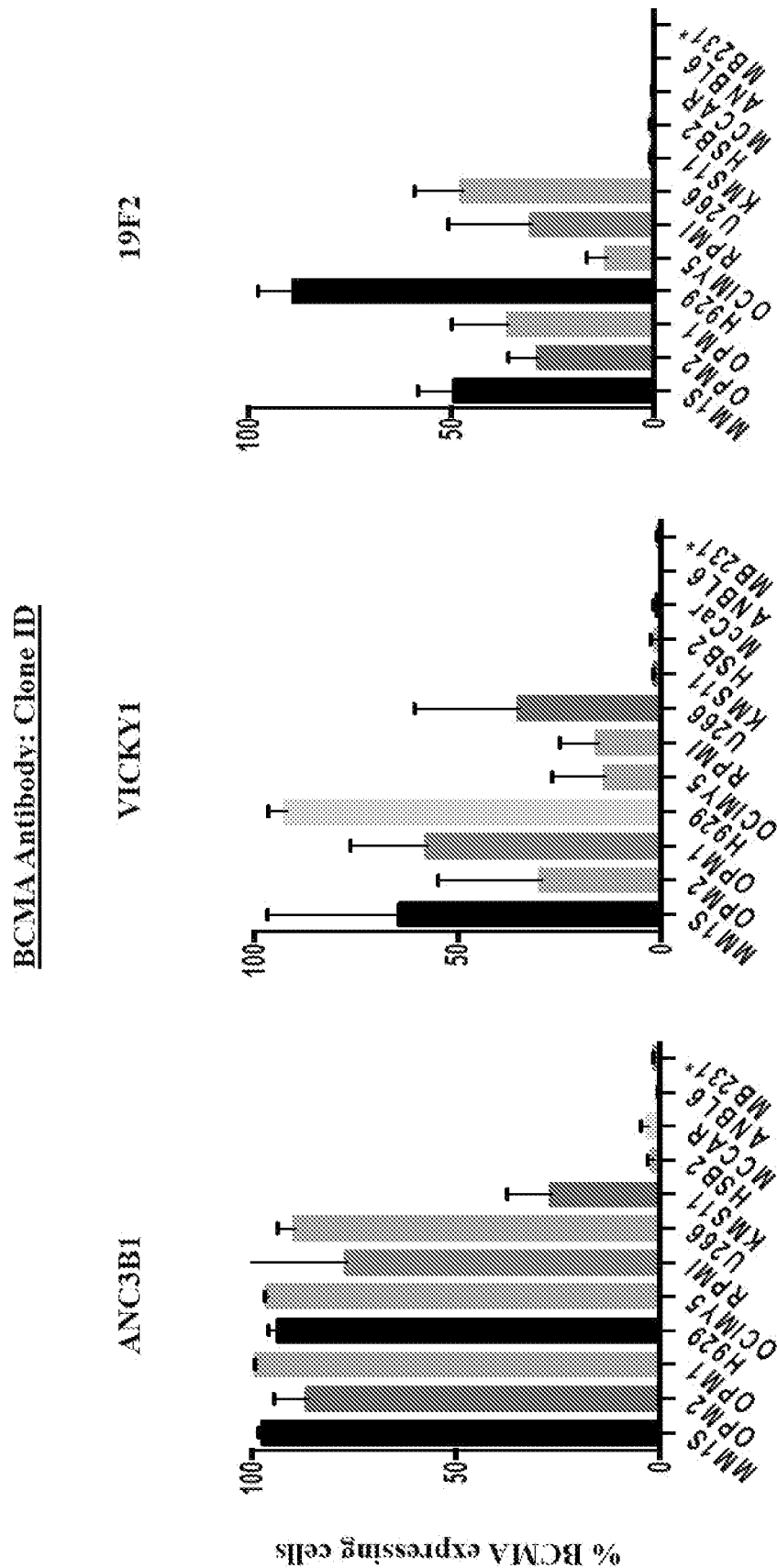

SEQUENCE LISTING

```
<160> NUMBER OF SEQ ID NOS: 396

<210> SEQ ID NO 1
<211> LENGTH: 1020
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 1
atgggcttca ggctcctctg ctgtgtggcc ttttgtctcc tgggagcagg cccagtggat     60
tctggagtca cacaaacccc aaagcacctg atcacagcaa ctggacagcg agtgacgctg    120
agatgctccc ctaggtctgg agacctctct gtgtactggt accaacagag cctggaccag    180
ggcctccagt tcctcattca gtattataat ggagaagaga gagcaaaagg aaacattctt    240
gaacgattct ccgcacaaca gttccctgac ttgcactctg aactaaacct gagctctctg    300
gagctggggg actcagcttt gtatttctgt gccagcagcg tagctggctc ttctagctat    360
ggctacacct tcggttcggg gaccaggtta accgttgtag aggacctgaa caaggtgttc    420
```

```
ccacccgagg tcgctgtgtt tgagccatca gaagcagaga tctcccacac ccaaaaggcc      480
acactggtgt gcctggccac aggcttcttc cccgaccacg tggagctgag ctggtgggtg      540
aatgggaagg aggtgcacag tggggtcagc acggacccgc agcccctcaa ggagcagccc      600
gccctcaatg actccagata ctgcctgagc agccgcctga gggtctcggc caccttctgg      660
cagaaccccc gcaaccactt ccgctgtcaa gtccagttct acgggctctc ggagaatgac      720
gagtggaccc aggatagggc caaacccgtc acccagatcg tcagcgccga ggcctggggt      780
agagcagact gtggctttac ctcggtgtcc taccagcaag gggtcctgtc tgccaccatc      840
ctctatgaga tcctgctagg gaaggccacc ctgtatgctg tgctggtcag cgcccttgtg      900
ttgatggcca tggtcaagag aaaggatttc aggaggagga ggagcggcag tggagtgaaa      960
cagactttga attttgacct tctcaagttg gcgggagacg tggagtccaa cccagggccc     1020

<210> SEQ ID NO 2
<211> LENGTH: 1014
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 2
atgggcacca gcctcctctg ctggatggcc ctgtgtctcc tggggggcaga tcacgcagat       60 actggagtct cccagaaccc cagacacaag atcacaaaga gggacagaa tgtaactttc      120 aggtgtgatc aatttctga acacaaccgc ctttattggt accgacagac cctggggcag      180
ggcccagagt ttctgactta cttccagaat gaagctcaac tagaaaaatc aaggctgctc      240
agtgatcggt tctctgcaga gaggcctaag ggatctttct ccaccttgga gatccagcgc      300
acagagcagg gggactcggc catgtatctc tgtgccagca gcttagcccg cactgaagct      360
ttctttggac aaggcaccag actcacagtt gtagaggacc tgaacaaggt gttcccaccc      420
gaggtcgctg tgtttgagcc atcagaagca gagatctccc acacccaaaa ggccacactg      480
gtgtgcctgg ccacaggctt cttccccgac acgtggagc tgagctggtg ggtgaatggg      540
aaggaggtgc acagtggggt cagcacggac ccgcagcccc tcaaggagca gcccgccctc      600
aatgactcca gatactgcct gagcagccgc ctgagggtct cggccacctt ctggcagaac      660
ccccgcaacc acttccgctg tcaagtccag ttctacgggc tctcggagaa tgacgagtgg      720
acccaggata gggccaaacc cgtcacccag atcgtcagcg ccgaggcctg ggtagagca      780 gactgtggct ttacctcggt gtcctaccag caagggtcc tgtctgccac catcctctat      840
gagatcctgc tagggaaggc caccctgtat gctgtgctgg tcagcgccct tgtgttgatg      900
gccatggtca agagaaagga tttcaggagg aggaggagcg gcagtggagt gaaacagact      960
ttgaattttg accttctcaa gttggcggga gacgtggagt ccaacccagg gccc          1014

<210> SEQ ID NO 3
<211> LENGTH: 930
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 3
atgggcttca ggctcctctg ctgtgtggcc ttttgtctcc tgggagcagg cccagtggat       60
```

```
tctggagtca cacaaacccc aaagcacctg atcacagcaa ctggacagcg agtgacgctg      120
agatgctccc ctaggtctgg agacctctct gtgtactggt accaacagag cctggaccag      180
ggcctccagt tcctcattca gtattataat ggagaagaga gagcaaaagg aaacattctt      240
gaacgattct ccgcacaaca gttccctgac ttgcactctg aactaaacct gagctctctg      300
gagctggggg actcagcttt gtatttctgt gccagcagcg tagctggctc ttctagctat      360
ggctacacct tcggttcggg gaccaggtta accgttgtag aggacctgaa caaggtgttc      420
ccacccgagg tcgctgtgtt tgagccatca gaagcagaga tctcccacac ccaaaaggcc      480
acactggtgt gcctggccac aggcttcttc cccgaccacg tggagctgag ctggtgggtg      540
aatgggaagg aggtgcacag tggggtcagc acggacccgc agcccctcaa ggagcagccc      600
gccctcaatg actccagata ctgcctgagc agccgcctga ggtctcggc caccttctgg       660 cagaaccccc gcaaccactt ccgctgtcaa gtccagttct acgggctctc ggagaatgac      720
gagtggaccc aggatagggc caaacccgtc acccagatcg tcagcgccga ggcctggggt      780
agagcagact gtggctttac ctcggtgtcc taccagcaag gggtcctgtc tgccaccatc      840
ctctatgaga tcctgctagg gaaggccacc ctgtatgctg tgctggtcag cgcccttgtg      900
ttgatggcca tggtcaagag aaaggatttc                                       930
```

<210> SEQ ID NO 4
<211> LENGTH: 924
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 4

```
atgggcacca gcctcctctg ctggatggcc ctgtgtctcc tgggggcaga tcacgcagat       60
actggagtct cccagaaccc cagacacaag atcacaaaga ggggacagaa tgtaactttc      120
aggtgtgatc caatttctga acacaaccgc ctttattggt accgacagac cctggggcag      180
ggcccagagt ttctgactta cttccagaat gaagctcaac tagaaaaatc aaggctgctc      240
agtgatcggt tctctgcaga gaggcctaag ggatcttttc tccaccttga gatccagcgc      300
acagagcagg gggactcggc catgtatctc tgtgccagca gcttagcccg cactgaagct      360
ttctttggac aaggcaccag actcacagtt gtagaggacc tgaacaaggt gttcccaccc      420
gaggtcgctg tgtttgagcc atcagaagca gagatctccc acacccaaaa ggccacactg      480
gtgtgcctgg ccacaggctt cttccccgac acgtggagc tgagctggtg ggtgaatggg      540
aaggaggtgc acagtgggt cagcacggac ccgcagcccc tcaaggagca gcccgccctc      600
aatgactcca gatactgcct gagcagccgc ctgagggtct cggccacctt ctggcagaac      660
ccccgcaacc acttccgctg tcaagtccag ttctacgggc tctcggagaa tgacgagtgg      720
acccaggata gggccaaacc cgtcacccag atcgtcagcg ccgaggcctg ggtagagca      780 gactgtggct ttacctcggt gtcctaccag caagggtcc tgtctgccac catcctctat      840
gagatcctgc tagggaaggc cacctgtat gctgtgctgg tcagcgccct tgtgttgatg      900
gccatggtca agagaaagga tttc                                             924
```

<210> SEQ ID NO 5
<211> LENGTH: 927
<212> TYPE: DNA

<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 5

```
atgggctgca ggctcctctg ctgtgtggtc ttctgcctcc tccaagcagg tcccttggac    60
acagctgttt cccagactcc aaaatacctg gtcacacaga tgggaaacga caagtccatt   120
aaatgtgaac aaaatctggg ccatgatact atgtattggt ataaacagga ctctaagaaa   180
tttctgaaga taatgtttag ctacaataat aaggagctca ttataaatga aacagttcca   240
aatcgcttct cacctaaatc tccagacaaa gctcacttaa atcttcacat caattccctg   300
gagcttggtg actctgctgt gtatttctgt gccagcagcc ttgggacaga tacgcagtat   360
tttggcccag gcacccggct gacagtgctc gaggacctga aaaacgtgtt cccacccgag   420
gtcgctgtgt ttgagccatc agaagcagag atctcccaca cccaaaaggc cacactggtg   480
tgcctggcca caggcttcta ccccgaccac gtggagctga gctggtgggt gaatgggaag   540
gaggtgcaca gtgggtcag cacagaccc cagcccctca aggagcagcc cgccctcaat   600
gactccagat actgcctgag cagccgcctg agggtctcgg ccaccttctg gcagaacccc   660
cgcaaccact ccgctgtca agtccagttc tacgggctct cggagaatga cgagtggacc   720
caggataggg ccaaacctgt cacccagatc gtcagcgccg aggcctgggg tagagcagac   780
tgtggcttca cctccgagtc ttaccagcaa ggggtcctgt ctgccaccat cctctatgag   840
atcttgctag gaaggccac cttgtatgcc gtgctggtca gtgccctcgt gctgatggcc   900
atggtcaaga gaaaggattc cagaggc                                       927
```

<210> SEQ ID NO 6
<211> LENGTH: 927
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 6

```
atgggctgca ggctcctctg ctgtgtggtc ttctgcctcc tccaagcagg tcccttggac    60
acagctgttt cccagactcc aaaatacctg gtcacacaga tgggaaacga caagtccatt   120
aaatgtgaac aaaatctggg ccatgatact atgtattggt ataaacagga ctctaagaaa   180
tttctgaaga taatgtttag ctacaataat aaggagctca ttataaatga aacagttcca   240
aatcgcttct cacctaaatc tccagacaaa gctcacttaa atcttcacat caattccctg   300
gagcttggtg actctgctgt gtatttctgt gccagcagcc agcgggtcta cgagcagtac   360
ttcgggccgg gcaccaggct cacggtcaca gaggacctga aaaacgtgtt cccacccgag   420
gtcgctgtgt ttgagccatc agaagcagag atctcccaca cccaaaaggc cacactggtg   480
tgcctggcca caggcttcta ccccgaccac gtggagctga gctggtgggt gaatgggaag   540
gaggtgcaca gtgggtcag cacagaccc cagcccctca aggagcagcc cgccctcaat   600
gactccagat actgcctgag cagccgcctg agggtctcgg ccaccttctg gcagaacccc   660
cgcaaccact ccgctgtca agtccagttc tacgggctct cggagaatga cgagtggacc   720
caggataggg ccaaacctgt cacccagatc gtcagcgccg aggcctgggg tagagcagac   780
tgtggcttca cctccgagtc ttaccagcaa ggggtcctgt ctgccaccat cctctatgag   840
```

```
atcttgctag ggaaggccac cttgtatgcc gtgctggtca gtgccctcgt gctgatggcc      900
atggtcaaga gaaaggattc cagaggc                                         927
```

<210> SEQ ID NO 7
<211> LENGTH: 942
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 7

```
atgggccccc agctccttgg ctatgtggtc ctttgccttc taggagcagg ccccctggaa       60
gcccaagtga cccagaaccc aagatacctc atcacagtga ctggaaagaa gttaacagtg      120
acttgttctc agaatatgaa ccatgagtat atgtcctggt atcgacaaga cccagggctg      180
ggcttaaggc agatctacta ttcaatgaat gttgaggtga ctgataaggg agatgttcct      240
gaagggtaca aagtctctcg aaaagagaag aggaatttcc ccctgatcct ggagtcgccc      300
agccccaacc agacctctct gtacttctgt gccagcagtt tattaggaac acaggggccc      360
aaagagaccc agtacttcgg gccaggcacg cggctcctgg tgctcgagga cctgaaaaac      420
gtgttcccac ccgaggtcgc tgtgtttgag ccatcagaag cagagatctc ccacacccaa      480
aaggccacac tggtgtgcct ggccacaggc ttctaccccg accacgtgga gctgagctgg      540
tgggtgaatg gaaggaggt gcacagtggg gtcagcacag accgcagcc cctcaaggag       600 cagcccgccc tcaatgactc cagatactgc ctgagcagcc gcctgagggt ctcggccacc      660
ttctggcaga accccgcaa ccacttccgc tgtcaagtcc agttctacgg gctctcggag       720
aatgacgagt ggacccagga tagggccaaa cctgtcaccc agatcgtcag cgccgaggcc      780
tggggtagag cagactgtgg cttcacctcc gagtcttacc agcaaggggg cctgtctgcc      840
accatcctct atgagatctt gctagggaag gccaccttgt atgccgtgct ggtcagtgcc      900
ctcgtgctga tggccatggt caagagaaag gattccagag gc                        942
```

<210> SEQ ID NO 8
<211> LENGTH: 939
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 8

```
atgggcacca ggctcctctg ctgggcagcc ctgtgcctcc tggggcaga tcacacaggt       60 gctggagtct cccagacccc cagtaacaag gtcacagaga agggaaaata tgtagagctc      120
aggtgtgatc caatttcagg tcatactgcc ctttactggt accgacaaag cctggggcag      180
ggcccagagt ttctaattta cttccaaggc acgggtgcgg cagatgactc agggctgccc      240
aacgatcggt tctttgcagt caggcctgag ggatccgtct ctactctgaa gatccagcgc      300
acagagcggg gggactcagc cgtgtatctc tgtgccagca gcttaggggg acagggccg      360 tttaccactg aagctttctt tggacaaggc accagactca cagttgtaga ggacctgaac      420
aaggtgttcc cacccgaggt cgctgtgttt gagccatcag aagcagagat ctcccacacc      480
caaaaggcca cactggtgtg cctggccaca ggcttcttcc ccgaccacgt ggagctgagc      540
```

| | |
|---|---|
| tggtgggtga atggaagga ggtgcacagt ggggtcagca cggacccgca gccccctcaag | 600 |
| gagcagcccg ccctcaatga ctccagatac tgcctgagca gccgcctgag ggtctcggcc | 660 |
| accttctggc agaaccccg caaccactttc cgctgtcaag tccagttcta cgggctctcg | 720 |
| gagaatgacg agtggaccca ggatagggcc aaacccgtca cccagatcgt cagcgccgag | 780 |
| gcctggggta gagcagactg tggctttacc tcggtgtcct accagcaagg ggtcctgtct | 840 |
| gccaccatcc tctatgagat cctgctaggg aaggccaccc tgtatgctgt gctggtcagc | 900 |
| gcccttgtgt tgatggccat ggtcaagaga aaggatttc | 939 |

<210> SEQ ID NO 9
<211> LENGTH: 819
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 9

| | |
|---|---|
| atgaaatcct tgagagtttt actagtgatc ctgtggcttc agttgagctg ggtttggagc | 60 |
| caacagaagg aggtggagca gaattctgga cccctcagtg ttccagaggg agccattgcc | 120 |
| tctctcaact gcacttacag tgaccgaggt tcccagtcct tcttctggta cagacaatat | 180 |
| tctgggaaaa gccctgagtt gataatgttc atatactcca atggtgacaa agaagatgga | 240 |
| aggtttacag cacagctcaa taaagccagc cagtatgttt ctctgctcat cagagactcc | 300 |
| cagcccagtg attcagccac ctacctctgt gccgtggggg acgcgggcag agagcactt | 360 |
| acttttggga gtggaacaag actccaagtg caaccaaata tccagaaccc tgaccctgcc | 420 |
| gtgtaccagc tgagagactc taaatccagt gacaagtctg tctgcctatt caccgatttt | 480 |
| gattctcaaa caaatgtgtc acaaagtaag gattctgatg tgtatatcac agacaaaact | 540 |
| gtgctagaca tgaggtctat ggacttcaag agcaacagtg ctgtggcctg gagcaacaaa | 600 |
| tctgactttg catgtgcaaa cgccttcaac aacagcatta ttccagaaga caccttcttc | 660 |
| cccagcccag aaagttcctg tgatgtcaag ctggtcgaga aaagctttga acagatacg | 720 |
| aacctaaact ttcaaaacct gtcagtgatt gggttccgaa tcctcctcct gaaagtggcc | 780 |
| gggtttaatc tgctcatgac gctgcggctg tggtccagc | 819 |

<210> SEQ ID NO 10
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 10

| | |
|---|---|
| atggcatgcc ctggcttcct gtgggcactt gtgatcttca cctgtcttga atttagcatg | 60 |
| gctcagacag tcactcagtc tcaaccagag atgtctgtgc aggaggcaga gaccgtgacc | 120 |
| ctgagctgca catatgacac cagtgagagt gattattatt tattctggta caagcagcct | 180 |
| cccagcaggc agatgattct cgttattcgc caagaagctt ataagcaaca gaatgcaaca | 240 |
| gagaatcgtt tctctgtgaa cttccagaaa gcagccaaat ccttcagtct caagatctca | 300 |
| gactcacagc tggggatgc cgcgatgtat ttctgtgctt atgaggacgg atctgaaaag | 360 |
| ctggtctttg gaagggaac gaaactgaca gtaaacccat atatccagaa ccctgaccct | 420 |

```
gccgtgtacc agctgagaga ctctaaatcc agtgacaagt ctgtctgcct attcaccgat    480
tttgattctc aaacaaatgt gtcacaaagt aaggattctg atgtgtatat cacagacaaa    540
actgtgctag acatgaggtc tatggacttc aagagcaaca gtgctgtggc ctggagcaac    600
aaatctgact ttgcatgtgc aaacgccttc aacaacagca ttattccaga agacaccttc    660
ttccccagcc agaaagttc ctgtgatgtc aagctggtcg agaaaagctt gaaacagat    720 acgaacctaa actttcaaaa cctgtcagtg attgggttcc gaatcctcct cctgaaagtg    780
gccgggttta atctgctcat gacgctgcgg ctgtggtcca gc                       822

<210> SEQ ID NO 11
<211> LENGTH: 819
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 11
atgaaatcct tgagagtttt actagtgatc ctgtggcttc agttgagctg ggtttggagc     60
caacagaagg aggtggagca gaattctgga cccctcagtg ttccagaggg agccattgcc    120
tctctcaact gcacttacag tgaccgaggt tcccagtcct tcttctggta cagacaatat    180
tctgggaaaa gccctgagtt gataatgttc atatactcca atggtgacaa agaagatgga    240
aggtttacag cacagctcaa taaagccagc agtatgtttt ctctgctcat cagagactcc    300
cagcccagtg attcagccac ctacctctgt gccgtggggg acgcgggcag agagcactt    360 actttgggga gtggaacaag actccaagtg caaccaaata tccagaaccc tgaccctgcc    420
gtgtaccagc tgagagactc taaatccagt gacaagtctg tctgcctatt caccgatttt    480
gattctcaaa caaatgtgtc acaaagtaag gattctgatg tgtatatcac agacaaaact    540
gtgctagaca tgaggtctat ggacttcaag agcaacagtg ctgtggcctg gagcaacaaa    600
tctgactttg catgtgcaaa cgccttcaac aacagcatta ttccagaaga caccttcttc    660
cccagcccag aaagttcctg tgatgtcaag ctggtcgaga aaagctttga acagatacg    720 aacctaaact ttcaaaacct gtcagtgatt gggttccgaa tcctcctcct gaaagtggcc    780
gggtttaatc tgctcatgac gctgcggctg tggtccagc                           819

<210> SEQ ID NO 12
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 12
atggcatgcc ctggcttcct gtgggcactt gtgatctcca cctgtcttga atttagcatg     60
gctcagacag tcactcagtc tcaaccagag atgtctgtgc aggaggcaga gaccgtgacc    120
ctgagctgca catatgacac cagtgagagt gattattatt tattctggta caagcagcct    180
cccagcaggc agatgattct cgttattcgc caagaagctt ataagcaaca gaatgcaaca    240
gagaatcgtt tctctgtgaa cttccagaaa gcagccaaat ccttcagtct caagatctca    300
gactcacagc tgggggatgc cgcgatgtat ttctgtgctt atgaggacgg atctgaaaag    360
```

| | |
|---|---|
| ctggtctttg gaaagggaac gaaactgaca gtaaacccat atatccagaa ccctgaccct | 420 |
| gccgtgtacc agctgagaga ctctaaatcc agtgacaagt ctgtctgcct attcaccgat | 480 |
| tttgattctc aaacaaatgt gtcacaaagt aaggattctg atgtgtatat cacagacaaa | 540 |
| actgtgctag acatgaggtc tatggacttc aagagcaaca gtgctgtggc ctggagcaac | 600 |
| aaatctgact ttgcatgtgc aaacgccttc aacaacagca ttattccaga agacaccttc | 660 |
| ttccccagcc cagaaagttc ctgtgatgtc aagctggtcg agaaaagctt tgaaacagat | 720 |
| acgaacctaa actttcaaaa cctgtcagtg attgggttcc gaatcctcct cctgaaagtg | 780 |
| gccgggttta atctgctcat gacgctgcgg ctgtggtcca gc | 822 |

<210> SEQ ID NO 13
<211> LENGTH: 846
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 13

| | |
|---|---|
| atggccatgc tcctgggggc atcagtgctg attctgtggc ttcagccaga ctgggtaaac | 60 |
| agtcaacaga gaatgatga ccagcaagtt aagcaaaatt caccatccct gagcgtccag | 120 |
| gaaggaagaa tttctattct gaactgtgac tatactaaca gcatgtttga ttatttccta | 180 |
| tggtacaaaa ataccctgc tgaaggtcct acattcctga tatctataag ttccattaag | 240 |
| gataaaaatg aagatggaag attcactgtc ttccttaaaca aaagtgccaa gcacctctct | 300 |
| ctgcacattg tgccctccca gctggagac tctgcagtgt acttctgtgc agcaagcccg | 360 |
| ccggaatctg gtggctacaa taagctgatt tttggagcag ggaccaggct ggctgtacac | 420 |
| ccatatatcc agaaccctga ccctgccgtg taccagctga gagactctaa atccagtgac | 480 |
| aagtctgtct gcctattcac cgattttgat tctcaaacaa atgtgtcaca agtaaggat | 540 |
| tctgatgtgt atatcacaga caaaactgtg ctagacatga ggtctatgga cttcaagagc | 600 |
| aacagtgctg tggcctggag caacaaatct gactttgcat gtgcaaacgc cttcaacaac | 660 |
| agcattattc cagaagacac cttcttcccc agcccagaaa gttcctgtga tgtcaagctg | 720 |
| gtcgagaaaa gctttgaaac agatacgaac ctaaactttc aaaacctgtc agtgattggg | 780 |
| ttccgaatcc tcctgaa gtggccggg tttaatctgc tcatgacgct gcggctgtgg | 840 |
| tccagc | 846 |

<210> SEQ ID NO 14
<211> LENGTH: 831
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 14

| | |
|---|---|
| atgaaatcct tgagagtttt actagtgatc ctgtggcttc agttgagctg ggtttggagc | 60 |
| caacagaagg aggtggagca gaattctgga cccctcagtg ttccagaggg agccattgcc | 120 |
| tctctcaact gcacttacag tgaccgaggt tcccagtcct tcttctggta cagacaatat | 180 |
| tctgggaaaa gccctgagtt gataatgttc atatactcca atggtgacaa agaagatgga | 240 |
| aggtttacag cacagctcaa taaagccagc cagtatgttt ctctgctcat cagagactcc | 300 |

```
cagcccagtg attcagccac ctacctctgt gccgtgtcgc gccgggagag gaacacaggc    360
tttcagaaac ttgtatttgg aactggcacc cgacttctgg tcagtccaaa tatccagaac    420
cctgaccctg ccgtgtacca gctgagagac tctaaatcca gtgacaagtc tgtctgccta    480
ttcaccgatt tgattctca aacaaatgtg tcacaaagta aggattctga tgtgtatatc    540
acagacaaaa ctgtgctaga catgaggtct atggacttca agagcaacag tgctgtggcc    600
tggagcaaca aatctgactt tgcatgtgca aacgccttca caacagcat tattccagaa     660 gacaccttct tccccagccc agaaagttcc tgtgatgtca agctggtcga gaaaagcttt    720
gaaacagata cgaacctaaa ctttcaaaac ctgtcagtga ttgggttccg aatcctcctc    780
ctgaaagtgg ccgggtttaa tctgctcatg acgctgcggc tgtggtccag c              831
```

<210> SEQ ID NO 15
<211> LENGTH: 819
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 15

```
atgatatcct tgagagtttt actggtgatc ctgtggcttc agttaagctg ggtttggagc     60
caacggaagg aggtggagca ggatcctgga cccttcaatg ttccagaggg agccactgtc    120
gctttcaact gtacttacag caacagtgct tctcagtctt tcttctggta cagacaggat    180
tgcaggaaag aacctaagtt gctgatgtcc gtatactcca gtggtaatga agatggaagg    240
tttacagcac agctcaatag agccagccag tatatttccc tgctcatcag agactccaag    300
ctcagtgatt cagccaccta cctctgtgtg gtgcggccgg ggactggagg cttcaaaact    360
atctttggag caggaacaag actatttgtt aaagcaaata tccagaaccc tgaccctgcc    420
gtgtaccagc tgagagactc taaatccagt gacaagtctg tctgcctatt caccgatttt    480
gattctcaaa caaatgtgtc acaaagtaag gattctgatg tgtatatcac agacaaaact    540
gtgctagaca tgaggtctat ggacttcaag agcaacagtc tgtgcctg gagcaacaaa     600 tctgactttg catgtgcaaa cgccttcaac aacagcatta ttccagaaga caccttcttc    660
cccagcccag aaagttcctg tgatgtcaag ctggtcgaga aaagctttga aacagatacg    720
aacctaaact ttcaaaacct gtcagtgatt gggttccgaa tcctcctcct gaaagtggcc    780
gggtttaatc tgctcatgac gctgcggctg tggtccagc                           819
```

<210> SEQ ID NO 16
<211> LENGTH: 822
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 16

```
atggctttgc agagcactct gggggcggtg tggctagggc ttctcctcaa ctctctctgg    60
aaggttgcag aaagcaagga ccaagtgttt cagccttcca cagtggcatc ttcagaggga    120
gctgtggtgg aaatcttctg taatcactct gtgtccaatg cttacaactt cttctggtac    180
cttcacttcc cgggatgtgc accaagactc cttgttaaag gctcaaagcc ttctcagcag    240
```

```
ggacgataca acatgaccta tgaacggttc tcttcatcgc tgctcatcct ccaggtgcgg      300
gaggcagatg ctgctgttta ctactgtgct gtggaggacc tttataacca gggaggaaag      360
cttatcttcg gacagggaac ggagttatct gtgaaaccca atatccagaa ccctgaccct      420
gccgtgtacc agctgagaga ctctaaatcc agtgacaagt ctgtctgcct attcaccgat      480
tttgattctc aaacaaatgt gtcacaaagt aaggattctg atgtgtatat cacagacaaa      540
actgtgctag acatgaggtc tatggacttc aagagcaaca gtgctgtggc ctggagcaac      600
aaatctgact ttgcatgtgc aaacgccttc aacaacagca ttattccaga agacaccttc      660
ttccccagcc cagaaagttc ctgtgatgtc aagctggtcg agaaaagctt tgaaacagat      720
acgaacctaa actttcaaaa cctgtcagtg attgggttcc gaatcctcct cctgaaagtg      780
gccgggttta atctgctcat gacgctgcgg ctgtggtcca gc                        822
```

<210> SEQ ID NO 17

<400> SEQUENCE: 17

000

<210> SEQ ID NO 18

<400> SEQUENCE: 18

000

<210> SEQ ID NO 19
<211> LENGTH: 340
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 19

Met Gly Phe Arg Leu Leu Cys Cys Val Ala Phe Cys Leu Leu Gly Ala
1               5                   10                  15

Gly Pro Val Asp Ser Gly Val Thr Gln Thr Pro Lys His Leu Ile Thr
            20                  25                  30

Ala Thr Gly Gln Arg Val Thr Leu Arg Cys Ser Pro Arg Ser Gly Asp
        35                  40                  45

Leu Ser Val Tyr Trp Tyr Gln Gln Ser Leu Asp Gln Gly Leu Gln Phe
    50                  55                  60

Leu Ile Gln Tyr Tyr Asn Gly Glu Glu Arg Ala Lys Gly Asn Ile Leu
65                  70                  75                  80

Glu Arg Phe Ser Ala Gln Gln Phe Pro Asp Leu His Ser Glu Leu Asn
                85                  90                  95

Leu Ser Ser Leu Glu Leu Gly Asp Ser Ala Leu Tyr Phe Cys Ala Ser
            100                 105                 110

Ser Val Ala Gly Ser Ser Tyr Gly Tyr Thr Phe Gly Ser Gly Thr
        115                 120                 125

Arg Leu Thr Val Val Glu Asp Leu Asn Lys Val Phe Pro Pro Glu Val
    130                 135                 140

Ala Val Phe Glu Pro Ser Glu Ala Glu Ile Ser His Thr Gln Lys Ala
145                 150                 155                 160

Thr Leu Val Cys Leu Ala Thr Gly Phe Phe Pro Asp His Val Glu Leu
                165                 170                 175

```
Ser Trp Trp Val Asn Gly Lys Glu Val His Ser Gly Val Ser Thr Asp
                180                 185                 190

Pro Gln Pro Leu Lys Glu Gln Pro Ala Leu Asn Asp Ser Arg Tyr Cys
            195                 200                 205

Leu Ser Ser Arg Leu Arg Val Ser Ala Thr Phe Trp Gln Asn Pro Arg
210                 215                 220

Asn His Phe Arg Cys Gln Val Gln Phe Tyr Gly Leu Ser Glu Asn Asp
225                 230                 235                 240

Glu Trp Thr Gln Asp Arg Ala Lys Pro Val Thr Gln Ile Val Ser Ala
                245                 250                 255

Glu Ala Trp Gly Arg Ala Asp Cys Gly Phe Thr Ser Val Ser Tyr Gln
                260                 265                 270

Gln Gly Val Leu Ser Ala Thr Ile Leu Tyr Glu Ile Leu Leu Gly Lys
            275                 280                 285

Ala Thr Leu Tyr Ala Val Leu Val Ser Ala Leu Val Leu Met Ala Met
            290                 295                 300

Val Lys Arg Lys Asp Phe Arg Arg Arg Ser Gly Ser Gly Val Lys
305                 310                 315                 320

Gln Thr Leu Asn Phe Asp Leu Leu Lys Leu Ala Gly Asp Val Glu Ser
                325                 330                 335

Asn Pro Gly Pro
            340

<210> SEQ ID NO 20
<211> LENGTH: 338
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 20

Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Ala Arg Thr Glu Ala Phe Phe Gly Gln Gly Thr Arg Leu
        115                 120                 125

Thr Val Val Glu Asp Leu Asn Lys Val Phe Pro Pro Glu Val Ala Val
    130                 135                 140

Phe Glu Pro Ser Glu Ala Glu Ile Ser His Thr Gln Lys Ala Thr Leu
145                 150                 155                 160

Val Cys Leu Ala Thr Gly Phe Phe Pro Asp His Val Glu Leu Ser Trp
                165                 170                 175

Trp Val Asn Gly Lys Glu Val His Ser Gly Val Ser Thr Asp Pro Gln
```

```
                180             185             190
Pro Leu Lys Glu Gln Pro Ala Leu Asn Asp Ser Arg Tyr Cys Leu Ser
            195                 200                 205

Ser Arg Leu Arg Val Ser Ala Thr Phe Trp Gln Asn Pro Arg Asn His
            210                 215                 220

Phe Arg Cys Gln Val Gln Phe Tyr Gly Leu Ser Glu Asn Asp Glu Trp
225                 230                 235                 240

Thr Gln Asp Arg Ala Lys Pro Val Thr Gln Ile Val Ser Ala Glu Ala
            245                 250                 255

Trp Gly Arg Ala Asp Cys Gly Phe Thr Ser Val Ser Tyr Gln Gln Gly
            260                 265                 270

Val Leu Ser Ala Thr Ile Leu Tyr Glu Ile Leu Leu Gly Lys Ala Thr
            275                 280                 285

Leu Tyr Ala Val Leu Val Ser Ala Leu Val Leu Met Ala Met Val Lys
            290                 295                 300

Arg Lys Asp Phe Arg Arg Arg Ser Gly Ser Gly Val Lys Gln Thr
305                 310                 315                 320

Leu Asn Phe Asp Leu Leu Lys Leu Ala Gly Asp Val Glu Ser Asn Pro
            325                 330                 335

Gly Pro

<210> SEQ ID NO 21
<211> LENGTH: 310
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 21

Met Gly Phe Arg Leu Leu Cys Cys Val Ala Phe Cys Leu Leu Gly Ala
1               5                   10                  15

Gly Pro Val Asp Ser Gly Val Thr Gln Thr Pro Lys His Leu Ile Thr
            20                  25                  30

Ala Thr Gly Gln Arg Val Thr Leu Arg Cys Ser Pro Arg Ser Gly Asp
        35                  40                  45

Leu Ser Val Tyr Trp Tyr Gln Gln Ser Leu Asp Gln Gly Leu Gln Phe
    50                  55                  60

Leu Ile Gln Tyr Tyr Asn Gly Glu Glu Arg Ala Lys Gly Asn Ile Leu
65                  70                  75                  80

Glu Arg Phe Ser Ala Gln Gln Phe Pro Asp Leu His Ser Glu Leu Asn
                85                  90                  95

Leu Ser Ser Leu Glu Leu Gly Asp Ser Ala Leu Tyr Phe Cys Ala Ser
            100                 105                 110

Ser Val Ala Gly Ser Ser Tyr Gly Tyr Thr Phe Gly Ser Gly Thr
            115                 120                 125

Arg Leu Thr Val Val Glu Asp Leu Asn Lys Val Phe Pro Pro Glu Val
        130                 135                 140

Ala Val Phe Glu Pro Ser Glu Ala Glu Ile Ser His Thr Gln Lys Ala
145                 150                 155                 160

Thr Leu Val Cys Leu Ala Thr Gly Phe Phe Pro Asp His Val Glu Leu
                165                 170                 175

Ser Trp Trp Val Asn Gly Lys Glu Val His Ser Gly Val Ser Thr Asp
            180                 185                 190
```

```
Pro Gln Pro Leu Lys Glu Gln Pro Ala Leu Asn Asp Ser Arg Tyr Cys
            195                 200                 205

Leu Ser Ser Arg Leu Arg Val Ser Ala Thr Phe Trp Gln Asn Pro Arg
        210                 215                 220

Asn His Phe Arg Cys Gln Val Gln Phe Tyr Gly Leu Ser Glu Asn Asp
225                 230                 235                 240

Glu Trp Thr Gln Asp Arg Ala Lys Pro Val Thr Gln Ile Val Ser Ala
                245                 250                 255

Glu Ala Trp Gly Arg Ala Asp Cys Gly Phe Thr Ser Val Ser Tyr Gln
                260                 265                 270

Gln Gly Val Leu Ser Ala Thr Ile Leu Tyr Glu Ile Leu Leu Gly Lys
            275                 280                 285

Ala Thr Leu Tyr Ala Val Leu Val Ser Ala Leu Val Leu Met Ala Met
        290                 295                 300

Val Lys Arg Lys Asp Phe
305                 310
```

<210> SEQ ID NO 22
<211> LENGTH: 308
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 22

```
Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
                20                  25                  30

Lys Arg Gly Gln Asn Val Thr Phe Arg Cys Asp Pro Ile Ser Glu His
            35                  40                  45

Asn Arg Leu Tyr Trp Tyr Arg Gln Thr Leu Gly Gln Gly Pro Glu Phe
        50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Ala Arg Thr Glu Ala Phe Phe Gly Gln Gly Thr Arg Leu
        115                 120                 125

Thr Val Val Glu Asp Leu Asn Lys Val Phe Pro Pro Glu Val Ala Val
130                 135                 140

Phe Glu Pro Ser Glu Ala Glu Ile Ser His Thr Gln Lys Ala Thr Leu
145                 150                 155                 160

Val Cys Leu Ala Thr Gly Phe Phe Pro Asp His Val Glu Leu Ser Trp
                165                 170                 175

Trp Val Asn Gly Lys Glu Val His Ser Gly Val Ser Thr Asp Pro Gln
            180                 185                 190

Pro Leu Lys Glu Gln Pro Ala Leu Asn Asp Ser Arg Tyr Cys Leu Ser
        195                 200                 205

Ser Arg Leu Arg Val Ser Ala Thr Phe Trp Gln Asn Pro Arg Asn His
210                 215                 220

Phe Arg Cys Gln Val Gln Phe Tyr Gly Leu Ser Glu Asn Asp Glu Trp
```

```
                225                 230                 235                 240

Thr Gln Asp Arg Ala Lys Pro Val Thr Gln Ile Val Ser Ala Glu Ala
                245                 250                 255

Trp Gly Arg Ala Asp Cys Gly Phe Thr Ser Val Ser Tyr Gln Gln Gly
                260                 265                 270

Val Leu Ser Ala Thr Ile Leu Tyr Glu Ile Leu Leu Gly Lys Ala Thr
                275                 280                 285

Leu Tyr Ala Val Leu Val Ser Ala Leu Val Leu Met Ala Met Val Lys
                290                 295                 300

Arg Lys Asp Phe
305

<210> SEQ ID NO 23
<211> LENGTH: 309
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 23

Met Gly Cys Arg Leu Leu Cys Cys Val Val Phe Cys Leu Leu Gln Ala
1               5                   10                  15

Gly Pro Leu Asp Thr Ala Val Ser Gln Thr Pro Lys Tyr Leu Val Thr
                20                  25                  30

Gln Met Gly Asn Asp Lys Ser Ile Lys Cys Glu Gln Asn Leu Gly His
                35                  40                  45

Asp Thr Met Tyr Trp Tyr Lys Gln Asp Ser Lys Lys Phe Leu Lys Ile
            50                  55                  60

Met Phe Ser Tyr Asn Asn Lys Glu Leu Ile Ile Asn Glu Thr Val Pro
65                  70                  75                  80

Asn Arg Phe Ser Pro Lys Ser Pro Asp Lys Ala His Leu Asn Leu His
                85                  90                  95

Ile Asn Ser Leu Glu Leu Gly Asp Ser Ala Val Tyr Phe Cys Ala Ser
                100                 105                 110

Ser Leu Gly Thr Asp Thr Gln Tyr Phe Gly Pro Gly Thr Arg Leu Thr
                115                 120                 125

Val Leu Glu Asp Leu Lys Asn Val Phe Pro Pro Glu Val Ala Val Phe
                130                 135                 140

Glu Pro Ser Glu Ala Glu Ile Ser His Thr Gln Lys Ala Thr Leu Val
145                 150                 155                 160

Cys Leu Ala Thr Gly Phe Tyr Pro Asp His Val Glu Leu Ser Trp Trp
                165                 170                 175

Val Asn Gly Lys Glu Val His Ser Gly Val Ser Thr Asp Pro Gln Pro
                180                 185                 190

Leu Lys Glu Gln Pro Ala Leu Asn Asp Ser Arg Tyr Cys Leu Ser Ser
                195                 200                 205

Arg Leu Arg Val Ser Ala Thr Phe Trp Gln Asn Pro Arg Asn His Phe
                210                 215                 220

Arg Cys Gln Val Gln Phe Tyr Gly Leu Ser Glu Asn Asp Glu Trp Thr
225                 230                 235                 240

Gln Asp Arg Ala Lys Pro Val Thr Gln Ile Val Ser Ala Glu Ala Trp
                245                 250                 255

Gly Arg Ala Asp Cys Gly Phe Thr Ser Glu Ser Tyr Gln Gln Gly Val
                260                 265                 270
```

Leu Ser Ala Thr Ile Leu Tyr Glu Ile Leu Leu Gly Lys Ala Thr Leu
            275                 280                 285

Tyr Ala Val Leu Val Ser Ala Leu Val Leu Met Ala Met Val Lys Arg
            290                 295                 300

Lys Asp Ser Arg Gly
305

<210> SEQ ID NO 24
<211> LENGTH: 309
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 24

Met Gly Cys Arg Leu Leu Cys Cys Val Val Phe Cys Leu Leu Gln Ala
1               5                   10                  15

Gly Pro Leu Asp Thr Ala Val Ser Gln Thr Pro Lys Tyr Leu Val Thr
            20                  25                  30

Gln Met Gly Asn Asp Lys Ser Ile Lys Cys Glu Gln Asn Leu Gly His
        35                  40                  45

Asp Thr Met Tyr Trp Tyr Lys Gln Asp Ser Lys Lys Phe Leu Lys Ile
    50                  55                  60

Met Phe Ser Tyr Asn Asn Lys Glu Leu Ile Ile Asn Glu Thr Val Pro
65                  70                  75                  80

Asn Arg Phe Ser Pro Lys Ser Pro Asp Lys Ala His Leu Asn Leu His
                85                  90                  95

Ile Asn Ser Leu Glu Leu Gly Asp Ser Ala Val Tyr Phe Cys Ala Ser
            100                 105                 110

Ser Gln Arg Val Tyr Glu Gln Tyr Phe Gly Pro Gly Thr Arg Leu Thr
        115                 120                 125

Val Thr Glu Asp Leu Lys Asn Val Phe Pro Pro Glu Val Ala Val Phe
    130                 135                 140

Glu Pro Ser Glu Ala Glu Ile Ser His Thr Gln Lys Ala Thr Leu Val
145                 150                 155                 160

Cys Leu Ala Thr Gly Phe Tyr Pro Asp His Val Glu Leu Ser Trp Trp
                165                 170                 175

Val Asn Gly Lys Glu Val His Ser Gly Val Ser Thr Asp Pro Gln Pro
            180                 185                 190

Leu Lys Glu Gln Pro Ala Leu Asn Asp Ser Arg Tyr Cys Leu Ser Ser
        195                 200                 205

Arg Leu Arg Val Ser Ala Thr Phe Trp Gln Asn Pro Arg Asn His Phe
    210                 215                 220

Arg Cys Gln Val Gln Phe Tyr Gly Leu Ser Glu Asn Asp Glu Trp Thr
225                 230                 235                 240

Gln Asp Arg Ala Lys Pro Val Thr Gln Ile Val Ser Ala Glu Ala Trp
                245                 250                 255

Gly Arg Ala Asp Cys Gly Phe Thr Ser Glu Ser Tyr Gln Gln Gly Val
            260                 265                 270

Leu Ser Ala Thr Ile Leu Tyr Glu Ile Leu Leu Gly Lys Ala Thr Leu
        275                 280                 285

Tyr Ala Val Leu Val Ser Ala Leu Val Leu Met Ala Met Val Lys Arg
    290                 295                 300

Lys Asp Ser Arg Gly
305

<210> SEQ ID NO 25
<211> LENGTH: 314
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 25

Met Gly Pro Gln Leu Leu Gly Tyr Val Val Leu Cys Leu Leu Gly Ala
1               5                   10                  15

Gly Pro Leu Glu Ala Gln Val Thr Gln Asn Pro Arg Tyr Leu Ile Thr
            20                  25                  30

Val Thr Gly Lys Lys Leu Thr Val Thr Cys Ser Gln Asn Met Asn His
        35                  40                  45

Glu Tyr Met Ser Trp Tyr Arg Gln Asp Pro Gly Leu Gly Leu Arg Gln
    50                  55                  60

Ile Tyr Tyr Ser Met Asn Val Glu Val Thr Asp Lys Gly Asp Val Pro
65                  70                  75                  80

Glu Gly Tyr Lys Val Ser Arg Lys Glu Lys Arg Asn Phe Pro Leu Ile
                85                  90                  95

Leu Glu Ser Pro Ser Pro Asn Gln Thr Ser Leu Tyr Phe Cys Ala Ser
            100                 105                 110

Ser Leu Leu Gly Thr Gln Gly Pro Lys Glu Thr Gln Tyr Phe Gly Pro
        115                 120                 125

Gly Thr Arg Leu Leu Val Leu Glu Asp Leu Lys Asn Val Phe Pro Pro
    130                 135                 140

Glu Val Ala Val Phe Glu Pro Ser Glu Ala Glu Ile Ser His Thr Gln
145                 150                 155                 160

Lys Ala Thr Leu Val Cys Leu Ala Thr Gly Phe Tyr Pro Asp His Val
                165                 170                 175

Glu Leu Ser Trp Trp Val Asn Gly Lys Glu Val His Ser Gly Val Ser
            180                 185                 190

Thr Asp Pro Gln Pro Leu Lys Glu Gln Pro Ala Leu Asn Asp Ser Arg
        195                 200                 205

Tyr Cys Leu Ser Ser Arg Leu Arg Val Ser Ala Thr Phe Trp Gln Asn
    210                 215                 220

Pro Arg Asn His Phe Arg Cys Gln Val Gln Phe Tyr Gly Leu Ser Glu
225                 230                 235                 240

Asn Asp Glu Trp Thr Gln Asp Arg Ala Lys Pro Val Thr Gln Ile Val
                245                 250                 255

Ser Ala Glu Ala Trp Gly Arg Ala Asp Cys Gly Phe Thr Ser Glu Ser
            260                 265                 270

Tyr Gln Gln Gly Val Leu Ser Ala Thr Ile Leu Tyr Glu Ile Leu Leu
        275                 280                 285

Gly Lys Ala Thr Leu Tyr Ala Val Leu Val Ser Ala Leu Val Leu Met
    290                 295                 300

Ala Met Val Lys Arg Lys Asp Ser Arg Gly
305                 310

<210> SEQ ID NO 26
<211> LENGTH: 313
<212> TYPE: PRT

<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 26

```
Met Gly Thr Arg Leu Leu Cys Trp Ala Ala Leu Cys Leu Leu Gly Ala
1               5                   10                  15
Asp His Thr Gly Ala Gly Val Ser Gln Thr Pro Ser Asn Lys Val Thr
            20                  25                  30
Glu Lys Gly Lys Tyr Val Glu Leu Arg Cys Asp Pro Ile Ser Gly His
        35                  40                  45
Thr Ala Leu Tyr Trp Tyr Arg Gln Ser Leu Gly Gln Gly Pro Glu Phe
    50                  55                  60
Leu Ile Tyr Phe Gln Gly Thr Gly Ala Ala Asp Ser Gly Leu Pro
65                  70                  75                  80
Asn Asp Arg Phe Phe Ala Val Arg Pro Glu Gly Ser Val Ser Thr Leu
                85                  90                  95
Lys Ile Gln Arg Thr Glu Arg Gly Asp Ser Ala Val Tyr Leu Cys Ala
            100                 105                 110
Ser Ser Leu Gly Gly Thr Gly Pro Phe Thr Thr Glu Ala Phe Phe Gly
        115                 120                 125
Gln Gly Thr Arg Leu Thr Val Val Glu Asp Leu Asn Lys Val Phe Pro
    130                 135                 140
Pro Glu Val Ala Val Phe Glu Pro Ser Glu Ala Glu Ile Ser His Thr
145                 150                 155                 160
Gln Lys Ala Thr Leu Val Cys Leu Ala Thr Gly Phe Phe Pro Asp His
                165                 170                 175
Val Glu Leu Ser Trp Trp Val Asn Gly Lys Glu Val His Ser Gly Val
            180                 185                 190
Ser Thr Asp Pro Gln Pro Leu Lys Glu Gln Pro Ala Leu Asn Asp Ser
        195                 200                 205
Arg Tyr Cys Leu Ser Ser Arg Leu Arg Val Ser Ala Thr Phe Trp Gln
    210                 215                 220
Asn Pro Arg Asn His Phe Arg Cys Gln Val Gln Phe Tyr Gly Leu Ser
225                 230                 235                 240
Glu Asn Asp Glu Trp Thr Gln Asp Arg Ala Lys Pro Val Thr Gln Ile
                245                 250                 255
Val Ser Ala Glu Ala Trp Gly Arg Ala Asp Cys Gly Phe Thr Ser Val
            260                 265                 270
Ser Tyr Gln Gln Gly Val Leu Ser Ala Thr Ile Leu Tyr Glu Ile Leu
        275                 280                 285
Leu Gly Lys Ala Thr Leu Tyr Ala Val Leu Val Ser Ala Leu Val Leu
    290                 295                 300
Met Ala Met Val Lys Arg Lys Asp Phe
305                 310
```

<210> SEQ ID NO 27
<211> LENGTH: 273
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 27

Met Lys Ser Leu Arg Val Leu Leu Val Ile Leu Trp Leu Gln Leu Ser
1               5                   10                  15

Trp Val Trp Ser Gln Gln Lys Glu Val Glu Gln Asn Ser Gly Pro Leu
            20                  25                  30

Ser Val Pro Glu Gly Ala Ile Ala Ser Leu Asn Cys Thr Tyr Ser Asp
            35                  40                  45

Arg Gly Ser Gln Ser Phe Phe Trp Tyr Arg Gln Tyr Ser Gly Lys Ser
    50                  55                  60

Pro Glu Leu Ile Met Phe Ile Tyr Ser Asn Gly Asp Lys Glu Asp Gly
65                  70                  75                  80

Arg Phe Thr Ala Gln Leu Asn Lys Ala Ser Gln Tyr Val Ser Leu Leu
                85                  90                  95

Ile Arg Asp Ser Gln Pro Ser Asp Ser Ala Thr Tyr Leu Cys Ala Val
                100                 105                 110

Gly Asp Ala Gly Arg Arg Ala Leu Thr Phe Gly Ser Gly Thr Arg Leu
            115                 120                 125

Gln Val Gln Pro Asn Ile Gln Asn Pro Asp Pro Ala Val Tyr Gln Leu
        130                 135                 140

Arg Asp Ser Lys Ser Ser Asp Lys Ser Val Cys Leu Phe Thr Asp Phe
145                 150                 155                 160

Asp Ser Gln Thr Asn Val Ser Gln Ser Lys Asp Ser Asp Val Tyr Ile
                165                 170                 175

Thr Asp Lys Thr Val Leu Asp Met Arg Ser Met Asp Phe Lys Ser Asn
            180                 185                 190

Ser Ala Val Ala Trp Ser Asn Lys Ser Asp Phe Ala Cys Ala Asn Ala
        195                 200                 205

Phe Asn Asn Ser Ile Ile Pro Glu Asp Thr Phe Phe Pro Ser Pro Glu
    210                 215                 220

Ser Ser Cys Asp Val Lys Leu Val Glu Lys Ser Phe Glu Thr Asp Thr
225                 230                 235                 240

Asn Leu Asn Phe Gln Asn Leu Ser Val Ile Gly Phe Arg Ile Leu Leu
                245                 250                 255

Leu Lys Val Ala Gly Phe Asn Leu Leu Met Thr Leu Arg Leu Trp Ser
            260                 265                 270

Ser

<210> SEQ ID NO 28
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 28

Met Ala Cys Pro Gly Phe Leu Trp Ala Leu Val Ile Ser Thr Cys Leu
1               5                   10                  15

Glu Phe Ser Met Ala Gln Thr Val Thr Gln Ser Gln Pro Glu Met Ser
            20                  25                  30

Val Gln Glu Ala Glu Thr Val Thr Leu Ser Cys Thr Tyr Asp Thr Ser
            35                  40                  45

Glu Ser Asp Tyr Tyr Leu Phe Trp Tyr Lys Gln Pro Pro Ser Arg Gln
        50                  55                  60

Met Ile Leu Val Ile Arg Gln Glu Ala Tyr Lys Gln Gln Asn Ala Thr

```
              65                  70                  75                  80
Glu Asn Arg Phe Ser Val Asn Phe Gln Lys Ala Ala Lys Ser Phe Ser
                    85                  90                  95

Leu Lys Ile Ser Asp Ser Gln Leu Gly Asp Ala Ala Met Tyr Phe Cys
                100                 105                 110

Ala Tyr Glu Asp Gly Ser Glu Lys Leu Val Phe Gly Lys Gly Thr Lys
            115                 120                 125

Leu Thr Val Asn Pro Tyr Ile Gln Asn Pro Asp Pro Ala Val Tyr Gln
    130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
                180                 185                 190

Asn Ser Ala Val Ala Trp Ser Asn Lys Ser Asp Phe Ala Cys Ala Asn
            195                 200                 205

Ala Phe Asn Asn Ser Ile Ile Pro Glu Asp Thr Phe Phe Pro Ser Pro
    210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
            260                 265                 270

Ser Ser

<210> SEQ ID NO 29
<211> LENGTH: 273
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 29

Met Lys Ser Leu Arg Val Leu Leu Val Ile Leu Trp Leu Gln Leu Ser
1               5                   10                  15

Trp Val Trp Ser Gln Gln Lys Glu Val Glu Gln Asn Ser Gly Pro Leu
                20                  25                  30

Ser Val Pro Glu Gly Ala Ile Ala Ser Leu Asn Cys Thr Tyr Ser Asp
            35                  40                  45

Arg Gly Ser Gln Ser Phe Phe Trp Tyr Arg Gln Tyr Ser Gly Lys Ser
        50                  55                  60

Pro Glu Leu Ile Met Phe Ile Tyr Ser Asn Gly Asp Lys Glu Asp Gly
65                  70                  75                  80

Arg Phe Thr Ala Gln Leu Asn Lys Ala Ser Gln Tyr Val Ser Leu Leu
                85                  90                  95

Ile Arg Asp Ser Gln Pro Ser Asp Ser Ala Thr Tyr Leu Cys Ala Val
                100                 105                 110

Gly Asp Ala Gly Arg Arg Ala Leu Thr Phe Gly Ser Gly Thr Arg Leu
            115                 120                 125

Gln Val Gln Pro Asn Ile Gln Asn Pro Asp Pro Ala Val Tyr Gln Leu
        130                 135                 140
```

```
Arg Asp Ser Lys Ser Ser Asp Lys Ser Val Cys Leu Phe Thr Asp Phe
145                 150                 155                 160

Asp Ser Gln Thr Asn Val Ser Gln Ser Lys Asp Ser Val Tyr Ile
            165                 170                 175

Thr Asp Lys Thr Val Leu Asp Met Arg Ser Met Asp Phe Lys Ser Asn
            180                 185                 190

Ser Ala Val Ala Trp Ser Asn Lys Ser Asp Phe Ala Cys Ala Asn Ala
            195                 200                 205

Phe Asn Asn Ser Ile Ile Pro Glu Asp Thr Phe Phe Pro Ser Pro Glu
    210                 215                 220

Ser Ser Cys Asp Val Lys Leu Val Glu Lys Ser Phe Glu Thr Asp Thr
225                 230                 235                 240

Asn Leu Asn Phe Gln Asn Leu Ser Val Ile Gly Phe Arg Ile Leu Leu
            245                 250                 255

Leu Lys Val Ala Gly Phe Asn Leu Leu Met Thr Leu Arg Leu Trp Ser
            260                 265                 270

Ser

<210> SEQ ID NO 30
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 30

Met Ala Cys Pro Gly Phe Leu Trp Ala Leu Val Ile Ser Thr Cys Leu
1               5                   10                  15

Glu Phe Ser Met Ala Gln Thr Val Thr Gln Ser Gln Pro Glu Met Ser
            20                  25                  30

Val Gln Glu Ala Glu Thr Val Thr Leu Ser Cys Thr Tyr Asp Thr Ser
        35                  40                  45

Glu Ser Asp Tyr Tyr Leu Phe Trp Tyr Lys Gln Pro Pro Ser Arg Gln
50                  55                  60

Met Ile Leu Val Ile Arg Gln Glu Ala Tyr Lys Gln Gln Asn Ala Thr
65                  70                  75                  80

Glu Asn Arg Phe Ser Val Asn Phe Gln Lys Ala Ala Lys Ser Phe Ser
            85                  90                  95

Leu Lys Ile Ser Asp Ser Gln Leu Gly Asp Ala Ala Met Tyr Phe Cys
            100                 105                 110

Ala Tyr Glu Asp Gly Ser Glu Lys Leu Val Phe Gly Lys Gly Thr Lys
            115                 120                 125

Leu Thr Val Asn Pro Tyr Ile Gln Asn Pro Asp Pro Ala Val Tyr Gln
            130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Val Tyr
                165                 170                 175

Ile Thr Asp Lys Thr Val Leu Asp Met Arg Ser Met Asp Phe Lys Ser
            180                 185                 190

Asn Ser Ala Val Ala Trp Ser Asn Lys Ser Asp Phe Ala Cys Ala Asn
            195                 200                 205

Ala Phe Asn Asn Ser Ile Ile Pro Glu Asp Thr Phe Phe Pro Ser Pro
    210                 215                 220
```

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
                260                 265                 270

Ser Ser

<210> SEQ ID NO 31
<211> LENGTH: 282
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 31

Met Ala Met Leu Leu Gly Ala Ser Val Leu Ile Leu Trp Leu Gln Pro
1               5                   10                  15

Asp Trp Val Asn Ser Gln Gln Lys Asn Asp Gln Gln Val Lys Gln
            20                  25                  30

Asn Ser Pro Ser Leu Ser Val Gln Glu Gly Arg Ile Ser Ile Leu Asn
                35                  40                  45

Cys Asp Tyr Thr Asn Ser Met Phe Asp Tyr Phe Leu Trp Tyr Lys Lys
            50                  55                  60

Tyr Pro Ala Glu Gly Pro Thr Phe Leu Ile Ser Ile Ser Ser Ile Lys
65                  70                  75                  80

Asp Lys Asn Glu Asp Gly Arg Phe Thr Val Phe Leu Asn Lys Ser Ala
                85                  90                  95

Lys His Leu Ser Leu His Ile Val Pro Ser Gln Pro Gly Asp Ser Ala
            100                 105                 110

Val Tyr Phe Cys Ala Ala Ser Pro Pro Glu Ser Gly Tyr Asn Lys
            115                 120                 125

Leu Ile Phe Gly Ala Gly Thr Arg Leu Ala Val His Pro Tyr Ile Gln
    130                 135                 140

Asn Pro Asp Pro Ala Val Tyr Gln Leu Arg Asp Ser Lys Ser Ser Asp
145                 150                 155                 160

Lys Ser Val Cys Leu Phe Thr Asp Phe Asp Ser Gln Thr Asn Val Ser
                165                 170                 175

Gln Ser Lys Asp Ser Asp Val Tyr Ile Thr Asp Lys Thr Val Leu Asp
            180                 185                 190

Met Arg Ser Met Asp Phe Lys Ser Asn Ser Ala Val Ala Trp Ser Asn
            195                 200                 205

Lys Ser Asp Phe Ala Cys Ala Asn Ala Phe Asn Asn Ser Ile Ile Pro
    210                 215                 220

Glu Asp Thr Phe Phe Pro Ser Pro Glu Ser Ser Cys Asp Val Lys Leu
225                 230                 235                 240

Val Glu Lys Ser Phe Glu Thr Asp Thr Asn Leu Asn Phe Gln Asn Leu
                245                 250                 255

Ser Val Ile Gly Phe Arg Ile Leu Leu Leu Lys Val Ala Gly Phe Asn
            260                 265                 270

Leu Leu Met Thr Leu Arg Leu Trp Ser Ser
            275                 280

```
<210> SEQ ID NO 32
<211> LENGTH: 277
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 32
```

Met Lys Ser Leu Arg Val Leu Leu Val Ile Leu Trp Leu Gln Leu Ser
1               5                   10                  15

Trp Val Trp Ser Gln Gln Lys Glu Val Glu Gln Asn Ser Gly Pro Leu
                20                  25                  30

Ser Val Pro Glu Gly Ala Ile Ala Ser Leu Asn Cys Thr Tyr Ser Asp
            35                  40                  45

Arg Gly Ser Gln Ser Phe Phe Trp Tyr Arg Gln Tyr Ser Gly Lys Ser
        50                  55                  60

Pro Glu Leu Ile Met Phe Ile Tyr Ser Asn Gly Asp Lys Glu Asp Gly
65                  70                  75                  80

Arg Phe Thr Ala Gln Leu Asn Lys Ala Ser Gln Tyr Val Ser Leu Leu
                85                  90                  95

Ile Arg Asp Ser Gln Pro Ser Asp Ser Ala Thr Tyr Leu Cys Ala Val
            100                 105                 110

Ser Arg Arg Glu Arg Asn Thr Gly Phe Gln Lys Leu Val Phe Gly Thr
        115                 120                 125

Gly Thr Arg Leu Leu Val Ser Pro Asn Ile Gln Asn Pro Asp Pro Ala
    130                 135                 140

Val Tyr Gln Leu Arg Asp Ser Lys Ser Ser Asp Lys Ser Val Cys Leu
145                 150                 155                 160

Phe Thr Asp Phe Asp Ser Gln Thr Asn Val Ser Gln Ser Lys Asp Ser
                165                 170                 175

Asp Val Tyr Ile Thr Asp Lys Thr Val Leu Asp Met Arg Ser Met Asp
            180                 185                 190

Phe Lys Ser Asn Ser Ala Val Ala Trp Ser Asn Lys Ser Asp Phe Ala
        195                 200                 205

Cys Ala Asn Ala Phe Asn Asn Ser Ile Ile Pro Glu Asp Thr Phe Phe
    210                 215                 220

Pro Ser Pro Glu Ser Ser Cys Asp Val Lys Leu Val Glu Lys Ser Phe
225                 230                 235                 240

Glu Thr Asp Thr Asn Leu Asn Phe Gln Asn Leu Ser Val Ile Gly Phe
                245                 250                 255

Arg Ile Leu Leu Leu Lys Val Ala Gly Phe Asn Leu Leu Met Thr Leu
            260                 265                 270

Arg Leu Trp Ser Ser
        275

```
<210> SEQ ID NO 33
<211> LENGTH: 273
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 33
```

Met Ile Ser Leu Arg Val Leu Leu Val Ile Leu Trp Leu Gln Leu Ser
1               5                   10                  15

Trp Val Trp Ser Gln Arg Lys Glu Val Glu Gln Asp Pro Gly Pro Phe
            20                  25                  30

Asn Val Pro Glu Gly Ala Thr Val Ala Phe Asn Cys Thr Tyr Ser Asn
            35                  40                  45

Ser Ala Ser Gln Ser Phe Phe Trp Tyr Arg Gln Asp Cys Arg Lys Glu
50                  55                  60

Pro Lys Leu Leu Met Ser Val Tyr Ser Ser Gly Asn Glu Asp Gly Arg
65                  70                  75                  80

Phe Thr Ala Gln Leu Asn Arg Ala Ser Gln Tyr Ile Ser Leu Leu Ile
            85                  90                  95

Arg Asp Ser Lys Leu Ser Asp Ser Ala Thr Tyr Leu Cys Val Val Arg
            100                 105                 110

Pro Gly Thr Gly Gly Phe Lys Thr Ile Phe Gly Ala Gly Thr Arg Leu
            115                 120                 125

Phe Val Lys Ala Asn Ile Gln Asn Pro Asp Pro Ala Val Tyr Gln Leu
130                 135                 140

Arg Asp Ser Lys Ser Ser Asp Lys Ser Val Cys Leu Phe Thr Asp Phe
145                 150                 155                 160

Asp Ser Gln Thr Asn Val Ser Gln Ser Lys Asp Ser Asp Val Tyr Ile
            165                 170                 175

Thr Asp Lys Thr Val Leu Asp Met Arg Ser Met Asp Phe Lys Ser Asn
            180                 185                 190

Ser Ala Val Ala Trp Ser Asn Lys Ser Asp Phe Ala Cys Ala Asn Ala
            195                 200                 205

Phe Asn Asn Ser Ile Ile Pro Glu Asp Thr Phe Phe Pro Ser Pro Glu
210                 215                 220

Ser Ser Cys Asp Val Lys Leu Val Glu Lys Ser Phe Glu Thr Asp Thr
225                 230                 235                 240

Asn Leu Asn Phe Gln Asn Leu Ser Val Ile Gly Phe Arg Ile Leu Leu
            245                 250                 255

Leu Lys Val Ala Gly Phe Asn Leu Leu Met Thr Leu Arg Leu Trp Ser
            260                 265                 270

Ser

<210> SEQ ID NO 34
<211> LENGTH: 274
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 34

Met Ala Leu Gln Ser Thr Leu Gly Ala Val Trp Leu Gly Leu Leu Leu
1               5                   10                  15

Asn Ser Leu Trp Lys Val Ala Glu Ser Lys Asp Gln Val Phe Gln Pro
            20                  25                  30

Ser Thr Val Ala Ser Ser Glu Gly Ala Val Val Glu Ile Phe Cys Asn
            35                  40                  45

His Ser Val Ser Asn Ala Tyr Asn Phe Phe Trp Tyr Leu His Phe Pro
            50                  55                  60

Gly Cys Ala Pro Arg Leu Leu Val Lys Gly Ser Lys Pro Ser Gln Gln
65                  70                  75                  80

Gly Arg Tyr Asn Met Thr Tyr Glu Arg Phe Ser Ser Ser Leu Leu Ile

```
                      85                  90                  95
Leu Gln Val Arg Glu Ala Asp Ala Ala Val Tyr Tyr Cys Ala Val Glu
                100                 105                 110
Asp Leu Tyr Asn Gln Gly Gly Lys Leu Ile Phe Gly Gln Gly Thr Glu
                115                 120                 125
Leu Ser Val Lys Pro Asn Ile Gln Asn Pro Asp Pro Ala Val Tyr Gln
            130                 135                 140
Leu Arg Asp Ser Lys Ser Ser Asp Lys Ser Val Cys Leu Phe Thr Asp
145                 150                 155                 160
Phe Asp Ser Gln Thr Asn Val Ser Gln Ser Lys Asp Ser Asp Val Tyr
                165                 170                 175
Ile Thr Asp Lys Thr Val Leu Asp Met Arg Ser Met Asp Phe Lys Ser
                180                 185                 190
Asn Ser Ala Val Ala Trp Ser Asn Lys Ser Asp Phe Ala Cys Ala Asn
            195                 200                 205
Ala Phe Asn Asn Ser Ile Ile Pro Glu Asp Thr Phe Phe Pro Ser Pro
            210                 215                 220
Glu Ser Ser Cys Asp Val Lys Leu Val Glu Lys Ser Phe Glu Thr Asp
225                 230                 235                 240
Thr Asn Leu Asn Phe Gln Asn Leu Ser Val Ile Gly Phe Arg Ile Leu
                245                 250                 255
Leu Leu Lys Val Ala Gly Phe Asn Leu Leu Met Thr Leu Arg Leu Trp
            260                 265                 270
Ser Ser

<210> SEQ ID NO 35

<400> SEQUENCE: 35

000

<210> SEQ ID NO 36

<400> SEQUENCE: 36

000

<210> SEQ ID NO 37
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 37

Tyr Leu Met Phe Leu Leu Arg Lys Ile
1               5

<210> SEQ ID NO 38
<211> LENGTH: 184
<212> TYPE: PRT
<213> ORGANISM: Homo sapiens

<400> SEQUENCE: 38

Met Leu Gln Met Ala Gly Gln Cys Ser Gln Asn Glu Tyr Phe Asp Ser
1               5                   10                  15
Leu Leu His Ala Cys Ile Pro Cys Gln Leu Arg Cys Ser Ser Asn Thr
            20                  25                  30
```

```
Pro Pro Leu Thr Cys Gln Arg Tyr Cys Asn Ala Ser Val Thr Asn Ser
         35                  40                  45

Val Lys Gly Thr Asn Ala Ile Leu Trp Thr Cys Leu Gly Leu Ser Leu
 50                  55                  60

Ile Ile Ser Leu Ala Val Phe Val Leu Met Phe Leu Leu Arg Lys Ile
 65                  70                  75                  80

Asn Ser Glu Pro Leu Lys Asp Glu Phe Lys Asn Thr Gly Ser Gly Leu
                 85                  90                  95

Leu Gly Met Ala Asn Ile Asp Leu Glu Lys Ser Arg Thr Gly Asp Glu
             100                 105                 110

Ile Ile Leu Pro Arg Gly Leu Glu Tyr Thr Val Glu Glu Cys Thr Cys
             115                 120                 125

Glu Asp Cys Ile Lys Ser Lys Pro Lys Val Asp Ser Asp His Cys Phe
         130                 135                 140

Pro Leu Pro Ala Met Glu Gly Ala Thr Ile Leu Val Thr Thr Lys
145                 150                 155                 160

Thr Asn Asp Tyr Cys Lys Ser Leu Pro Ala Ala Leu Ser Ala Thr Glu
                 165                 170                 175

Ile Glu Lys Ser Ile Ser Ala Arg
             180
```

<210> SEQ ID NO 39
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Leu Ile Ile Ser Leu Ala Val Phe Val
1               5

<210> SEQ ID NO 40
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 40

Ala Val Phe Val Leu Met Phe Leu Leu
1               5

<210> SEQ ID NO 41
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Ser Gln Asn Glu Tyr Phe Asp Ser Leu
1               5

<210> SEQ ID NO 42
<211> LENGTH: 9

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Val Leu Met Phe Leu Leu Arg Lys Ile
1               5

<210> SEQ ID NO 43
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 43

Ala Ile Leu Trp Thr Cys Leu Gly Leu
1               5

<210> SEQ ID NO 44
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 44

Ile Leu Pro Arg Gly Leu Glu Tyr Thr
1               5

<210> SEQ ID NO 45
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 45

Tyr Ile Leu Trp Thr Cys Leu Gly Leu
1               5

<210> SEQ ID NO 46
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 46

Gly Leu Val Gly Leu Ile Phe Ala Val
1               5

<210> SEQ ID NO 47
<211> LENGTH: 9
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 47

Tyr Gln Asn Glu Tyr Phe Asp Ser Leu
1               5

<210> SEQ ID NO 48
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 48

Ser Leu Tyr Asn Thr Val Ala Thr Leu
1               5

<210> SEQ ID NO 49
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 49

Cys Ala Met Arg Val Tyr Asp Lys Val Ile Phe
1               5                   10

<210> SEQ ID NO 50
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 50

Cys Ala Val Ile Gly Tyr Gly Gln Asn Phe Val Phe
1               5                   10

<210> SEQ ID NO 51
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 51

Cys Ala Val Arg Asp Asn Lys Asp Gly Ala Thr Asn Lys Leu Ile Phe
1               5                   10                  15

<210> SEQ ID NO 52
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 52
```

```
Cys Ala Glu Ser Tyr Gly Gly Ala Thr Asn Lys Leu Ile Phe
1               5                   10
```

<210> SEQ ID NO 53
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 53

```
Cys Ala Met Ser Ala Gly Ala Gly Ser Tyr Gln Leu Thr Phe
1               5                   10
```

<210> SEQ ID NO 54
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 54

```
Cys Ala Thr Asp Ala Gly Tyr Asn Asn Asp Met Arg Phe
1               5                   10
```

<210> SEQ ID NO 55
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 55

```
Cys Ala Glu Thr Gly Tyr Ser Thr Leu Thr Phe
1               5                   10
```

<210> SEQ ID NO 56
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 56

```
Cys Ile Leu Thr Arg Ser Arg Ser Ala Arg Gln Leu Thr Phe
1               5                   10
```

<210> SEQ ID NO 57
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 57

```
Cys Ala Val His Phe Gly Asn Glu Lys Leu Thr Phe
1               5                   10
```

<210> SEQ ID NO 58
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 58

Cys Ile Val Arg Ser Tyr Asp Arg Gly Ser Gln Gly Asn Leu Ile Phe
1               5                   10                  15

<210> SEQ ID NO 59
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 59

Cys Leu Leu Gly Asp Glu Leu Gly Asp Tyr Gln Leu Ile Trp
1               5                   10

<210> SEQ ID NO 60
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 60

Cys Ala Leu Gln Leu Asp Asn Tyr Gly Gln Asn Phe Val Phe
1               5                   10

<210> SEQ ID NO 61
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 61

Cys Ala Ala Ser Pro Pro Glu Ser Gly Gly Tyr Asn Lys Leu Ile Phe
1               5                   10                  15

<210> SEQ ID NO 62
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 62

Cys Ala Val Thr Leu Ile Gln Gly Ala Gln Lys Leu Val Phe
1               5                   10

<210> SEQ ID NO 63
<211> LENGTH: 11
<212> TYPE: PRT

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 63

Cys Ala Leu Ser Gly Asp Tyr Lys Leu Ser Phe
1               5                   10

<210> SEQ ID NO 64
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 64

Cys Ala Ser Asp Arg Ser Asn Asp Tyr Lys Leu Ser Phe
1               5                   10

<210> SEQ ID NO 65
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 65

Cys Ile Leu Arg Asp Gly Arg Gly Ser Gln Gly Asn Leu Ile Phe
1               5                   10                  15

<210> SEQ ID NO 66
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 66

Cys Gly Ala Asp Pro Gln Tyr Gly Asn Lys Leu Val Phe
1               5                   10

<210> SEQ ID NO 67
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 67

Cys Ala Ala Ser Pro Tyr Asn Asn Ala Gly Asn Met Leu Thr Phe
1               5                   10                  15

<210> SEQ ID NO 68
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
```

Synthetic peptide"

<400> SEQUENCE: 68

Cys Ala Val Met Asp Ser Asn Tyr Gln Leu Ile Trp
1               5                   10

<210> SEQ ID NO 69
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 69

Cys Leu Val Ala Gln Gly Asn Thr Gly Phe Gln Lys Leu Val Phe
1               5                   10                  15

<210> SEQ ID NO 70
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 70

Cys Ala Val Ser Pro Ile Thr Thr Asp Lys Leu Ile Phe
1               5                   10

<210> SEQ ID NO 71
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 71

Cys Ala Thr Asp Thr Gly Arg Arg Ala Leu Thr Phe
1               5                   10

<210> SEQ ID NO 72
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 72

Cys Ala Glu Arg Gly Gly Tyr Asn Thr Asp Lys Leu Ile Phe
1               5                   10

<210> SEQ ID NO 73
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

```
Cys Ala Ser Asn Ala Gly Gly Thr Ser Tyr Gly Lys Leu Thr Phe
1               5                   10                  15

<210> SEQ ID NO 74
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Cys Ala Ala Ser Tyr Ser Asn Ala Arg Leu Met Phe
1               5                   10

<210> SEQ ID NO 75
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Cys Ala Tyr Ile Asp Asn Asp Met Arg Phe
1               5                   10

<210> SEQ ID NO 76
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Cys Ala Val Arg Ala Tyr Gly Gly Ser Gln Gly Asn Leu Ile Phe
1               5                   10                  15

<210> SEQ ID NO 77
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Cys Ala Val Thr Thr Gly Gly Phe Lys Thr Ile Phe
1               5                   10

<210> SEQ ID NO 78
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 78

Cys Ala Glu Ser Leu Arg Ser Asn Asp Tyr Lys Leu Ser Phe
1               5                   10
```

```
<210> SEQ ID NO 79
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 79

Cys Ala Gly Pro Ser Ser Ser Asn Asp Tyr Lys Leu Ser Phe
1               5                   10

<210> SEQ ID NO 80
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 80

Cys Ala Val Pro Asp Arg Gly Ser Thr Leu Gly Arg Leu Tyr Phe
1               5                   10                  15

<210> SEQ ID NO 81
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 81

Cys Ala Ser Ser His His Gly Arg Gly Ala Thr Gly Glu Leu Phe Phe
1               5                   10                  15

<210> SEQ ID NO 82
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Cys Ala Ser Thr Gly Gly Phe Ser Glu Pro Gln His Phe
1               5                   10

<210> SEQ ID NO 83
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 83

Cys Ala Ser Ser Pro Gly Thr Gly Ser Ser Gly Tyr Thr Phe
1               5                   10

<210> SEQ ID NO 84
<211> LENGTH: 15
<212> TYPE: PRT
<213> ORGANISM: Artificial Sequence
```

```
<220> FEATURE:
<221> NAME/KEY: source
<223> OTHER INFORMATION: /note="Description of Artificial Sequence:
      Synthetic peptide"

<400> SEQUENCE: 84

Cys Ala Ser Ser Thr Thr Ser Gly Gly Ala Gly Glu Gln Phe Phe
1               5                   10                  15

<210> SEQ ID NO 85
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 85

Cys Ala Ser Ser Gln Tyr Ser Gly Gly Ala His Thr Gln Tyr Phe
1               5                   10                  15

<210> SEQ ID NO 86
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 86

Cys Ser Ala Ile Asp Gly Asn Thr Ile Tyr Phe
1               5                   10

<210> SEQ ID NO 87
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 87

Cys Ala Ser Ser Pro Pro Gly Leu Ala Gly Asn Gln Glu Thr Gln Tyr
1               5                   10                  15

Phe

<210> SEQ ID NO 88
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 88

Cys Ala Ser Arg Pro Leu Thr Gly Gly Ala Asn Thr Glu Ala Phe Phe
1               5                   10                  15

<210> SEQ ID NO 89
<211> LENGTH: 13
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 89

Cys Ala Ser Ser Ile Tyr Ser Asn Thr Glu Ala Phe Phe
1               5                   10

<210> SEQ ID NO 90
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 90

Cys Ala Ser Ser Thr Arg Gly Leu Asn Ser Asn Gln Pro Gln His Phe
1               5                   10                  15

<210> SEQ ID NO 91
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 91

Cys Ala Ser Ser Trp Met Gly Gly Asn Glu Gln Phe Phe
1               5                   10

<210> SEQ ID NO 92
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 92

Cys Ala Ser Thr Gly His Pro Gly Thr Gly Pro Tyr Glu Gln Tyr Phe
1               5                   10                  15

<210> SEQ ID NO 93
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 93

Cys Ala Ser Ser Leu Gly Thr Asp Thr Gln Tyr Phe
1               5                   10

<210> SEQ ID NO 94
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 94
```

```
Cys Ala Ser Ser Gly Trp Gly Ser Trp Thr Asp Thr Gln Tyr Phe
1               5                   10                  15
```

<210> SEQ ID NO 95
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 95

```
Cys Ala Ser Ser Ser Gly Gly Ser Ala Ala Tyr Glu Gln Tyr Phe
1               5                   10                  15
```

<210> SEQ ID NO 96
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 96

```
Cys Ala Ser Ser Ser Ala Gly Gly Ala His Tyr Glu Gln Tyr Phe
1               5                   10                  15
```

<210> SEQ ID NO 97
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 97

```
Cys Ala Ser Ser Leu Gly Val Ala Ala Gly Glu Leu Phe Phe
1               5                   10
```

<210> SEQ ID NO 98
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 98

```
Cys Ala Thr Thr Gly Gly Gly Tyr Gly Tyr Thr Phe
1               5                   10
```

<210> SEQ ID NO 99
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 99

```
Cys Ala Ser Ser Leu Thr Trp Gly Ala Asp Thr Gln Tyr Phe
1               5                   10
```

```
<210> SEQ ID NO 100
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 100

Cys Ala Ser Ser Glu Ser Thr Gly His Gln Pro Gln His Phe
1               5                   10

<210> SEQ ID NO 101
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 101

Cys Ala Ser Ser Pro Val Gly Leu Arg Asp Asn Ser Pro Leu His Phe
1               5                   10                  15

<210> SEQ ID NO 102
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 102

Cys Ala Ser Ser Pro Arg Gly Gln Gly Ala Asp Thr Gln Tyr Phe
1               5                   10                  15

<210> SEQ ID NO 103
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 103

Cys Ala Ser Arg Gly Asp Arg Ala Asp Gln Pro Gln His Phe
1               5                   10

<210> SEQ ID NO 104
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 104

Cys Ser Ala Arg Glu Leu Thr Ala Asp Asn Glu Gln Phe Phe
1               5                   10

<210> SEQ ID NO 105
<211> LENGTH: 14
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 105

Cys Ala Ser Ser Leu Val Ala Gly Gln Glu Thr Gln Tyr Phe
1               5                   10

<210> SEQ ID NO 106
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 106

Cys Ala Ser Ser Gln Glu Gly Glu Gly Ala Glu Ala Phe Phe
1               5                   10

<210> SEQ ID NO 107
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 107

Cys Ser Ala Arg Leu Phe Ile Tyr Arg Val Tyr Asn Glu Gln Phe Phe
1               5                   10                  15

<210> SEQ ID NO 108
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 108

Cys Ser Val Pro Lys Gln Asp Leu Tyr Tyr Gly Tyr Thr Phe
1               5                   10

<210> SEQ ID NO 109
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 109

Cys Ala Ser Ser Leu Ala Asp His Arg Gly Leu Ala Lys Asn Ile Gln
1               5                   10                  15

Tyr Phe

<210> SEQ ID NO 110
<211> LENGTH: 13
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 110

Cys Ala Ser Ser Gln Ala Leu Arg Gly Glu Ala Phe Phe
1               5                   10

<210> SEQ ID NO 111
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 111

Cys Ala Ser Asn Pro Thr Gly Gly Ser Tyr Glu Gln Tyr Phe
1               5                   10

<210> SEQ ID NO 112
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 112

Cys Ala Ser Ser Phe Leu Gly Asn Thr Glu Ala Phe Phe
1               5                   10

<210> SEQ ID NO 113
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 113

Cys Ala Ser Thr Pro Gly Arg Thr Val Asn Gln Pro Gln His Phe
1               5                   10                  15

<210> SEQ ID NO 114
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 114

Cys Ala Thr Ser Ser Glu Gly Gln Ala Thr Asp Thr Gln Tyr Phe
1               5                   10                  15

<210> SEQ ID NO 115
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 115

Cys Ala Ser Ser Tyr Thr Gly Phe Thr Glu Ala Phe Phe
1               5                   10

<210> SEQ ID NO 116
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 116

Cys Ala Ser Asn Ala Gly Thr Gly Ala Leu Leu Ala Lys Asn Ile Gln
1               5                   10                  15

Tyr Phe

<210> SEQ ID NO 117
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 117

Cys Ala Thr Ser Asp Lys Ser Arg Asp Ser Ala Asp Thr Gln Tyr Phe
1               5                   10                  15

<210> SEQ ID NO 118
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 118

Cys Ala Ser Ser Asp Gly Thr Gly Gly Thr Asp Thr Gln Tyr Phe
1               5                   10                  15

<210> SEQ ID NO 119
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 119

Cys Ala Ser Ser Gly Gln Gln Gly Asp Asn Ser Pro Leu His Phe
1               5                   10                  15

<210> SEQ ID NO 120
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 120
```

Cys Ala Ser Ser Asp Gly Gln Gly Glu Ser Gly Glu Leu Phe Phe
1               5                   10                  15

<210> SEQ ID NO 121
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 121

Cys Ser Ala Arg Asp Gly Leu Glu Gln Pro Gln His Phe
1               5                   10

<210> SEQ ID NO 122
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 122

Cys Ala Trp Thr Ala Ser Ser Arg Gly Arg Ala Phe Phe
1               5                   10

<210> SEQ ID NO 123
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 123

Cys Ala Ser Ser Ile Arg Asp Arg Gly Gln Pro Gln His Phe
1               5                   10

<210> SEQ ID NO 124
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 124

Cys Ala Ser Ser Gly Asp Ser Asn Gln Pro Gln His Phe
1               5                   10

<210> SEQ ID NO 125
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 125

Cys Ala Ser Ser Gln Arg Arg Gln Gly Gly Leu Asn Glu Lys Leu Phe
1               5                   10                  15

Phe

```
<210> SEQ ID NO 126
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 126

Cys Ala Ser Ser Tyr Arg Glu Asn Thr Gly Glu Leu Phe Phe
1               5                   10                  15

<210> SEQ ID NO 127
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 127

Cys Ser Val Glu Arg Gly Tyr Gly Asp His Gly Glu Leu Phe Phe
1               5                   10                  15

<210> SEQ ID NO 128
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 128

Cys Ala Ser Ser Leu Ala Thr Gly Gly Tyr Glu Gln Tyr Phe
1               5                   10

<210> SEQ ID NO 129
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 129

Cys Ala Ser Ser Phe Tyr Thr Gly Thr Gly Asp Tyr Asn Glu Gln Phe
1               5                   10                  15

Phe

<210> SEQ ID NO 130
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 130

Cys Ala Ser Ser Phe Leu Ala Gly Gly Arg Asn Glu Gln Phe Phe
1               5                   10                  15
```

```
<210> SEQ ID NO 131
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 131

Cys Ala Trp Ser Val Thr Gly Arg Gly Gln Pro Gln His Phe
1               5                   10

<210> SEQ ID NO 132
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 132

Cys Ala Trp Ser Ala Pro Arg Asp Arg Gly Leu Ser Glu Lys Leu Phe
1               5                   10                  15

Phe

<210> SEQ ID NO 133
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 133

Cys Ala Ser Ser Asp Arg Val Leu Arg Cys Asn Glu Gln Phe Phe
1               5                   10                  15

<210> SEQ ID NO 134
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 134

Cys Ser Ala Ser Gly Leu Ala Asp Tyr Asn Glu Gln Phe Phe
1               5                   10

<210> SEQ ID NO 135
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 135

Cys Ala Ser Ser Val Tyr Gly Gly Asn Gln Pro Gln His Phe
1               5                   10

<210> SEQ ID NO 136
<211> LENGTH: 13
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 136

Cys Ser Ala Arg Asp Arg Thr Gly Asn Gly Tyr Thr Phe
1               5                   10

<210> SEQ ID NO 137
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 137

Cys Ala Ser Lys Gly Gly Thr Glu Ser Tyr Gly Tyr Thr Phe
1               5                   10

<210> SEQ ID NO 138
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 138

Cys Ala Thr Ser Arg Asp Pro Gln Glu Thr Gln Tyr Phe
1               5                   10

<210> SEQ ID NO 139
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 139

Cys Ala Ser Arg Glu Gly Arg Gly Asp Tyr Ser Pro Leu His Phe
1               5                   10                  15

<210> SEQ ID NO 140
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 140

Cys Ala Ser Arg Ser Leu Arg Gly Asp Thr Glu Ala Phe Phe
1               5                   10

<210> SEQ ID NO 141
<211> LENGTH: 16
<212> TYPE: PRT
<213> ORGANISM: Artificial Sequence
<220> FEATURE:
<221> NAME/KEY: source
```

<223> OTHER INFORMATION: /note="Description of Artificial Sequence:
      Synthetic peptide"

<400> SEQUENCE: 141

Cys Ala Ser Ser Gln Glu Asp Ser Ser Gly Ala Asn Val Leu Thr Phe
1               5                   10                  15

<210> SEQ ID NO 142
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 142

Cys Ser Ala Arg Asp Pro Ser Ser Gly Asp Tyr Asn Glu Gln Phe Phe
1               5                   10                  15

<210> SEQ ID NO 143
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 143

Cys Ala Ser Arg Glu Asp Met Leu Ile Glu Ala Phe Phe
1               5                   10

<210> SEQ ID NO 144
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 144

Cys Ala Ser Thr Thr Pro Thr Asp Gly Ser Gln Asn Thr Glu Ala Phe
1               5                   10                  15

Phe

<210> SEQ ID NO 145
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 145

Cys Ser Ala Ser Gly Thr Ser Gly Tyr Asn Glu Gln Phe Phe
1               5                   10

<210> SEQ ID NO 146
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

```
<400> SEQUENCE: 146

Cys Ala Ser Ser Phe Asp Ser Gly Ala Asn Val Leu Thr Phe
1               5                   10

<210> SEQ ID NO 147
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 147

Cys Ala Ser Ser Leu Val Gly Ala Arg Gln Pro Gln His Phe
1               5                   10

<210> SEQ ID NO 148
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 148

Cys Ala Thr Ser Arg Gly Gly Ala Asn Tyr Gly Tyr Thr Phe
1               5                   10

<210> SEQ ID NO 149
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 149

Cys Ala Trp Ser Ile Gly Ile Glu Ala Phe Phe
1               5                   10

<210> SEQ ID NO 150
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 150

Cys Ala Ser Gly Gly Thr Gly Asn Ser Asn Gln Pro Gln His Phe
1               5                   10                  15

<210> SEQ ID NO 151
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 151

Cys Ala Ser Ser Ser Met Thr Gly Leu Tyr Glu Gln Tyr Phe
```

```
<210> SEQ ID NO 152
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 152

Cys Ala Ser Ser Trp Leu Ala Met Ala Gly Asp Thr Gly Glu Leu Phe
1               5                   10                  15

Phe

<210> SEQ ID NO 153
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 153

Cys Ala Ser Ser Gln Glu Gly Gln Gly Phe Asn Gln Pro Gln His Phe
1               5                   10                  15

<210> SEQ ID NO 154
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 154

Cys Ala Ser Ser Pro Glu Arg Thr Tyr Glu Gln Tyr Phe
1               5                   10

<210> SEQ ID NO 155
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 155

Cys Ala Ser Ser Val Asp Thr Gln Gly Ala Phe Phe
1               5                   10

<210> SEQ ID NO 156
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 156

Cys Ala Ser Ser Gly Pro Trp Glu Gln Tyr Phe
1               5                   10
```

<210> SEQ ID NO 157
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 157
tgtgcaatga gagtctacga caaggtgata ttt                                   33

<210> SEQ ID NO 158
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 158
tgtgccgtga ttggctatgg tcagaatttt gtcttt                                36

<210> SEQ ID NO 159
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 159
tgtgctgtga gagataataa ggatggtgct acaaacaagc tcatcttt                   48

<210> SEQ ID NO 160
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 160
tgtgcagaga gttatggtgg tgctacaaac aagctcatct tt                         42

<210> SEQ ID NO 161
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 161
tgtgcaatga gcgctggggc tgggagttac caactcactt tc                         42

<210> SEQ ID NO 162
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 162
tgtgctacgg acgcgggcta taacaatgac atgcgcttt                                39

<210> SEQ ID NO 163
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 163
tgtgccgaaa ccggatacag caccctcacc ttt                                      33

<210> SEQ ID NO 164
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 164
tgcatcctga cccgctcccg ttctgcaagg caactgacct tt                             42

<210> SEQ ID NO 165
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 165
tgtgctgtcc actttggaaa tgagaaatta accttt                                   36

<210> SEQ ID NO 166
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 166
tgcatcgtcc ggagttatga cagaggaagc caaggaaatc tcatcttt                      48

<210> SEQ ID NO 167
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 167
tgtcttctgg gagatgagct agggactat cagttaatct gg                             42

<210> SEQ ID NO 168
<211> LENGTH: 42
<212> TYPE: DNA

```
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 168
tgtgctctcc agctggataa ctatggtcag aattttgtct tt                    42

<210> SEQ ID NO 169
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 169
tgtgcagcaa gcccgccgga atctggtggc tacaataagc tgattttt              48

<210> SEQ ID NO 170
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 170
tgtgctgtga ccctaattca gggagcccag aagctggtat tt                    42

<210> SEQ ID NO 171
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 171
tgtgctctga gcggcgacta caagctcagc ttt                              33

<210> SEQ ID NO 172
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 172
tgtgcctccg accgttctaa cgactacaag ctcagcttt                        39

<210> SEQ ID NO 173
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 173
tgcatcctga gagacgggcg aggaagccaa ggaaatctca tcttt                 45
```

<210> SEQ ID NO 174
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 174
tgtggagcag accccccaata tggaaacaag ctggtctttt                39

<210> SEQ ID NO 175
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 175
tgtgcagcaa gcccctataa taatgcaggc aacatgctca cctttt          45

<210> SEQ ID NO 176
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 176
tgtgctgtca tggatagcaa ctatcagtta atctgg                     36

<210> SEQ ID NO 177
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 177
tgcctcgtgg cccaggggaa cacaggcttt cagaaacttg tatttt          45

<210> SEQ ID NO 178
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 178
tgtgctgtgt ctccaataac taccgacaag ctcatctttt                 39

<210> SEQ ID NO 179
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:

Synthetic oligonucleotide"

<400> SEQUENCE: 179
tgtgctacgg acacgggcag gagagcactt actttt    36

<210> SEQ ID NO 180
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 180
tgtgcagaga ggggcggtta acaccgac aagctcatct tt    42

<210> SEQ ID NO 181
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 181
tgtgcttcta atgctggtgg tactagctat ggaaagctga catt    45

<210> SEQ ID NO 182
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 182
tgtgcagcaa gctattctaa tgccagactc atgttt    36

<210> SEQ ID NO 183
<211> LENGTH: 30
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 183
tgtgcttata tagacaatga catgcgcttt    30

<210> SEQ ID NO 184
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 184
tgtgccgtga gagcttatgg aggaagccaa ggaaatctca tcttt    45

<210> SEQ ID NO 185
<211> LENGTH: 36

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 185
tgtgccgtga cgactggagg cttcaaaact atcttt                              36

<210> SEQ ID NO 186
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 186
tgtgcagaga gtttacgttc taacgactac aagctcagct tt                       42

<210> SEQ ID NO 187
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 187
tgtgcaggtc cttcgtcttc taacgactac aagctcagct tt                       42

<210> SEQ ID NO 188
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 188
tgtgcagtcc cagacagagg ctcaaccctg gggaggctat acttt                    45

<210> SEQ ID NO 189
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 189
tgcgccagca gccaccacgg acggggggcc accggggagc tgtttttt                 48

<210> SEQ ID NO 190
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 190
```
tgtgccagca ctgggggtt ttcagagccc cagcatttt            39

<210> SEQ ID NO 191
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 191
tgtgccagca gccccgggac agggagtagt ggctacacct tc            42

<210> SEQ ID NO 192
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 192
tgcgccagca gcactactag cggggggggcc ggagagcagt tcttc            45

<210> SEQ ID NO 193
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 193
tgcgccagca gccagtatag cgggggggcg catacgcagt atttt            45

<210> SEQ ID NO 194
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 194
tgcagtgcta ttgacggaaa caccatatat ttt            33

<210> SEQ ID NO 195
<211> LENGTH: 51
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 195
tgtgccagca gcccaccagg actagcggga aaccaagaga cccagtactt c            51

<210> SEQ ID NO 196
<211> LENGTH: 48
<212> TYPE: DNA
<213> ORGANISM: Artificial Sequence
<220> FEATURE:
<221> NAME/KEY: source

```
<223> OTHER INFORMATION: /note="Description of Artificial Sequence:
      Synthetic oligonucleotide"

<400> SEQUENCE: 196
tgtgccagca ggcctctcac aggggggcgcc aacactgaag ctttcttt            48

<210> SEQ ID NO 197
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 197
tgtgccagta gtatttattc taacactgaa gctttcttt                       39

<210> SEQ ID NO 198
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 198
tgtgccagca gcacccgagg acttaatagc aatcagcccc agcatttt            48

<210> SEQ ID NO 199
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 199
tgtgccagct cctggatggg aggcaatgag cagttcttc                       39

<210> SEQ ID NO 200
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 200
tgtgccagca cgggacaccc agggactgga ccctacgagc agtacttc            48

<210> SEQ ID NO 201
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 201
tgtgccagca gccttgggac agatacgcag tatttt                          36

<210> SEQ ID NO 202
```

```
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 202
tgtgccagct ccggttgggg ctcgtggaca gatacgcagt atttt          45

<210> SEQ ID NO 203
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 203
tgtgccagca gctccggagg cagcgcagcc tacgagcagt acttc          45

<210> SEQ ID NO 204
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 204
tgtgccagca gctctgctgg aggggcccac tacgagcagt acttc          45

<210> SEQ ID NO 205
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 205
tgtgccagca gcttgggggt cgcagccggg gagctgtttt tt             42

<210> SEQ ID NO 206
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 206
tgtgccacca cggggggggg ttatggctac accttc                    36

<210> SEQ ID NO 207
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 207
```
tgtgccagca gcttgacgtg gggcgcagat acgcagtatt tt                                42

<210> SEQ ID NO 208
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 208
tgtgccagca gtgagagcac agggcatcag ccccagcatt tt                                42

<210> SEQ ID NO 209
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 209
tgcgccagca gccctgttgg actaagggat aattcacccc tccactttt                         48

<210> SEQ ID NO 210
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 210
tgtgccagca gcccccgagg tcaggggca gatacgcagt atttt                              45

<210> SEQ ID NO 211
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 211
tgtgccagca gaggcgacag ggcggatcag ccccagcatt tt                                42

<210> SEQ ID NO 212
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 212
tgcagtgccc gggagttgac ggctgacaat gagcagttct tc                                42

<210> SEQ ID NO 213
<211> LENGTH: 42
<212> TYPE: DNA
<213> ORGANISM: Artificial Sequence
<220> FEATURE:

<221> NAME/KEY: source
<223> OTHER INFORMATION: /note="Description of Artificial Sequence:
      Synthetic oligonucleotide"

<400> SEQUENCE: 213
tgtgccagca gcttagtagc aggacaagag acccagtact tc                          42

<210> SEQ ID NO 214
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 214
tgcgccagca gccaagaggg agaggggct gaagctttct tt                           42

<210> SEQ ID NO 215
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 215
tgcagtgcta gattatttat ctacagagta tacaatgagc agttcttc                    48

<210> SEQ ID NO 216
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 216
tgcagcgtcc ccaaacagga tctctactat ggctacacct tc                          42

<210> SEQ ID NO 217
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 217
tgtgccagca gcttagcgga tcacagggga ctagccaaaa acattcagta cttc             54

<210> SEQ ID NO 218
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 218
tgcgccagca gccaagccct cagaggtgaa gctttcttt                              39

-continued

```
<210> SEQ ID NO 219
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 219
tgtgccagca atccgacagg gggttcctac gagcagtact tc                          42

<210> SEQ ID NO 220
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 220
tgtgccagca gcttttggg taacactgaa gctttcttt                               39

<210> SEQ ID NO 221
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 221

Cys Ala Phe Glu Asn Asn Ala Gly Asn Met Leu Thr Phe
1               5                   10

<210> SEQ ID NO 222
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 222

Cys Ala Gly Glu Gly Asn Ala Gly Asn Met Leu Thr Phe
1               5                   10

<210> SEQ ID NO 223
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 223

Cys Val Val Asn Ile Gly Gly Ser Tyr Ile Pro Thr Phe
1               5                   10

<210> SEQ ID NO 224
<211> LENGTH: 12
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 224

Cys Ala Val Arg Asp Ser Asn Tyr Gln Leu Ile Trp
1               5                   10

<210> SEQ ID NO 225
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 225

Cys Ala Val Pro Lys Ala Ala Gly Asn Lys Leu Thr Phe
1               5                   10

<210> SEQ ID NO 226
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 226

Cys Ile Val Arg Ala Leu Gly Gly Ser Asn Tyr Lys Leu Thr Phe
1               5                   10                  15

<210> SEQ ID NO 227
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 227

Cys Ala Val Gly Asp Thr Gly Gly Phe Lys Thr Ile Phe
1               5                   10

<210> SEQ ID NO 228
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 228

Cys Ala Ala Arg Tyr Ala Gly Gly Thr Ser Tyr Gly Lys Leu Thr Phe
1               5                   10                  15

<210> SEQ ID NO 229
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 229
```

```
Cys Leu Val Gly Glu Arg Ala Ala Gly Asn Lys Leu Thr Phe
1               5                   10

<210> SEQ ID NO 230
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 230

Cys Ala Glu Leu Gly Gly Gly Gly Ala Asp Gly Leu Thr Phe
1               5                   10

<210> SEQ ID NO 231
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 231

Cys Ala Ala Ser Ser Asn Asn Ala Arg Leu Met Phe
1               5                   10

<210> SEQ ID NO 232
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 232

Cys Ala Tyr Arg Ser Ser Thr Ser Gly Thr Tyr Lys Tyr Ile Phe
1               5                   10                  15

<210> SEQ ID NO 233
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 233

Cys Ala Val Asp Asn Ala Gly Asn Met Leu Thr Phe
1               5                   10

<210> SEQ ID NO 234
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 234

Cys Ala Ala Ile Gly Asn Lys Leu Ser Phe
1               5                   10
```

```
<210> SEQ ID NO 235
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 235

Cys Ala Phe Gly Pro Met Ser Arg Asp Asp Lys Ile Ile Phe
1               5                   10

<210> SEQ ID NO 236
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 236

Cys Ala Val Val Asp Ser Gly Asn Thr Pro Leu Val Phe
1               5                   10

<210> SEQ ID NO 237
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 237

Cys Ala Val Gly Gly Gly Ser Gln Gly Asn Leu Ile Phe
1               5                   10

<210> SEQ ID NO 238
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 238

Cys Ala Thr Leu Thr Gly Gly Phe Lys Thr Ile Phe
1               5                   10

<210> SEQ ID NO 239
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 239

Cys Ile Ala Leu Ile Gly Phe Gly Asn Val Leu His Cys
1               5                   10

<210> SEQ ID NO 240
<211> LENGTH: 16
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 240

Cys Ala Ala Ile Leu Arg Tyr Gly Gly Ser Gln Gly Asn Leu Ile Phe
1               5                   10                  15

<210> SEQ ID NO 241
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 241

Cys Ala Val Gly Gly Ser Gln Gly Asn Leu Ile Phe
1               5                   10

<210> SEQ ID NO 242
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 242

Cys Ala Val Thr Gly Gly Gly Asn Lys Leu Thr Phe
1               5                   10

<210> SEQ ID NO 243
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 243

Cys Ala Val Val Ser Ser Gly Ser Ala Arg Gln Leu Thr Phe
1               5                   10

<210> SEQ ID NO 244
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 244

Cys Ala Met Ser Asp Asn Asn Ala Gly Asn Asn Arg Lys Leu Ile Trp
1               5                   10                  15

<210> SEQ ID NO 245
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
```

```
                                    Synthetic peptide"

<400> SEQUENCE: 245

Cys Ala Thr Leu Thr Ser Tyr Gly Lys Leu Thr Phe
1               5                   10

<210> SEQ ID NO 246
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 246

Cys Ala Leu Lys Gly Leu Thr Gly Gly Gly Asn Lys Leu Thr Phe
1               5                   10                  15

<210> SEQ ID NO 247
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 247

Cys Ala Val Tyr Ser Ser Ala Ser Lys Ile Ile Phe
1               5                   10

<210> SEQ ID NO 248
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 248

Cys Ile Leu Arg Asp Asp Phe Gly Asn Glu Lys Leu Thr Phe
1               5                   10

<210> SEQ ID NO 249
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 249

Cys Ala Glu Ile His Ile Asn Thr Gly Lys Leu Ile Phe
1               5                   10

<210> SEQ ID NO 250
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 250
```

Cys Ala Val Asn Phe Gly Asn Glu Lys Leu Thr Phe
1               5                   10

<210> SEQ ID NO 251
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 251

Cys Ala Ala Ser Ser Pro Gly Thr Gly Asn Met Leu Thr Phe
1               5                   10

<210> SEQ ID NO 252
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 252

Cys Ala Val Leu Asp Ser Asn Tyr Gln Leu Ile Trp
1               5                   10

<210> SEQ ID NO 253
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 253

Cys Ala Met Arg Val Thr Met Asp Ser Ser Tyr Lys Leu Ile Phe
1               5                   10                  15

<210> SEQ ID NO 254
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 254

Cys Ala Glu Asn Asn Ser Gly Gly Gly Ala Asp Gly Leu Thr Phe
1               5                   10                  15

<210> SEQ ID NO 255
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 255

Cys Ala Ala Ser Glu Ser Gly Gly Gly Ala Asp Gly Leu Thr Phe
1               5                   10                  15

```
<210> SEQ ID NO 256
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 256

Cys Ala Leu Ser Val Pro Trp Ile Ser Ser Gly Ser Ala Arg Gln Leu
1               5                   10                  15

Thr Phe

<210> SEQ ID NO 257
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 257

Cys Ala Val Ile Ser Gly Gly Tyr Gln Lys Val Thr Phe
1               5                   10

<210> SEQ ID NO 258
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 258

Cys Ile Val Arg Ala Trp Asp Ser Asn Tyr Gln Leu Ile Trp
1               5                   10

<210> SEQ ID NO 259
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 259

Cys Ala Ala Ser Pro Gly Gly Tyr Asn Lys Leu Ile Phe
1               5                   10

<210> SEQ ID NO 260
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 260

Cys Val Val Arg Arg Asp Asn Thr Asp Lys Leu Ile Phe
1               5                   10

<210> SEQ ID NO 261
<211> LENGTH: 13
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 261

Cys Ala Ala Ala Thr Gly Thr Ala Ser Lys Leu Thr Phe
1               5                   10

<210> SEQ ID NO 262
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 262

Cys Ala Met Arg Gly Ala Met Asn Arg Asp Asp Lys Ile Ile Phe
1               5                   10                  15

<210> SEQ ID NO 263
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 263

Cys Ala Ala Gln Ile Ala Ala Gly Asn Lys Leu Thr Phe
1               5                   10

<210> SEQ ID NO 264
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 264

Cys Ala Val Gly Ala Pro Gln Thr Gly Ala Asn Asn Leu Phe Phe
1               5                   10                  15

<210> SEQ ID NO 265
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 265

Cys Val Val Gly Ala Asp Gly Leu Thr Phe
1               5                   10

<210> SEQ ID NO 266
<211> LENGTH: 14
<212> TYPE: PRT
<213> ORGANISM: Artificial Sequence
<220> FEATURE:
<221> NAME/KEY: source
```

```
-continued

<223> OTHER INFORMATION: /note="Description of Artificial Sequence:
      Synthetic peptide"

<400> SEQUENCE: 266

Cys Leu Val Gly Asp Leu Val Gly Gly Asn Met Leu Thr Phe
1               5                   10

<210> SEQ ID NO 267
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 267

Cys Ala Phe Ile Phe Ala Asn Asn Leu Phe Phe
1               5                   10

<210> SEQ ID NO 268
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 268

Cys Ala Val Thr Gly Gly Gly Ala Asp Gly Leu Thr Phe
1               5                   10

<210> SEQ ID NO 269
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 269

Cys Ala Thr Val Asn Ile Lys Ala Ala Gly Asn Lys Leu Thr Phe
1               5                   10                  15

<210> SEQ ID NO 270
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 270

Cys Ala Val Asp His Thr Gly Gly Phe Lys Thr Ile Phe
1               5                   10

<210> SEQ ID NO 271
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 271
```

```
Cys Val Val Ser Gly Ser Tyr Ile Pro Thr Phe
1               5                   10
```

<210> SEQ ID NO 272
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 272

```
Cys Ala Leu Ser Asp Val Tyr Ala Gly Asn Met Leu Thr Phe
1               5                   10
```

<210> SEQ ID NO 273
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 273

```
Cys Ala Gln Ile Val Arg Glu Thr Ser Gly Ser Arg Leu Thr Phe
1               5                   10                  15
```

<210> SEQ ID NO 274
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 274

```
Cys Ala Ala Ser Lys Asp Phe Gly Asn Glu Lys Leu Thr Phe
1               5                   10
```

<210> SEQ ID NO 275
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 275

```
Cys Ala Glu Thr Phe Thr Gly Arg Arg Ala Leu Thr Phe
1               5                   10
```

<210> SEQ ID NO 276
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 276

```
Cys Ala Ala Gly Gly Ser Asn Tyr Lys Leu Thr Phe
1               5                   10
```

<210> SEQ ID NO 277
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 277

Cys Ala Gly Thr Gly Gly Phe Lys Thr Ile Phe
1               5                   10

<210> SEQ ID NO 278
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 278

Cys Ala Met Arg Asp Leu Gly Ala Gly Ser Tyr Gln Leu Thr Phe
1               5                   10                  15

<210> SEQ ID NO 279
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 279

Cys Ala Leu Val Ser Gly Gly Tyr Gln Lys Val Thr Phe
1               5                   10

<210> SEQ ID NO 280
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 280

Cys Val Val Ser Asn Asp Tyr Lys Leu Ser Phe
1               5                   10

<210> SEQ ID NO 281
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 281

Cys Ala Val Thr Ala Tyr Gly Ser Ser Asn Thr Gly Lys Leu Ile Phe
1               5                   10                  15

<210> SEQ ID NO 282
<211> LENGTH: 15
<212> TYPE: PRT

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 282

Cys Ala Val Ile Gly Gly Gly Thr Ser Tyr Gly Lys Leu Thr Phe
1               5                   10                  15

<210> SEQ ID NO 283
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 283

Cys Ala Ala Arg Gly Ser Ser Tyr Gln Leu Ile Trp
1               5                   10

<210> SEQ ID NO 284
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 284

Cys Ala Met Ser Ala Ala Thr Ser Tyr Asp Lys Val Ile Phe
1               5                   10

<210> SEQ ID NO 285
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 285

Cys Ile Val Asn Asn Ala Gly Asn Met Leu Thr Phe
1               5                   10

<210> SEQ ID NO 286
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 286

Cys Ala Thr Arg Leu Val Arg Gly Gly Ser Asn Tyr Lys Leu Thr Phe
1               5                   10                  15

<210> SEQ ID NO 287
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
```

```
                  Synthetic peptide"

<400> SEQUENCE: 287

Cys Ala Ser Arg Val Tyr Asn Gln Gly Gly Lys Leu Ile Phe
1               5                   10                  15

<210> SEQ ID NO 288
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 288

Cys Ala Val Lys Arg Ala Gly Thr Ala Leu Ile Phe
1               5                   10

<210> SEQ ID NO 289
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 289

Cys Ala Gly Leu Gly Asp Tyr Lys Leu Ser Phe
1               5                   10

<210> SEQ ID NO 290
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 290

Cys Ala Ser Ser Ser Arg Gln Ser Gly Asn Gln Pro Gln His Phe
1               5                   10                  15

<210> SEQ ID NO 291
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 291

Cys Ala Ser Ser Gln Gly Glu Arg Thr Tyr Gly Ala Glu Ala Phe Phe
1               5                   10                  15

<210> SEQ ID NO 292
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 292
```

Cys Ala Ser Ser Pro His Thr Gly Asn Glu Gln Tyr Phe
1               5                   10

<210> SEQ ID NO 293
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 293

Cys Ala Ser Ser Tyr Thr Ser Tyr Gly Ala Asn Val Leu Thr Phe
1               5                   10                  15

<210> SEQ ID NO 294
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 294

Cys Ala Ser Ser Leu Gln Gly Asn Thr Glu Ala Phe Phe
1               5                   10

<210> SEQ ID NO 295
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 295

Cys Ala Ser Ser Gln Glu Gly Arg Phe Thr Gln Pro Gln His Phe
1               5                   10                  15

<210> SEQ ID NO 296
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 296

Cys Ala Arg Glu Trp Asp Arg Gly Val Gly Thr Glu Ala Phe Phe
1               5                   10                  15

<210> SEQ ID NO 297
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 297

Cys Ala Ser Ser Phe Asp Gln Gly Val Gly Glu Leu Phe Phe
1               5                   10

```
<210> SEQ ID NO 298
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 298

Cys Ala Ser Ser Gln Glu Leu Val Val Asn Glu Gln Phe Phe
1               5                   10

<210> SEQ ID NO 299
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 299

Cys Ala Ser Ser Gln Asp Leu Gln Gly Ala Arg Glu Gln Tyr Phe
1               5                   10                  15

<210> SEQ ID NO 300
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 300

Cys Ala Ser Ser Pro Gly Ala Asp Leu Glu Thr Gln Tyr Phe
1               5                   10

<210> SEQ ID NO 301
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 301

Cys Ala Ser Thr Lys Gln Gly Gly Thr Glu Ala Phe Phe
1               5                   10

<210> SEQ ID NO 302
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 302

Cys Ala Ser Ser Ser Ser Gly Thr Ser Gly Thr Asp Thr Gln Tyr Phe
1               5                   10                  15

<210> SEQ ID NO 303
<211> LENGTH: 15
<212> TYPE: PRT
<213> ORGANISM: Artificial Sequence
```

```
<220> FEATURE:
<221> NAME/KEY: source
<223> OTHER INFORMATION: /note="Description of Artificial Sequence:
      Synthetic peptide"

<400> SEQUENCE: 303

Cys Ala Ser Ser Tyr Arg Gly Arg Pro Pro Tyr Glu Gln Tyr Phe
1               5                   10                  15

<210> SEQ ID NO 304
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 304

Cys Ala Ser Ser Phe Glu Ser Gly Gly Ser Tyr Asn Glu Gln Phe Phe
1               5                   10                  15

<210> SEQ ID NO 305
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 305

Cys Ala Ser Ser Gln Asp Ala Gly Phe Ala Phe Phe
1               5                   10

<210> SEQ ID NO 306
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 306

Cys Ala Ile Ser Glu Thr Glu Gln Gly Thr Ser Tyr Glu Gln Tyr Phe
1               5                   10                  15

<210> SEQ ID NO 307
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 307

Cys Ala Ser Gly Ala Gly Val Gln Glu Thr Gln Tyr Phe
1               5                   10

<210> SEQ ID NO 308
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

<400> SEQUENCE: 308

Cys Ala Ser Ser Arg Pro Phe Arg Asp Arg Glu Gly Thr Asp Thr Gln
1               5                   10                  15
Tyr Phe

<210> SEQ ID NO 309
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 309

Cys Ala Ser Ser Pro Gly Ala Asp Leu Thr Phe Phe Thr Phe
1               5                   10

<210> SEQ ID NO 310
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 310

Cys Ala Ser Ser Leu Ala Val Arg Asp Thr Tyr Gly Tyr Thr Phe
1               5                   10                  15

<210> SEQ ID NO 311
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 311

Cys Ala Ser Gly Tyr Gln Gly Glu Met His Gln Pro Gln His Phe
1               5                   10                  15

<210> SEQ ID NO 312
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 312

Cys Ala Ser Ser Ile Thr Leu Ala Gly Gly Arg Asn Glu Gln Phe Phe
1               5                   10                  15

<210> SEQ ID NO 313
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 313

```
Cys Ala Ser Ser Leu Thr Ser Gly Gly Thr Ile Tyr Glu Gln Tyr Phe
1               5                   10                  15
```

<210> SEQ ID NO 314
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 314

```
Cys Ala Ser Ser Leu Trp Gly Pro Gln Pro Gln His Phe
1               5                   10
```

<210> SEQ ID NO 315
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 315

```
Cys Ala Ser Ser Leu Ala Arg Asp Arg Gly Glu Gly Glu Gln Phe Phe
1               5                   10                  15
```

<210> SEQ ID NO 316
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 316

```
Cys Ala Ser Ser Gln Glu Arg Gly Gly Gln Glu Thr Gln Tyr Phe
1               5                   10                  15
```

<210> SEQ ID NO 317
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 317

```
Cys Ala Ser Ser Ser Ser Pro Gln Gln Tyr Phe
1               5                   10
```

<210> SEQ ID NO 318
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 318

```
Cys Ala Ser Ser Gln Pro Asp Arg Gly Tyr Asn Glu Gln Phe Phe
1               5                   10                  15
```

```
<210> SEQ ID NO 319
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 319

Cys Ala Ser Ser Leu Gly Leu Leu Glu Gly Gly Arg Tyr Asn Glu Gln
1               5                   10                  15

Phe Phe

<210> SEQ ID NO 320
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 320

Cys Ala Ser Val Thr Gly Ser Tyr Glu Gln Tyr Phe
1               5                   10

<210> SEQ ID NO 321
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 321

Cys Ala Ser Ser Tyr Thr Ala Pro Gly Gly Leu Asn Glu Lys Leu Phe
1               5                   10                  15

Phe

<210> SEQ ID NO 322
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 322

Cys Ala Ser Ser Pro Arg Ala Ser Asn Glu Gln Phe Phe
1               5                   10

<210> SEQ ID NO 323
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 323

Cys Ala Ser Ser Phe Ser Thr Arg Gly Ala Tyr Asn Glu Gln Phe Phe
1               5                   10                  15
```

```
<210> SEQ ID NO 324
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 324

Cys Ala Ser Ser Leu His Leu Ser Arg Gly Phe Asn Gln Pro Gln His
1               5                   10                  15

Phe

<210> SEQ ID NO 325
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 325

Cys Ala Ser Ser Phe Gly Thr Val Ser Gly Asn Thr Ile Tyr Phe
1               5                   10                  15

<210> SEQ ID NO 326
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 326

Cys Ala Ser Ser Lys Ile Leu Arg Asp Val Asp Ile Val Thr Glu Ala
1               5                   10                  15

Phe Phe

<210> SEQ ID NO 327
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 327

Cys Ala Ser Ser Ile Gly Ser Leu Asn Glu Gln Phe Phe
1               5                   10

<210> SEQ ID NO 328
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 328

Cys Ala Ser Thr Ser Leu Gly Arg Glu Val Gly Phe Tyr Asn Glu Gln
1               5                   10                  15
```

Phe Phe

<210> SEQ ID NO 329
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 329

Cys Ala Ser Ser Asn Asp Arg Ser Ser Tyr Glu Gln Tyr Phe
1               5                   10

<210> SEQ ID NO 330
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 330

Cys Ala Ser Ser Leu Gly Asp Arg Pro Val Gly Gln Pro Gln His Phe
1               5                   10                  15

<210> SEQ ID NO 331
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 331

Cys Ala Ser Ser Pro Pro Gly Leu Gln Thr Gly Val Ser Tyr Glu Gln
1               5                   10                  15

Tyr Phe

<210> SEQ ID NO 332
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 332

Cys Ser Val Ala Pro Gly Val Val Thr Gln Tyr Phe
1               5                   10

<210> SEQ ID NO 333
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 333

Cys Ala Ser Ser Pro Pro Ser Gly Gly Asn Asn Glu Gln Phe Phe
1               5                   10                  15

<210> SEQ ID NO 334
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 334

Cys Ala Ser Ser Leu Gly Val Ile Pro Leu His Phe
1               5                   10

<210> SEQ ID NO 335
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 335

Cys Ala Ser Ser Glu Arg Gly Phe Glu Gln Tyr Phe
1               5                   10

<210> SEQ ID NO 336
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 336

Cys Ala Ser Arg Lys Arg Val Asp Gln Pro Gln His Phe
1               5                   10

<210> SEQ ID NO 337
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 337

Cys Ala Ser Ser Glu Thr Arg Asn Tyr Gly Tyr Thr Phe
1               5                   10

<210> SEQ ID NO 338
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 338

Cys Ala Ser Ser Pro Ile Tyr Pro Gln Pro Gln His Phe
1               5                   10

<210> SEQ ID NO 339
<211> LENGTH: 15
<212> TYPE: PRT

<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 339

Cys Ala Ser Ser Leu Leu Asn Gln Gly Thr Asp Thr Gln Tyr Phe
1               5                   10                  15

<210> SEQ ID NO 340
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 340

Cys Ala Ser Ser Leu Thr Pro Arg Gly Gly Val Gly Glu Gln Phe Phe
1               5                   10                  15

<210> SEQ ID NO 341
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 341

Cys Ser Ala Arg Asp Leu Gly Gly Asn Gln Pro Gln His Phe
1               5                   10

<210> SEQ ID NO 342
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 342

Cys Ala Ser Arg Ala Gly Ala Gly Leu Glu Gln Phe Phe
1               5                   10

<210> SEQ ID NO 343
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 343

Cys Ala Ser Arg Leu Gly Gly Glu Gln Phe Phe
1               5                   10

<210> SEQ ID NO 344
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:

Synthetic peptide"

<400> SEQUENCE: 344

Cys Ala Ser Arg Glu Thr Gly Glu Arg Gly Tyr Thr Phe
1               5                   10

<210> SEQ ID NO 345
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 345

Cys Ala Ser Ser Leu Gly Leu Ala Val Ser Tyr Glu Gln Tyr Phe
1               5                   10                  15

<210> SEQ ID NO 346
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 346

Cys Ser Val Glu Glu Ala Gly Gly Thr Glu Ala Phe Phe
1               5                   10

<210> SEQ ID NO 347
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 347

Cys Ala Ser Ser Gln Gly Trp Thr Ala Thr Gly Glu Ala Phe Phe
1               5                   10                  15

<210> SEQ ID NO 348
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 348

Cys Ala Ser Asn Pro Gly Gln Gly Pro Glu Ala Phe Phe
1               5                   10

<210> SEQ ID NO 349
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 349

Cys Ala Ser Ser Arg Gly Thr Ser Gly Gly Leu Leu Gln Glu Thr Gln
1               5                   10                  15

Tyr Phe

<210> SEQ ID NO 350
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 350

Cys Ser Ala Arg Asp Trp Gln Ser Asn Gln Pro Gln His Phe
1               5                   10

<210> SEQ ID NO 351
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 351

Cys Ser Val Glu Gly Val Gln Gly Asp Tyr Asn Glu Gln Phe Phe
1               5                   10                  15

<210> SEQ ID NO 352
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 352

Cys Ala Ser Ser Leu Gly Leu Arg Gly Thr Asp Thr Gln Tyr Phe
1               5                   10                  15

<210> SEQ ID NO 353
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 353

Cys Ala Ser Ser Gly Thr Tyr Glu Asn Thr Glu Ala Phe Phe
1               5                   10

<210> SEQ ID NO 354
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 354

Cys Ala Ser Ser Gln Ala Gly Glu Thr Gln Tyr Phe
1               5                   10

-continued

```
<210> SEQ ID NO 355
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 355

Cys Ser Ala Arg Val Ala Gly His Leu Arg Thr Gly Glu Leu Phe Phe
1               5                   10                  15

<210> SEQ ID NO 356
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 356

Cys Ala Thr Thr Glu Gln Gly Val Tyr Glu Gln Tyr Phe
1               5                   10

<210> SEQ ID NO 357
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 357

Cys Ser Val Asp Glu Gly Thr Ser Tyr Glu Gln Tyr Phe
1               5                   10

<210> SEQ ID NO 358
<211> LENGTH: 19
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 358

Cys Ala Ser Ser Leu Gly Leu Val Gly Gly Tyr Ser Ser Tyr Asn Glu
1               5                   10                  15

Gln Phe Phe

<210> SEQ ID NO 359
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 359

Cys Ala Ser Ser Pro Asp Gly Ala Phe Gly Glu Gln Tyr Phe
1               5                   10
```

```
<210> SEQ ID NO 360
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 360

Cys Ala Ser Ser Tyr Val Ala Pro Pro Tyr Glu Gln Tyr Phe
1               5                   10

<210> SEQ ID NO 361
<211> LENGTH: 18
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 361

Cys Ala Ser Gly Lys Leu Ala Gly Gly Glu Gly Tyr Gln Glu Thr Gln
1               5                   10                  15

Tyr Phe

<210> SEQ ID NO 362
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 362

Cys Ala Ser Ser Leu Leu Leu Ala Gly Asp Tyr Glu Gln Tyr Phe
1               5                   10                  15

<210> SEQ ID NO 363
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 363

Cys Ser Val Ala Ser Ser Thr Asp Thr Gln Tyr Phe
1               5                   10

<210> SEQ ID NO 364
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 364

Cys Ala Ser Ser Pro Leu Gly Gly Ser Phe Tyr Glu Gln Tyr Phe
1               5                   10                  15

<210> SEQ ID NO 365
<211> LENGTH: 15
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 365

Cys Ala Ser Leu Gly Ser Glu Ala Ser Thr Asp Thr Gln Tyr Phe
1               5                   10                  15

<210> SEQ ID NO 366
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 366

Cys Ser Ala Arg Ala Leu Leu Arg Gly Thr Gly Glu Leu Phe Phe
1               5                   10                  15

<210> SEQ ID NO 367
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 367

Cys Ala Ala Pro Gly Ala Thr Glu Ala Phe Phe
1               5                   10

<210> SEQ ID NO 368
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 368

Cys Ala Ser Ser Leu Ser Gly Glu Gln Phe Phe
1               5                   10

<210> SEQ ID NO 369
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 369

Cys Ala Ser Ser Gln Glu Ser Asp Glu Gln Phe Phe
1               5                   10

<210> SEQ ID NO 370
<211> LENGTH: 12
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 370

Cys Ala Ser Thr Ser Ser Val Tyr Glu Gln Tyr Phe
1               5                   10

<210> SEQ ID NO 371
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 371

Cys Ser Ala Arg Asp Val Thr Lys Thr Gly Asn Glu Lys Leu Phe Phe
1               5                   10                  15

<210> SEQ ID NO 372
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 372

Cys Ala Ser Ser Val Glu Gly Ala Gly Val Ala Phe Phe
1               5                   10

<210> SEQ ID NO 373
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 373

Cys Ala Ser Ser Phe Ser Trp Asp Glu Ala Phe Phe
1               5                   10

<210> SEQ ID NO 374
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 374

Cys Ala Ser Ser Ser Trp Gly Gln Pro Asp Thr Gln Tyr Phe
1               5                   10

<210> SEQ ID NO 375
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 375
```

Cys Ala Ser Ser Leu Gly Asn Asp Thr Glu Ala Phe Phe
1               5                   10

<210> SEQ ID NO 376
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 376

Cys Ala Ser Ser Pro Met Asn Asn Glu Gln Phe Phe
1               5                   10

<210> SEQ ID NO 377
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 377

Cys Ala Ser Ser Trp Thr Asp Gln Glu Thr Gln Tyr Phe
1               5                   10

<210> SEQ ID NO 378
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 378

Cys Ala Ser Ser Leu Gly Gly Ile Gln Pro Gln His Phe
1               5                   10

<210> SEQ ID NO 379
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 379

Cys Ala Ser Ser Arg Leu Ala Gly Val Tyr Asn Glu Gln Phe Phe
1               5                   10                  15

<210> SEQ ID NO 380
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 380

Cys Ser Leu Trp Ser Gly Thr Glu Asn Ile Gln Tyr Phe
1               5                   10

```
<210> SEQ ID NO 381
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 381

Cys Ala Ile Gly Thr Gly Glu Gly Asn Thr Gly Glu Leu Phe Phe
1               5                   10                  15

<210> SEQ ID NO 382
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 382

Cys Ala Ser Ser Trp Val Pro Gly Thr Arg Ser Tyr Glu Gln Tyr Phe
1               5                   10                  15

<210> SEQ ID NO 383
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 383

Cys Ser Val Ala Ser Met Asn Thr Glu Ala Phe Phe
1               5                   10

<210> SEQ ID NO 384
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 384

Cys Ala Ser Ser Val Ala Gly Gly Ser Tyr Asn Glu Gln Phe Phe
1               5                   10                  15

<210> SEQ ID NO 385
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 385

Cys Ala Ser Ser Pro Gly Gln Gly Thr Tyr Glu Gln Tyr Phe
1               5                   10

<210> SEQ ID NO 386
<211> LENGTH: 12
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 386

Cys Ala Ser Ser His Leu Pro His Glu Gln Phe Phe
1               5                   10

<210> SEQ ID NO 387
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 387

Cys Ala Ser Ser Leu Asp Ile Asn Thr Gly Glu Leu Phe Phe
1               5                   10

<210> SEQ ID NO 388
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 388

Cys Ala Ser Ile Lys Gly Leu Ala Gly Gly Arg Gln Phe Phe
1               5                   10

<210> SEQ ID NO 389
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 389

Cys Ser Ala Ser Gly Asp Ser Ala Glu Gln Tyr Phe
1               5                   10

<210> SEQ ID NO 390
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 390

Cys Ala Ser Arg Val Gly Thr Ala Tyr Ser Asn Gln Pro Gln His Phe
1               5                   10                  15

<210> SEQ ID NO 391
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
```

Synthetic peptide"

<400> SEQUENCE: 391

Cys Ala Ser Ser Arg Trp Gly Gly Asn Ser Thr Asp Thr Gln Tyr Phe
1               5                   10                  15

<210> SEQ ID NO 392
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 392

Cys Ala Ser Ser Gln His Thr Asp Thr Gln Tyr Phe
1               5                   10

<210> SEQ ID NO 393
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 393

Cys Ala Ser Ser Leu Glu Leu Ala Gly Gly Pro Ser Phe Phe
1               5                   10

<210> SEQ ID NO 394
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 394

Cys Ala Ser Ser Ser Gln Asp Ala Ser Tyr Tyr Asn Glu Gln Phe Phe
1               5                   10                  15

<210> SEQ ID NO 395
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 6xHis tag"

<400> SEQUENCE: 395

His His His His His His
1               5

<210> SEQ ID NO 396
<211> LENGTH: 4
<212> TYPE: PRT
<213> ORGANISM: Artificial Sequence
<220> FEATURE:

```
<221> NAME/KEY: source
<223> OTHER INFORMATION: /note="Description of Artificial Sequence:
      Synthetic peptide"

<400> SEQUENCE: 396

Lys Asp Glu Leu
1
```

T CELL RECEPTORS SPECIFIC TO B-CELL MATURATION ANTIGEN FOR TREATMENT OF CANCER

CROSS REFERENCE TO RELATED APPLICATION

This application is a U.S. National Stage application and claims priority of International Application No. PCT/US2020/021273, filed Mar. 5, 2020, which claims the benefit of U.S. Provisional Application No. 62/814,622, filed Mar. 6, 2019, the contents of both of which are incorporated herein by reference in their entirety.

REFERENCE TO SEQUENCE LISTING SUBMITTED ELECTRONICALLY

The instant application contains a Sequence Listing which has been submitted electronically in ASCII format and is hereby incorporated by reference in its entirety. Said ASCII copy, created on Mar. 4, 2020, is named 00530-0353WO1_SL.txt and is 168,969 bytes in size.

TECHNICAL FIELD

This disclosure relates to T cell receptor alpha chains and beta chains specific to B-cell maturation antigen (BCMA), T cells comprising same, and methods of use thereof.

BACKGROUND

Cancer is currently one of the diseases that have the highest human mortality. According to the World Health Organization statistical data, in 2012 the number of global cancer incidence and death cases reached 14 million and 8.2 million, respectively. In the United States, cancer is responsible for at least 25% of all deaths.

In recent years, new therapies have been developed for treating various types of cancers. Patients afflicted with cancers are often treated by using, e.g., surgeries, chemotherapies and/or immune therapies. The prognosis for these patients sometimes is still unsatisfactory. Efficacious therapies and/or prophylactic regimens for treating the cancer are therefore urgently needed.

SUMMARY

This disclosure relates, in part to, to T cell receptors, including T cell receptor alpha chains and T cell receptor beta chains, specific to BCMA, nucleic acids and expression vectors encoding same, cells (e.g., T cells) comprising same, compositions (e.g., pharmaceutical compositions) comprising same, and methods of use thereof. In certain instances, these T cell receptors bind major histocompatibility complex (MHC) molecule that presents a BCMA peptide that evokes a T cell response (e.g., the heteroclitic BCMA72-80 (YLMFLLRKI (SEQ ID NO:37) or a variant thereof (e.g., one that differs from SEQ ID NO:37 by 1, 2, or 3 amino acids).

In one aspect, the disclosure relates to a T cell receptor alpha chain (TCA) comprising: (a) complementarity determining regions (CDRs) 1, 2, and/or 3 of an amino acid sequence set forth in any one of SEQ ID NOs:27-34, or differing by 1 or 2 amino acids at each CDR; or (b) a CDR3 comprising an amino acid sequence set forth in any one of SEQ ID NOs: 49-80 or 221-289, or differing by 1 or 2 amino acids. In some embodiments, the TCA comprises CDRs 1, 2, and 3 of an amino acid sequence set forth in any one of SEQ ID NOs:27-34. In some embodiments, the TCA comprises a variable domain of an amino acid sequence set forth in any one of SEQ ID NOs:27-34, or differing by 1-10 amino acids. In some embodiments, the TCA comprises the amino acid sequence of any one of SEQ ID NOS:27-34. The TCAs of this aspect, when paired with a TCB bind a MHC or HLA (e.g., HLA-A2) complexed with a BCMA peptide (e.g., SEQ ID NO:37). CDRs of TCRs can be identified by any method known in the art (see, e.g., Wong et al., Front. Immunol., 2019; doi.org/10.3389/fimmu.2019.02454; an auto-updating sequence-based prediction tool (available at opig.stats.ox-.ac.uk/resources).

In some embodiments, the TCA further comprises a heterologous amino acid sequence. In some embodiments, the heterologous sequence is a detectable label.

In a second aspect, the disclosure relates to a T cell receptor beta chain (TCB) comprising: (a) complementarity determining regions (CDRs) 1, 2, and/or 3 of an amino acid sequence set forth in any one of SEQ ID NOs:19-26, or differing by 1 or 2 amino acids at each CDR; or (b) a CDR3 comprising an amino acid sequence set forth in any one of SEQ ID NOs: 81-156 or 290-394, or differing by 1 or 2 amino acids. In some embodiments, the TCB comprises CDRs 1, 2, and 3 of an amino acid sequence set forth in any one of SEQ ID NOs:19-26. In some embodiments, the TCB comprises a variable domain of an amino acid sequence set forth in any one of SEQ ID NOs:19-26, or differing by 1-10 amino acids. In some embodiments, the TCB comprises the amino acid sequence of any one of SEQ ID NOS:19-26. The TCBs of this aspect, when paired with a TCA bind a MHC or HLA (e.g., HLA-A2) complexed with a BCMA peptide (e.g., SEQ ID NO:37).

In some embodiments, the TCB further comprises a heterologous amino acid sequence. In some embodiments, the heterologous sequence is a detectable label.

In a third aspect, the disclosure relates to a T cell receptor (TCR) comprising: the TCA of the first aspect of the disclosure and the TCB of the second aspect of the disclosure. In some embodiments, the TCA comprises a CDR3 comprising an amino acid sequence set forth in any one of SEQ ID NOs: 49-80 or 221-289 and the TCB comprises a CDR3 comprising an amino acid sequence set forth in any one of SEQ ID NOs:81-112, respectively. In some embodiments, the TCA comprises an amino acid sequence set forth in any one of SEQ ID NOs:27-34. In some embodiments, the TCB comprises an amino acid sequence set forth in any one of SEQ ID NOs:19-26. In some embodiments, the TCA comprises an amino acid sequence set forth in SEQ ID NO:27, or differs by 1 to 10 amino acids, and wherein the TCB comprises an amino acid sequence set forth in SEQ ID NO:19, or differs by 1 to 10 amino acids. In some embodiments, the TCA comprises an amino acid sequence set forth in SEQ ID NO:28, or differs by 1 to 10 amino acids, and wherein the TCB comprises an amino acid sequence set forth in SEQ ID NO:20, or differs by 1 to 10 amino acids. In some embodiments, the TCA comprises an amino acid sequence set forth in SEQ ID NO:29, or differs by 1 to 10 amino acids, and wherein the TCB comprises an amino acid sequence set forth in SEQ ID NO:21, or differs by 1 to 10 amino acids. In some embodiments, the TCA comprises an amino acid sequence set forth in SEQ ID NO:30, or differs by 1 to 10 amino acids, and wherein the TCB comprises an amino acid sequence set forth in SEQ ID NO:22, or differs by 1 to 10 amino acids. In some embodiments, the TCA comprises an amino acid sequence set forth in SEQ ID NO:31, or differs by 1 to 10 amino acids, and wherein the TCB comprises an amino acid sequence set forth in SEQ ID NO:23, or differs by 1 to 10 amino acids. In some embodiments, the TCA comprises an amino acid sequence set forth in SEQ ID NO:32, or differs by 1 to 10 amino acids, and wherein the TCB comprises an amino acid sequence set forth in SEQ ID NO:24, or differs by 1 to 10 amino acids. In some embodiments, the TCA comprises an amino acid sequence set forth in SEQ ID NO:33, or differs by 1 to 10 amino acids, and wherein the TCB comprises an amino acid sequence set forth in SEQ ID NO:25, or differs by 1 to 10 amino acids. In some embodiments, the TCA comprises an amino acid sequence set forth in SEQ ID NO:34, or differs by 1 to 10 amino acids, and wherein the TCB comprises an amino acid sequence set forth in SEQ ID NO:26, or differs by 1 to 10 amino acids.

In some embodiments, the TCA comprises the amino acid sequence set forth in SEQ ID NO:27, and the TCB comprises the amino acid sequence set forth in SEQ ID NO:19. In some embodiments, the TCA comprises the amino acid sequence set forth in SEQ ID NO:28, and the TCB comprises the amino acid sequence set forth in SEQ ID NO:20. In some embodiments, the TCA comprises the amino acid sequence set forth in SEQ ID NO:29, and the TCB comprises the amino acid sequence set forth in SEQ ID NO:21. In some embodiments, the TCA comprises the amino acid sequence set forth in SEQ ID NO:30, and the TCB comprises the amino acid sequence set forth in SEQ ID NO:22. In some embodiments, the TCA comprises the amino acid sequence set forth in SEQ ID NO:31, and the TCB comprises the amino acid sequence set forth in SEQ ID NO:23. In some embodiments, the TCA comprises the amino acid sequence set forth in SEQ ID NO:32, and the TCB comprises the amino acid sequence set forth in SEQ ID NO:24. In some embodiments, the TCA comprises the amino acid sequence set forth in SEQ ID NO:33, and the TCB comprises the amino acid sequence set forth in SEQ ID NO:25. In some embodiments, the TCA comprises the amino acid sequence set forth in SEQ ID NO:34, and the TCB comprises the amino acid sequence set forth in SEQ ID NO:26.

In a fourth aspect, the disclosure relates to a nucleic acid encoding any one of the foregoing TCAs. In some embodiments, the nucleic acid comprises the sequence set forth in any one of SEQ ID NOs:9 to 16. In some embodiments, the nucleic acid is a cDNA. In some embodiments, the nucleic acid further comprises a heterologous sequence. In some embodiments, the heterologous sequence is selected from the group consisting of a promoter, a regulatory element, and an expression control sequence.

In a fifth aspect, the disclosure relates to a nucleic acid encoding any one of the foregoing TCBs. In some embodiments, the nucleic acid comprises the sequence set forth in any one of SEQ ID NOs:1 to 8. In some embodiments, the nucleic acid is a cDNA. In some embodiments, the nucleic acid further comprises a heterologous sequence. In some embodiments, the heterologous sequence is selected from the group consisting of a promoter, a regulatory element, and an expression control sequence.

In a sixth aspect, the disclosure relates to a nucleic acid or nucleic acids encoding any one of the foregoing TCRs. In some embodiments, the nucleic acid or nucleic acids comprise(s) the sequence set forth in any one of SEQ ID NOs:9 to 16 and/or any one of SEQ ID NOs:1 to 8. In some embodiments, the nucleic acid or nucleic acids is/are cDNA. In some embodiments, the nucleic acid or nucleic acids further comprise(s) a heterologous sequence(s). In some embodiments, the heterologous sequence is selected from the group consisting of a promoter, a regulatory element, and an expression control sequence.

In a seventh aspect, the disclosure relates to an expression vector or expression vectors comprising any one of the foregoing nucleic acids. In some embodiments, the nucleic acid is operably linked to a promoter, a regulatory element, or an expression control sequence.

In an eighth aspect, the disclosure relates to an expression vector or expression vectors comprising a first nucleic acid sequence and a second nucleic acid sequence, wherein the first nucleic acid sequence encodes any one of the foregoing TCAs, and wherein the second nucleic acid sequence encodes any one of the foregoing the TCBs. In some embodiments, the first nucleic acid sequence comprises the sequence set forth in any one of SEQ ID NOs:9 to 16, and wherein the second nucleic acid sequence comprises the sequence set forth in any one of SEQ ID NOs:1 to 8. In some embodiments, the first nucleic acid is operably linked to a promoter, a regulatory element, or an expression control sequence. In some embodiments, the second nucleic acid is operably linked to a promoter, a regulatory element, or an expression control sequence. In some embodiments, the expression vector or expression vectors is/are for expression in a T cell.

In a ninth aspect, the disclosure relates to a composition comprising: (i) any one of the foregoing TCAs, any one of the foregoing TCBs, or any one of the foregoing TCRs; and (ii) a second agent.

In a tenth aspect, the disclosure relates to a pharmaceutical composition comprising: (i) any one of the foregoing TCAs, any one of the foregoing TCBs, or any one of the foregoing TCRs; and (ii) a pharmaceutically acceptable carrier.

In an eleventh aspect, the disclosure relates to a cultured cell comprising: (a) any one of the foregoing TCAs, (b) any one of the foregoing TCBs, (c) any one of the foregoing TCAs and any one of the foregoing TCBs, (d) any one of the foregoing TCRs, (e) one or more of any one of the foregoing the nucleic acids, or (f) one or more of any one of the foregoing expression vectors.

In a twelfth aspect, the disclosure relates to a T cell comprising: (a) any one of the foregoing TCAs, (b) any one of the foregoing TCBs, (c) any one of the foregoing TCAs and any one of the foregoing TCBs, (d) any one of the foregoing TCRs, (e) one or more of any one of the foregoing the nucleic acids, or (f) one or more of any one of the foregoing expression vectors. In some embodiments, the T cell comprises any one of the foregoing TCAs and any one of the foregoing TCBs. In some embodiments, the T cell comprises any one of the foregoing nucleic acid or nucleic acids encoding any one of the foregoing TCRs. In some embodiments, the T cell comprises any one of the foregoing expression vector or expression vectors encoding any one of the foregoing TCRs. In some embodiments, the T cell is a human T cell. In some embodiments, the T cell is derived from induced pluripotent stem cells.

In a thirteenth aspect, the disclosure relates to a method of producing any one of the foregoing T cells, comprising: (a) isolating a population of T cells from a subject, and (b) transforming the population of T cells with the foregoing nucleic acid or nucleic acids or the foregoing expression vector or expression vectors.

In a fourteenth aspect, the disclosure relates to a method of treating a human subject having a cancer or a premalignant disease, comprising administering to the subject any one of the foregoing T cells.

In a fifteenth aspect, the disclosure relates to a method of treating a human subject having a cancer or a pre-malignant disease, comprising administering to the subject any one of the foregoing nucleic acid or nucleic acids.

In a sixteenth aspect, the disclosure relates to a method of treating a human subject having a cancer or a pre-malignant disease, administering to the subject any one of the foregoing expression vector or expression vectors.

In some embodiments of the foregoing methods of treating, the cancer is a hematologic cancer. In some embodiments of the foregoing methods of treating, the cancer is multiple myeloma, leukemia, or lymphoma. In some embodiments of the foregoing methods of treating, the pre-malignant disease is monoclonal gammopathy of undetermined significance (MGUS) or smoldering multiple myeloma.

In some embodiments of the foregoing methods of treating, the cancer or pre-malignant disease expresses a level of B-cell maturation antigen (BCMA), wherein the level of BCMA is at least 20% more than a level of BCMA in a normal cell.

In some embodiments of the foregoing methods of treating, the method further comprises detecting that one or more cancer cells or pre-malignant disease cells in the subject expresses or overexpresses BCMA.

In a seventeenth aspect, the disclosure relates to a method of killing a target cell, the method comprising: contacting the target cell with any one of the foregoing T cells, wherein the target cell expresses or overexpresses B-cell maturation antigen (BCMA) and expresses human leukocyte antigen A (HLA-A). In some embodiments, the method further comprises contacting the T cell with an immune agonist. In some embodiments, the immune agonist is an OX40 agonist or a glucocorticoid-induced TNFR-related protein (GITR) agonist. In some embodiments, the OX40 agonist is an anti-OX40 antibody and the GITR agonist is an anti-GITR antibody.

In a eighteenth aspect, the disclosure relates to a method of treating a human subject having a BCMA-expressing plasma cell disorder, the method comprising administering to the subject any one of the foregoing T cells. In some embodiments, the plasma cell disorder is Waldenstrom's macroglobulinemia.

In a nineteenth aspect, the disclosure relates to a method of treating a human subject having a BCMA-expressing plasma cell disorder, the method comprising administering to the subject one or more of the foregoing nucleic acids. In some embodiments, the plasma cell disorder is Waldenstrom's macroglobulinemia.

In a twentieth aspect, the disclosure relates to a method of treating a human subject having a BCMA-expressing plasma cell disorder, the method comprising administering to the subject one or more of the foregoing expression vectors. In some embodiments, the plasma cell disorder is Waldenstrom's macroglobulinemia.

In a twenty first aspect, the disclosure relates to a TCR comprising an alpha chain and a beta chain, wherein: (i) the TCR alpha chain comprises a CDR1 and a CDR2 from SEQ ID NO:27 and a CDR3 of any one of SEQ ID NOs.: 49-80 or 221-289; and wherein the TCR beta chain comprises a CDR1 and/or a CDR2 from SEQ ID NO:19 and a CDR3 of any one of SEQ ID NOs.: 81-112, 128-156, or 290-394; (ii) the TCR alpha chain comprises a CDR1 and a CDR2 from SEQ ID NO:28 and a CDR3 of any one of SEQ ID NOs.: 49-80 or 221-289; and wherein the TCR beta chain comprises a CDR1 and/or a CDR2 from SEQ ID NO:20 and a CDR3 of any one of SEQ ID NOs.: 81-112, 128-156, or 290-394; (iii) the TCR alpha chain comprises a CDR1 and a CDR2 from SEQ ID NO:29 and a CDR3 of any one of SEQ ID NOs.: 49-80 or 221-289; and wherein the TCR beta chain comprises a CDR1 and/or a CDR2 from SEQ ID NO:21 and a CDR3 of any one of SEQ ID NOs.: 81-112, 128-156, or 290-394; (iv) the TCR alpha chain comprises a CDR1 and/or a CDR2 from SEQ ID NO:30 and a CDR3 of any one of SEQ ID NOs.: 49-80 or 221-289; and wherein the TCR beta chain comprises a CDR1 and/or a CDR2 from SEQ ID NO:22 and a CDR3 of any one of SEQ ID NOs.: 81-112, 128-156, or 290-394; (v) the TCR alpha chain comprises a CDR1 and/or a CDR2 from SEQ ID NO:31 and a CDR3 of any one of SEQ ID NOs.: 49-80 or 221-289; and wherein the TCR beta chain comprises a CDR1 and/or a CDR2 from SEQ ID NO:23 and a CDR3 of any one of SEQ ID NOs.: 81-112, 128-156, or 290-394; (vi) the TCR alpha chain comprises a CDR1 and/or a CDR2 from SEQ ID NO:32 and a CDR3 of any one of SEQ ID NOs.: 49-80 or 221-289; and wherein the TCR beta chain comprises a CDR1 and/or a CDR2 from SEQ ID NO:24 and a CDR3 of any one of SEQ ID NOs.: 81-112, 128-156, or 290-394; (vii) the TCR alpha chain comprises a CDR1 and/or a CDR2 from SEQ ID NO:33 and a CDR3 of any one of SEQ ID NOs.: 49-80 or 221-289; and wherein the TCR beta chain comprises a CDR1 and/or a CDR2 from SEQ ID NO:25 and a CDR3 of any one of SEQ ID NOs.: 81-112, 128-156, or 290-394; or (viii) the TCR alpha chain comprises a CDR1 and/or a CDR2 from SEQ ID NO:34 and a CDR3 of any one of SEQ ID NOs.: 49-80 or 221-289; and wherein the TCR beta chain comprises a CDR1 and/or a CDR2 from SEQ ID NO:26 and a CDR3 of any one of SEQ ID NOs.: 81-112, 128-156, or 290-394. CDRs of TCRs can be identified by any method known in the art (see, e.g., Wong et al., *Front. Immunol.*, 2019; doi.org/10.3389/fimmu.2019.02454; an auto-updating sequence-based prediction tool (available at opig.stats.ox.ac.uk/resources).

In one instance, any of the TCRs set out in any of the aspects above or of this disclosure binds a BCMA peptide MHC/HLA complex. In certain cases, the BCMA peptide is the heteroclitic BCMA$_{72-80}$ peptide (YLMFLLRKI (SEQ ID NO:37). In some cases, the BCMA peptide differs from the amino acid sequence of SEQ ID NO:37 by 1 to 5 amino acids (e.g., 1, 2, 3, 4, 5). In some cases, the BCMA peptide differs from the amino acid sequence of SEQ ID NO:37 by 1 to 4 amino acids. In some cases, the BCMA peptide differs from the amino acid sequence of SEQ ID NO:37 by 1 to 3 amino acids. In some cases, the BCMA peptide differs from the amino acid sequence of SEQ ID NO:37 by 1 to 2 amino acids. In some cases, the BCMA peptide differs from the amino acid sequence of SEQ ID NO:37 by 1 amino acid. In some cases, the BCMA peptide differs from the amino acid sequence of SEQ ID NO:37 at one or more (e.g., 1, 2, 3) of positions 1, 2, or 9 of the amino acid sequence of SEQ ID NO:37. In some cases, the BCMA peptide differs from the amino acid sequence of SEQ ID NO:37 at one or two of positions 1, 2, or 9 of the amino acid sequence of SEQ ID NO:37. In some cases, the BCMA peptide differs from the amino acid sequence of SEQ ID NO:37 at one position of 1, 2, or 9 of the amino acid sequence of SEQ ID NO:37. In some instances, the TCR binds a BCMA peptide presented in HLA-A2 (e.g., HLA-A2.1). In some cases, the BCMA peptide is an HLA-A2.1-restricted peptide.

DESCRIPTION OF DRAWINGS

FIGS. 1A-1I show BCMA expression on multiple myeloma cell lines.

FIGS. 5A-5C show increased CD8$^+$ cytotoxic T cell (CTL) with heteroclitic BCMA #4 peptide stimulation.

FIGS. 6A-6C show decreased naïve CTL with heteroclitic BCMA #4 peptide stimulation.

FIGS. 7A-7C show increased memory CTL with heteroclitic BCMA #4 peptide stimulation.

FIG. 11 shows HLA-A2 specific proliferation of heteroclitic BCMA #4 peptide-CTL.

FIGS. 14A-14F show HLA-A2 restricted and antigen-specific immune responses by heteroclitic BCMA$_{72-80}$-specific CTL to HLA-A2$^+$ MM cell lines.

FIGS. 15A-15H show anti-tumor activities of heteroclitic BCMA$_{54-62}$-specific CTL or heteroclitic BCMA$_{72-80}$ specific CTL against patients' MM cells.

FIGS. 22A-22C show high BCMA expression on H929, MMIS, U266 and OPM1 cell lines, but not on breast cancer cell line (MDA-MB231).

DETAILED DESCRIPTION

Figure 1A:
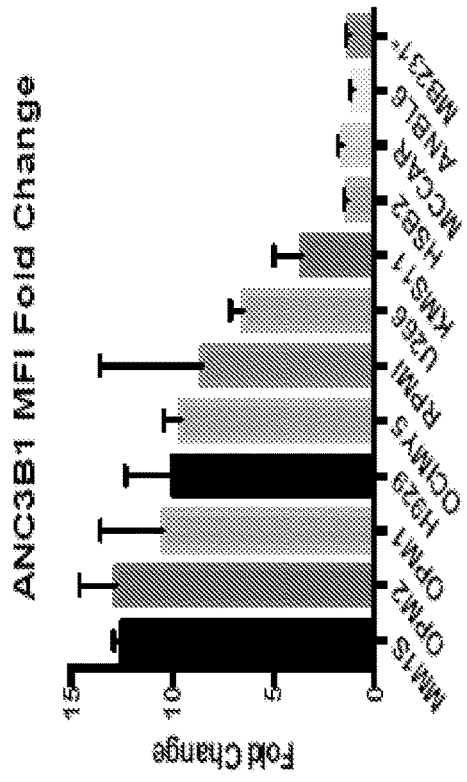
Figure 1B:
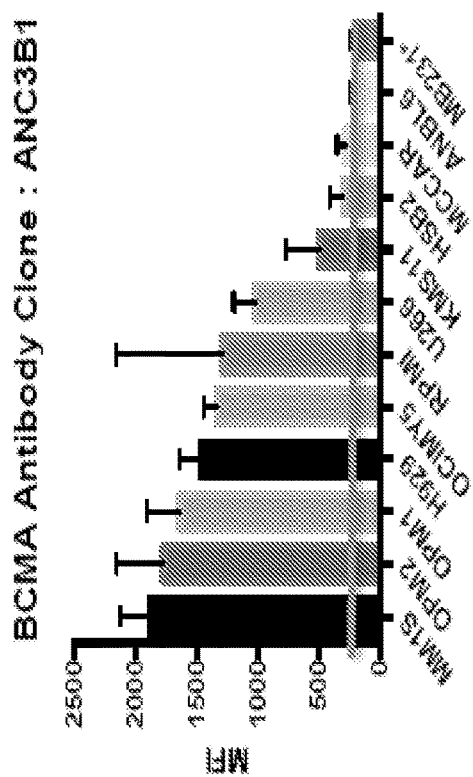
Figure 1C:
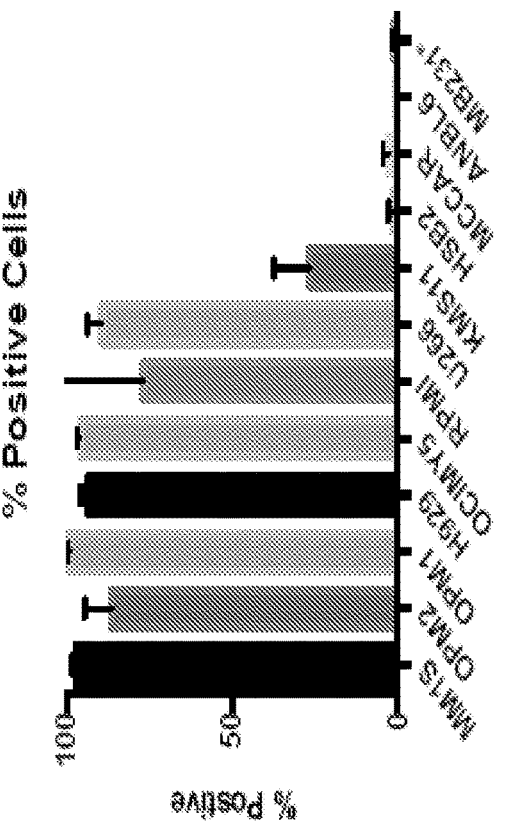

B-cell maturation antigen (BCMA) is a critical antigen specific to many cancers, including, e.g., multiple myeloma (MM), plasma cell disorders (e.g., Waldenstrom's macroglobulinemia), and other hematological malignancies. This disclosure is based at least, in part, on the identification of HLA-A2-specific immunogenic peptides derived from BCMA antigen, which were used to generate BCMA-specific T cell receptors (TCRs), which can be used, e.g., to engineer BCMA-specific T cells for use in adoptive T cell therapy for the treatment of, e.g., multiple myeloma. Thus, the disclosure relates to TCRs, or portions thereof (e.g., TCR alpha chain or TCR beta chain), specific to BCMA, cells comprising same (e.g., T cells comprising said TCRs), and compositions thereof (e.g., pharmaceutical compositions thereof). The TCRs, or BCMA-binding portions thereof can be used to, e.g., generate BCMA-specific T cells, which can be used to, e.g., treat cancer (e.g., MM) or a pre-malignant disease, plasma cell disorders (e.g., Waldenstrom's macroglobulinemia), and other hematological malignancies in a subject. The TCRs and BCMA-binding portions thereof can be used in a variety of applications, such as, e.g., methods for treating cancer or a pre-malignant disease (e.g., such as multiple myeloma), plasma cell disorders (e.g., Waldenstrom's macroglobulinemia), or other hematological malignancies, including, e.g., adoptive T cell therapy.

BCMA-Derived Peptides

B-cell maturation antigen (BCMA) (NM 001192.2→NP_001183.2), also known as tumor necrosis factor receptor superfamily member 17 (TNFRSF17), is a protein that in humans is encoded by the TNFRSF17 gene. BCMA is a cell surface receptor of the TNF receptor superfamily which recognizes B-cell activating factor (BAFF). BCMA is expressed in mature B lymphocytes. This receptor has been shown to specifically bind to the tumor necrosis factor (ligand) superfamily, member 13b (TNFSF13B/TALL-1/BAFF), and to lead to NF-kappaB and MAPK8/JNK activation. This receptor also binds to various TRAF family members, and thus may transduce signals for cell survival and proliferation. BCMA is often overexpressed in various cancer cells, e.g., in a subject with leukemia, lymphomas, and multiple myeloma.

The amino acid sequence of human BCMA is shown below.

```
Human BCMA
                                           (NP_001183.2; SEQ ID NO: 38)
    1    mlqmagqcsq neyfdsllha cipcqlrcss ntppltcqry cnasvtnsvk gtnailwtcl 61    glsliislav fvlmfllrki nseplkdefk ntgsgllgma nidleksrtg deiilprgle 121    ytveectced cikskpkvds dhcfplpame egatilvttk tndyckslpa alsateieks 181    isar
```

The TCRs described herein specifically bind to a BCMA peptide (e.g., the BCMA heteroclitic peptide). In one instance, a BCMA heteroclitic peptide is $BCMA_{72-80}$ (YLMFLLRKI) (SEQ ID NO: 37). As used herein, the term "heteroclitic" (e.g., a heteroclitic peptide) refers to a form of a peptide in which one or more amino acid residues have been modified from a wild-type or original sequence in order to produce a peptide that is more immunogenic than the corresponding peptide with wildtype sequence or original sequence.

It is of course to be understood that the TCRs described herein bind the BCMA peptide in the context of peptide bound to MHC or HLA.

In some instances, the BCMA heteroclitic peptide disclosed herein elicits TCR binding (e.g., when the BCMA peptide is presented in the context of MHC/HLA). In some instances, once a BCMA heteroclitic peptide is identified as a peptide that specifically binds to a TCR, then it may be modified. In some instances, the BCMA heteroclitic peptide includes 9 amino acids (e.g., SEQ ID NO:37). In some instances, the amino acid is modified at 1 position, at 2 positions, or at 3 positions of SEQ ID NO:37. In some instances, the BCMA heteroclitic peptide is modified at position 1 of SEQ ID NO:37 with a substitution. In some instances, the BCMA heteroclitic peptide is modified at position 2 of SEQ ID NO:37 with a substitution. In some instances, the BCMA heteroclitic peptide is modified at position 9 of SEQ ID NO:37 with a substitution. In some instances, the BCMA heteroclitic peptide is modified at positions 1 and 2 of SEQ ID NO:37 with a substitution at each position. In some instances, the BCMA heteroclitic peptide is modified at positions 2 and 9 of SEQ ID NO:37 with a substitution at each position. In some instances, the BCMA heteroclitic peptide is modified at positions 1, 2, and 9 of SEQ ID NO:37 with a substitution at each position. In some instances, the substitution is to a different naturally-occurring amino acid. In some instances, the substation is to a non-naturally-occurring amino acid.

The substitutions can be any type of amino acid substitution, e.g., conservative or non-conservative. Conservative substitutions include substitutions within the following groups: (1) valine, alanine and glycine; leucine, valine, and isoleucine; (2) aspartic acid and glutamic acid; (3) asparagine and glutamine; (4) serine, cysteine, and threonine; lysine and arginine; and (5) phenylalanine and tyrosine. The non-polar hydrophobic amino acids include alanine, leucine, isoleucine, valine, proline, phenylalanine, tryptophan and methionine. The polar neutral amino acids include glycine, serine, threonine, cysteine, tyrosine, asparagine and glutamine. The positively charged (basic) amino acids include arginine, lysine, and histidine. The negatively charged (acidic) amino acids include aspartic acid and glutamic acid. Any substitution of one member of the above-mentioned polar, basic or acidic groups by another member of the same group can be deemed a conservative substitution. By contrast, a non-conservative substitution is a substitution of one amino acid for another with dissimilar characteristics, e.g., substituting an amino acid with another amino acid within another group.

BCMA-Specific T Cell Receptors

The disclosure provides TCR sequences (e.g., TCR alpha chain and TCR beta chain sequences) that bind to the BCMA-derived peptide YLMFLLRKI (SEQ ID NO: 37). Also provided herein are derivatives or variants of the BCMA-specific TCR sequences, conjugates comprising such TCR sequences, derivatives or variants thereof.

TCRs are disulfide-linked membrane-bound heterodimeric proteins expressed on the surface of T cells. TCRs engage, via their variable regions, antigenic peptide in complex with the MHC/HLA. Engagement with the antigenic peptide/MHC or HLA activates T cell signaling. TCRs normally comprise the highly variable alpha and beta chains, which complex with invariant CD3 chain molecules; a minority of TCRs comprise variable gamma and delta chains. Each of the alpha chain and the beta chain comprises two extracellular domains: a variable (V) region and a constant (C) region. Each variable region (i.e., in the alpha chain and the beta chain) contains three hypervariable regions, also referred to as "complementarity determining regions" (CDRs). CDR3 is the main CDR responsible for antigen binding. The alpha and beta chains also contain joining (J) regions. The beta chain also usually contains a diversity (D) region between the V and J regions; however, this D region may be considered part of the J region. TCRs are described using the International Immunogenetics (IMGT) TCR nomenclature. The sequences defined by the IMGT nomenclature are known to those skilled in the art and can be found, e.g., in the IMGT public database and in the "T cell Receptor Factsbook", (2001) LeFranc and LeFranc, Academic Press, ISBN 0-12-441352-8. Methods for producing TCRs are known in the art (see, e.g., U.S. Pat. Appl. Publ. Nos. 2018/0245242 and 2007/0116718, U.S. Pat. No. 6,534,633, and International Patent Application Publication Nos. WO 98/39482, WO 00/23087, WO 99/18129, and WO 97/32603, each of which is incorporated by reference herein in its entirety).

Thus, provided herein are TCRs (e.g., TCR alpha chains and/or beta chains), which may be characterized as comprising the variable region(s) or CDR(s) of a TCR alpha chain (Table 1) and/or TCR beta chain (Table 2) sequence described herein. The corresponding nucleotide sequences encoding the TCR alpha chain and beta chains are set forth in Tables 7 and 8, respectively, below.

A TCR described herein may comprises one, two, or all three of the CDRs of a TCR alpha chain sequence set forth in Table 1 (i.e., any one of SEQ ID NOs: 27-34) or a TCR alpha chain CDR3 sequence set forth in Table 3 or 5 (i.e., any one of SEQ ID NOs:49-80 or 221-289). For example, in certain embodiments, a TCR described herein may comprise CDRs 1, 2, and 3 of a TCR alpha chain sequence set forth in Table 1. In another example, a TCR described herein may comprise CDRs 1 and 2 of a TCR alpha chain sequence set forth in Table 1. In another example, a TCR described herein may comprise CDR3 of a TCR alpha chain sequence set forth in Table 1. In yet another example, in certain embodiments, a TCR described herein may comprise a TCR alpha chain CDR3 sequence set forth in Tables 3 or 5 (i.e., any one of SEQ ID NOs:49-80 or 221-289). In certain embodiments, the TCR may comprise a TCR alpha chain comprising 1, 2, or all three of the CDRs of an amino acid sequence set forth in Table 1, except that each CDR differs by 0, 1 or 2 amino acids as compared to the CDRs of the amino acid sequence of Table 1. In certain embodiments, the TCR may comprise a TCR alpha chain comprising a CDR3 set forth in Table 3 or 5, except that the CDR3 differs by 1 or 2 amino acids as compared to the CDR3 of Tables 3 or 5.

In some embodiments, a TCR described herein may comprise the TCR alpha chain variable domain of an amino acid sequence set forth in Table 1 (i.e., any one of SEQ ID NOs: 27-34). In some embodiments, the TCR alpha chain comprises the variable domain of an amino acid sequence set forth in Table 1, except that it differs by 1 to 10 (i.e., 1, 2, 3, 4, 5, 6, 7, 8, 9, 10) amino acids.

In some embodiments, a TCR described herein comprises a TCR alpha chain comprising or consisting of an amino acid sequence set forth in Table 1 (i.e., any one of SEQ ID NOs: 27-34), or differs by 1 to 50 amino acids, by 1 to 40 amino acids, by 1 to 30 amino acids, by 1 to 20 amino acids, by 1 to 10 amino acids, or by 1 to 5 amino acids. In certain embodiments, the TCR alpha chain comprises an amino acid sequence set forth in Table 1 (i.e., any one of SEQ ID NOs: 27-34), differing by 1 to 10 (i.e., 1, 2, 3, 4, 5, 6, 7, 8, 9, or 10) amino acids. In some embodiments, the TCR alpha chain consists of an amino acid sequence set forth in Table 1. In certain embodiments, the TCR comprises an alpha chain comprising or consisting of the amino acid sequence of SEQ ID NO: 27. In certain embodiments, the TCR comprises an alpha chain comprising or consisting of the amino acid sequence of SEQ ID NO: 28. In certain embodiments, the TCR comprises an alpha chain comprising or consisting of the amino acid sequence of SEQ ID NO: 29. In certain embodiments, the TCR comprises an alpha chain comprising or consisting of the amino acid sequence of SEQ ID NO: 30. In certain embodiments, the TCR comprises an alpha chain comprising or consisting of the amino acid sequence of SEQ ID NO: 31. In certain embodiments, the TCR comprises an alpha chain comprising or consisting of the amino acid sequence of SEQ ID NO: 32. In certain embodiments, the TCR comprises an alpha chain comprising or consisting of the amino acid sequence of SEQ ID NO: 33. In certain embodiments, the TCR comprises an alpha chain comprising or consisting of the amino acid sequence of SEQ ID NO: 34.

TABLE 1

TCR Alpha Chain Amino Acid Sequences

| SEQ ID NO | ID | SEQUENCE |
|---|---|---|
| 27 | >clonotype2.2\|TRA\|TRAV12-2*01\|TRAJ5*01\|TRAC TRAC_001 | MKSLRVLLVILWLQLSWVWSQQKEVEQNSGPLSVPEGAIASLNCTYSDRG SQSFFWYRQYSGKSPELIMFIYSNGDKEDGRFTAQLNKASQYVSLLIRDSQP SDSATYLCAVGDAGRRALTFGSGTRLQVQPNIQNPDPAVYQLRDSKSSDKS VCLFTDFDSQTNVSQSKDSDVYITDKTVLDMRSMDFKSNSAVAWSNKSDF ACANAFNNSIIPEDTFFPSPESSCDVKLVEKSFETDTNLNFQNLSVIGFRILLL KVAGFNLLMTLRLWSS |
| 28 | >clonotype3.3\|TRA\|TRAV38-2/DV8*01\|TRAJ57*01\|TRAC TRAC_002 | MACPGFLWALVISTCLEFSMAQTVTQSQPEMSVQEAETVTLSCTYDTSES DYYLFWYKQPPSRQMILVIRQEAYKQQNATENRFSVNFQKAAKSFSLKISD SQLGDAAMYFCAYEDGSEKLVFGKGTKLTVNPYIQNPDPAVYQLRDSKSSD KSVCLFTDFDSQTNVSQSKDSDVYITDKTVLDMRSMDFKSNSAVAWSNKS DFACANAFNNSIIPEDTFFPSPESSCDVKLVEKSFETDTNLNFQNLSVIGFRIL LLKVAGFNLLMTLRLWSS |
| 29 | >clonotype2A\|TRA\|TRAV12-2*01\|TRAJ5*01\|TRAC TRAC_003 | MKSLRVLLVILWLQLSWVWSQQKEVEQNSGPLSVPEGAIASLNCTYSDRG SQSFFWYRQYSGKSPELIMFIYSNGDKEDGRFTAQLNKASQYVSLLIRDSQP SDSATYLCAVGDAGRRALTFGSGTRLQVQPNIQNPDPAVYQLRDSKSSDKS VCLFTDFDSQTNVSQSKDSDVYITDKTVLDMRSMDFKSNSAVAWSNKSDF ACANAFNNSIIPEDTFFPSPESSCDVKLVEKSFETDTNLNFQNLSVIGFRILLL KVAGFNLLMTLRLWSS |
| 30 | >clonotype3A\|TRA\|TRAV38-2/DV8*01\|TRAJ57*01\|TRAC TRAC_004 | MACPGFLWALVISTCLEFSMAQTVTQSQPEMSVQEAETVTLSCTYDTSES DYYLFWYKQPPSRQMILVIRQEAYKQQNATENRFSVNFQKAAKSFSLKISD SQLGDAAMYFCAYEDGSEKLVFGKGTKLTVNPYIQNPDPAVYQLRDSKSSD KSVCLFTDFDSQTNVSQSKDSDVYITDKTVLDMRSMDFKSNSAVAWSNKS DFACANAFNNSIIPEDTFFPSPESSCDVKLVEKSFETDTNLNFQNLSVIGFRIL LLKVAGFNLLMTLRLWSS |
| 31 | >clonotype4A\|TRA\|TRAV29/DV5*01\|TRAJ4*01\|TRAC TRAC_005 | MAMLLGASVLILWLQPDWVNSQQKNDDQQVKQNSPSLSVQEGRISILNC DYTNSMFDYFLWYKKYPAEGPTFLISISSIKDKNEDGRFTVFLNKSAKHLSLHI VPSQPGDSAVYFCAASPPESGGYNKLIFGAGTRLAVHPYIQNPDPAVYQLR DSKSSDKSVCLFTDFDSQTNVSQSKDSDVYITDKTVLDMRSMDFKSNSAVA WSNKSDFACANAFNNSIIPEDTFFPSPESSCDVKLVEKSFETDTNLNFQNLS VIGFRILLLKVAGFNLLMTLRLWSS |
| 32 | >clonotype7A\|TRA\|TRAV12-2*01\|TRAJ801*\|TRAC TRAC_006 | MKSLRVLLVILWLQLSWVWSQQKEVEQNSGPLSVPEGAIASLNCTYSDRG SQSFFWYRQYSGKSPELIMFIYSNGDKEDGRFTAQLNKASQYVSLLIRDSQP SDSATYLCAVSRRERNTGFQKLVFGTGTRLLVSPNIQNPDPAVYQLRDSKSS DKSVCLFTDFDSQTNVSQSKDSDVYITDKTVLDMRSMDFKSNSAVAWSNK SDFACANAFNNSIIPEDTFFPSPESSCDVKLVEKSFETDTNLNFQNLSVIGFRI LLLKVAGFNLLMTLRLWSS |
| 33 | >clonotype8A\|TRA\|VTRA12-1*01\|TRAJ9*01\|TRAC TRAC_007 | MISLRVLLVILWLQLSWVWSQRKEVEQDPGPFNVPEGATVAFNCTYSNSA SQSFFWYRQDCRKEPKLLMSVYSSGNEDGRFTAQLNRASQYISLLIRDSKLS DSATYLCVVRPGTGGFKTIFGAGTRLFVKANIQNPDPAVYQLRDSKSSDKSV CLFTDFDSQTNVSQSKDSDVYITDKTVLDMRSMDFKSNSAVAWSNKSDFA CANAFNNSIIPEDTFFPSPESSCDVKLVEKSFETDTNLNFQNLSVIGFRILLLKV AGFNLLMTLRLWSS |

TABLE 1-continued

TCR Alpha Chain Amino Acid Sequences

| SEQ ID NO | ID | SEQUENCE |
|---|---|---|
| 34 | >clonotype9 A\|TRA\| TRAV2*01\| TRAJ23*01\|TRAC TRAC_008 | MALQSTLGAVWLGLLLNSLWKVAESKDQVFQPSTVASSEGAVVEIFCNHS VSNAYNFFWYLHFPGCAPRLLVKGSKPSQQGRYNMTYERFSSSLLILQVRE ADAAVYYCAVEDLYNQGGKLIFGQGTELSVKPNIQNPDPAVYQLRDSKSSD KSVCLFTDFDSQTNVSQSKDSDVYITDKTVLDMRSMDFKSNSAVAWSNKS DFACANAFNNSIIPEDTFFPSPESSCDVKLVEKSFETDTNLNFQNLSVIGFRIL LLKVAGFNLLMTLRLWSS |

A TCR described herein may comprises one, two, or all three of the CDRs of a TCR beta chain sequence set forth in Table 2 (i.e., any one of SEQ ID NOs: 19-26) or a TCR beta chain CDR3 sequence set forth in Table 3 or 6 (i.e., any one of SEQ ID NOs: 81-156 or 290-394). For example, in certain embodiments, a TCR described herein may comprise CDRs 1, 2, and 3 of a TCR beta chain sequence set forth in Table 2. In another example, a TCR described herein may comprise CDRs 1 and 2 of a TCR beta chain sequence set forth in Table 2. In another example, a TCR described herein may comprise CDR3 of a TCR beta chain sequence set forth in Table 2. In yet another example, in certain embodiments, a TCR described herein may comprise a TCR beta chain CDR3 sequence set forth in Table 3, 4, or 6 (i.e., any one of SEQ ID NOs: 81-156 or 290-394). In certain embodiments, the TCR may comprise a TCR beta chain comprising 1, 2, or all three of the CDRs of an amino acid sequence set forth in Table 2, except that each CDR differs by 0, 1, or 2 amino acids as compared to the CDRs of the amino acid sequence of Table 2. In certain embodiments, the TCR may comprise a TCR beta chain comprising a CDR3 set forth in Table 3, 4, or 6, except that the CDR3 differs by 1 or 2 amino acids as compared to the CDR3 of Tables 3, 4, or 6. These TCRs bind MHC or HLA complexed with a BCMA peptide (e.g., SEQ ID NO:37).

In some embodiments, a TCR described herein may comprise the TCR beta chain variable domain of an amino acid sequence set forth in Table 2 (i.e., any one of SEQ ID NOs:19-26). In some embodiments, the TCR beta chain comprises the variable domain of an amino acid sequence set forth in Table 2, except that it differs by 1 to 10 (i.e., 1, 2, 3, 4, 5, 6, 7, 8, 9, 10) amino acids. These TCRs bind MHC or HLA complexed with a BCMA peptide (e.g., SEQ ID NO:37).

In some embodiments, a TCR described herein comprises a TCR beta chain comprising or consisting of an amino acid sequence set forth in Table 2 (i.e., any one of SEQ ID NOs: 19-26), or differs by 1 to 50 amino acids, by 1 to 40 amino acids, by 1 to 30 amino acids, by 1 to 20 amino acids, by 1 to 10 amino acids, or by 1 to 5 amino acids. In certain embodiments, the TCR beta chain comprises an amino acid sequence set forth in Table 2 (i.e., any one of SEQ ID NOs:19-26), differing by 1 to 10 (i.e., 1, 2, 3, 4, 5, 6, 7, 8, 9, or 10) amino acids. In some embodiments, the TCR beta chain consists of an amino acid sequence set forth in Table 2. In certain embodiments, the TCR comprises a beta chain comprising or consisting of the amino acid sequence of SEQ ID NO: 19. In certain embodiments, the TCR comprises a beta chain comprising or consisting of the amino acid sequence of SEQ ID NO: 20. In certain embodiments, the TCR comprises a beta chain comprising or consisting of the amino acid sequence of SEQ ID NO: 21. In certain embodiments, the TCR comprises a beta chain comprising or consisting of the amino acid sequence of SEQ ID NO: 22. In certain embodiments, the TCR comprises a beta chain comprising or consisting of the amino acid sequence of SEQ ID NO: 23. In certain embodiments, the TCR comprises a beta chain comprising or consisting of the amino acid sequence of SEQ ID NO: 24. In certain embodiments, the TCR comprises a beta chain comprising or consisting of the amino acid sequence of SEQ ID NO: 25. In certain embodiments, the TCR comprises a beta chain comprising or consisting of the amino acid sequence of SEQ ID NO: 26. These TCRs bind MHC or HLA complexed with a BCMA peptide (e.g., SEQ ID NO:37).

TABLE 2

TCR Beta Chain Amino Acid Sequences

| SEQ ID NO | ID | SEQUENCE |
|---|---|---|
| 19 | >clonotype2.2 \|TRB\|TRBV9*01 \|TRBJ1-2*01\|TRBC1 TRBC_001 | MGFRLLCCVAFCLLGAGPVDSGVTQTPKHLITATGQRVTLRCSPRSGDLSV YWYQQSLDQGLQFLIQYYNGEERAKGNILERFSAQQFPDLHSELNLSSLELG DSALYFCASSVAGSSSYGYTFGSGTRLTVVEDLNKVFPPEVAVFEPSEAEISH TQKATLVCLATGFFPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSVSYQQGVLSATILYEILLGKATLYAVLVSALVLMAMVKR KDFRRRRSGSGVKQTLNFDLLKLAGDVESNPGP |
| 20 | >clonotype3.3 \|TRB\|TRBV7-9*01\|TRBJ1-1*01\|TRBC1 TRBC_002 | MGTSLLCWMALCLLGADHADTGVSQNPRHKITKRGQNVTFRCDPISEHN RLYWYRQTLGQGPEFLTYFQNEAQLEKSRLLSDRFSAERPKGSFSTLEIQRTE QGDSAMYLCASSLARTEAFFGQGTRLTVVEDLNKVFPPEVAVFEPSEAEISH TQKATLVCLATGFFPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSVSYQQGVLSATILYE1LLGKATLYAVLVSALVLMAMVKR KDFRRRRSGSGVKQTLNFDLLKLAGDVESNPGP |

TABLE 2-continued

TCR Beta Chain Amino Acid Sequences

| SEQ ID NO | ID | SEQUENCE |
|---|---|---|
| 21 | >clonotype2B\|TRB\|TRBV9*01\|TRBJ1-2*01\|TRBC1 TRBC_003 | MGFRLLCCVAFCLLGAGPVDSGVTQTPKHLITATGQRVTLRCSPRSGDLSV YWYQQSLDQGLQFLIQYYNGEERAKGNILERFSAQQFPDLHSELNLSSLELG DSALYFCASSVAGSSSYGYTFGSGTRLTVVEDLNKVFPPEVAVFEPSEAEISH TQKATLVCLATGFFPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSVSYQQGVLSATILYEILLGKATLYAVLVSALVLMAMVKR KDF |
| 22 | >clonotype3B\|TRB\|TRBV7-9*01\|TRBJ1-1*01\|TRBC1 TRBC_004 | MGTSLLCWMALCLLGADHADTGVSQNPRHKITKRGQNVTFRCDPISEHN RLYWYRQTLGQGPEFLTYFQNEAQLEKSRLLSDRFSAERPKGSFSTLEIQRTE QGDSAMYLCASSLARTEAFFGQGTRLTVVEDLNKVFPPEVAVFEPSEAEISH TQKATLVCLATGFFPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSVSYQQGVLSATILYEILLGKATLYAVLVSALVLMAMVKR KDF |
| 23 | >clonotype4B\|TRB\|TRBV3-1*01\|TRBJ2-3*01\|TRBC2 TRBC_005 | MGCRLLCCVVFCLLQAGPLDTAVSQTPKYLVTQMGNDKSIKCEQNLGHDT MYWYKQDSKKFLKIMFSYNNKELIINETVPNRFSPKSPDKAHLNLHINSLEL GDSAVYFCASSLGTDTQYFGPGTRLTVLEDLKNVFPPEVAVFEPSEAEISHT QKATLVCLATGFYPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSESYQQGVLSATILYEILLGKATLYAVLVSALVLMAMVKR KDSRG |
| 24 | >clonotype7B\|TRB\|TRBV3-1*01\|TRBJ2-7*01\|TRBC2 TRBC_006 | MGCRLLCCVVFCLLQAGPLDTAVSQTPKYLVTQMGNDKSIKCEQNLGHDT MYWYKQDSKKFLKIMFSYNNKELIINETVPNRFSPKSPDKAHLNLHINSLEL GDSAVYFCASSQRVYEQYFGPGTRLTVTEDLKNVFPPEVAVFEPSEAEISHT QKATLVCLATGFYPDHVELSWWVNGKEVHSGVSTDPQPLKEQPALNDSR YCLSSRLRVSATFWQNPRNHFRCQVQFYGLSENDEWTQDRAKPVTQIVSA EAWGRADCGFTSESYQQGVLSATILYEILLGKATLYAVLVSALVLMAMVKR KDSRG |
| 25 | >clonotype8B\|TRB\|TRBV27*01\|TRBJ2-5*01\|TRBC2 TRBC_007 | MGPQLLGYVVLCLLGAGPLEAQVTQNPRYLITVTGKKLTVTCSQNMNHEY MSWYRQDPGLGLRQIYYSMNVEVTDKGDVPEGYKVSRKEKRNFPLILESPS PNQTSLYFCASSLLGTQGPKETQYFGPGTRLLVLEDLKNVFPPEVAVFEPSE AEISHTQKATLVCLATGFYPDHVELSWWVNGKEVHSGVSTDPQPLKEQPA LNDSRYCLSSRLRVSATFWQNPRNHFRCQVQFYGLSENDEWTQDRAKPV TQIVSAEAWGRADCGFTSESYQQGVLSATILYEILLGKATLYAVLVSALVLM AMVKRKDSRG |
| 26 | >clonotype9B\|TRB\|TRBV7-3*01\|TRBJ1-1*01\|TRBC1 TRBC_008 | MGTRLLCWAALCLLGADHTGAGVSQTPSNKVTEKGKYVELRCDPISGHTA LYWYRQSLGQGPEFLIYFQGTGAADDSGLPNDRFFAVRPEGSVSTLKIQRT ERGDSAVYLCASSLGGTGPFTTEAFFGQGTRLTVVEDLNKVFPPEVAVFEPS EAEISHTQKATLVCLATGFFPDHVELSWWVNGKEVHSGVSTDPQPLKEQP ALNDSRYCLSSRLRVSATFWQNPRNHFRCQVQFYGLSENDEWTQDRAKP VTQIVSAEAWGRADCGFTSVSYQQGVLSATILYEILLGKATLYAVLVSALVL MAMVKRKDF |

TABLE 3

Exemplary TCR Alpha and Beta Chain CDR3 Amino Acid Sequences

| | TCR alpha chain CDR3 | TCR beta chain CDR3 |
|---|---|---|
| HLA-A2 + Donor 3 clonotype1 | CAMRVYDKVIF (SEQ ID NO: 49) | CASSHHGRGATGELFF (SEQ ID NO: 81) |
| HLA-A2 + Donor 3 clonotype2 | CAVIGYGQNFVF (SEQ ID NO: 50) | CASTGGFSEPQHF (SEQ ID NO: 82) |
| HLA-A2 + Donor 3 clonotype4 | CAVRDNKDGATNKLIF (SEQ ID NO: 51) | CASSPGTGSSGYTF (SEQ ID NO: 83) |
| HLA-A2 + Donor 3 clonotype5 | CAESYGGATNKLIF (SEQ ID NO: 52) | CASSTTSGGAGEQFF (SEQ ID NO: 84) |
| HLA-A2 + Donor 3 clonotype6 | CAMSAGAGSYQLTF (SEQ ID NO: 53) | CASSQYSGGAHTQYF (SEQ ID NO: 85) |
| HLA-A2 + Donor 3 clonotype8 | CATDAGYNNDMRF (SEQ ID NO: 54) | CSAIDGNTIYF (SEQ ID NO: 86) |

TABLE 3-continued

Exemplary TCR Alpha and Beta Chain CDR3 Amino Acid Sequences

|  | TCR alpha chain CDR3 | TCR beta chain CDR3 |
| --- | --- | --- |
| HLA-A2 + Donor 3 clonotype9 | CAETGYSTLTF (SEQ ID NO: 55) | CASSPPGLAGNQETQYF (SEQ ID NO: 87) |
| HLA-A2 + Donor 3 clonotype12 | CILTRSRSARQLTF (SEQ ID NO: 56) | CASRPLTGGANTEAFF (SEQ ID NO: 88) |
| HLA-A2 + Donor 3 clonotype13 | CAVHFGNEKLTF (SEQ ID NO: 57) | CASSIYSNTEAFF (SEQ ID NO: 89) |
| HLA-A2 + Donor 3 clonotype14 | CIVRSYDRGSQGNLIF (SEQ ID NO: 58) | CASSTRGLNSNQPQHF (SEQ ID NO: 90) |
| HLA-A2 + Donor 3 clonotype15 | CLLGDELGDYQLIW (SEQ ID NO: 59) | CASSWMGGNEQFF (SEQ ID NO: 91) |
| HLA-A2 + Donor 3 clonotype16 | CALQLDNYGQNFVF (SEQ ID NO: 60) | CASTGHPGTGPYEQYF (SEQ ID NO: 92) |
| HLA-A2 + Donor 4 clonotype2 | CAASPPESGGYNKLIF (SEQ ID NO: 61) | CASSLGTDTQYF (SEQ ID NO: 93) |
| HLA-A2 + Donor 4 clonotype4 | CAVTLIQGAQKLVF (SEQ ID NO: 62) | CASSGWGSWTDTQYF (SEQ ID NO: 94) |
| HLA-A2 + Donor 4 clonotype6 | CALSGDYKLSF (SEQ ID NO: 63) | CASSSGGSAAYEQYF (SEQ ID NO: 95) |
| HLA-A2 + Donor 4 clonotype9 | CASDRSNDYKLSF (SEQ ID NO: 64) | CASSSAGGAHYEQYF (SEQ ID NO: 96) |
| HLA-A2 + Donor 4 clonotype8 | CILRDGRGSQGNLIF (SEQ ID NO: 65) | CASSLGVAAGELFF (SEQ ID NO: 97) |
| HLA-A2 + Donor 4 clonotype11 | CGADPQYGNKLVF (SEQ ID NO: 66) | CATTGGGYGYTF (SEQ ID NO: 98) |
| HLA-A2 + Donor 4 clonotype12 | CAASPYNNAGNMLTF (SEQ ID NO: 67) | CASSLTWGADTQYF (SEQ ID NO: 99) |
| HLA-A2 + Donor 4 clonotype40 | CAVMDSNYQLIW (SEQ ID NO: 68) | CASSESTGHQPQHF (SEQ ID NO: 100) |
| HLA-A2 + Donor 4 clonotype35 | CLVAQGNTGFQKLVF (SEQ ID NO: 69) | CASSPVGLRDNSPLHF (SEQ ID NO: 101) |
| HLA-A2 + Donor 4 clonotype34 | CAVSPITTDKLIF (SEQ ID NO: 70) | CASSPRGQGADTQYF (SEQ ID NO: 102) |
| HLA-A2 + Donor 5 clonotype4 | CATDTGRRALTF (SEQ ID NO: 71) | CASRGDRADQPQHF (SEQ ID NO: 103) |
| HLA-A2 + Donor 5 clonotype25 | CAERGGYNTDKLIF (SEQ ID NO: 72) | CSARELTADNEQFF (SEQ ID NO: 104) |
| HLA-A2 + Donor 5 clonotype72 | CASNAGGTSYGKLTF (SEQ ID NO: 73) | CASSLVAGQETQYF (SEQ ID NO: 105) |
| HLA-A2 + Donor 5 clonotype77 | CAASYSNARLMF (SEQ ID NO: 74) | CASSQEGEGAEAFF (SEQ ID NO: 106) |
| HLA-A2 + Donor 5 clonotype75 | CAYIDNDMRF (SEQ ID NO: 75) | CSARLFIYRVYNEQFF (SEQ ID NO: 107) |
| HLA-A2 + Donor 5 clonotype132 | CAVRAYGGSQGNLIF (SEQ ID NO: 76) | CSVPKQDLYYGYTF (SEQ ID NO: 108) |

TABLE 3-continued

Exemplary TCR Alpha and Beta Chain CDR3 Amino Acid Sequences

| | TCR alpha chain CDR3 | TCR beta chain CDR3 |
|---|---|---|
| HLA-A2 + Donor 5 clonotype102 | CAVTTGGFKTIF (SEQ ID NO: 77) | CASSLADHRGLAKNIQYF (SEQ ID NO: 109) |
| HLA-A2 + Donor 5 clonotype125 | CAESLRSNDYKLSF (SEQ ID NO: 78) | CASSQALRGEAFF (SEQ ID NO: 110) |
| HLA-A2 + Donor 5 clonotype158 | CAGPSSSNDYKLSF (SEQ ID NO: 79) | CASNPTGGSYEQYF (SEQ ID NO: 111) |
| HLA-A2 + Donor 5 clonotype168 | CAVPDRGSTLGRLYF (SEQ ID NO: 80) | CASSFLGNTEAFF (SEQ ID NO: 112) |

TABLE 4

Exemplary TCR Beta Chain CDR3 Amino Acid Sequences
TCR beta chain CDR3

| | | |
|---|---|---|
| CASTPGRTVNQPQHF (SEQ ID NO: 113) | CASSLATGGYEQYF (SEQ ID NO: 128) | CASREDMLIEAFF (SEQ ID NO: 143) |
| CATSSEGQATDTQYF (SEQ ID NO: 114) | CASSFYTGTGDYNEQFF (SEQ ID NO: 129) | CASTTPTDGSQNTEAFF (SEQ ID NO: 144) |
| CASSYTGFTEAFF (SEQ ID NO: 115) | CASSFLAGGRNEQFF (SEQ ID NO: 130) | CSASGTSGYNEQFF (SEQ ID NO: 145) |
| CASNAGTGALLAKNIQYF (SEQ ID NO: 116) | CAWSVTGRGQPQHF (SEQ ID NO: 131) | CASSFDSGANVLTF (SEQ ID NO: 146) |
| CATSDKSRDSADTQYF (SEQ ID NO: 117) | CAWSAPRDRGLSEKLFF (SEQ ID NO: 132) | CASSLVGARQPQHF (SEQ ID NO: 147) |
| CASSDGTGGTDTQYF (SEQ ID NO: 118) | CASSDRVLRCNEQFF (SEQ ID NO: 133) | CATSRGGANYGYTF (SEQ ID NO: 148) |
| CASSGQQGDNSPLHF (SEQ ID NO: 119) | CSASGLADYNEQFF (SEQ ID NO: 134) | CAWSIGIEAFF (SEQ ID NO: 149) |
| CASSDGQGESGELFF (SEQ ID NO: 120) | CASSVYGGNQPQHF (SEQ ID NO: 135) | CASGGTGNSNQPQHF (SEQ ID NO: 150) |
| CSARDGLEQPQHF (SEQ ID NO: 121) | CSARDRTGNGYTF (SEQ ID NO: 136) | CASSSMTGLYEQYF (SEQ ID NO: 151) |
| CAWTASSRGRAFF (SEQ ID NO: 122) | CASKGGTESYGYTF (SEQ ID NO: 137) | CASSWLAMAGDTGELFF (SEQ ID NO: 152) |
| CASSIRDRGQPQHF (SEQ ID NO: 123) | CATSRDPQETQYF (SEQ ID NO: 138) | CASSQEGQGFNQPQHF (SEQ ID NO: 153) |
| CASSGDSNQPQHF (SEQ ID NO: 124) | CASREGRGDYSPLHF (SEQ ID NO: 139) | CASSPERTYEQYF (SEQ ID NO: 154) |
| CASSQRRQGGLNEKLFF (SEQ ID NO: 125) | CASRSLRGDTEAFF (SEQ ID NO: 140) | CASSVDTQGAFF (SEQ ID NO: 155) |
| CASSSYRENTGELFF (SEQ ID NO: 126) | CASSQEDSSGANVLTF (SEQ ID NO: 141) | CASSGPWEQYF (SEQ ID NO: 156) |
| CSVERGYGDHGELFF (SEQ ID NO: 127) | CSARDPSSGDYNEQFF (SEQ ID NO: 142) | |

TABLE 5

BCMA-Specific Alpha-TCR Sequences

BCMA TCR ALPHA Repertoire

| | TRAV | TRAJ | CDR3 |
|---|---|---|---|
| 1 | TRAV24 | TRAJ39 | CAFENNAGNMLTF (SEQ ID NO: 221) |
| 2 | TRAV25 | TRAJ39 | CAGEGNAGNMLTF (SEQ ID: NO: 222) |
| 3 | TRAV12-1 | TRAJ6 | CVVNIGGSYIPTF (SEQ ID: NO: 223) |
| 4 | TRAV1-2 | TRAJ33 | CAVRDSNYQLIW (SEQ ID: NO: 224) |
| 5 | TRAV12-2 | TRAJ17 | CAVPKAAGNKLTF (SEQ ID: NO: 225) |
| 6 | TRAV26-1 | TRAJ53 | CIVRALGGSNYKLTF (SEQ ID: NO: 226) |
| 7 | TRAV2 | TRAJ9 | CAVGDTGGFKTIF (SEQ ID: NO: 227) |
| 8 | TRAV29DV5 | TRAJ52 | CAARYAGGTSYGKLTF (SEQ ID: NO: 228) |
| 11 | TRAV4 | TRAJ17 | CLVGERAAGNKLTF (SEQ ID: NO: 229) |
| 12 | TRAV5 | TRAJ45 | CAELGGGGADGLTF (SEQ ID: NO: 230) |
| 13 | TRAV13-1 | TRAJ31 | CAASSNNARLMF (SEQ ID: NO: 231) |
| 14 | TRAV38-2DV8 | TRAJ40 | CAYRSSTSGTYKYIF (SEQ ID: NO:232) |
| 15 | TRAV1-2 | TRAJ33 | CAVRDSNYQLIW (SEQ ID: NO: 224) |
| 16 | TRAV12-2 | TRAJ39 | CAVDNAGNMLTF (SEQ ID: NO: 233) |
| 17 | TRAV29DV5 | TRAJ20 | CAAIGNKLSF (SEQ ID: NO: 234) |
| 18 | TRAV38-1 | TRAJ30 | CAFGPMSRDDKIIF (SEQ ID: NO: 235) |
| 19 | TRAV12-2 | TRAJ29 | CAVVDSGNTPLVF (SEQ ID: NO: 236) |
| 20 | TRAV36DV7 | TRAJ42 | CAVGGGSQGNLIF (SEQ ID: NO: 237) |
| 21 | TRAV12-3 | TRAJ9 | CATLTGGFKTIF (SEQ ID: NO: 238) |
| 22 | TRAV26-1 | TRAJ35 | CIALIGFGNVLHC (SEQ ID: NO: 239) |
| 42 | TRAV29DV5 | TRAJ42 | CAAILRYGGSQGNLIF (SEQ ID: NO: 240) |
| 43 | TRAV20 | TRAJ42 | CAVGGSQGNLIF (SEQ ID: NO: 241) |
| 44 | TRAV12-2 | TRAJ10 | CAVTGGGNKLTF (SEQ ID: NO: 242) |
| 45 | TRAV12-2 | TRAJ22 | CAVVSSGSARQLTF (SEQ ID: NO: 243) |
| 46 | TRAV14DV4 | TRAJ38 | CAMSDNNAGNNRKLIW (SEQ ID: NO: 244) |
| 47 | TRAV17 | TRAJ52 | CATLTSYGKLTF (SEQ ID: NO: 245) |
| 48 | TRAV12-2 | TRAJ10 | CALKGLTGGGNKLTF (SEQ ID: NO: 246) |
| 49 | TRAV12-2 | TRAJ3 | CAVYSSASKIIF (SEQ ID: NO: 247) |
| 50 | TRAV26-2 | TRAJ48 | CILRDDFGNEKLTF (SEQ ID: NO: 248) |
| 51 | TRAV13-2 | TRAJ37 | CAEIHINTGKLIF (SEQ ID: NO: 249) |
| 52 | TRAV12-2 | TRAJ48 | CAVNFGNEKLTF (SEQ ID: NO: 250) |
| 53 | TRAV29DV5 | TRAJ39 | CAASSPGTGNMLTF (SEQ ID: NO: 251) |
| 54 | TRAV12-2 | TRAJ10 | CALKGLTGGGNKLTF (SEQ ID: NO: 246) |
| 55 | TRAV1-2 | TRAJ33 | CAVLDSNYQLIW (SEQ ID: NO: 252) |
| 56 | TRAV14DV4 | TRAJ12 | CAMRVTMDSSYKLIF (SEQ ID: NO: 253) |
| 57 | TRAV13-2 | TRAJ45 | CAENNSGGGADGLTF (SEQ ID: NO: 254) |
| 58 | TRAV13-1 | TRAJ45 | CAASESGGGADGLTF (SEQ ID: NO: 255) |

TABLE 5-continued

BCMA-Specific Alpha-TCR Sequences

BCMA TCR ALPHA Repertoire

| | TRAV | TRAJ | CDR3 |
|---|---|---|---|
| 59 | TRAV19 | TRAJ22 | CALSVPWISSGSARQLTF (SEQ ID: NO: 256) |
| 60 | TRAV21 | TRAJ13 | CAVISGGYQKVTF (SEQ ID: NO: 257) |
| 61 | TRAV26-1 | TRAJ33 | CIVRAWDSNYQLIW (SEQ ID: NO: 258) |
| 62 | TRAV13-1 | TRAJ4 | CAASPGGYNKLIF (SEQ ID: NO: 259) |
| 63 | TRAV12-1 | TRAJ34 | CVVRRDNTDKLIF (SEQ ID: NO: 260) |
| 64 | TRAV12-2 | TRAJ44 | CAAATGTASKLTF (SEQ ID: NO: 261) |
| 65 | TRAV14DV4 | TRAJ30 | CAMRGAMNRDDKIIF (SEQ ID: NO: 262) |
| 74 | TRAV13-1 | TRAJ17 | CAAQIAAGNKLTF (SEQ ID: NO: 263) |
| 75 | TRAV8-3 | TRAJ36 | CAVGAPQTGANNLFF (SEQ ID: NO: 264) |
| 76 | TRAV12-1 | TRAJ45 | CVVGADGLTF (SEQ ID: NO: 265) |
| 77 | TRAV4 | TRAJ39 | CLVGDLVGGNMLTF (SEQ ID: NO: 266) |
| 78 | TRAV38-1 | TRAJ36 | CAFIFANNLFF (SEQ ID: NO: 267) |
| 79 | TRAV39 | TRAJ45 | CAVTGGGADGLTF (SEQ ID: NO: 268) |
| 80 | TRAV17 | TRAJ17 | CATVNIKAAGNKLTF (SEQ ID: NO: 269) |
| 81 | TRAV12-2 | TRAJ9 | CAVDHTGGFKTIF (SEQ ID: NO: 270) |
| 82 | TRAV12-1 | TRAJ6 | CVVSGSYIPTF (SEQ ID: NO: 271) |
| 83 | TRAV19 | TRAJ39 | CALSDVYAGNMLTF (SEQ ID: NO: 272) |
| 84 | TRAV38-2DV8 | TRAJ58 | CAQIVRETSGSRLTF (SEQ ID: NO: 273) |
| 85 | TRAV23DV6 | TRAJ48 | CAASKDFGNEKLTF (SEQ ID: NO: 274) |
| 86 | TRAV5 | TRAJ5 | CAETFTGRRALTF (SEQ ID: NO: 275) |
| 87 | TRAV21 | TRAJ53 | CAAGGSNYKLTF (SEQ ID: NO: 276) |
| 88 | TRAV12-2 | TRAJ9 | CAGTGGFKTIF (SEQ ID: NO: 277) |
| 89 | TRAV14DV4 | TRAJ28 | CAMRDLGAGSYQLTF (SEQ ID: NO: 278) |
| 90 | TRAV12-3 | TRAJ13 | CALVSGGYQKVTF (SEQ ID: NO: 279) |
| 91 | TRAV12-1 | TRAJ20 | CVVSNDYKLSF (SEQ ID: NO: 280) |
| 92 | TRAV12-2 | TRAJ37 | CAVTAYGSSNTGKLIF (SEQ ID: NO: 281) |
| 93 | TRAV21 | TRAJ52 | CAVIGGGTSYGKLTF (SEQ ID: NO: 282) |
| 94 | TRAV19 | TRAJ39 | CALSDVYAGNMLTF (SEQ ID: NO: 272) |
| 95 | TRAV23DV6 | TRAJ33 | CAARGSSYQLIW (SEQ ID: NO: 283) |
| 96 | TRAV12-3 | TRAJ50 | CAMSAATSYDKVIF (SEQ ID: NO: 284) |
| 97 | TRAV26-1 | TRAJ39 | CIVNNAGNMLTF (SEQ ID: NO: 285) |
| 98 | TRAV12-3 | TRAJ53 | CATRLVRGGSNYKLTF (SEQ ID: NO: 286) |
| 99 | TRAV13-1 | TRAJ23 | CAASRVYNQGGKLIF (SEQ ID: NO :287) |
| 100 | TRAV12-2 | TRAJ15 | CAVKRAGTALIF (SEQ ID: NO: 288) |
| 101 | TRAV25 | TRAJ20 | CAGLGDYKLSF (SEQ ID: NO: 289) |

TABLE 6

BCMA-Specific Beta-TCR Sequences

BCMA TCR BETA Repertoire

|    | TRBV         | TRBJ   | CDR3                              |
|----|--------------|--------|-----------------------------------|
| 1  | TRBV2        | TRBJ1-5| CASSSRQSGNQPQHF (SEQ ID: NO: 290) |
| 2  | TRBV4-1      | TRBJ1-1| CASSQGERTYGAEAFF (SEQ ID: NO: 291)|
| 3  | TRBV12-3/4   | TRBJ2-7| CASSPHTGNEQYF (SEQ ID: NO: 292)   |
| 4  | TRBV6-2/3/5/6| TRBJ2-6| CASSYTSYGANVLTF (SEQ ID: NO: 293) |
| 5  | TRBV12-3/4   | TRBJ1-1| CASSLQGNTEAFF (SEQ ID: NO: 294)   |
| 6  | TRBV14       | TRBJ1-5| CASSQEGRFTQPQHF (SEQ ID: NO: 295) |
| 7  | TRBV12-3/4   | TRBJ1-1| CAREWDRGVGTEAFF (SEQ ID: NO: 296) |
| 8  | TRBV7-9      | TRBJ2-2| CASSFDQGVGELFF (SEQ ID: NO: 297)  |
| 9  | TRBV4-2      | TRBJ2-1| CASSQELVVNEQFF (SEQ ID: NO: 298)  |
| 10 | TRBV4-2      | TRBJ2-7| CASSQDLQGAREQYF (SEQ ID: NO: 299) |
| 11 | TRBV7-9      | TRBJ2-5| CASSPGADLETQYF (SEQ ID: NO: 300)  |
| 12 | TRBV12-3/4   | TRBJ1-1| CASTKQGGTEAFF (SEQ ID: NO: 301)   |
| 13 | TRBV2        | TRBJ2-3| CASSSSGTSGTDTQYF (SEQ ID: NO: 302)|
| 14 | TRBV6-2/3/5/6| TRBJ2-7| CASSYRGRPPYEQYF (SEQ ID: NO: 303) |
| 15 | TRBV13       | TRBJ2-1| CASSFESGGSYNEQFF (SEQ ID: NO: 304)|
| 16 | TRBV4-2      | TRBJ1-1| CASSQDAGFAFF (SEQ ID: NO: 305)    |
| 17 | TRBV10-3     | TRBJ2-7| CAISETEQGTSYEQYF (SEQ ID: NO: 306)|
| 18 | TRBV28       | TRBJ2-5| CASGAGVQETQYF (SEQ ID: NO: 307)   |
| 19 | TRBV28       | TRBJ2-3| CASSRPFRDREGTDTQYF (SEQ ID: NO: 308)|
| 20 | TRBV7-9      | TRBJ1-2| CASSPGADLTFFTF (SEQ ID: NO: 309)  |
| 21 | TRBV12-3/4   | TRBJ1-2| CASSLAVRDTYGYTF (SEQ ID: NO: 310) |
| 22 | TRBV12-5     | TRBJ1-5| CASGYQGEMHQPQHF (SEQ ID: NO: 311) |
| 23 | TRBV19       | TRBJ2-1| CASSITLAGGRNEQFF (SEQ ID: NO: 312)|
| 24 | TRBV7-2      | TRBJ2-7| CASSLTSGGTIYEQYF (SEQ ID: NO: 313)|
| 26 | TRBV5-6      | TRBJ1-5| CASSLWGPQPQHF (SEQ ID: NO: 314)   |
| 27 | TRBV7-2      | TRBJ2-1| CASSLARDRGEGEQFF (SEQ ID: NO: 315)|
| 28 | TRBV4-3      | TRBJ2-5| CASSQERGGQETQYF (SEQ ID: NO: 316) |
| 29 | TRBV12-3/4   | TRBJ2-7| CASSSSPQQYF (SEQ ID: NO: 317)     |
| 30 | TRBV7-9      | TRBJ2-1| CASSQPDRGYNEQFF (SEQ ID: NO: 318) |
| 31 | TRBV13       | TRBJ2-1| CASSLGLLEGGRYNEQFF (SEQ ID: NO: 319)|
| 32 | TRBV12-3/4   | TRBJ2-7| CASVTGSYEQYF (SEQ ID: NO: 320)    |
| 33 | TRBV6-2/3/5/6| TRBJ1-4| CASSYTAPGGLNEKLFF (SEQ ID: NO: 321)|
| 34 | TRBV7-2      | TRBJ2-1| CASSPRASNEQFF (SEQ ID: NO: 322)   |
| 35 | TRBV27       | TRBJ2-1| CASSFSTRGAYNEQFF (SEQ ID: NO: 323)|
| 36 | TRBV4-1      | TRBJ1-5| CASSLHLSRGFNQPQHF (SEQ ID: NO: 324)|
| 37 | TRBV13       | TRBJ1-3| CASSFGTVSGNTIYF (SEQ ID: NO: 325) |
| 38 | TRBV6-2/3/5/6| TRBJ1-1| CASSKILRDVDIVTEAFF (SEQ ID: NO: 326)|

TABLE 6-continued

BCMA-Specific Beta-TCR Sequences

BCMA TCR BETA Repertoire

| | TRBV | TRBJ | CDR3 |
|---|---|---|---|
| 39 | TRBV19 | TRBJ2-1 | CASSIGSLNEQFF (SEQ ID: NO: 327) |
| 40 | TRBV27 | TRBJ2-1 | CASTSLGREVGFYNEQFF (SEQ ID: NO: 328) |
| 41 | TRBV12-3/4 | TRBJ2-7 | CASSNDRSSYEQYF (SEQ ID: NO: 329) |
| 42 | TRBV7-9 | TRBJ1-5 | CASSLGDRPVGQPQHF (SEQ ID: NO: 330) |
| 43 | TRBV28 | TRBJ2-7 | CASSPPGLQTGVSYEQYF (SEQ ID: NO: 331) |
| 44 | TRBV29-1 | TRBJ2-5 | CSVAPGVVTQYF (SEQ ID: NO: 332) |
| 45 | TRBV28 | TRBJ2-1 | CASSPPSGGNNEQFF (SEQ ID: NO: 333) |
| 46 | TRBV6-1 | TRBJ1-2 | CASKGGTESYGYTF (SEQ ID NO: 137) |
| 47 | TRBV29-1 | TRBJ2-2 | CSVERGYGDHGELFF (SEQ ID NO: 127) |
| 48 | TRBV3-1 | TRBJ1-6 | CASSLGVIPLHF (SEQ ID: NO :334) |
| 49 | TRBV2 | TRBJ2-7 | CASSERGFEQYF (SEQ ID: NO: 335) |
| 50 | TRBV12-3/4 | TRBJ1-5 | CASRKRVDQPQHF (SEQ ID: NO: 336) |
| 51 | TRBV6-1 | TRBJ1-2 | CASSETRNYGYTF (SEQ ID: NO: 337) |
| 52 | TRBV27 | TRBJ1-5 | CASSPIYPQPQHF (SEQ ID: NO: 338) |
| 53 | TRBV11-2 | TRBJ2-3 | CASSLLNQGTDTQYF (SEQ ID: NO: 339) |
| 54 | TRBV7-9 | TRBJ1-5 | CASSGDSNQPQHF (SEQ ID NO:124) |
| 55 | TRBV11-3 | TRBJ2-2 | CASSSYRENTGELFF (SEQ ID NO: 126) |
| 56 | TRBV28 | TRBJ2-1 | CASSLTPRGGVGEQFF (SEQ ID: NO: 340) |
| 57 | TRBV20-1 | TRBJ1-5 | CSARDLGGNQPQHF (SEQ ID: NO: 341) |
| 58 | TRBV2 | TRBJ2-1 | CASRAGAGLEQFF (SEQ ID: NO: 342) |
| 59 | TRBV7-9 | TRBJ2-1 | CASSFLAGGRNEQFF (SEQ ID NO: 130) |
| 60 | TRBV12-3/4 | TRBJ2-1 | CASRLGGEQFF (SEQ ID: NO: 343) |
| 61 | TRBV28 | TRBJ1-2 | CASRETGERGYTF (SEQ ID: NO: 344) |
| 62 | TRBV3-1 | TRBJ2-7 | CASSLGLAVSYEQYF (SEQ ID: NO: 345) |
| 63 | TRBV29-1 | TRBJ1-1 | CSVEEAGGTEAFF (SEQ ID: NO: 346) |
| 64 | TRBV4-3 | TRBJ1-1 | CASSQGWTATGEAFF (SEQ ID: NO: 347) |
| 65 | TRBV6-2/3/5/6 | TRBJ1-1 | CASNPGQGPEAFF (SEQ ID: NO: 348) |
| 66 | TRBV5-4 | TRBJ2-5 | CASSRGTSGGLLQETQYF (SEQ ID: NO: 349) |
| 67 | TRBV20-1 | TRBJ1-5 | CSARDWQSNQPQHF (SEQ ID: NO: 350) |
| 68 | TRBV27 | TRBJ2-1 | CASSFYTGTGDYNEQFF (SEQ ID NO: 129) |
| 69 | TRBV29-1 | TRBJ2-1 | CSVEGVQGDYNEQFF (SEQ ID: NO: 351) |
| 70 | TRBV28 | TRBJ2-3 | CASSLGLRGTDTQYF (SEQ ID: NO: 352) |
| 71 | TRBV6-2/3/5/6 | TRBJ1-1 | CASSGTYENTEAFF (SEQ ID: NO: 353) |
| 72 | TRBV13 | TRBJ2-5 | CASSQAGETQYF (SEQ ID: NO: 354) |
| 73 | TRBV20-1 | TRBJ2-2 | CSARVAGHLRTGELFF (SEQ ID: NO: 355) |
| 74 | TRBV28 | TRBJ2-7 | CATTEQGVYEQYF (SEQ ID: NO: 356) |
| 75 | TRBV29-1 | TRBJ2-7 | CSVDEGTSYEQYF (SEQ ID: NO: 357) |

TABLE 6-continued

BCMA-Specific Beta-TCR Sequences

BCMA TCR BETA Repertoire

| | TRBV | TRBJ | CDR3 |
|---|---|---|---|
| 76 | TRBV7-3 | TRBJ2-1 | CASSLGLVGGYSSYNEQFF (SEQ ID: NO: 358) |
| 77 | TRBV7-9 | TRBJ2-7 | CASSPDGAFGEQYF (SEQ ID: NO: 359) |
| 78 | TRBV6-2/3/5/6 | TRBJ2-7 | CASSYVAPPYEQYF (SEQ ID: NO: 360) |
| 79 | TRBV28 | TRBJ2-5 | CASGKLAGGEGYQETQYF (SEQ ID: NO: 361) |
| 80 | TRBV12-3/4 | TRBJ2-7 | CASSLLLAGDYEQYF (SEQ ID: NO: 362) |
| 81 | TRBV20-1 | TRBJ2-3 | CSVASSTDTQYF (SEQ ID: NO: 363) |
| 82 | TRBV28 | TRBJ2-7 | CASSPLGGSFYEQYF (SEQ ID: NO: 364) |
| 83 | TRBV28 | TRBJ2-3 | CASLGSEASTDTQYF (SEQ ID: NO: 365) |
| 84 | TRBV20-1 | TRBJ2-2 | CSARALLRGTGELFF (SEQ ID: NO: 366) |
| 85 | TRBV12-3/4 | TRBJ1-1 | CAAPGATEAFF (SEQ ID: NO: 367) |
| 86 | TRBV11-2 | TRBJ2-1 | CASSLSGEQFF (SEQ ID: NO: 368) |
| 87 | TRBV4-3 | TRBJ2-1 | CASSQESDEQFF (SEQ ID: NO: 369) |
| 88 | TRBV12-3/4 | TRBJ2-7 | CASTSSVYEQYF (SEQ ID: NO: 370) |
| 89 | TRBV20-1 | TRBJ1-4 | CSARDVTKTGNEKLFF (SEQ ID: NO: 371) |
| 90 | TRBV9 | TRBJ1-1 | CASSVEGAGVAFF (SEQ ID: NO: 372) |
| 91 | TRBV28 | TRBJ1-1 | CASSFSWDEAFF (SEQ ID: NO: 373) |
| 92 | TRBV12-3/4 | TRBJ2-3 | CASSSWGQPDTQYF (SEQ ID: NO: 374) |
| 93 | TRBV12-3/4 | TRBJ1-1 | CASSLGNDTEAFF (SEQ ID: NO: 375) |
| 94 | TRBV6-2/3/5/6 | TRBJ2-1 | CASSPMNNEQFF (SEQ ID: NO: 376) |
| 95 | TRBV5-6 | TRBJ2-5 | CASSWTDQETQYF (SEQ ID: NO: 377) |
| 96 | TRBV27 | TRBJ1-5 | CASSLGGIQPQHF (SEQ ID: NO: 378) |
| 97 | TRBV7-9 | TRBJ2-1 | CASSRLAGVYNEQFF (SEQ ID: NO: 379) |
| 98 | TRBV20-1 | TRBJ2-4 | CSLWSGTENIQYF (SEQ ID: NO: 380) |
| 99 | TRBV10-3 | TRBJ2-2 | CAIGTGEGNTGELFF (SEQ ID: NO: 381) |
| 100 | TRBV28 | TRBJ2-7 | CASSWVPGTRSYEQYF (SEQ ID: NO: 382) |
| 101 | TRBV29-1 | TRBJ1-1 | CSVASMNTEAFF (SEQ ID: NO: 383) |
| 102 | TRBV28 | TRBJ2-1 | CASSVAGGSYNEQFF (SEQ ID: NO: 384) |
| 103 | TRBV4-2 | TRBJ2-7 | CASSPGQGTYEQYF (SEQ ID: NO: 385) |
| 104 | TRBV4-3 | TRBJ2-1 | CASSHLPHEQFF (SEQ ID: NO: 386) |
| 105 | TRBV7-7 | TRBJ2-2 | CASSLDINTGELFF (SEQ ID: NO: 387) |
| 106 | TRBV7-9 | TRBJ2-7 | CASSPDGAFGEQYF (SEQ ID: NO: 359) |
| 107 | TRBV6-2/3/5/6 | TRBJ2-1 | CASIKGLAGGRQFF (SEQ ID: NO: 388) |
| 108 | TRBV20-1 | TRBJ2-7 | CSASGDSAEQYF (SEQ ID: NO: 389) |
| 109 | TRBV6-2/3/5/6 | TRBJ1-5 | CASRVGTAYSNQPQHF (SEQ ID: NO: 390) |
| 110 | TRBV13 | TRBJ2-3 | CASSRWGGNSTDTQYF (SEQ ID: NO: 391) |
| 111 | TRBV6-2/3/5/6 | TRBJ2-7 | CASSYVAPPYEQYF (SEQ ID: NO: 360) |
| 112 | TRBV7-8 | TRBJ2-3 | CASSQHTDTQYF (SEQ ID: NO: 392) |

TABLE 6-continued

BCMA-Specific Beta-TCR Sequences

BCMA TCR BETA Repertoire

| | TRBV | TRBJ | CDR3 |
|---|---|---|---|
| 113 | TRBV7-8 | TRBJ2-1 | CASSLELAGGPSFF (SEQ ID: NO: 393) |
| 114 | TRBV13 | TRBJ2-1 | CASSSQDASYYNEQFF (SEQ ID: NO: 394) |

In certain embodiments, a TCR described herein may comprise: (i) one, two, or all three of the CDRs of a TCR alpha chain sequence set forth in Table 1 (i.e., any one of SEQ ID NOs: 27-34), and (ii) one, two, or all three of the CDRs of a TCR beta chain sequence set forth in Table 2 (i.e., any one of SEQ ID NOs: 19-26). For example, in certain embodiments, a TCR described herein may comprise CDRs 1, 2, and 3 of a TCR alpha chain sequence set forth in Table 1 and CDRs 1, 2, and 3 of a TCR beta chain sequence set forth in Table 2. In another example, a TCR described herein may comprise CDRs 1 and 2 of a TCR alpha chain set forth in Table 1 and CDRs 1 and 2 of a TCR beta chain sequence set forth in Table 2. In another example, a TCR described herein may comprise CDR3 of a TCR alpha chain set forth in Table 1 and CDR3 of a TCR beta chain sequence set forth in Table 2. In yet another example, a TCR described herein may comprise: (i) a TCR alpha chain comprising a TCR alpha chain CDR3 set forth in Table 3, and (ii) a TCR beta chain comprising a TCR beta chain CDR3 set forth in Table 3 (e.g., the TCR alpha chain CDR3 and the TCR beta chain CDR3 from a single clonotype, e.g., SEQ ID NOs: 49 and 81, respectively). In certain embodiments, the TCR may comprise: (i) a TCR alpha chain comprising 1, 2, or all three of the CDRs of an amino acid sequence set forth in Table 1, except that each CDR differs by 0, 1 or 2 amino acids as compared to the CDRs of the amino acid sequence of Table 1, and (ii) a TCR beta chain comprising 1, 2, or all three of the CDRs of an amino acid sequence set forth in Table 2, except that each CDR differs by 0, 1 or 2 amino acids as compared to the CDRs of the amino acid sequence of Table 2. In certain embodiments, the TCR may comprise: (i) a TCR alpha chain comprising a TCR alpha chain CDR3 set forth in Table 3, except that the CDR3 differs by 1 or 2 amino acids as compared to the CDR3 of Table 3, and (b) a TCR beta chain comprising a TCR beta chain CDR3 set forth in Table 3, except that the CDR3 differs by 1 or 2 amino acids as compared to the CDR3 of Table 3 (e.g., the TCR alpha chain CDR3 and the TCR beta chain CDR3 from a single clonotype, e.g., SEQ ID NOs: 49 and 81, respectively). These TCRs bind MHC or HLA complexed with a BCMA peptide (e.g., SEQ ID NO:37).

It has been identified through single-cell sequencing that alpha- and beta TCR chains uniquely pair in healthy CD4+ and CD8+ repertoires. See Carter et al., Front Immunol. 2019; 10: 1516, which is incorporated by reference in its entirety.

In yet another example, a TCR described herein may comprise: (i) a TCR alpha chain comprising a TCR alpha chain CDR3 set forth in Table 5, and (ii) a TCR beta chain comprising a TCR beta chain CDR3 set forth in Table 6. In certain embodiments, the TCR may comprise: (i) a TCR alpha chain comprising a TCR alpha chain CDR3 set forth in Table 5, except that the CDR3 differs by 1 or 2 amino acids as compared to the CDR3 of Table 5, and (b) a TCR beta chain comprising a TCR beta chain CDR3 set forth in Table 6, except that the CDR3 differs by 1 or 2 amino acids as compared to the CDR3 of Table 6 (e.g., the TCR alpha chain CDR3 and the TCR beta chain CDR3 from a single clonotype, e.g., SEQ ID NOs: 221 and 290, respectively). Table 5 provides a list of TCR alpha chain sequences (TRAV, TRAJ, alpha-chain CDR3) and TCR beta chain sequences (TRBV, TRBJ, beta-chain CDR3), respectively. In certain embodiments, the TCR may comprise any one of the TRAV, TRAJ, and alpha chain CDR3 sequences listed in Table 5 and any of the TRBV, TRBJ, and beta-chain CDR3 listed in Table 6. These TCRs bind MHC or HLA complexed with a BCMA peptide (e.g., SEQ ID NO:37).

In another example, a TCR described herein may comprise CDRs 1 and 2 of a TCR alpha chain set forth in Table 1; a CDR3 of a TCR alpha chain set forth in Table 5; CDRs 1 and 2 of a TCR beta chain set forth in Table 1; and a CDR3 of a TCR beta chain set forth in Table 6, In another example, a TCR described herein may comprise CDRs 1 and 2 of a TCR alpha chain set forth in Table 1; a CDR3 of a TCR alpha chain set forth in Table 5; a TRAV set forth in Table 5; a TRAJ set forth in Table 5; CDRs 1 and 2 of a TCR beta chain set forth in Table 1; a CDR3 of a TCR beta chain set forth in Table 6; a TRBV set forth in Table 6; and a TRBJ set forth in Table 6. These TCRs bind MHC or HLA complexed with a BCMA peptide (e.g., SEQ ID NO:37).

In another example, a TCR described herein may comprise CDRs 1 and 2 of a TCR alpha chain set forth in Table 1; a CDR3 of a TCR alpha chain set forth in Table 5 except that the CDR3 of a TCR alpha chain differs by 1 or 2 amino acids as compared to a CDR3 of Table 5; CDRs 1 and 2 of a TCR beta chain set forth in Table 1; and a CDR3 of a TCR beta chain set forth in Table 6 except that the CDR3 of a TCR beta chain set differs by 1 or 2 amino acids as compared to the CDR3 of Table 6. These TCRs bind MHC or HLA complexed with a BCMA peptide (e.g., SEQ ID NO:37).

In another example, a TCR described herein may comprise CDRs 1 and 2 of a TCR alpha chain set forth in Table 1; a CDR3 of a TCR alpha chain set forth in Table 5 except that the CDR3 of a TCR alpha chain differs by 1 or 2 amino acids as compared to a CDR3 of Table 5; a TRAV set forth in Table 5; a TRAJ set forth in Table 5; CDRs 1 and 2 of a TCR beta chain set forth in Table 1; a CDR3 of a TCR beta chain set forth in Table 6 except that the CDR3 of a TCR beta chain differs by 1 or 2 amino acids as compared to a CDR3 of Table 6; a TRBV set forth in Table 6; and a TRBJ set forth in Table 6. These TCRs bind MHC or HLA complexed with a BCMA peptide (e.g., SEQ ID NO:37).

In some embodiments, a TCR described herein may comprise: (i) the TCR alpha chain variable domain of an amino acid sequence set forth in Table 1 (i.e., any one of SEQ ID NOs: 27-34), except that it differs by 1 to 10 (i.e., 1, 2, 3, 4, 5, 6, 7, 8, 9, 10) amino acids, and (ii) the TCR beta chain variable domain of an amino acid sequence set forth in Table 2 (i.e., any one of SEQ ID NOs: 19-26), except that it differs by 1 to 10 (i.e., 1, 2, 3, 4, 5, 6, 7, 8, 9, 10) amino acids. In some embodiments, a TCR described herein may comprise: (i) the TCR alpha chain variable domain of an amino acid sequence set forth in Table 1 (i.e., any one of SEQ ID NOs: 27-34), and (ii) the TCR beta chain variable domain of an amino acid sequence set forth in Table 2 (i.e., any one of SEQ ID NOs:19-26). These TCRs bind MHC or HLA complexed with a BCMA peptide (e.g., SEQ ID NO:37).

In some embodiments, a TCR described herein comprises: (i) a TCR alpha chain comprising or consisting of an amino acid sequence set forth in Table 1 (i.e., any one of SEQ ID NOs: 27-34), or differs by 1 to 50 amino acids, by 1 to 40 amino acids, by 1 to 30 amino acids, by 1 to 20 amino acids, by 1 to 10 amino acids, or by 1 to 5 amino acids, and (ii) a TCR beta chain comprising or consisting of an amino acid sequence set forth in Table 2 (i.e., any one of SEQ ID NOs: 19-26), or differs by 1 to 50 amino acids, by 1 to 40 amino acids, by 1 to 30 amino acids, by 1 to 20 amino acids, by 1 to 10 amino acids, or by 1 to 5 amino acids. In certain embodiments, the TCR comprises: (i) a TCR alpha chain comprising an amino acid sequence set forth in Table 1 (i.e., any one of SEQ ID NOs: 27-34), differing by 1 to 10 (i.e., 1, 2, 3, 4, 5, 6, 7, 8, 9, or 10) amino acids, and (ii) a TCR beta chain comprising an amino acid sequence set forth in Table 2 (i.e., any one of SEQ ID NOs:19-26), differing by 1 to 10 (i.e., 1, 2, 3, 4, 5, 6, 7, 8, 9, or 10) amino acids. In some embodiments, the TCR comprises: (i) a TCR alpha chain consisting of an amino acid sequence set forth in Table 1, and (ii) a TCR beta chain consisting of an amino acid sequence set forth in Table 2. In certain embodiments, the TCR comprises: (i) an alpha chain comprising or consisting of the amino acid sequence of SEQ ID NO:27, and (ii) a beta chain comprising or consisting of the amino acid sequence of SEQ ID NO: 19. In certain embodiments, the TCR comprises: (i) an alpha chain comprising or consisting of the amino acid sequence of SEQ ID NO:28, and (ii) a beta chain comprising or consisting of the amino acid sequence of SEQ ID NO: 20. In certain embodiments, the TCR comprises: (i) an alpha chain comprising or consisting of the amino acid sequence of SEQ ID NO:29, and (ii) a beta chain comprising or consisting of the amino acid sequence of SEQ ID NO: 21. In certain embodiments, the TCR comprises: (i) an alpha chain comprising or consisting of the amino acid sequence of SEQ ID NO:30, and (ii) a beta chain comprising or consisting of the amino acid sequence of SEQ ID NO: 22. In certain embodiments, the TCR comprises: (i) an alpha chain comprising or consisting of the amino acid sequence of SEQ ID NO:31, and (ii) a beta chain comprising or consisting of the amino acid sequence of SEQ ID NO: 23. In certain embodiments, the TCR comprises: (i) an alpha chain comprising or consisting of the amino acid sequence of SEQ ID NO:32, and (ii) a beta chain comprising or consisting of the amino acid sequence of SEQ ID NO: 24. In certain embodiments, the TCR comprises: (i) an alpha chain comprising or consisting of the amino acid sequence of SEQ ID NO:33, and (ii) a beta chain comprising or consisting of the amino acid sequence of SEQ ID NO: 25. In certain embodiments, the TCR comprises: (i) an alpha chain comprising or consisting of the amino acid sequence of SEQ ID NO:34, and (ii) a beta chain comprising or consisting of the amino acid sequence of SEQ ID NO: 26. These TCRs bind MHC or HLA complexed with a BCMA peptide (e.g., SEQ ID NO:37).

The disclosure further provides variants of the TCRs or portions thereof (e.g., the TCR alpha chains (e.g., SEQ ID NOs:27-34) and the TCR beta chains (e.g., SEQ ID NOs: 19-26) as described herein. Variants of the TCRs described herein can include forms of the peptides having not more than ten, not more than nine, not more than eight, not more than seven, not more than six, not more than five, not more than four, not more than three, not more than two, not more than one amino acid substitutions (e.g., 10, 9, 8, 7, 6, 5, 4, 3, 2, or 1 amino acid substitutions). In some embodiments, variants of the TCRs described herein can include forms of the TCRs having at least one, at least two, at least three, or at least four substitutions. These variants of the TCRs or portions thereof bind MHC or HLA complexed with a BCMA peptide (e.g., SEQ ID NO:37).

In some embodiments, amino acids in the constant region of the TCR alpha and/or beta chain do not directly interact the TCR's antigen, and thus can be substituted without affecting the antigen-TCR interaction. Thus, the BCMA-specific T cell response can still be maintained with substitutions in the constant region(s) of the TCR alpha and/or beta chains (i.e., the constant regions of SEQ ID NOs: 27-34 and 19-26, respectively).

In some embodiments, amino acids in the framework regions (i.e., the variable domain sequences between the CDRs) do not directly interact with the TCR's antigen, and thus can be substituted without affecting the antigen-TCR interaction. Thus, the BCMA-specific T cell response can still be maintained with substitutions in one or more framework region(s) of the TCR alpha and/or beta chains (i.e., one or more framework region(s) of SEQ ID NOs:27-34 and 19-26, respectively).

The substitutions can be any type of amino acid substitution, e.g., conservative or non-conservative. Conservative substitutions include substitutions within the following groups: (1) valine, alanine and glycine; leucine, valine, and isoleucine; (2) aspartic acid and glutamic acid; (3) asparagine and glutamine; (4) serine, cysteine, and threonine; lysine and arginine; and (5) phenylalanine and tyrosine. The non-polar hydrophobic amino acids include alanine, leucine, isoleucine, valine, proline, phenylalanine, tryptophan and methionine. The polar neutral amino acids include glycine, serine, threonine, cysteine, tyrosine, asparagine and glutamine. The positively charged (basic) amino acids include arginine, lysine, and histidine. The negatively charged (acidic) amino acids include aspartic acid and glutamic acid. Any substitution of one member of the above-mentioned polar, basic or acidic groups by another member of the same group can be deemed a conservative substitution. By contrast, a non-conservative substitution is a substitution of one amino acid for another with dissimilar characteristics, e.g., substituting an amino acid with another amino acid within another group.

In some embodiments, one or more (e.g., one, two, three, four, five, six, seven, or eight) positions of a TCR alpha chain CDR3 are not substituted. In some embodiments, one or more (e.g., one, two, three, four, five, six, seven, or eight) positions of a TCR alpha chain CDR3 are identical to a CDR3 sequence of a TCR alpha chain selected from SEQ ID NOs: 27-34. In some embodiments, one or more (e.g., one, two, three, four, five, six, seven, or eight) positions of a TCR beta chain CDR3 are not substituted. In some embodiments, one or more (e.g., one, two, three, four, five, six, seven, or eight) positions of a TCR beta chain CDR3 are identical to a CDR3 sequence of a TCR beta chain selected from SEQ ID NOs: 19-26.

The disclosure further provides an amino acid sequence or a nucleotide sequence comprising, consisting of, or consisting essentially of, a sequence that is at least 90% (e.g., 91%, 92%, 93%, 94%, 95%, 96%, 97%, 98%, 99%) identical to any sequence as described in this disclosure, e.g., SEQ ID NOs: 19-34, and a nucleotide sequence encoding SEQ ID NOs: 19-34 (e.g., SEQ ID NOs: 1-16). To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is at least 80% of the length of the reference sequence, and in some embodiments is at least 90%, 95%, or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences. For purposes of the present disclosure, the comparison of sequences and determination of percent identity between two sequences can be accomplished using a Blossum 62 scoring matrix with a gap penalty of 12, a gap extend penalty of 4, and a frameshift gap penalty of 5.

Also provided herein are TCRs or portions thereof (e.g., a TCR alpha chain or a TCR beta chain) comprising or consisting of a first amino acid sequence; and a second amino acid sequence that is heterologous to the first amino acid sequence. An amino acid sequence that is "heterologous" to a first amino acid sequence, or the term "heterologous amino acid sequence," is an amino acid sequence flanking the first amino acid sequence, wherein the flanking sequence does not occur in nature (e.g., the flanking sequence is not linked to the first amino acid sequence in nature). The first amino acid sequence can comprise, consist essentially of, or consist of any sequence as described herein, e.g., SEQ ID NOs: 19-34, or any sequence derived from SEQ ID NOs: 19-34 (e.g., a sequence with no more than ten substitutions of SEQ ID NOs: 19-34). The peptide with heterologous flanking amino acid sequence generally do not (and are selected such that do not) adversely affect the generation in the cell of a functional BCMA-specific TCR (e.g., a TCR capable of binding BCMA).

A heterologous flanking sequence can be, for example, a sequence used for purification of the recombinant protein (e.g., FLAG, polyhistidine (e.g., hexahistidine) (SEQ ID NO: 395), hemagluttanin (HA), glutathione-S-transferase (GST), or maltose-binding protein (MBP)). Heterologous sequences can also be proteins useful as diagnostic or detectable markers, for example, luciferase, green fluorescent protein (GFP), or chloramphenicol acetyl transferase (CAT). In some embodiments, the peptides can contain all or part of an immunoglobulin molecule (e.g., all or part of an immunoglobulin heavy chain constant region).

In some embodiments, the heterologous sequence can comprise a therapeutic or immune-stimulating polypeptide sequence (e.g., a T helper epitope (e.g., a PADRE epitope or a Tetanus Toxoid universal T helper cell epitope) or all or part of a cytokine or chemokine) and/or a carrier (e.g., KLH) useful, e.g., in eliciting an immune response (e.g., for antibody generation). In some embodiments, the peptide can contain one or more linker peptide sequences. The peptide can also contain a targeting polypeptide. Heterologous sequences can be of varying length and in some cases can be longer sequences than the first amino acid sequences to which the heterologous amino acid sequences are attached. It is understood that a peptide containing a first amino acid sequence and a second amino acid sequence that is heterologous to the first does not correspond in sequence to a naturally occurring protein.

Targeting polypeptides, as used herein, are polypeptides that target the moiety (or moieties) they are attached to (e.g., the first amino acid sequence) to specific tissues (e.g., to a lymph node) or cells (e.g., to an antigen presenting cell or other immune cell), or where in vitro, specific isolated molecules or molecular complexes. Targeting polypeptides can be, e.g., an antibody (immunoglobulin) or antigen binding fragment thereof or a ligand for a cell surface receptor. An antibody (or antigen-binding fragment thereof) can be, e.g., a monoclonal antibody, a polyclonal antibody, a humanized antibody, a fully human antibody, a single chain antibody, a chimeric antibody, or an Fab fragment, an F(ab')2 fragment, an Fab' fragment, an Fv fragment, or an scFv fragment of an antibody. Antibody fragments that include, or are, Fc regions (with or without antigen-binding regions) can also be used to target the reagents to Fc receptor-expressing cells (e.g., antigen presenting cells such as interdigitating dendritic cells, macrophages, monocytes, or B cells). A ligand for a cell surface receptor can be, e.g., a chemokine, a cytokine (e.g., interleukins 1, 2, 3, 4, 5, 6, 7, 8, 9, 10, 11, 12, 13, 14, 15, or 16), or a death receptor ligand (e.g., FasL or TNFα).

In some embodiments, the heterologous sequence can comprise, e.g., a "transportation sequence" that aids in the delivery of the peptide to the cell or to a specific compartment of a cell (e.g., the endoplasmic reticulum or Golgi apparatus). Transportation sequences can include, e.g., membrane translocating sequence, a transportan sequence, an antennapedia sequence, a cyclic integrin-binding peptide, and a Tat-mediated peptide, or modified versions thereof.

A linker peptide can connect the first amino acid sequence to one or more heterologous amino acid sequences. For example, a linker peptide can connect the first amino acid sequence to a second amino acid sequence. In certain embodiments, a linker peptide can link/connect a TCR alpha chain of any one of SEQ ID NOs: 27-34 with a TCR beta chain of any one of SEQ ID NOs: 19-26. The linker peptide can, or contain, e.g., stretches of amino acids where at least four to six amino acids are glycine. (See, e.g., Mancebo et al. (1990) Mol. Cell. Biol. 10: 2492-2502). A linker can also be, or contain, six or more (e.g., seven, eight, nine, ten, eleven, or twelve or more) histidine residues. The linker peptide can contain, or be, at least one (e.g., one, two, three, four, five, six, seven, or eight or more) protease cleavage site(s). The protease sites can be, e.g., a trypsin, a chymotrypsin, or a factor Xa cleavage site. Such protease sites can be useful, e.g., to separate a first amino acid sequence from a heterologous sequence. For example, after expression and purification of a peptide containing a first amino acid sequence joined to a polyhistidine sequence (e.g., for purification) by a trypsin protease cleavage site, the polyhistidine sequence can be removed from first amino acid sequence by contacting the peptide with trypsin.

In some embodiments, the disclosure provides a TCR or portion thereof (e.g., a TCR alpha chain (e.g., any one of SEQ ID NOs: 27-34) or a TCR beta chain (e.g., any one of SEQ ID NOs: 19-26)) that can have at the amino-terminal end and/or carboxy-terminal end up to 200 (e.g., one, two, three, four, five, six, seven, eight, nine, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, or 200) amino acids that are heterologous or are present in the native protein.

In some embodiments, the TCR or portion thereof (e.g., alpha or beta chain) can include a sequence that is at least 90%, 91%, 92%, 93%, 94%, 95%, 96%, 97%, 98%, or 99% identical to any sequence as described herein (e.g., a TCR alpha chain (e.g., any one of SEQ ID NOs: 27-34) or a TCR beta chain (e.g., any one of SEQ ID NOs:19-26)).

In some embodiments, the TCR or portion thereof (e.g., TCR alpha or beta chain) can have an additional sequence. The additional sequence can be located at the amino-terminal end or the carboxy-terminal of the TCR or portion thereof. In some embodiments, the additional sequence can have at least one, two, three, four, five, six, seven, eight, nine, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, or 200 amino acids. In some embodiments, the additional sequence can have up to one, two, three, four, five, six, seven, eight, nine, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, or 200 amino acids.

The TCRs described herein can also recognize (i.e., bind to) SEQ ID NO:37, in association with an MHC molecule. A variety of suitable methods can be used to determine whether a TCR described herein can recognize (i.e., bind to) SEQ ID NO:37, in association with an MHC molecule.

In some embodiments, the TCRs or portions thereof (e.g., TCR alpha or beta chain) can be further modified (e.g., amino acids of the peptides can be substituted) in order to modulate (e.g., increase or decrease) one of more properties of the TCR. For example, one or more (e.g., two, three, or four) amino acids of one of the TCRs or portions thereof described herein can be substituted in order to increase the affinity of the TCR for the BCMA peptide of SEQ ID NO:37. In some embodiments, an amino acid of one of the TCRs described herein (e.g., a BCMA-contacting amino acid residue of the TCR) can be modified in order to enhance a binding interaction between the T cell receptor and the BCMA peptide (in the context of an MHC molecule). Suitable methods for determining the effect of the modification are described in, e.g., Collins et al. (*Immunological Reviews* (1998) 163: 151-160, the disclosure of which is incorporated by reference in its entirety).

The disclosure further provides for variants of the TCRs described herein, for example, single-chain TCRs or chimeric TCRs. Methods of producing single-chain TCRs are known in the art (see, e.g., Knies et al., *Oncotarget*, 7(16): 21199-21221, 2016; Aggen et al., *Gene Ther.*, 19(4):365-374, 2012, and Wong et al., *J. Immunol.*, 198 (1 Supplement) 120.9, 2017). Methods of producing chimeric TCRs are known in the art (see, e.g., Cohen et al., *Cancer Res.*, 66:8878-8886, 2006).

The disclosure further provides a composition comprising any TCR or portion thereof or variant thereof as described herein.

Nucleic Acids and Methods for Producing the Peptides

The disclosure also features nucleic acid sequences (as well as nucleic acid vectors containing nucleic acid sequences) encoding, and methods for producing, any of the TCRs or portions thereof (e.g., a TCR alpha chain and/or a TCR beta chain) described herein. Such methods can include the steps of: optionally, providing a cell (or group of cells) comprising a nucleic acid vector containing one or more nucleic acid sequences encoding a TCR described herein (e.g., one or more nucleic acid sequences encoding a TCR alpha chain and/or a TCR beta chain), the nucleic acid sequence(s) being operably linked to an expression control sequence(s), and culturing the cell under conditions that permit the expression of the TCR. The methods can also include the step of isolating the TCR (or portions thereof) from the cell, or from the medium in which the cell was cultured. In some instances, the nucleic acid vector encodes both the TCR alpha chain and the TCR beta chain (e.g., each of which is operably linked to a separate expression control sequence). In some instances, a first nucleic acid vector is used to encode the TCR alpha chain and a second nucleic acid vector is used to encode the TCR beta chain. In some instances, the first nucleic acid vector encoding the TCR alpha chain and the second nucleic acid vector encoding the TCR beta chain are provided in the same cell (or group of cells). In some instances, the first nucleic acid vector encoding the TCR alpha chain and the second nucleic acid vector encoding the TCR beta chain are provided in different cells (or group of cells). Thus, in one aspect, the disclosure provides RNA-based therapeutics and DNA-based therapeutics including e.g., cancer vaccines. In some embodiments, the cancer vaccines can have a polynucleotide as described herein (e.g., a polynucleotide encoding SEQ ID NOS: 19-34). In some instances, the polynucleotide encodes a TCR alpha chain that is identical to one of SEQ ID NOs: 27-34, except having 1 to 10 amino acid substitutions. In some instances, the polynucleotide encodes a TCR beta chain that is identical to one of SEQ ID NOs:19-26, except having 1 to 10 amino acid substitutions. In some instances, the polynucleotide encodes: (i) a TCR alpha chain that is identical to one of SEQ ID NOs:27-34, except having 1 to 10 amino acid substitutions, and (ii) a TCR beta chain that is identical to one of SEQ ID NOs:19-26, except having 1 to 10 amino acid substitutions. In some cases, the nucleic acid comprises or consists of one or more nucleotide sequences set forth in Table 7 or 8 (e.g., a nucleotide sequence set forth in Table 7 encoding a TCR alpha chain and a nucleotide sequence set forth in Table 8 encoding a TCR beta chain). In some cases, the nucleic acid comprises a TCR alpha chain CDR3 nucleotide sequence and a TCR beta chain CDR3 nucleotide sequence set forth in Table 9. In some cases, the nucleic acid can include regulatory sequences (e.g., start codon, stop codon, poly-A tail). In some embodiments, the RNA/DNA cancer vaccines can be formulated within a polymeric or liposomal nanocarrier (e.g., a nanoparticle).

TABLE 7

TCR Alpha Chain Nucleic Acid Sequences

| SEQ ID NO | ID | SEQUENCE |
|---|---|---|
| 9 | >clonotype2.2\|TRA\|TRAV12-2*01\|TRAJ5*01\|TRAC TRAC_001 | ATGAAATCCTTGAGAGTTTTACTAGTGATCCTGTGGCTTCAGTTGAGCTG GGTTTGGAGCCAAcagaaggaggtggagcagaattctggaccccctcagtgttccagagg gagccattgcctctctcaactgcacttacagtgaccgaggttcccagtccttcttctggtacaga caatattctgggaaaagccctgagttgataatgttcatatactccaatggtgacaaagaagatg gaaggtttacagcacagctcaataaagccagccagtatgtttctctgctcatcagagactccca gcccagtgattcagccacctacctcTGTGCCGTGGGGGACGCGGGCAGGAGAG CACTTACTTTTgggagtggaacaagactccaagtgcaaccaaatatccagaaccctgacc ctgccgtgtaccagctgagagactctaaatccagtgacaagtctgtctgcctattcaccgatttt gattctcaaacaaatgtgtcacaaagtaaggattctgatgtgtatatcacagacaaaactgtgc tagacatgaggtctatggacttcaagagcaacagtgctgtggcctggagcaacaaatctgactt tgcatgtgcaaacgccttcaacaacagcattattccagaagacaccttcttcccagcccagaa agttcctgtgatgtcaagctggtcgagaaaagctttgaaacagatacgaacctaaactttcaaa acctgtcagtgattgggttccgaatcctcctcctgaaagtggccgggtttaatctgctcatgacg ctgcggctgtggtccagc |
| 10 | >clonotype3.3\|TRA\|TRAV38-2/DV8*01\|TRAJ57*01\|TRAC TRAC_002 | ATGGCATGCCCTGGCTTCCTGTGGGCACTTGTGATCTCCACCTGTCTTGA ATTTAGCATGgctcagacagtcactcagtctcaaccagagatgtctgtgcaggaggcaga gaccgtgaccctgagctgcacatatgacaccagtgagagtgattattatttattctggtacaag cagcctcccagcaggcagatgattctcgttattcgccaagaagcttataagcaacagaatgca acagagaatcgtttctctgtgaacttccagaaagcagccaaatccttcagtctcaagatctcag actcacagctcggggatgccgcgatgtatttcTGTGCTTATGAGGACGGATCTGAA AAGCTGGTCTTTggaaagggaacgaaactgacagtaaacccatatatccagaaccctga ccctgccgtgtaccagctgagagactctaaatccagtgacaagtctgtctgcctattcaccgatt tgattctcaaacaaatgtgtcacaaagtaaggattctgatgtgtatatcacagacaaaactgt gctagacatgaggtctatggacttcaagagcaacagtgctgtggcctggagcaacaaatctga ctttgcatgtgcaaacgccttcaacaacagcattattccagaagacaccttcttcccagcccag aaagttcctgtgatgtcaagctggtcgagaaaagctttgaaacagatacgaacctaaactttca aaacctgtcagtgattgggttccgaatcctcctcctgaaagtggccgggtttaatctgctcatga cgctgcggctgtggtccagc |
| 11 | >clonotype2A\|TRA\|TRAV12-2*01\|TRAJ5*01\|TRAC TRAC_003 | ATGAAATCCTTGAGAGTTTTACTAGTGATCCTGTGGCTTCAGTTGAGCTG GGTTTGGAGCCAAcagaaggaggtggagcagaattctggaccccctcagtgttccagagg gagccattgcctctctcaactgcacttacagtgaccgaggttcccagtccttcttctggtacaga caatattctgggaaaagccctgagttgataatgttcatatactccaatggtgacaaagaagatg gaaggtttacagcacagctcaataaagccagccagtatgtttctctgctcatcagagactccca gcccagtgattcagccacctacctcTGTGCCGTGGGGGACGCGGGCAGGAGAG CACTTACTTTTgggagtggaacaagactccaagtgcaaccaaatatccagaaccctgacc ctgccgtgtaccagctgagagactctaaatccagtgacaagtctgtctgcctattcaccgatttt gattctcaaacaaatgtgtcacaaagtaaggattctgatgtgtatatcacagacaaaactgtgc tagacatgaggtctatggacttcaagagcaacagtgctgtggcctggagcaacaaatctgactt tgcatgtgcaaacgccttcaacaacagcattattccagaagacaccttcttcccagcccagaa agttcctgtgatgtcaagctggtcgagaaaagctttgaaacagatacgaacctaaactttcaaa acctgtcagtgattgggttccgaatcctcctcctgaaagtggccgggtttaatctgctcatgacg ctgcggctgtggtccagc |
| 12 | >clonotype3A\|TRA\|VTRA38-2/DV8*01\|TRAJ57*01\|TRAC TRAC_004 | ATGGCATGCCCTGGCTTCCTGTGGGCACTTGTGATCTCCACCTGTCTTGA ATTTAGCATGgctcagacagtcactcagtctcaaccagagatgtctgtgcaggaggcaga gaccgtgaccctgagctgcacatatgacaccagtgagagtgattattatttattctggtacaag cagcctcccagcaggcagatgattctcgttattcgccaagaagcttataagcaacagaatgca acagagaatcgtttctctgtgaacttccagaaagcagccaaatccttcagtctcaagatctcag actcacagctcggggatgccgcgatgtatttcTGTGCTTATGAGGACGGATCTGAA AAGCTGGTCTTTggaaagggaacgaaactgacagtaaacccatatatccagaaccctga ccctgccgtgtaccagctgagagactctaaatccagtgacaagtctgtctgcctattcaccgatt tgattctcaaacaaatgtgtcacaaagtaaggattctgatgtgtatatcacagacaaaactgt gctagacatgaggtctatggacttcaagagcaacagtgctgtggcctggagcaacaaatctga ctttgcatgtgcaaacgccttcaacaacagcattattccagaagacaccttcttcccagcccag aaagttcctgtgatgtcaagctggtcgagaaaagctttgaaacagatacgaacctaaactttca aaacctgtcagtgattgggttccgaatcctcctcctgaaagtggccgggtttaatctgctcatga cgctgcggctgtggtccagc |
| 13 | >clonotype4A\|TRA\|TRAV29/DV5*01\|TRAJ4*01\|TRAC TRAC_005 | ATGGCCATGCTCCTGGGGGCATCAGTGCTGATTCTGTGGCTTCAGCCAG ACTGGGTAAACAGTCAACAGAAGAATGATgaccagcaagttaagcaaaattcac catccctgagcgtccaggaaggaagaatttctattctgaactgtgactatactaacagcatgttt gattatttcctatggtacaaaaaataccctgctgaaggtcctacattcctgatatctataagttcc attaaggataaaaatgaagatggaagattcactgtcttctttaaacaaaagtgccaagcacctc tctctgcacattgtgccctcccagcctggagactctgcagtgtacttcTGTGCAGCAAGCC CGCCGGAATCTGGTGGCTACAATAAGCTGAttttttggagcagggaccaggctg gctgtacacccatatatccagaaccctgaccctgccgtgtaccagctgagagactctaaatcca gtgacaagtctgtctgcctattcaccgattttgattctcaaacaaatgtgtcacaaagtaaggat tctgatgtgtatatcacagacaaaactgtgctagacatgaggtctatggacttcaagagcaaca gtgctgtggcctggagcaacaaatctgactttgcatgtgcaaacgccttcaacaacagcattat tccagaagacaccttcttcccagcccagaaagttcctgtgatgtcaagctggtcgagaaaagc tttgaaacagatacgaacctaaactttcaaaacctgtcagtgattgggttccgaatcctcctcct gaaagtggccgggtttaatctgctcatgacgctgcggctgtggtccagc |

TABLE 7-continued

TCR Alpha Chain Nucleic Acid Sequences

| SEQ ID NO | ID | SEQUENCE |
|---|---|---|
| 14 | >clonotype7 A\|TRA\| TRAV12- 2*01\|TRAJ8*01 \|TRAC TRAC_006 | ATGAAATCCTTGAGAGTTTTACTAGTGATCCTGTGGCTTCAGTTGAGCTG GGTTTGGAGCCAAcagaaggaggtggagcagaattctggaccccctcagtgttccagagg gagccattgcctctctcaactgcacttacagtgaccgaggttcccagtcctccttctggtacaga caatattctgggaaaagccctgagttgataatgttcatatactccaatggtgacaaagaagatg gaaggtttacagcacagctcaataaagccagccagtatgttctctgctcatcagagactccca gcccagtgattcagccacctaccrcTGTGCCGTGTCGCGCCGGGAGAGGAACAC AGGCTTTCAGAAACTTGTATTTggaactggcacccgacttctggtcagtccaaatatc cagaaccctgaccctgccgtgtaccagctgagagactctaaatccagtgacaagtctgtctgcc tattcaccgattttgattctcaaacaaatgtgtcacaaagtaaggattctgatgtgtatatcaca gacaaaactgtgctagacatgaggtctatggacttcaagagcaacagtgctgtggcctggagc aacaaatctgactttgcatgtgcaaacgccttcaacaacagcattattccagaagacaccttctt ccccagcccagaaagttcctgtgatgtcaagctggtcgagaaaagctttgaaacagatacgaa cctaaactttcaaaacctgtcagtgattgggttccgaatcctcctcctgaaagtggccgggttta atctgctcatgacgctgcggctgtggtccagc |
| 15 | >clonotype8 A\|TRA\| TRAV12- 1*01\|TRAJ9*01 \|TRAC TRAC_007 | ATGATATCCTTGAGAGTTTTACTGGTGATCCTGTGGCTTCAGTTAAGCTG GGTTTGGAGCCAAcggaaggaggtggagcaggatcctggaccccttcaatgttccagagg gagccactgtcgctttcaactgtacttacagcaacagtgcttctcagtctttcttctggtacagac aggattgcaggaaagaacctaagttgctgatgtccgtatactccagtggtaatgaagatggaa ggtttacagcacagctcaatagagccagccagtatatttccctgctcatcagagactccaagct cagtgattcagccacctacctcTGTGTGGTGCGGCCGGGGACTGGAGGCTTCA AAACTATCTTTggagcaggaacaagactattgttaaagcaaatatccagaaccctgacc ctgccgtgtaccagctgagagactctaaatccagtgacaagtctgtctgcctattcaccgattt tgattctcaaacaaatgtgtcacaaagtaaggattctgatgtgtatatcacagacaaaactgtgc tagacatgaggtctatggacttcaagagcaacagtgctgtggcctggagcaacaaatctgactt tgcatgtgcaaacgccttcaacaacagcattattccagaagacaccttcttccccagcccagaa agttcctgtgatgtcaagctggtcgagaaaagctttgaaacagatacgaacctaaactttcaaa acctgtcagtgattgggttccgaatcctcctcctgaaagtggccgggtttaatctgctcatgacg ctgcggctgtggtccagc |
| 16 | >clonotype9 A\|TRA\| TRAV2*01\| TRAJ23*01\| TRAC TRAC_008 | ATGGCTTTGCAGAGCACTCTGGGGGCGGTGTGGCTAGGGCTTCTCCTCA ACTCTCTCTGGAAGGTTGCAGAAAGCaaggaccaagtgtttcagccttccacagtg gcatcttcagagggagctgtggtggaaatcttctgtaatcactctgtgtccaatgcttacaacttc ttctggtaccttcacttcccgggatgtgcaccaagactccttgttaaaggctcaaagccttctca gcagggacgatacaacatgacctatgaacggttctcttcatcgctgctcatcctccaggtgcgg gaggcagatgctgctgtttactacTGTGCTGTGGAGGACCTTTATAACCAGGGA GGAAAGCTTATCTTCggacagggaacggagttatctgtgaaacccaatatccgaaccc tgaccctgccgtgtaccagctgagagactctaaatccagtgacaagtctgtctgcctattcaccg attttgattctcaaacaaatgtgtcacaaagtaaggattctgatgtgtatatcacagacaaaact gtgctagacatgaggtctatggacttcaagagcaacagtgctgtggcctggagcaacaaatct gactttgcatgtgcaaacgccttcaacaacagcattattccagaagacaccttcttccccagccc agaaagttcctgtgatgtcaagctggtcgagaaaagctttgaaacagatacgaacctaaacttt caaaacctgtcagtgattgggttccgaatcctcctcctgaaagtggccgggtttaatctgctcat gacgctgcggctgtggtccagc |

TABLE 8

TCR Beta Chain Nucleic Acid Sequences

| SEQ ID NO | ID | SEQUENCE |
|---|---|---|
| 1 | >clonotype2.2 \|TRB\| TRBV9*01\| TRBJ1- 2*01\|TRBC1 TRBC_001 | ATGGGCTTCAGGCTCCTCTGCTGTGTGGCCTTTTGTCTCCTGGGAGCAG GCCCAGTGgattctggagtcacacaaacccccaaagcacctgatcacagcaactggacagc gagtgacgctgagatgctcccctaggtctggagacctctctgtgtactggtaccaacagagcct ggaccagggcctccagttcctcattcagtattataatggagaagagagagcaaaaggaaaca ttcttgaacgattctccgcacaacagttccctgacttgcactctgaactaaacctgagctctctgg agctggggactcagctatttctcTGTGCCAGCAGCGTAGCTGGCTCTTCTAGC TATGGCTACACCTTCggttcggggaccaggttaaccgttgtagaggacctgaacaaggt gttcccacccgaggtcgctgtgtttgagccatcagaagcagagatctcccacacccaaaaggc cacactggtgtgcctggccacaggcttcttccccgaccacgtggagctgagctggtgggtgaat gggaaggaggtgcacagtggggtcagcacggacccgcagcccctcaaggagcagcccgccct caatgactccagatactgcctgagcagccgcctgagggtctcggcaccttctggcagaacccc cgcaaccacttccgctgtcaagtccagttctacgggctctcggagaatgacgagtggacccag gatagggcaaacccgtcacccagatcgtcagcgccgaggcctggggtagagcagactgtgg cttttacctcggtgtccaccagcaaggggtcctgtctgccaccaacatcctctatgagatcctgctag ggaaggccaccctgtatgctgtgctggtcagcgcccttgtgttgatgccatggtcaagagaaa ggatttcAGGAgGAGGAGgagcggcagtggagtgaaacagactttgaattttgaccttct caagttggcgggagacgtggagtccaacccagggccc |

TABLE 8-continued

TCR Beta Chain Nucleic Acid Sequences

| SEQ ID NO | ID | SEQUENCE |
|---|---|---|
| 2 | >clonotype3.3\|TRB\|TRBV7-9*01\|TRBJ1-1*01\|TRBC1 TRBC_002 | ATGGGCACCAGCCTCCTCTGCTGGATGGCCCTGTGTCTCCTGGGGCAG<br>ATCACGCAgatactggagtctcccagaaccccagacacaagatcacaaagaggggacag<br>aatgtaactttcaggtgtgatccaatttctgaacacaaccgcctttattggtaccgacagaccct<br>ggggcagggcccagagtttctgacttacttccagaatgaagctcaactagaaaaatcaaggct<br>gctcagtgatcggttctctgcagagaggcctaagggatctttctccaccttggagatccagcgc<br>acagagcagggggactcggccatgtatctcTGTGCCAGCAGCTTAGCCCGCACTG<br>AAGCTTTCTTTggacaaggcaccagactcacagttgtagaggacctgaacaaggtgttcc<br>cacccgaggtcgctgtgtttgagccatcagaagcagagatctcccacacccaaaaggccacac<br>tggtgtgcctggccacaggcttcttccccgaccacgtggagctgagctggtgggtgaatgggaa<br>ggaggtgcacagtggggtcagcacggacccgcagccctcaaggagcagcccgccctcaatg<br>actccagatactgcctgagcagccgcctgagggtctcggccaccttctggcagaaccccgca<br>accacttccgctgtcaagtccagttctacgggctctcggagaatgacgagtggacccaggatag<br>ggccaaacccgtcacccagatcgtcagcgccgaggcctggggtagagcagactgtggctttac<br>ctcggtgtcctaccagcaaggggtcctgtctgccaccatcctctatgagatcctgctagggaag<br>gccaccctgtatgctgtgctggtcagcgcccttgtgttgatggccatggtcaagagaaaggattt<br>cAGGAgGAGGAGGagcggcagtggagtgaaacagactttgaattttgaccttctcaagtt<br>ggcgggagacgtggagtccaacccagggccc |
| 3 | >clonotype2 B\|TRB\|TRBV9*01\|TRBJ1-2*01\|TRBC1 TRBC_003 | ATGGGCTTCAGGCTCCTCTGCTGTGTGGCCTTTTGTCTCCTGGGAGCAG<br>GCCCAGTGgattctggagtcacacaaaccccaaagcacctgatcacgaactggacagc<br>gagtgacgctgagatgctccccaggtctggagacctctctgtgtactggtaccaacagagcct<br>ggaccagggcctccagttcctcattcagtattataatggagaagagagagcaaaaggaaaca<br>ttcttgaacgattctccgcacaacagttccctgacttgcactctgaactaaacctgagctctctgg<br>agctggggggactcagctttgtatttcTGTGCCAGCAGCAGCTTAGCCCGCACTTC<br>TATGGCTACACCTTCggttcggggaccaggttaaccgttgtagaggacctgaacaaggt<br>gttcccacccgaggtcgctgtgtttgagccatcagaagcagagatctcccacacccaaaaggc<br>cacactggtgtgcctggccacaggcttcttccccgaccacgtggagctgagctggtgggtgaat<br>gggaaggaggtgcacagtggggtcagcacggacccgcagccctcaaggagcagcccgccct<br>caatgactccagatactgcctgagcagccgcctgagggtctcggccaccttctggcagaaccc<br>cgcaaccacttccgctgtcaagtccagttctacgggctctcggagaatgacgagtggacccag<br>gatagggccaaacccgtcacccagatcgtcagcgccgaggcctggggtagagcagactgtgg<br>ctttacctcggtgtcctaccagcaaggggtcctgtctgccaccatcctctatgagatcctgctag<br>ggaaggccaccctgtatgctgtgctggtcagcgcccttgtgttgatggccatggtcaagagaaa<br>ggatttc |
| 4 | >clonotype3 B\|TRB\|TRBV7-9*01\|TRBJ1-1*01\|TRBC1 TRBC_004 | ATGGGCACCAGCCTCCTCTGCTGGATGGCCCTGTGTCTCCTGGGGCAG<br>ATCACGCAgatactggagtctcccagaaccccagacacaagatcacaaagaggggacag<br>aatgtaactttcaggtgtgatccaatttctgaacacaaccgcctttattggtaccgacagaccct<br>ggggcagggcccagagtttctgacttacttccagaatgaagctcaactagaaaaatcaaggct<br>gctcagtgatcggttctctgcagagaggcctaagggatctttctccaccttggagatccagcgc<br>acagagcagggggactcggccatgtatctcTGTGCCAGCAGCTTAGCCCGCACTG<br>AAGCTTTCTTTggacaaggcaccagactcacagttgtagaggacctgaacaaggtgttcc<br>cacccgaggtcgctgtgtttgagccatcagaagcagagatctcccacacccaaaaggccacac<br>tggtgtgcctggccacaggcttcttccccgaccacgtggagctgagctggtgggtgaatgggaa<br>ggaggtgcacagtggggtcagcacggacccgcagccctcaaggagcagcccgccctcaatg<br>actccagatactgcctgagcagccgcctgagggtctcggccaccttctggcagaaccccgca<br>accacttccgctgtcaagtccagttctacgggctctcggagaatgacgagtggacccaggatag<br>ggccaaacccgtcacccagatcgtcagcgccgaggcctggggtagagcagactgtggctttac<br>ctcggtgtcctaccagcaaggggtcctgtctgccaccatcctctatgagatcctgctagggaag<br>gccaccctgtatgctgtgctggtcagcgcccttgtgttgatggccatggtcaagagaaaggattt<br>c |
| 5 | >clonotype4 B\|TRB\|TRBV3-1*01\|TRBJ2-3*01\|TRBC2 TRBC_005 | ATGGGCTGCAGGCTCCTCTGCTGTGTGGTCTTCTGCCTCCTCCAAGCAG<br>GTCCCTTGgacacagctgtttcccagactccaaaatacctggtcacacagatgggaaacga<br>caagtccattaaatgtgaacaaaatctgggccatgatactatgtattggtataaacaggactct<br>aagaaatttctgaagataatgtttagctacaataataaggagctcattataaatgaaacagttc<br>caaatcgcttctcacctaaatctccagacaaagctcacttaaatcttcacatcaattccctggag<br>cttggtgactctgctgtgtatttcTGTGCCAGCAGCCTTGGGACAGATACGCAGT<br>ATTTTggcccaggcaccggctgacagtgctcgaggacctgaaaaacgtgttcccacccgag<br>gtcgctgtgtttgagccatcagaagcagagatctcccacacccaaaaggccacactggtgtgc<br>ctggccacaggcttctaccccgaccacgtggagctgagctggtgggtgaatgggaaggaggtg<br>cacagtggggtcagcacagacccgcagccctcaaggagcagcccgccctcaatgactccag<br>atactgcctgagcagccgcctgagggtctcggccaccttctggcagaaccccgccaaccacttc<br>cgctgtcaagtccagttctacgggctctcggagaatgacgagtggacccaggatagggccaaa<br>cctgtcacccagatcgtcagcgccgaggcctggggtagagcagactgtggcttcacctccgagt<br>cttaccagcaaggggtcctgtctgccaccatcctctatgagatcttgctagggaaggccaccttg<br>tatgccgtgctggtcagtgccctcgtgctgatggccatggtcaagagaaaggattccagaggc |
| 6 | >clonotype7 B\|TRB\|TRBV3-1*01\|TRBJ2-7*01\|TRBC2 TRBC_006 | ATGGGCTGCAGGCTCCTCTGCTGTGTGGTCTTCTGCCTCCTCCAAGCAG<br>GTCCCTTGGacacagctgtttcccagactccaaaatacctggtcacacagatgggaaacg<br>acaagtccattaaatgtgaacaaaatctgggccatgatactatgtattggtataaacaggactc<br>taagaaatttctgaagataatgtttagctacaataataaggagctcattataaatgaaacagtt<br>ccaaatcgcttctcacctaaatctccagacaaagctcacttaaatcttcacatcaattccctgga<br>gcttggtgactctgctgtgtatttcTGTGCCAGCAGCCAGCGGGTCTACGAGCAG<br>TACTTCgggccgggcaccaggctcacggtcacagaggacctgaaaaacgtgttcccacccg<br>aggtcgctgtgtttgagccatcagaagcagagatctcccacacccaaaaggccacactggtgt |

TABLE 8-continued

TCR Beta Chain Nucleic Acid Sequences

| SEQ ID NO | ID | SEQUENCE |
|---|---|---|
| | | gcctggccacaggcttctaccccgaccacgtggagctgagctggtgggtgaatgggaaggagg<br>tgcacagtggggtcagcacagacccgcagcccctcaaggagcagcccgccctcaatgactcc<br>agatactgcctgagcagccgcctgagggtctcggccaccttctggcagaaccccgcaaccac<br>ttccgctgtcaagtccagttctacgggctctcggagaatgacgagtggacccaggataggggc<br>aaacctgtcacccagatcgtcagcgccgaggcctggggtagagcagactgtggcttcacctcc<br>gagtcttaccagcaaggggtcctgtctgccaccatcctctatgagatcttgctagggaaggcca<br>ccttgtatgccgtgctggtcagtgccctcgtgctgatggccatggtcaagagaaaggattccag<br>aggc |
| 7 | >clonotype8<br>B\|TRB\|<br>TRBV27*01\|<br>TRBJ2-<br>5*01\|TRBC2<br>TRBC_007 | ATGGGCCCCCAGCTCCTTGGCTATGTGGTCCTTTGCCTTCTAGGAGCAG<br>GCCCCCTGgaagcccaagtgacccagaacccaagatacctcatcacagtgactggaaaga<br>agttaacagtgacttgttctcagaatattgaaccatgagtatatgtcctggtatcgacaagaccc<br>agggctgggcttaaggcagatctactattcaatgaatgttgaggtgactgataaggagatgtt<br>cctgaagggtacaaagtctctcgaaaagagaagaggaatttcccctgatcctggagtcgccc<br>agccccaaccagacctctctgtacttcTGTGCCAGCAGTTTATTAGGAACACAGG<br>GGCCCAAAGAGACCCAGTACTTCgggcaggcacgcgggctcctggtgctcgaggac<br>ctgaaaaacgtgttcccaccgaggtcgctgtgtttgagccatcagaagcagagatctcccaca<br>cccaaaaggccacactggtgtgcctggccacaggcttctaccccgaccacgtggagctgagct<br>ggtgggtgaatgggaaggaggtgcacagtggggtcagcacagacccgcagcccctcaagga<br>gcagcccgccctcaatgactccagatactgcctgagcagccgcctgagggtctcggccaccttc<br>tggcagaaccccgcaaccacttccgctgtcaagtccagttctacgggctctcggagaatgacg<br>agtggacccaggatagggccaaacctgtcacccagatcgtcagcgccgaggcctggggtaga<br>gcagactgtggcttcacctccgagtcttaccagcaaggggtcctgtctgccaccatcctctatga<br>gatcttgctagggaaggccaccttgtatgccgtgctggtcagtgccctcgtgctgatggccatgg<br>tcaagagaaaggattccagaggc |
| 8 | >clonotype9<br>B\|TRB\|<br>TRBV7-<br>3*01\|TRBJ1-<br>1*01\|TRBC1<br>TRBC_008 | ATGGGCACCAGGCTCCTCTGCTGGGCAGCCCTGTGCCTCCTGGGGCA<br>GATCACACAggtgctggagtctcccagaccccagtaacaaggtcacagagaagggaaa<br>atatgtagagctcaggtgtgatccaatttcaggtcatactgcccttactggtaccgacaaagcc<br>tggggcagggcccagagtttctaatttacttccaaggcacgggtgcggcagatgactcagggct<br>gcccaacgatcggttctttgcagtcaggcctgagggatccgtctctactctgaagatccagcgc<br>acagagcgggggactcagccgtgtatctcTGTGCCAGCAGCTTAGGGGGGACAG<br>GGCCGTTTACCACTGAAGCTTTCTTTggacaaggcaccagactcacagttgtagag<br>gacctgaacaaggtgttcccaccgaggtcgctgtgtttgagccatcagaagcagagatctccc<br>acacccaaaaggccacactggtgtgcctggccacaggcttcttccccgaccacgtggagctga<br>gctggtgggtgaatgggaaggaggtgcacagtggggtcagcacggacccgcagcccctcaag<br>gagcagcccgccctcaatgactccagatactgcctgagcagccgcctgagggtctcggccacc<br>ttctggcagaaccccgcaaccacttccgctgtcaagtccagttctacgggctctcggagaatg<br>acgagtggacccaggatagggccaaacccgtcacccagatcgtcagcgccgaggcctggggt<br>agagcagactgtggcttacctcggtgtcctaccagcaaggggtcctgtctgccaccatcctcta<br>tgagatcctgctagggaaggccaccctgtatgctgtgctggtcagcgcccttgtgttgatggca<br>tggtcaagagaaaggatttc |

TABLE 9

Exemplary TCR Alpha and Beta Chain CDR3 Nucleic Acid Sequences

| | TCR alpha chain CDR3 | TCR beta chain CDR3 |
|---|---|---|
| HLA-A2 + Donor 3<br>clonotype1 | TGTGCAATGAGAGTCTACGACAAG<br>GTGATATTT<br>(SEQ ID NO: 157) | TGCGCCAGCAGCCACCACGGACGG<br>GGGGCCACCGGGGAGCTGTTTTTT<br>(SEQ ID NO: 189) |
| HLA-A2 + Donor 3<br>clonotype2 | TGTGCCGTGATTGGCTATGGTCAGA<br>ATTTTGTCTTT<br>(SEQ ID NO: 158) | TGTGCCAGCACTGGGGGTTTTCAG<br>AGCCCCAGCATTTT<br>(SEQ ID NO: 190) |
| HLA-A2 + Donor 3<br>clonotype4 | TGTGCTGTGAGAGATAATAAGGAT<br>GGTGCTACAAACAAGCTCATCTTT<br>(SEQ ID NO: 159) | TGTGCCAGCAGCCCCGGGACAGGG<br>AGTAGTGGCTACACCTTC<br>(SEQ ID NO: 191) |
| HLA-A2 + Donor 3<br>clonotype5 | TGTGCAGAGAGTTATGGTGGTGCT<br>ACAAACAAGCTCATCTTT<br>(SEQ ID NO: 160) | TGCGCCAGCAGCACTACTAGCGGG<br>GGGGCCGGAGAGCAGTTCTTC<br>(SEQ ID NO: 192) |
| HLA-A2 + Donor 3<br>clonotype6 | TGTGCAATGAGCGCTGGGGCTGGG<br>AGTTACCAACTCACTTTC<br>(SEQ ID NO: 161) | TGCGCCAGCAGCCAGTATAGCGGG<br>GGGGCGCATACGCAGTATTTT<br>(SEQ ID NO: 193) |
| HLA-A2 + Donor 3<br>clonotype8 | TGTGCTACGGACGCGGGCTATAAC<br>AATGACATGCGCTTT<br>(SEQ ID NO: 162) | TGCAGTGCTATTGACGGAAACACCA<br>TATATTTT<br>(SEQ ID NO: 194) |

TABLE 9-continued

Exemplary TCR Alpha and Beta Chain CDR3 Nucleic Acid Sequences

| | TCR alpha chain CDR3 | TCR beta chain CDR3 |
|---|---|---|
| HLA-A2 + Donor 3 clonotype9 | TGTGCCGAAACCGGATACAGCACCC TCACCTTT (SEQ ID NO: 163) | TGTGCCAGCAGCCCACCAGGACTA GCGGGAAACCAAGAGACCCAGTAC TTC (SEQ ID NO: 195) |
| HLA-A2 + Donor 3 clonotype12 | TGCATCCTGACCCGCTCCCGTTCTGC AAGGCAACTGACCTTT (SEQ ID NO: 164) | TGTGCCAGCAGGCCTCTCACAGGG GGCGCCAACACTGAAGCTTTCTTT (SEQ ID NO: 196) |
| HLA-A2 + Donor 3 clonotype13 | TGTGCTGTCCACTTTGGAAATGAGA AATTAACCTTT (SEQ ID NO: 165) | TGTGCCAGTAGTATTTATTCTAACAC TGAAGCTTTCTTT (SEQ ID NO: 197) |
| HLA-A2 + Donor 3 clonotype14 | TGCATCGTCCGGAGTTATGACAGAG GAAGCCAAGGAAATCTCATCTTT (SEQ ID NO: 166) | TGTGCCAGCAGCACCCGAGGACTTA ATAGCAATCAGCCCCAGCATTTT (SEQ ID NO: 198) |
| HLA-A2 + Donor 3 clonotype15 | TGTCTTCTGGGAGATGAGCTAGGG GACTATCAGTTAATCTGG (SEQ ID NO: 167) | TGTGCCAGCTCCTGGATGGGAGGC AATGAGCAGTTCTTC (SEQ ID NO: 199) |
| HLA-A2 + Donor 3 clonotype16 | TGTGCTCTCCAGCTGGATAACTATG GTCAGAATTTTGTCTTT (SEQ ID NO: 168) | TGTGCCAGCACGGGACACCCAGGG ACTGGACCCTACGAGCAGTACTTC (SEQ ID NO: 200) |
| HLA-A2 + Donor 4 clonotype2 | TGTGCAGCAAGCCCGCCGGAATCT GGTGGCTACAATAAGCTGATTTTT (SEQ ID NO: 169) | TGTGCCAGCAGCTTGGGACAGAT ACGCAGTATTTT (SEQ ID NO: 201) |
| HLA-A2 + Donor 4 clonotype4 | TGTGCTGTGACCCTAATTCAGGGAG CCCAGAAGCTGGTATTT (SEQ ID NO: 170) | TGTGCCAGCTCCGGTTGGGGCTCGT GGACAGATACGCAGTATTTT (SEQ ID NO: 202) |
| HLA-A2 + Donor 4 clonotype6 | TGTGCTCTGAGCGGCGACTACAAGC TCAGCTTT (SEQ ID NO: 171) | TGTGCCAGCAGCTCCGGAGGCAGC GCAGCCTACGAGCAGTACTTC (SEQ ID NO: 203) |
| HLA-A2 + Donor 4 clonotype9 | TGTGCCTCCGACCGTTCTAACGACT ACAAGCTCAGCTTT (SEQ ID NO: 172) | TGTGCCAGCAGCTCTGCTGGAGGG GCCCACTACGAGCAGTACTTC (SEQ ID NO: 204) |
| HLA-A2 + Donor 4 clonotype8 | TGCATCCTGAGAGACGGGCGAGGA AGCCAAGGAAATCTCATCTTT (SEQ ID NO: 173) | TGTGCCAGCAGCTTGGGGGTCGCA GCCGGGGAGCTGTTTTTT (SEQ ID NO: 205) |
| HLA-A2 + Donor 4 clonotype11 | TGTGGAGCAGACCCCCAATATGGA AACAAGCTGGTCTTT (SEQ ID NO: 174) | TGTGCCACCACGGGGGGGGGTTAT GGCTACACCTTC (SEQ ID NO: 206) |
| HLA-A2 + Donor 4 clonotype12 | TGTGCAGCAAGCCCCTATAATAATG CAGGCAACATGCTCACCTTT (SEQ ID NO: 175) | TGTGCCAGCAGCTTGACGTGGGGC GCAGATACGCAGTATTTT (SEQ ID NO: 207) |
| HLA-A2 + Donor 4 clonotype40 | TGTGCTGTCATGGATAGCAACTATC AGTTAATCTGG (SEQ ID NO: 176) | TGTGCCAGCAGTGAGAGCACAGGG CATCAGCCCCAGCATTTT (SEQ ID NO: 208) |
| HLA-A2 + Donor 4 clonotype35 | TGCCTCGTGGCCCAGGGGAACACA GGCTTTCAGAAACTTGTATTT (SEQ ID NO: 177) | TGCGCCAGCAGCCCTGTTGGACTAA GGGATAATTCACCCCTCCACTTT (SEQ ID NO: 209) |
| HLA-A2 + Donor 4 clonotype34 | TGTGCTGTGTCTCCAATAACTACCG ACAAGCTCATCTTT (SEQ ID NO: 178) | TGTGCCAGCAGCCCCGAGGTCAG GGGGCAGATACGCAGTATTTT (SEQ ID NO: 210) |
| HLA-A2 + Donor 5 clonotype4 | TGTGCTACGGACACGGGCAGGAGA GCACTTACTTTT (SEQ ID NO: 179) | TGTGCCAGCAGAGGCGACAGGGCG GATCAGCCCCAGCATTTT (SEQ ID NO: 211) |
| HLA-A2 + Donor 5 clonotype25 | TGTGCAGAGAGGGGCGGTTATAAC ACCGACAAGCTCATCTTT (SEQ ID NO: 180) | TGCAGTGCCCGGGAGTTGACGGCT GACAATGAGCAGTTCTTC (SEQ ID NO: 212) |

TABLE 9-continued

Exemplary TCR Alpha and Beta Chain CDR3 Nucleic Acid Sequences

| | TCR alpha chain CDR3 | TCR beta chain CDR3 |
|---|---|---|
| HLA-A2 + Donor 5 clonotype72 | TGTGCTTCTAATGCTGGTGGTACTA GCTATGGAAAGCTGACATTT (SEQ ID NO: 181) | TGTGCCAGCAGCTTAGTAGCAGGA CAAGAGACCCAGTACTTC (SEQ ID NO: 213) |
| HLA-A2 + Donor 5 clonotype77 | TGTGCAGCAAGCTATTCTAATGCCA GACTCATGTTT (SEQ ID NO: 182) | TGCGCCAGCAGCCAAGAGGGAGAG GGGGCTGAAGCTTTCTTT (SEQ ID NO: 214) |
| HLA-A2 + Donor 5 clonotype75 | TGTGCTTATATAGACAATGACATGC GCTTT (SEQ ID NO: 183) | TGCAGTGCTAGATTATTTATCTACA GAGTATACAATGAGCAGTTCTTC (SEQ ID NO: 215) |
| HLA-A2 + Donor 5 clonotype132 | TGTGCCGTGAGAGCTTATGGAGGA AGCCAAGGAAATCTCATCTTT (SEQ ID NO: 184) | TGCAGCGTCCCCAAACAGGATCTCT ACTATGGCTACACCTTC (SEQ ID NO: 216) |
| HLA-A2 + Donor 5 clonotype102 | TGTGCCGTGACGACTGGAGGCTTCA AAACTATCTTT (SEQ ID NO: 185) | TGTGCCAGCAGCTTAGCGGATCACA GGGGACTAGCCAAAAACATTCAGT ACTTC (SEQ ID NO: 217) |
| HLA-A2 + Donor 5 clonotype125 | TGTGCAGAGAGTTTACGTTCTAACG ACTACAAGCTCAGCTTT (SEQ ID NO: 186) | TGCGCCAGCAGCCAAGCCCTCAGA GGTGAAGCTTTCTTT (SEQ ID NO: 218) |
| HLA-A2 + Donor 5 clonotype158 | TGTGCAGGTCCTTCGTCTTCTAACG ACTACAAGCTCAGCTTT (SEQ ID NO: 187) | TGTGCCAGCAATCCGACAGGGGGT TCCTACGAGCAGTACTTC (SEQ ID NO: 219) |
| HLA-A2 + Donor 5 clonotype168 | TGTGCAGTCCCAGACAGAGGCTCA ACCCTGGGGAGGCTATACTTT (SEQ ID NO: 188) | TGTGCCAGCAGCTTTTTGGGTAACA CTGAAGCTTTCTTT (SEQ ID NO: 220) |

Suitable methods for constructing nucleic acid sequences and vectors (e.g., expression vectors) for recombinant expression of a TCR described herein are well known to those skilled in the art and described in, e.g., Sambrook et al., *Molecular Cloning: A Laboratory Manual Second Edition*, vol. 1, 2 and 3. Cold Spring Harbor Laboratory Press: Cold Spring Harbor, New York, USA, November 1989, the disclosure of which is incorporated by reference in its entirety. The nucleic acids and vectors can be used, e.g., to express the TCRs in a wide variety of host cells including, e.g., a bacterial, a yeast, or a mammalian cell. The nucleic acids and vectors can also be used in, e.g., in vivo and ex vivo methods as described below. The TCR-coding sequences can be operably-linked to a promoter, a regulatory element, or an expression control sequence. The promoter and/or enhancer elements can direct the expression of the TCRs encoded by the nucleic acids. Enhancers provide expression specificity in terms of time, location, and level. Unlike a promoter, an enhancer can function when located at variable distances from the transcription initiation site, provided a promoter is present. An enhancer can also be located downstream of the transcription initiation site or in an exon of the relevant gene. To bring a coding sequence under the control of a promoter, it is necessary to position the translation initiation site of the translational reading frame of the peptide between one and about fifty nucleotides downstream (3') of the promoter. Promoters of interest include, but are not limited to, the cytomegalovirus hCMV immediate early gene, the early or late promoters of SV40 adenovirus, the lac system, the trp system, the TAC system, the TRC system, the major operator and promoter regions of phage A, the control regions of fd coat protein, the promoter for 3 phosphoglycerate kinase, the promoters of acid phosphatase, and the promoters of the yeast a mating factors, the adenoviral EIb minimal promoter, or the thymidine kinase minimal promoter.

The TCR-coding sequences, or vectors containing the TCR-coding sequences, can contain a leader sequence that encodes a signal peptide. The leader sequence can be at the 5' end of the sequence encoding one or more of the TCRs described herein. The signal peptide can be immediately N-terminal of a given TCR or can be separated from it by one or more (e.g., 2, 3, 4, 6, 8, 10, 15 or 20) amino acids, provided that the leader sequence is in frame with the nucleic acid sequence encoding the peptides. The signal peptide, which is generally cleaved from the peptide prior to secretion (unless of course the signal peptide directs the insertion of a transmembrane protein), directs the peptide to which it is attached into the lumen of the host cell endoplasmic reticulum (ER) during translation and the peptides are then secreted, via secretory vesicles, into the environment of the host cell. Useful signal peptides include, e.g., native leader sequences of cytokines or growth factors, KDEL (Lys-Asp-Glu-Leu) (SEQ ID NO: 396), or any signal sequences described in, e.g., U.S. Pat. No. 5,827,516, the disclosure of which is incorporated herein by reference in its entirety.

In some embodiments, the 5' end of a peptide-coding sequence can include a non-native ATG "start sequence." That is, e.g., an ATG sequence can be added to a nucleic acid encoding a peptide to ensure that the peptide is properly transcribed and translated. Although a leader sequence generally includes an ATG start sequence, in embodiments where it does not, the ATG sequence can be added at the 5' end of a nucleic acid encoding the leader sequence.

Suitable methods for constructing peptide-coding sequences and expression vectors are well known to those skilled in the art and described in, e.g., Sambrook et al., Molecular *Cloning: A Laboratory Manual Second Edition* vols. 1, 2 *and* 3. Cold Spring Harbor Laboratory Press: Cold Spring Harbor, New York, USA, November 1989; the disclosure of which is incorporated herein by reference in its entirety.

A recombinant vector can be introduced into a cell using a variety of methods, which methods can depend, at least in part, on the type of cell into which the nucleic acid is introduced. For example, bacterial cells can be transformed using methods such as electroporation or heat shock. Methods for transfecting yeast cells include, e.g., the spheroplast technique or the whole-cell lithium chloride yeast transformation method (see, e.g., U.S. Pat. No. 4,929,555; Hinnen et al. (1978) *Proc. Nat. Acad. Sci. USA* 75: 1929; Ito et al. (1983) *J Bacteriol.* 153: 163; U.S. Pat. No. 4,879,231; and Sreekrishna et al. (1987) *Gene* 59: 115, the disclosures of each of which are incorporated herein by reference in their entirety). Transfection of animal cells can feature, for example, the introduction of a vector to the cells using calcium phosphate, electroporation, heat shock, liposomes, or transfection reagents such as FUGENE® or LIPOFECTAMINE®, or by contacting naked nucleic acid vectors with the cells in solution (see, e.g., Sambrook et al., supra).

Expression systems that can be used for small or large scale production of the TCRs described herein include, but are not limited to, microorganisms such as bacteria (for example, *E. coli* and *B. subtilis*) transformed with recombinant bacteriophage DNA, plasmid DNA, or cosmid DNA expression vectors; fungus (e.g., yeast (for example, *Saccharomyces* and *Pichia*)) transformed with recombinant yeast expression vectors; insect cell systems infected with recombinant virus expression vectors (for example, baculovirus); plant cell systems infected with recombinant virus expression vectors (for example, cauliflower mosaic virus (CaMV) and tobacco mosaic virus (TMV)) or transformed with recombinant plasmid expression vectors (for example, Ti plasmid); or mammalian cell systems (e.g., COS, CHO, BHK, 293, VERO, HeLa, MDCK, WI38, and NIH 3T3 cells) harboring recombinant expression constructs containing promoters derived from the genome of mammalian cells (for example, the metallothionein promoter) or from mammalian viruses (for example, the adenovirus late promoter, a CMV promoter, an SV40 promoter, or the vaccinia virus 7.5K promoter). Also useful as host cells are primary or secondary cells obtained directly from a mammal, transfected with a plasmid vector or infected with a viral vector (e.g., viral vectors such as herpes viruses, retroviruses, vaccinia viruses, attenuated vaccinia viruses, canary pox viruses, adenoviruses and adeno-associated viruses, among others).

Following the expression of any of the TCRs described herein, the TCRs can be isolated from the cultured cells, or from the media in which the cells were cultured, using standard techniques. Methods of isolating proteins are known in the art and include, e.g., liquid chromatography (e.g., HPLC), affinity chromatography (e.g., metal chelation or immunoaffinity chromatography), ion-exchange chromatography, hydrophobic-interaction chromatography, precipitation, or differential solubilization.

Smaller peptides (e.g., peptides having less than 200 (e.g., less than 175, less than 150, less than 125, less than 100, less than 90, less than 80, less than 70, or less than 60) amino acids) can be chemically synthesized by standard chemical means such as FMOC solid-phase synthesis.

The TCRs described herein can, but need not, be isolated. The term "isolated," as applied to any of the peptides described herein, refers to a peptide, a fragment thereof, (or for compositions, a macromolecular complex), that has been separated or purified from components (e.g., proteins or other naturally-occurring biological or organic molecules) which naturally accompany it. It is understood that recombinant molecules (e.g., recombinant peptides) will always be "isolated." Typically, a peptide (or fragment or macromolecular complex) is isolated when it constitutes at least 60%, 70%, 80%, or 90% by weight, of the total molecules of the same type in a preparation, e.g., at least 60%, 70%, 80%, or 90% of the total molecules of the same type in a sample. For example, a peptide described herein is considered isolated when it constitutes at least 60%, 70%, 80%, or 90% by weight, of the total protein in a preparation or sample. In some embodiments, a molecule in the preparation consists of at least 75%, at least 90%, or at least 99%, by weight, of the total molecules of the same type in a preparation.

Similarly, the TCR-coding sequences or vectors containing the TCR-coding sequences described herein can also be isolated. The term "isolated," as applied to any of the TCR-coding sequences or vectors described herein, refers to a TCR-coding sequence or vector, a fragment thereof that has been separated or purified from components (e.g., nucleic acids, proteins, or other naturally-occurring biological or organic molecules) which naturally accompany it. It is understood that recombinant molecules (e.g., recombinant vectors or TCR-coding sequences) will always be "isolated." Typically, a TCR-coding sequence or vector (or fragment thereof) is isolated when it constitutes at least 60%, 70%, 80%, or 90% by weight, of the total molecules of the same type in a preparation, e.g., at least 60%, 70%, 80%, or 90% of the total molecules of the same type in a sample. For example, a TCR-coding sequence or vector described herein is considered isolated when it constitutes at least 60%, 70%, 80%, or 90% by weight, of the total nucleic acid in a preparation or sample. In some embodiments, a molecule in the preparation consists of at least 75%, at least 90%, or at least 99%, by weight, of the total molecules of the same type in a preparation.

In some embodiments, the isolated TCRs, TCR-coding sequences, or vectors can be frozen, lyophilized, or immobilized and stored under appropriate conditions, which allow the molecules to retain activity (e.g., the ability of a TCR to bind to an antigen, or the ability of a vector to support expression of a TCR in a cell).

Processing of the TCRs

Following the expression or synthesis of any of the peptides (e.g., TCR alpha and/or beta chains) described herein, the peptides can be further processed. The further processing can include chemical or enzymatic modifications to peptides or, in cases where the peptides are modified, the processing can include enzymatic or chemical alterations of existing modifications, or both. The additional processing of the peptides can include the addition (covalent or non-covalent joining) of a heterologous amino acid sequence such as, but not limited to, any of the heterologous amino acid sequences described herein. Enzymatic treatment can involve contacting a peptide with, e.g., one or more proteases, phosphatases, or kinases under conditions that allow the peptide to be modified. Enzymatic treatment can involve contacting a peptide with one or more enzymes (e.g., an oligosaccharyltransferase or a mannosidase) capable of glycosylating, or modifying the glycosylation of, the peptide.

The processing can include the addition of, e.g., a detectable label to a peptide. For example, a peptide can be detectably labeled with an enzyme (e.g., horseradish peroxidase, alkaline phosphatase, β-galactosidase, or acetylcholinesterase), a fluorescent material (e.g., umbelliferone, fluorescein, fluorescein isothiocyanate, rhodamine, dichlorotriazinylamine, fluorescein, dansyl chloride, allophycocyanin (APC), or phycoerythrin), a luminescent material (e.g., a lanthanide or chelate thereof), a bioluminescent material (e.g., luciferase, luciferin, or aequorin), or a radionuclide (e.g., $^{3}$H, $^{32}$P, $^{33}$P, $^{125}$I, or $^{35}$S).

The processing can also involve the coupling of the peptide to a polymer (e.g., a polyalkylene glycol moiety such as a polyethylene glycol moiety), or a nanoparticle. In some embodiments, the polymer is coupled to the polypeptide at a site on the peptide that is an N terminus. In some embodiments, a peptide can contain one or more internal amino acid insertions that provide an internal polymer conjugation site to which a polymer can be conjugated.

T Cell-Based Immunotherapy

Ex vivo methods for stimulating an immune response can also include engineering a T cell (e.g., in a population of lymphocytes obtained from a subject) to encode a TCR described herein and contacting said engineered T cell with an antigen-presenting cell (APC) expressing an MHC molecule bound to a BCMA peptide recognized by the TCRs described herein (e.g., SEQ ID NO:37) for an amount of time (and under conditions) that is sufficient to activate the engineered T cell (e.g., cytotoxic T cells and/or CD4+ helper T cells). Thus, the disclosure provides methods of generating and/or proliferating BCMA-specific T cells (e.g., cytotoxic T cells and/or CD4+ helper T cells). In some embodiments, the methods involve generating a cell expressing a TCR alpha chain as described herein. In some embodiments, the methods involve generating a cell expressing a TCR beta chain as described herein. In some embodiments, the methods involve generating a cell expressing a TCR alpha chain and a TCR beta chain as described herein. In some embodiments, the methods of generating a cell expressing a TCR alpha chain and/or a TCR beta chain include introducing into the cell (e.g., a T cell) one or more nucleic acids encoding a TCR alpha chain and a TCR beta chain as described herein. In some embodiments, the methods of generating a cell expressing a TCR alpha chain include introducing into the cell (e.g., a T cell) one or more nucleic acids encoding a TCR alpha chain as described herein. In some embodiments, the methods of generating a cell expressing a TCR beta chain include introducing into the cell (e.g., a T cell) one or more nucleic acids encoding a TCR beta chain as described herein.

The methods involve contacting one or more T cells (e.g., cytotoxic T cells and/or CD4+ helper T cells) encoding a TCR described herein with one or more antigen presenting cells pulsed with a BCMA peptide as described herein (e.g., SEQ ID NO:37). These T cells can be cytotoxic T cells, e.g., memory cytotoxic T cells, effector cytotoxic T cells, or CD4+ helper T cells.

The activated T cells can be used kill a target cell. In some embodiments, the methods involve contacting the target cell with one or more BCMA-specific cytotoxic T cells, wherein the target cell expresses or overexpresses BCMA, and expresses HLA-A.

In some embodiments, the BCMA-specific T cells (e.g., cytotoxic T cells and/or CD4+ helper T cells) are administered in combination with a peptide disclosed herein (e.g., one or more of SEQ ID NOs: 37, 39-45, and 47), an APC that presents a BCMA (e.g., SEQ ID NO: 37 or 45) peptide, lenalidomide, an immunomodulatory agent, a checkpoint inhibitor (e.g., anti-LAG3 antibody) or an immune agonist (e.g., anti-OX40, anti-GITR). In some embodiments, the additional therapeutic agent administered with the BCMA-specific CTL T cells is an antibody (e.g., human antibody) the specifically binds to PD-1, CTLA-4, LAG-3, BTLA, PD-L1, CD27, CD28, CD40, CD47, 4-1BB (CD137), CD154, TIGIT, TIM-3, GITR (CD357), OX40, CD20, EGFR, or CD319. In some embodiments, the additional therapeutic agent is an anti-OX40 antibody, an anti-PD-L1 antibody, an anti-PD-L2 antibody, an anti-LAG-3 antibody, an anti-TIGIT antibody, an anti-BTLA antibody, an anti-CTLA-4 antibody, or an anti-GITR antibody. In some embodiments, the T cells are administered in combination with an immune agonist, e.g., an anti-OX40 or anti-GITR antibody.

The activated T cell(s) can also be reintroduced into the subject from which the cells were obtained. In some embodiments, T cells can be obtained from a subject of the same species other than the subject (allogeneic) can be contacted with the reagents (or immunogenic/antigenic compositions) and administered to the subject.

In some embodiments, T cells are derived from in vitro induction in patient-derived peripheral blood mononuclear cells (PBMC). The following protocol can be used to produce antigen specific CTL in vitro from patient derived PBMC. To generate dendritic cells, the plastic adherent cells from PBMCs are cultured in AIM-V medium supplemented with recombinant human GM-CSF and recombinant human IL-4 at 37° C. in a humidified $CO_2$ (5%) incubator. Six days later, the immature dendritic cells in the cultures are stimulated with recombinant human TNF-α for maturation. Mature dendritic cells are then harvested on day 8, resuspended in PBS at $1 \times 10^6$ per mL with peptide (2 μg/mL), and incubated for 2 hours at 37° C. Autologous CD8+ T cells are enriched from PBMCs using magnetic microbeads (Miltenyi Biotech, Auburn, Calif.). CD8+ T cells ($2 \times 10^6$ per well) are co-cultured with $2 \times 10^5$ per well peptide-pulsed dendritic cells in 2 mL/well of AIM-V medium supplemented with 5% human AB serum and 10 units/mL rhIL-7 (Cell Sciences) in each well of 24-well tissue culture plates. About 20 U/ml of IL-2 is added 24 h later at regular intervals, 2 days after each restimulation. On day 7, lymphocytes are restimulated with autologous dendritic cells pulsed with peptide in AIM-V medium supplemented with 5% human AB serum, rhIL-2, and rhIL-7 (10 units/mL each). About 20 U/ml of IL-2 is added 24 h later at regular intervals, 2 days after each restimulation. On the seventh day, after the three rounds of restimulation, cells are harvested and tested the activity of CTL. The stimulated CD8+ cultured cells (CTL) are co-cultured with T2 cells (a human TAP-deficient cell line) pulsed with 2 μg/ml Her-2, gp100, AIM-2, MAGE-1, or IL13 receptor α2 peptides. After 24 hours incubation, IFN-γ in the medium is measured by ELISA assay.

In one embodiment, T cells (e.g., autologous T cells from a human subject) engineered to express a TCR described herein are administered to the subject to treat a BCMA-expressing disease or disorder (e.g., a cancer (e.g., MM), a plasma cell disorder (e.g., Waldenstrom's macroglobulinemia), or another hematological malignancy). In some instances, the T cells are CTLs. In some instances the T cells are activated with the BCMA peptide (e.g., SEQ ID NO:37) prior to introduction into the subject.

Chimeric Antigen Receptor (CAR) T-Cell Based Immunotherapy

The present disclosure further provides methods for adoptive transfer of T cells expressing chimeric antigen receptors for treating a cancer. CAR-modified T cells can be engineered to target virtually any tumor associated antigen (e.g., BCMA). Usually, T cells are genetically engineered to express CARs specifically directed towards antigens on the patient's tumor cells, then infused back into the patient. In some embodiments, the T cells genetically engineered to express CARs are T cell cells described herein (e.g., T cells encoding a TCR described herein).

The common form of CARs are fusions of single-chain variable fragments (scFv), fused to CD3-zeta transmembrane- and endodomain. The scFV can be derived from the antigen-specific receptor of T cells (e.g., BCMA-specific cytotoxic T cells), or antibodies that specifically bind to the antigen. In some embodiments, the TCR used to generate a CAR is a TCR described herein.

In some embodiments, these T cells are collected from the patient. In some embodiments, these T cells are obtained from induced pluripotent stem cell (iPSC).

Viral vectors such as retrovirus, lentivirus or transposon, are often used to integrate the transgene (e.g., CAR) into the host cell genome. Alternatively, non-integrating vectors such as plasmids or mRNA can be used to transfer the CAR gene to the T cells, and make T cells to express CAR under appropriate conditions.

Induced Pluripotent Stem Cell-Approaches

Adoptive T-cell therapy with the administration of a large number of ex vivo expanded activated antigen-specific cytotoxic T lymphocytes (CTL) targeting tumor specific-antigens has induced durable remissions in selected malignancies. Although utilizing TCR which recognize mainly intracellular antigens that have already been processed and presented as peptide complexes with MHC molecules (Johnson et al. 2009; Morgan et al. 2006) may further enhance tumor selectivity, introduction of exogenous TCR genes can result in mismatching of transferred and endogenous $\alpha$ and $\beta$ chains, resulting in serious autoimmune adverse events (Bendle et al. 2010, Hinrichs et al. 2013). In contrast, CAR-T recognize antigens expressed on the cell surface in a non-MHC-restricted manner. To date, the most successful CAR-T therapy targeting the B-cell antigen CD19 has achieved minimal residual disease negative complete responses in patients with relapsed and chemo-refractory B-cell malignancies (Kochenderfer et al. 2010, Grupp et al. 2013). Nonetheless, ongoing efforts are directed to minimize adverse effects, including cytokine release syndrome, and improve durability of response (Brentjens et al. 2011, Kalos et al. 2011, Kochenderfer et al. 2012, Porter et al. 2011). Importantly, CTL continuously exposed to tumor antigens during long-term expansion to be used for TCR-based or CAR-based therapy, may lose their proliferative capacity ("exhausted") and their functional activity with terminal differentiation.

To overcome these limitations, a technique currently being developed is exploitation of fully rejuvenated CTL from "induced pluripotent stem cells (iPSC)". These iPSC are a special type of pluripotent cell that are derived from adult somatic cells upon ectopic expression of a set of defined transcription factors. Importantly, tumor antigen-specific CTL can be reprogrammed by iPSC technology from antigen-specific CTL (Vizcardo et al. 2013, Ando et al. 2015, Timmermans et al. 2009, Kennedy et al. 2012). These iPSC-CTL are functionally rejuvenated and demonstrate longer telomeres (1.5 fold increase) and a higher proliferative capacity (5-50 fold increase) than the original CTL from which they were derived (Nishimura et al. 2013). This powerful reprogramming therapeutic approach has the potential to markedly increase the efficacy and durability of antigen-specific cancer immunotherapy. Thus, the disclosure provides methods of rejuvenating cytotoxic T cells. In some embodiments, the methods can increase the proliferative capacity by at least 5, 6, 7, 8, 9, 10, 20, 30, 40, 50, 60, 70, 80, 90, or 100 folds.

Activation of tumor-specific CTLs is the main goal of many cancer immunotherapies. The isolation of tumor-specific T-cells from a cancer patient, in vitro preparation (activation and expansion), and transfusion of these T-cells to the patient are basic steps of adaptive immunotherapy with T-cell. iPSC technology can be used to improve the efficacy of adoptive cell transfer immunotherapy (ACT).

The iPSC can be obtained from differentiated cells (e.g., fibroblasts, immune cells, T cells, B cells) induced through retroviral transfection of Yamanaka factors (a combination of Oct3/4, Sox2, Klf4, and c-Myc), and differentiated into T-cell lineages by culturing it on monolayer OP9-DL1 cell system in addition to Flt-3 ligand and IL-7.

In some embodiments, iPSCs can be generated from T-cells. After the expansion, these cells are differentiated again into T-cells. Human T lymphocyte can act as cell source for iPSC generation. Peripheral blood mononuclear cells (PBMCs) can be separated from whole blood by leukapheresis or venipuncture and then CD3+ T-cells can be expanded by stimulation with IL-2 and anti-CD3 antibody. T-cell-derived iPSCs (TiPS) can be generated from activated T-cell when exposed to retroviral transduction of the reprogramming factors. These T-iPSCs preserve their original T-cell receptor (TCR) gene rearrangements, so they can be used as an unlimited source of hematopoietic stem cells bearing endogenous tumor-specific TCR gene for cancer ACT therapy.

Thus, in some embodiments, iPSCs are generated from antigen-specific cytotoxic T cells. These antigen-specific T cells are generated by the methods as described herein, e.g., engineering the T cells to encode a TCR described herein. Thus, provided herein are iPSCs encoding a TCR described herein. As the T-iPSCs preserve their original T-cell receptor (TCR) gene rearrangements, after these T-iPSCs differentiates into T cells, these T cells can recognize BCMA on a cancer cell.

In some embodiments, a nucleic acid that encodes CAR that specifically recognizes BCMA can be introduced into T-iPSCs. Once after these T-iPSCs differentiates into T cells, these T cells can recognize BCMA on a cancer cell.

In some embodiments, the differentiated T cells are administered to a subject. In some embodiments, T-iPSCs are administered to a subject, and then these cells are differentiated into cytotoxic T cells in the body of the subject.

Subjects

The subject can be any animal capable of an immune response to an antigen. The terms "subject" and "patient" are used interchangeably throughout the specification and describe an animal, human or non-human, to whom treatment according to the methods of the present disclosure is provided. Veterinary and non-veterinary applications are contemplated by the present invention. Human patients can be adult humans or juvenile humans (e.g., humans below the age of 18 years old). In addition to humans, subjects include but are not limited to mice, rats, hamsters, guinea-pigs, rabbits, ferrets, cats, dogs, and primates. Included are, for example, non-human primates (e.g., monkey, chimpanzee, gorilla, and the like), rodents (e.g., rats, mice, gerbils, hamsters, ferrets, rabbits), lagomorphs, swine (e.g., pig, miniature pig), equine, canine, feline, bovine, and other domestic, farm, and zoo animals.

The subject can be one having, suspected of having, or at risk of developing a cancer. As used herein, the term "cancer" refers to cells having the capacity for autonomous growth, i.e., an abnormal state or condition characterized by rapidly proliferating cell growth. The term is meant to include all types of cancerous growths or oncogenic processes, metastatic tissues or malignantly transformed cells, tissues, or organs, irrespective of histopathologic type or stage of invasiveness. The term "tumor" as used herein refers to cancerous cells, e.g., a mass of cancerous cells. Cancers that can be treated or diagnosed using the methods described herein include malignancies of the various organ systems, such as affecting lung, breast, thyroid, lymphoid, gastrointestinal, and genito-urinary tract, as well as adenocarcinomas which include malignancies such as most colon cancers, renal-cell carcinoma, prostate cancer and/or testicular tumors, non-small cell carcinoma of the lung, cancer of the small intestine and cancer of the esophagus. In some embodiments, the agents described herein are designed for treating or diagnosing a carcinoma in a subject. The term "carcinoma" is art recognized and refers to malignancies of epithelial or endocrine tissues including respiratory system carcinomas, gastrointestinal system carcinomas, genitourinary system carcinomas, testicular carcinomas, breast carcinomas, prostatic carcinomas, endocrine system carcinomas, and melanomas. In some embodiments, the cancer is renal carcinoma or melanoma. Exemplary carcinomas include those forming from tissue of the cervix, lung, prostate, breast, head and neck, colon and ovary. The term also includes carcinosarcomas, e.g., which include malignant tumors composed of carcinomatous and sarcomatous tissues. An "adenocarcinoma" refers to a carcinoma derived from glandular tissue or in which the tumor cells form recognizable glandular structures. The term "sarcoma" is art recognized and refers to malignant tumors of mesenchymal derivation. In some embodiments, the subject has a hematological cancer, e.g., multiple myeloma, leukemia, non-Hodgkin lymphoma, or Hodgkin lymphoma.

In some embodiments, the subject has a BCMA-expressing/overexpressing disease, including e.g., multiple myeloma, B cell-related malignancies, plasma cell-related malignancies, a pre-malignant disease (e.g., a pre-malignant disease of MM, such as SMM or MGUS). In some embodiments, the BCMA-expressing/overexpressing disease expresses a level of BCMA that is at least 20%, at least 30%, at least 40%, at least 50%, at least 60%, at least 70%, at least 80%, at least 90%, or at least 100% more than a level of BCMA in a normal (e.g., non-diseased) cell. In some embodiments, the BCMA-expressing/overexpressing disease expresses a level of BCMA that is at least 20% more than a level of BCMA in a normal (e.g., non-diseased) cell.

In some embodiments, the subject can be one having, suspected of having, or at risk of developing a plasma cell disorder. As used herein, the term "plasma cell to disorders" refer to a group of diseases or disorders characterized by clonal plasma cell (PC) proliferation and hyper-secretion of paraproteins (e.g., monoclonal immunoglobulin and/or free light chain (FLC)).

Non-limiting examples of plasma cell disorders include monoclonal gammopathy of undermined significance (MGUS), multiple myeloma (MM), Waldenström macroglobulinemia (WM), light chain amyloidosis (AL), solitary plasmacytoma (e.g., solitary plasmacytoma of bone, or extramedullary plasmacytoma), polyneuropathy, organomegaly, endocrinopathy monoclonal gammopathy and skin changes syndrome (POEMS), and heavy-chain disease. Other plasm cell disorders include, e.g., Monoclonal Gammopathy of Renal Significance (MGRS), MGUS-associated neuropathy, and other paraproteinemic neuropathy.

MGUS, smoldering MM (SMM), and symptomatic MM represent a spectrum of the same disease. Symptomatic or active multiple myeloma is characterized by more than 10% BM infiltration by clonal plasma cells and/or biopsy proven plasmacytoma in addition to any level of monoclonal protein and the presence of end-organ damage that consists of a myeloma defining event in the form of any of the CRAB criteria (hypercalcemia, renal insufficiency, anemia, or bone lesions which are deemed related to the plasma cell clone) or any of the new biomarker of malignancy (BM involvement by equal or greater than 60% clonal plasma cell; a ratio of involved versus uninvolved FLC equal or exceeding 100; and/or the presence of more than one bone lesion on MRI (Kyle R. A. et al., Leukemia, 23: 3-9 (2009); Rajkumar V. S. et al, Lancet Oncology, 15: 12, 2014). MM is a plasma cell malignancy that characteristically involves extensive infiltration of bone marrow (BM), and occasionally the formation of plasmacytoma, as discrete clusters of malignant plasma cells inside or outside of the BM space (Kyle R. A. et al., *N. Engl. J. Med.*, 351: 1860-73 (2004)). Consequences of this disease are numerous and involve multiple organ systems. Disruption of BM and normal plasma cell function leads to anemia, leukopenia, hypogammaglobulinemia, and thrombocytopenia, which variously result in fatigue, increased susceptibility to infection, and, less commonly, increased tendency to bleed. Disease involvement in bone creates osteolytic lesions, produces bone pain, and may be associated with hypercalcemia (Kyle R. A. et al., *Blood*, 111: 2962-72 (2008)).

Smoldering MM (SMM) is characterized by having a serum immunoglobulin (Ig) G or IgA monoclonal protein of 30 g/L or higher and/or 10% or more plasma cells in the bone marrow but no evidence of end-organ damage or malignancy-defining biomarkers (Rajkumar et al, *Lancet*, 2014). A study of the natural history of SMM suggests that there are 2 different types: evolving smoldering MM and non-evolving Smoldering MM (Dimopoulos M. et al., *Leukemia*, 23(9): 1545-56 (2009)). Evolving SMM is characterized by a progressive increase in M protein and a shorter median time to progression (TTP) to active multiple myeloma of 1.3 years. Non-evolving SMM has a more stable M protein that may then change abruptly at the time of progression to active multiple myeloma, with a median TTP of 3.9 years.

Monoclonal gammopathy of undetermined significance (MGUS), is a condition in which an abnormal immunoglobin protein (known as a paraprotein) is found in the blood during standard laboratory blood tests. MGUS resembles multiple myeloma and similar diseases, but the levels of antibody are lower, the number of plasma cells (white blood cells that secrete antibodies) in the bone marrow is lower, and it has no symptoms or major problems.

In some embodiments, the subject has multiple myeloma, SMM, or MGUS. In some embodiments, the subject can be one in remission from multiple myeloma. In some embodiments, the subject has a pre-malignant disease (e.g., a pre-malignant disease of MM, such as SMM or MGUS).

In some embodiments, the subject can have a type of cancer that expresses or overexpress BCMA. Thus, the methods can also include the step of, prior to administering the TCR(s) (or nucleic acids) or compositions thereof to the subject, determining whether one or more cancer cells of the subject's cancer (e.g., multiple myeloma) express or overexpress BCMA. Expression of BCMA includes both mRNA and protein expression. Methods for detecting protein and mRNA expression in a cell are known in the art and include, e.g., enzyme-linked immunosorbent assay (ELISA), western and dot-blotting techniques, or immunohistochemistry techniques for detecting protein and reverse transcription-polymerase chain reaction (RT-PCR) or northern-blotting techniques for detecting mRNA. In some embodiments, the average level of expression of BCMA in the cancer cell is at least 20%, 30%, 40%, 50%, 60%, 70%, 80%, 90%, 100% higher than the average level of expression of BCMA in a normal cell (e.g., a normal tissue cell in the same subject, a normal plasma cell in the same subject, or a tissue cell or a plasma cell in a healthy subject). In some embodiments, the average level of expression of BCMA in the cancer cell is at least 2 fold, 3 fold, 5 fold, 10 fold, 20 fold, or 50 fold higher than the average level of expression of BCMA in a normal cell (e.g., a normal tissue cell in the same subject, a normal plasma cell in the same subject, or a tissue cell or a plasma cell in a healthy subject).

The subject can have, be suspected of having, or be at risk of developing a cancer (e.g., multiple myeloma). A subject "suspected of having a cancer" is one having one or more symptoms of a cancer. Symptoms of cancer are well-known to those of skill in the art and generally include, without limitation, pain, weight loss, weakness, excessive fatigue, difficulty eating, loss of appetite, chronic cough, worsening breathlessness, coughing up blood, blood in the urine, blood in stool, nausea, vomiting, abdominal fullness, bloating, fluid in peritoneal cavity, vaginal bleeding, constipation, abdominal distension, perforation of colon, acute peritonitis (infection, fever, pain), pain, vomiting blood, heavy sweating, fever, high blood pressure, anemia, diarrhea, jaundice, dizziness, chills, muscle spasms, difficulty swallowing, and the like. Symptoms of multiple myeloma specifically include, e.g., bone pain (e.g., in the back or ribs), high levels of calcium in the blood, excessive thirst or urination, constipation, nausea, loss of appetite, confusion, weakness or numbness in the legs, weight loss, or repeated infections.

As used herein, a subject "at risk of developing a cancer" is a subject that has a predisposition to develop a cancer, i.e., a genetic predisposition to develop cancer such as a mutation in a tumor suppressor gene (e.g., mutation in BRCA1, p53, RB, or APC), has been exposed to conditions, or is presently affected by conditions, that can result in cancer. Thus, a subject can also be one "at risk of developing a cancer" when the subject has been exposed to mutagenic or carcinogenic levels of certain compounds (e.g., carcinogenic compounds in cigarette smoke such as acrolein, 4-aminobiphenyl, aromatic amines, benzene, benz{a}anthracene, benzo{a}pyrene, formaldehyde, hydrazine, Polonium-210 (Radon), urethane, or vinyl chloride). The subject can be "at risk of developing a cancer" when the subject has been exposed to, e.g., large doses of ultraviolet light or X-irradiation, or exposed (e.g., infected) to a tumor-causing/associated virus such as papillomavirus, Epstein-Barr virus, hepatitis B virus, or human T-cell leukemia-lymphoma virus. In addition, a subject can be "at risk of developing a cancer" when the subject suffers from an inflammation (e.g., chronic inflammation). A subject can be at risk of developing multiple myeloma if, e.g., the subject has monoclonal gammopathy of undetermined significance (MGUS). Thus, it is understood that subjects "suspected of having a cancer" or "at risk of developing a cancer" are not all the subjects within a species of interest.

In some embodiments, the methods can also include the step of determining whether a subject has a cancer. Suitable methods for such a determination depend on the type of cancer to be detected in the subject, but are known in the art. Such methods can be qualitative or quantitative. For example, a medical practitioner can diagnose a subject as having multiple myeloma when the subject exhibits two or more (e.g., three, four, five, or six or more) symptoms of multiple myeloma such as any of those described herein. A subject can also be determined to have multiple myeloma by measuring the blood calcium level, the white or red blood cell count, or the amount of protein in the urine of a subject.

Immunological Testing

The antigen-specific cellular immune responses of vaccinated subjects can be monitored by a number of different assays, such as tetramer assays, ELISPOT, and quantitative PCR. These methods and protocols are described, e.g., in *Current Protocols in Immunology*, Coligan, J. et al., Eds., (John Wiley & Sons, Inc.; New York, N.Y.).

A tetramer assay can be used to detect and quantify T-cells that are specific for a given antigen within a blood sample. Tetramers comprised of recombinant MHC molecules complexed with peptide can be used to identify populations of antigen-specific T cells. To detect T cells specific for antigens, fluorochrome labeled specific peptide tetramer complexes (e.g., phycoerythrin (PE)-tHLA) containing peptides from these antigens are synthesized and provided by Beckman Coulter (San Diego, Calif.). Specific CTL clone CD8 cells are resuspended at $10^5$ cells/50 µl FACS buffer (phosphate buffer plus 1% inactivated FCS buffer). Cells are incubated with 1 µl tHLA for 30 minutes at room temperature and incubation is continued for 30 minutes at 4° C. with 10 µl anti-CD8 mAb (Becton Dickinson, San Jose, Calif.). Cells are washed twice in 2 ml cold FACS buffer before analysis by FACS (Becton Dickinson).

ELISPOT assays can be used to detect cytokine secreting cells, e.g., to determine whether cells in a vaccinated patient secrete cytokine in response to antigen, thereby demonstrating whether antigen-specific responses have been elicited. ELISPOT assay kits are supplied from R & D Systems (Minneapolis, Minn.) and performed as described by the manufacturer's instructions. Responder (R) $1 \times 10^5$ patients' PBMC cells from before and after vaccination are plated in 96-well plates with nitrocellulose membrane inserts coated with capture Ab. Stimulator (S) cells (TAP-deficient T2 cells pulsed with antigen) are added at the R:S ratio of 1:1. After a 24-hour incubation, cells are removed by washing the plates 4 times. The detection Ab is added to each well. The plates are incubated at 4° C. overnight and the washing steps will be repeated. After a 2-hour incubation with streptavidin-AP, the plates are washed. Aliquots (100 µl) of BCIP/NBT chromogen are added to each well to develop the spots. The reaction is stopped after 60 min by washing with water. The spots are scanned and counted with computer-assisted image analysis (Cellular Technology Ltd, Cleveland, Ohio). When experimental values are significantly different from the mean number of spots against non-pulsed T2 cells (background values), as determined by a two-tailed Wilcoxon rank sum test, the background values are subtracted from the experimental values.

Quantitative PCR is another means for evaluating immune responses. To examine IFN-γ production in patients by quantitative PCR, cryopreserved PBMCs from patients' pre-vaccination and post-vaccinations samples and autologous dendritic cells are thawed in RPMI DC culture medium with 10% patient serum, washed and counted. PBMC are plated at $3 \times 10^6$ PBMCs in 2 ml of medium in 24-well plate; dendritic cells are plated at $1 \times 10^6$/ml and are pulsed 24 hour with 10 µg/ml tumor peptide in 2 ml in each well in 24 well plate. Dendritic cells are collected, washed, and counted, and diluted to $1 \times 10^6$/ml, and $3 \times 10^5$ (i.e., 300 µl solution) added to wells with PBMC (DC:PBMC=1:10). 2.3 µl IL-2 (300 IU/mL) is added every 3-4 days, and the cells are harvested between day 10 and day 13 after initiation of the culture. The harvested cells are then stimulated with tumor cells or autologous PBMC pulsed with 10 µg/ml tumor peptide for 4 hours at 37° C. On days 11-13, cultures are harvested, washed twice, then divided into four different wells, two wells using for control (without target); and another two wells CTL co-cultured with tumor cells (1:1) if tumor cells are available. If tumor cells are not available, 10 µg/ml tumor lysate is added to CTL. After 4 hours of stimulation, the cells are collected, RNA extracted, and IFN-γ and CD8 mRNA expression evaluated with a thermocycler/fluorescence camera system. PCR amplification efficiency follows natural log progression, with linear regression analyses demonstrating correlation co-efficients in excess of 0.99. Based on empirical analysis, a one-cycle difference is interpreted to be a two-fold difference in mRNA quantity, and CD8-normalized IFN-γ quantities are determined. An increase of >1.5-fold in post-vaccine relative to pre-vaccine IFN-γ is the established standard for positive type I vaccine responsiveness.

Methods for Selecting a Therapy

Methods for selecting a therapy for a subject with a cancer (e.g., a plasma cell disorder such as multiple myeloma or any cancer in which BCMA is expressed or overexpressed) include the steps of: optionally, determining whether one or more cancer cells of the subject express or over express BCMA; and if one or more cells express BCMA, selecting as a therapy for the subject a composition containing a TCR described herein (a TCR comprising a TCR alpha chain comprising the amino acid sequence of any one of SEQ ID NOs: 27-34 and a TCR beta chain comprising the amino acid sequence of any one of SEQ ID NOs: 19-26, a TCR comprising a TCR alpha chain comprising an amino acid sequence that is at least 90%, 91%, 92%, 93%, 94%, 95%, 96%, 97%, 98%, or 99% identical to any one of SEQ ID NOs: 27-34 and a TCR beta chain comprising an amino acid sequence that is at least 90%, 91%, 92%, 93%, 94%, 95%, 96%, 97%, 98%, or 99% identical to any one of SEQ ID NOs: 19-26, or a TCR comprising a TCR alpha chain having no more than 10 substitutions of the amino acid sequence of any one of SEQ ID NOs: 17-34 and a TCR beta chain having no more than 10 substitutions of the amino acid sequence of any one of SEQ ID NOs: 19-26), provided that the amino acid sequence is capable of: (i) inducing in the subject an immune response; (ii) binding to a BCMA peptide of SEQ ID NO:37.

In some embodiments, the methods further include the steps of determine whether one or more cancer cells of the subject express a MHC molecule, e.g., an MHC class I molecule (e.g., HLA-A2), or an MHC class II molecule.

Methods for determining whether one or more cells express BCMA and/or a MHC molecule are known in the art. For example, a biological sample (e.g., a blood sample or lymph node tissue sample) obtained from a subject can be tested using a BCMA-specific antibody made by a method described herein to detect the presence or amount of an BCMA polypeptide expressed by a cell (or cell lysate). Methods for assaying a biological sample for the presence or amount of a polypeptide include, e.g., ELISA, immunohistochemistry, flow cytometry, western-blotting, or dot-blotting assays. In some embodiments, any of the methods described herein can also include the step of providing a biological sample from a subject and/or obtaining a biological sample from a subject. Suitable biological samples for the methods described herein include any biological fluid, cell, tissue, or fraction thereof, which includes analyte proteins of interest. A biological sample can be, for example, a specimen obtained from a subject or can be derived from such a subject. For example, a sample can be a tissue section obtained by biopsy, or cells that are placed in or adapted to tissue culture. A biological sample can also be a cell-containing biological fluid such as urine, blood, plasma, serum, saliva, semen, sputum, cerebral spinal fluid, tears, mucus or an aspirate (e.g., a lung or breast nipple aspirate), or such a sample absorbed onto a paper or polymer substrate. A biological sample can be further fractionated, if desired, to a fraction containing particular cell types. For example, a blood sample can be fractionated into serum or into fractions containing particular types of blood cells such as red blood cells or white blood cells (leukocytes). If desired, a sample can be a combination of sample types from a subject such as a combination of a tissue and biological fluid.

The biological samples can be obtained from a subject, e.g., a subject having, suspected of having, or at risk of developing, a cancer (e.g., multiple myeloma). Any suitable methods for obtaining the biological samples can be employed, although exemplary methods include, e.g., phlebotomy, swab (e.g., buccal swab), aspiration, or fine needle aspirate biopsy procedure. Non-limiting examples of tissues susceptible to fine needle aspiration include lymph node, lung, thyroid, breast, and liver. Samples can also be collected, e.g., by microdissection (e.g., laser capture microdissection (LCM) or laser microdissection (LMD)), bladder wash, smear (PAP smear), or ductal lavage.

A medical practitioner can also select, prescribe and/or administer one or more additional therapeutic agents to treat a cancer or one or more medicaments to treat side-effects of an anti-cancer agent. Suitable chemotherapeutic agents for treating multiple myeloma include, e.g., melphalan, cyclophosphamide, vincristine, doxorubicin, prednisone, dexamethasone, proteosome inhibitors (e.g., bortezomib), thalidomide, or lenalidomide. Side effects of anti-cancer agents include, e.g., anemia, gastrointestinal symptoms (e.g., nausea, vomiting, diarrhea), leukopenia (decreased number of white blood cells, which may cause infection), temporary hair loss, or thrombocytopenia (decreased number of platelets, which may cause bleeding). Thus, a medical practitioner can prescribe or administer to a subject a chemotherapeutic agent such as vincristine along with an anti-anemia medication such as epoetin alpha (e.g., Procrit® or Epogen®).

Nucleic Acid Vaccines

The present disclosure provides Nucleic Acid Vaccines (NAVs) comprising one or more polynucleotides, e.g., polynucleotide constructs, which encode one or more polypeptides as described herein. Exemplary polynucleotides include e.g., polynucleotide constructs, include DNA, RNA, antigen-encoding RNA polynucleotides, e.g., mRNAs. In some embodiments, the polynucleotides, e.g., TCR-encoding RNA polynucleotides, can include at least one chemical modification. In some embodiments, the nucleic acid vaccines can be formulated within a polymeric or liposomal nanocarrier (e.g., a nanoparticle). In some embodiments, the NAV comprises one or more nucleic acid sequences encoding a TCR described herein, and one or more nucleic acid sequences encoding a second polypeptide.

In some embodiments, adjuvants or immune potentiators, can also be administered with or in combination with one or more NAVs. In some embodiments, an adjuvant acts as a co-signal to prime T-cells and/or B-cells and/or NK cells.

NAVs can vary in their valency. Valency refers to the number of antigenic components in the NAV or NAV polynucleotide (e.g., RNA polynucleotide) or polypeptide. In some embodiments, the NAVs are monovalent. In some embodiments, the NAVs are divalent. In some embodiments, the NAVs are trivalent. In some embodiments the NAVs are multi-valent. Multivalent vaccines can comprise 2, 3, 4, 5, 6, 7, 8, 9, 10, 11, 12, 13, 14, 15, 16, 17, 18, 19, 20, or more antigens or antigenic moieties (e.g., antigenic peptides, etc.). The antigenic components of the NAVs can be on a single polynucleotide or on separate polynucleotides.

The NAVs can be used as therapeutic or prophylactic agents. They are provided for use in medicine and/or for the priming of immune effector cells, e.g., stimulate/transfect peripheral blood mononuclear cells (PBMCs) ex vivo and re-infuse the activated cells. For example, a NAV described herein can be administered to a subject, wherein the polynucleotides is translated in vivo to produce a TCR. Provided are compositions, methods, kits, and reagents for diagnosis, treatment or prevention of a disease or condition in humans and other mammals. The active therapeutic agents can include NAVs, cells containing NAVs or polypeptides translated from the polynucleotides contained in said NAVs.

Provided herein are methods of inducing translation of a polypeptide (e.g., a TCR) in a cell, tissue or organism using the polynucleotides of the NAVs described herein. Such translation can be in vivo, ex vivo, in culture, or in vitro. The cell, tissue or organism is contacted with an effective amount of a composition containing a NAV which contains a polynucleotide that has at least one a translatable region encoding the polypeptide of interest (e.g., TCR).

An "effective amount" of the NAV composition is provided based, at least in part, on the target tissue, target cell type, means of administration, physical characteristics of the polynucleotide (e.g., size, and extent of modified nucleosides) and other components of the NAV, and other determinants. In general, an effective amount of the NAV composition provides an induced or boosted immune response as a function of antigen production in the cell, preferably more efficient than a composition containing a corresponding unmodified polynucleotide encoding the same antigen. Increased antigen production can be demonstrated by increased cell transfection (i.e., the percentage of cells transfected with the NAV), increased protein translation from the polynucleotide, decreased nucleic acid degradation (as demonstrated, e.g., by increased duration of protein translation from a modified polynucleotide), or altered innate immune response of the host cell.

The present disclosure also provides methods of inducing in vivo translation of a polypeptide (e.g., TCR) in a mammalian subject in need thereof. Therein, an effective amount of a NAV composition containing a polynucleotide that has at least one structural or chemical modification and a translatable region encoding the polypeptide (e.g., TCR) is administered to the subject using the delivery methods described herein. The polynucleotide is provided in an amount and under other conditions such that the polynucleotide is translated in the cell. The cell in which the polynucleotide is localized, or the tissue in which the cell is present, can be targeted with one or more than one rounds of NAV administration.

The proteins (e.g., TCRs) described herein can be engineered for localization within the cell, potentially within a specific compartment such as the cytoplasms or nucleus, or are engineered for secretion from the cell or translocation to the plasma membrane of the cell.

In some embodiments, the nucleic acid (e.g., DNA, RNA) can have one or more modifications. In some embodiments, the nucleic acid molecule (e.g., an RNA molecule) as defined herein can contain nucleotide analogues/modifications, e.g. backbone modifications, sugar modifications or base modifications. A backbone modification in connection with the present invention is a modification, in which phosphates of the backbone of the nucleotides contained in a nucleic acid molecule as defined herein are chemically modified. A sugar modification in connection with the present invention is a chemical modification of the sugar of the nucleotides of the nucleic acid molecule as defined herein. Furthermore, a base modification in connection with the present invention is a chemical modification of the base moiety of the nucleotides of the nucleic acid molecule of the nucleic acid molecule. In this context, nucleotide analogues or modifications are preferably selected from nucleotide analogues which are applicable for transcription and/or translation.

The modified nucleosides and nucleotides, which can be incorporated into the nucleic acid molecule can be modified in the sugar moiety. For example, the 2' hydroxyl group (OH) of an RNA molecule can be modified or replaced with a number of different "oxy" or "deoxy" substituents. Examples of "oxy"-2' hydroxyl group modifications include, but are not limited to, alkoxy or aryloxy (—OR, e.g., R═H, alkyl, cycloalkyl, aryl, aralkyl, heteroaryl or sugar); polyethyleneglycols (PEG), —O(CH$_2$CH$_2$O)nCH$_2$CH$_2$OR; "locked" nucleic acids (LNA) in which the 2' hydroxyl is connected, e.g., by a methylene bridge, to the 4' carbon of the same ribose sugar; and amino groups (—O-amino, wherein the amino group, e.g., NRR, can be alkylamino, dialkylamino, heterocyclyl, acylamino, diarylamino, heteroarylamino, or diheteroaryl amino, ethylene diamine, polyamino) or aminoalkoxy.

The sugar group can also contain one or more carbons that possess the opposite stereochemical configuration than that of the corresponding carbon in ribose. Thus, a modified nucleic acid molecule can include nucleotides containing, for instance, arabinose as the sugar.

The phosphate backbone can further be modified in the modified nucleosides and nucleotides, which can be incorporated into the nucleic acid molecule (e.g., an RNA) as described herein. The phosphate groups of the backbone can be modified by replacing one or more of the oxygen atoms with a different substituent. Further, the modified nucleosides and nucleotides can include the full replacement of an unmodified phosphate moiety with a modified phosphate as described herein. Examples of modified phosphate groups include, but are not limited to, phosphorothioate, phosphoroselenates, borano phosphates, borano phosphate esters, hydrogen phosphonates, phosphoroamidates, alkyl or aryl phosphonates and phosphotriesters. Phosphorodithioates have both non-linking oxygens replaced by sulfur. The phosphate linker can also be modified by the replacement of a linking oxygen with nitrogen (bridged phosphoroamidates), sulfur (bridged phosphorothioates) and carbon (bridged methylene-phosphonates).

The modified nucleosides and nucleotides, which can be incorporated into the nucleic acid molecule (e.g., an RNA molecule) as described herein, can further be modified in the nucleobase moiety. Examples of nucleobases found in RNA include, but are not limited to, adenine, guanine, cytosine and uracil. For example, the nucleosides and nucleotides described herein can be chemically modified on the major groove face. In some embodiments, the major groove chemical modifications can include an amino group, a thiol group, an alkyl group, or a halo group.

In some embodiments, the nucleotide analogues/modifications are selected from base modifications, which can be selected, e.g., from 2-amino-6-chloropurineriboside-5'-triphosphate, 2-Aminopurine-riboside-5'-triphosphate; 2-aminoadenosine-5'-triphosphate, 2'-Amino-2'-deoxycytidine-triphosphate, 2-thiocytidine-5'-triphosphate, 2-thiouridine-5'-triphosphate, 2'-Fluorothymidine-5'-triphosphate, 2'-O-Methyl inosine-5'-triphosphate 4-thiouridine-5'-triphosphate, 5-aminoallylcytidine-5'-triphosphate, 5-aminoallyluridine-5'-triphosphate, 5-bromocytidine-5'-triphosphate, 5-bromouridine-5'-triphosphate, 5-Bromo-2'-deoxycytidine-5'-triphosphate, 5-Bromo-2'-deoxyuridine-5'-triphosphate, 5-iodocytidine-5'-triphosphate, 5-Iodo-2'-deoxycytidine-5'-triphosphate, 5-iodouridine-5'-triphosphate, 5-Iodo-2'-deoxyuridine-5'-triphosphate, 5-methylcytidine-5'-triphosphate, 5-methyluridine-5'-triphosphate, 5-Propynyl-2'-deoxycytidine-5'-triphosphate, 5-Propynyl-2'-deoxyuridine-5'-triphosphate, 6-azacytidine-5'-triphosphate, 6-azauridine-5'-triphosphate, 6-chloropurineriboside-5'-triphosphate, 7-deazaadenosine-5'-triphosphate, 7-deazaguanosine-5'-triphosphate, 8-azaadenosine-5'-triphosphate, 8-azidoadenosine-5'-triphosphate, benzimidazole-riboside-5'-triphosphate, N1-methyladenosine-5'-triphosphate, N1-methylguanosine-5'-triphosphate, N6-methyladenosine-5'-triphosphate, O6-methylguanosine-5'-triphosphate, pseudouridine-5'-triphosphate, or puromycin-5'-triphosphate, xanthosine-5'-triphosphate. Particular preference is given to nucleotides for base modifications selected from the group of base-modified nucleotides consisting of 5-methylcytidine-5'-triphosphate, 7-deazaguanosine-5'-triphosphate, 5-bromocytidine-5'-triphosphate, and pseudouridine-5'-triphosphate.

In some embodiments, the nucleic acid molecule can be modified by the addition of a so-called "5' CAP" structure. A 5'-cap is an entity, typically a modified nucleotide entity, which generally "caps" the 5'-end of a mature mRNA. A 5'-cap can typically be formed by a modified nucleotide, particularly by a derivative of a guanine nucleotide. Preferably, the 5'-cap is linked to the 5'-terminus via a 5'-5'-triphosphate linkage. A 5'-cap can be methylated, e.g. m7GpppN, wherein N is the terminal 5' nucleotide of the nucleic acid carrying the 5'-cap, typically the 5'-end of an RNA. m7GpppN is the 5'-CAP structure which naturally occurs in mRNA transcribed by polymerase II and is therefore not considered as modification comprised in the modified RNA according to the invention.

How to make and use nucleic acid vaccines are described, e.g., in U.S. Pat. Appl. Publ. Nos. 2007/0269451, 2016/0317647, 2017/002984 and U.S. Pat. No. 9,872,900, each of which is incorporated herein by reference in its entirety.

Pharmaceutical Compositions

Any of the TCRs (or portions thereof (e.g., TCR alpha and/or beta chains)), nucleic acids encoding the peptides, and cells described herein can be incorporated into pharmaceutical compositions. The compositions can include one or more of the TCRs (and/or nucleic acids encoding the TCRs) and a pharmaceutically acceptable carrier. As used herein the language "pharmaceutically acceptable carrier" includes solvents, dispersion media, coatings, antibacterial and antifungal agents, isotonic and absorption delaying agents, and the like, compatible with pharmaceutical administration. One or more TCRs can be formulated as a pharmaceutical composition in the form of a syrup, an elixir, a suspension, a powder, a granule, a tablet, a capsule, a lozenge, a troche, an aqueous solution, a cream, an ointment, a lotion, a gel, an emulsion, etc. Supplementary active compounds (e.g., one or more chemotherapeutic agents) can also be incorporated into the compositions.

A pharmaceutical composition is generally formulated to be compatible with its intended route of administration. Examples of routes of administration include oral, rectal, and parenteral, e.g., intravenous, intramuscular, intradermal, subcutaneous, inhalation, transdermal, or transmucosal. Solutions or suspensions used for parenteral application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The compositions can be enclosed in ampoules, disposable syringes or multiple dose vials made of glass or plastic.

Pharmaceutical compositions suitable for injectable use include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, N.J.) or phosphate buffered saline (PBS). In all cases, the pharmaceutical composition must be sterile and should be fluid to the extent that easy syringability exists. It should be stable under the conditions of manufacture and storage and must be preserved against any contamination by microorganisms such as bacteria and fungi. The carrier can be a solvent or dispersion medium containing, for example, water, ethanol, polyol (for example, glycerol, propylene glycol, and liquid polyetheylene glycol, and the like), and suitable mixtures thereof. The proper fluidity can be maintained, for example, by the use of a coating such as lecithin, by the maintenance of the required particle size in the case of dispersion and by the use of surfactants. Prevention of contamination by microorganisms can be achieved by various antibacterial and antifungal agents, for example, parabens, chlorobutanol, phenol, ascorbic acid, thimerosal, and the like. In many cases, it will be desirable to include isotonic agents, for example, sugars, polyalcohols such as manitol, sorbitol, sodium chloride in the composition. Prolonged absorption of the injectable compositions can be facilitated by including in the composition an agent that delays absorption, for example, aluminum monostearate and gelatin.

Sterile injectable solutions can be prepared by incorporating one or more of the TCRs (or one or more the nucleic acids encoding the TCRs) in the required amount in an appropriate solvent with one or a combination of ingredients, as required, followed by filtered sterilization. Generally, dispersions are prepared by incorporating the TCR(s) (or nucleic acid(s) encoding the TCR(s)) into a sterile vehicle which contains a basic dispersion medium and the required other ingredients from those enumerated above. In the case of sterile powders for the preparation of sterile injectable solutions, the methods of preparation can include vacuum drying or freeze-drying which yields a powder of the active ingredient plus any additional desired ingredient from a previously sterile-filtered solution thereof.

Oral compositions generally include an inert diluent or an edible carrier. For the purpose of oral therapeutic administration, the one or more TCRs can be incorporated with excipients and used in the form of tablets, troches, or capsules, e.g., gelatin capsules. Oral compositions can also be prepared using a fluid carrier for use as a mouthwash. Pharmaceutically compatible binding agents, immune stimulatory agents, adjuvant, and/or checkpoint inhibitor or immune agonist materials can be included as part of the composition. The adjuvant can be selected from the group consisting of Freund's complete adjuvant, Freund's incomplete adjuvant, alum, a ligand for a Toll receptor, QS21, RIBI, cholera toxin (CT), E. coli heat labile toxin (LT), mutant CT (MCT), mutant E. coli heat labile toxin (MLT), and a toll like receptor-3 ligand (e.g., Poly ICLC). In some embodiments, the adjuvant is POLY ICLC. In some embodiments, the adjuvant is Freund's incomplete adjuvant. The immune stimulatory agent can be selected from the group consisting of lenalidomide, pomalidomide, a Thalidomide analogue, IMiDS compound, and/or HDAC inhibitors (e.g., ACY241) as a single agent and/or in combination with Dexamethasone. In some embodiments, the immune stimulatory agent is lenalidomide. In some embodiments, the immune stimulatory agent is an HDAC inhibitor. In some embodiments, the checkpoint inhibitor is an anti-LAG3 antibody. The tablets, pills, to capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or sterotes; a glidant such as colloidal silicon dioxide; a sweetening agent such as sucrose or saccharin; or a flavoring agent such as peppermint, methyl salicylate, or orange flavoring.

The powders and tablets can contain from 1% to 95% (w/w) of an individual TCR or a mixture of two or more TCRs. In certain embodiments, the TCR can range from about 5% to 70% (w/w). Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the peptide (or nucleic acid) with encapsulating material as a carrier providing a capsule in which the peptide with or without other carriers, is surrounded by a carrier, which is thus in association with it. Similarly, cachets and lozenges are included. Tablets, powders, capsules, pills, cachets, and lozenges can be used as solid dosage forms suitable for oral administration.

Aqueous solutions suitable for oral use can be prepared by dissolving the active component in water and adding suitable colorants, flavors, stabilizers, and thickening agents as desired. Aqueous suspensions suitable for oral use can be made by dispersing the finely divided active component in water with viscous material, such as natural or synthetic gums, resins, methylcellulose, sodium carboxymethylcellulose, and other well-known suspending agents.

For administration by inhalation, the TCRs or nucleic acids can be delivered in the form of an aerosol spray from pressured container or dispenser which contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the TCRs or nucleic acids can be formulated into ointments, salves, gels, or creams as generally known in the art.

The TCRs or nucleic acids can also be prepared in the form of suppositories (e.g., with conventional suppository bases such as cocoa butter and other glycerides) or retention enemas for rectal delivery.

In some embodiments, the TCRs or nucleic acids can be prepared with carriers that will protect the TCRs against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art. The materials can also be obtained commercially from Alza Corporation and Nova Pharmaceuticals, Inc. Liposomal suspensions (including liposomes targeted to, e.g., APCs with monoclonal antibodies to APC-specific antigens) can also be used as pharmaceutically acceptable carriers. These can be prepared according to methods known to those skilled in the art, for example, as described in U.S. Pat. No. 4,522,811.

It can be advantageous to formulate oral or parenteral compositions in dosage unit form for ease of administration and uniformity of dosage. Dosage unit form, as used herein, refers to physically discrete units suited as unitary dosages for the subject to be treated; each unit containing a predetermined quantity of the peptides (or nucleic acids) calculated to produce the desired therapeutic effect in association with the required pharmaceutical carrier. Dosage units can also be accompanied by instructions for use.

The nucleic acid molecules encoding the TCRs can be inserted into vectors and used as gene therapy vectors. Gene therapy vectors can be delivered to a subject by, for example, intravenous injection, local administration (see, e.g., U.S. Pat. No. 5,328,470) or by stereotactic injection (see, e.g., Chen, et al. (1994) Proc. Natl. Acad. Sci. USA 91: 3054-3057). The pharmaceutical preparation of the gene therapy vector can include the gene therapy vector in an acceptable diluent, or can comprise a slow release matrix in which the gene delivery vehicle is imbedded. Alternatively, where the complete gene delivery vector can be produced intact from recombinant cells, e.g., retroviral vectors, the pharmaceutical preparation can include one or more cells that produce the gene delivery system.

Additional examples of gene delivery vehicles include, but are not limited to, liposomes, biocompatible polymers, including natural polymers and synthetic polymers; lipoproteins; polypeptides; polysaccharides; lipopolysaccharides; artificial viral envelopes; metal particles; bacteria; viruses such as baculovirus, adenovirus, and retrovirus; bacteriophage; cosmids; plasmids; fungal vectors and other recombination vehicles typically used in the art which have been described for expression in a variety of eukaryotic and prokaryotic hosts, and may be used for gene therapy as well as for simple protein expression.

Examples of viral vectors include retroviral vectors, lentivirus vectors, adenovirus vectors, adeno-associated virus vectors, alphavirus vectors and the like. Liposomes that comprise a targeting moiety such as an antibody or fragment thereof can also be used to prepare pharmaceutical compositions of nucleic acids for delivery to a subject.

Any of the pharmaceutical compositions described herein can be included in a container, pack, or dispenser together with instructions for administration as described below.

Kits and Articles of Manufacture

The disclosure also features a variety of kits. The kits can include, e.g., one or more (e.g., one, two, three, four, five, six, seven, eight, nine, or 10 or more) of any of the TCRs (or expression vectors containing nucleic acid sequences encoding one or more TCRs) described herein; and instructions for administering the TCR to a subject. The kit can include one or more pharmaceutically acceptable carriers and/or one or more immune stimulating agents. The immune stimulating agents can be, e.g., a T helper epitope, an altered peptide ligand, or an adjuvant. The kits can also contain one or more therapeutic agents, diagnostic agents, or prophylactic agents. The one or more therapeutic, diagnostic, or prophylactic agents include, but are not limited to: (i) an agent that modulates inflammatory responses (e.g., aspirin, indomethacin, ibuprofen, naproxen, steroids, cromolyn sodium, or theophylline); (ii) an agent that affects renal and/or cardiovascular function (e.g., furosemide, thiazide, amiloride, spironolactone, captopril, enalapril, lisinopril, diltiazem, nifedipine, verapamil, digoxin, isordil, dobutamine, lidocaine, quinidine, adenosine, digitalis, mevastatin, lovastatin, simvastatin, or mevalonate); (iii) drugs that affect gastrointestinal function (e.g., omeprazole or sucralfate); (iv) antibiotics (e.g., tetracycline, clindamycin, amphotericin B, quinine, methicillin, vancomycin, penicillin G, amoxicillin, gentamicin, erythromycin, ciprofloxacin, doxycycline, streptomycin, gentamicin, tobramycin, chloramphenicol, isoniazid, fluconazole, or amantadine); (v) anti-cancer agents (e.g., cyclophosphamide, methotrexate, fluorouracil, cytarabine, mercaptopurine, vinblastine, vincristine, doxorubicin, bleomycin, mitomycin C, hydroxyurea, prednisone, tamoxifen, cisplatin, or decarbazine); (vi) immunomodulatory agents (e.g., interleukins, interferons (e.g., interferon gamma (IFN-γ), granulocyte macrophage-colony stimulating factor (GM-CSF), tumor necrosis factor alpha (TNFα), tumor necrosis factor beta (TNFβ), cyclosporine, FK506, azathioprine, steroids); (ix) drugs acting on the blood and/or the blood-forming organs (e.g., interleukins, G-CSF, GM-CSF, erythropoietin, heparin, warfarin, or coumarin); or (vii) hormones (e.g., growth hormone (GH), prolactin, luteinizing hormone, TSH, ACTH, insulin, FSH, CG, somatostatin, estrogens, androgens, progesterone, gonadotropin-releasing hormone (GnRH), thyroxine, triiodothyronine); hormone antagonists; agents affecting calcification and bone turnover (e.g., calcium, phosphate, parathyroid hormone (PTH), vitamin D, bisphospho nates, calcitonin, fluoride).

In some embodiments, the kits can contain one or more (e.g., one, two, or three or more) of any of the BCMA antibodies described herein. In some embodiments, the kits can include two antibodies. For example, a kit can contain one BCMA-specific antibody (described herein) and one TACI-specific antibody (described herein). The kits can optionally include instructions for assaying a biological sample for the presence or amount of BCMA protein. Also featured are articles of manufacture that include: a container; and a composition contained within the container, wherein the composition comprises an active ingredient for inducing an immune response in a mammal (e.g., a human), wherein the active ingredient comprises one or more (e.g., two, three, four, five, six, seven, eight, nine, or 10 or more) of any of the TCRs described herein, and wherein the container has a label indicating that the composition is for use in inducing an immune response in a mammal (e.g., any of the mammals described herein). The label can further indicate that the composition is to be administered to a mammal having, suspected of having, or at risk of developing, multiple myeloma. The composition of the article of manufacture can be dried or lyophilized and can include, e.g., one or more solutions (and/or instructions) for solubilizing a dried or lyophilized composition.

The articles of manufacture can also include instructions for administering the composition to the mammal.

EXAMPLES

The invention is further described in the following examples, which do not limit the scope of the invention described in the claims.

Example 1. BCMA Expression on Multiple Myeloma Cell Lines

A total of 12 cancer cell lines including 11 MM cell lines and 1 breast cancer cell line (MDA-MB231) were evaluated for their expression levels of BCMA antigen by staining with an antibody specific to each following clone; #1. ANC3B1 (LifeSpan Biosciences, Cat# LS-C357630), #2. VICKY1 (LifeSpan Biosciences, Cat# LS-C18662), and #3. 19F2 (BioLegend, Cat# 357506). Among the cell lines, H929 (MM cell line) showed the highest level of BCMA expression and MDA-MB231 (breast cancer cell line; BCMA negative) showed the minimum level of BCMA expression. (FIGS. 1A-1I)

Example 2. Selection of BCMA Native Peptides Specific to HLA-A2

Six native peptides derived from BCMA were identified as following:

1. $BCMA_{64-72}$ (LIISLAVFV) (SEQ ID NO: 39)

2. $BCMA_{69-77}$ (AVFVLMFLL) (SEQ ID NO: 40)

3. $BCMA_{9-17}$ (SQNEYFDSL) (SEQ ID NO: 41)

4. $BCMA_{72-80}$ (VLMFLLRKI) (SEQ ID NO: 42)

5. $BCMA_{54-62}$ (AILWTCLGL) (SEQ ID NO: 43)

6. $BCMA_{114-122}$ (ILPRGLEYT) (SEQ ID NO: 44)

Example 3. Binding Affinity of BCMA Native Peptides to HLA-A2 Molecule

Figure 2:
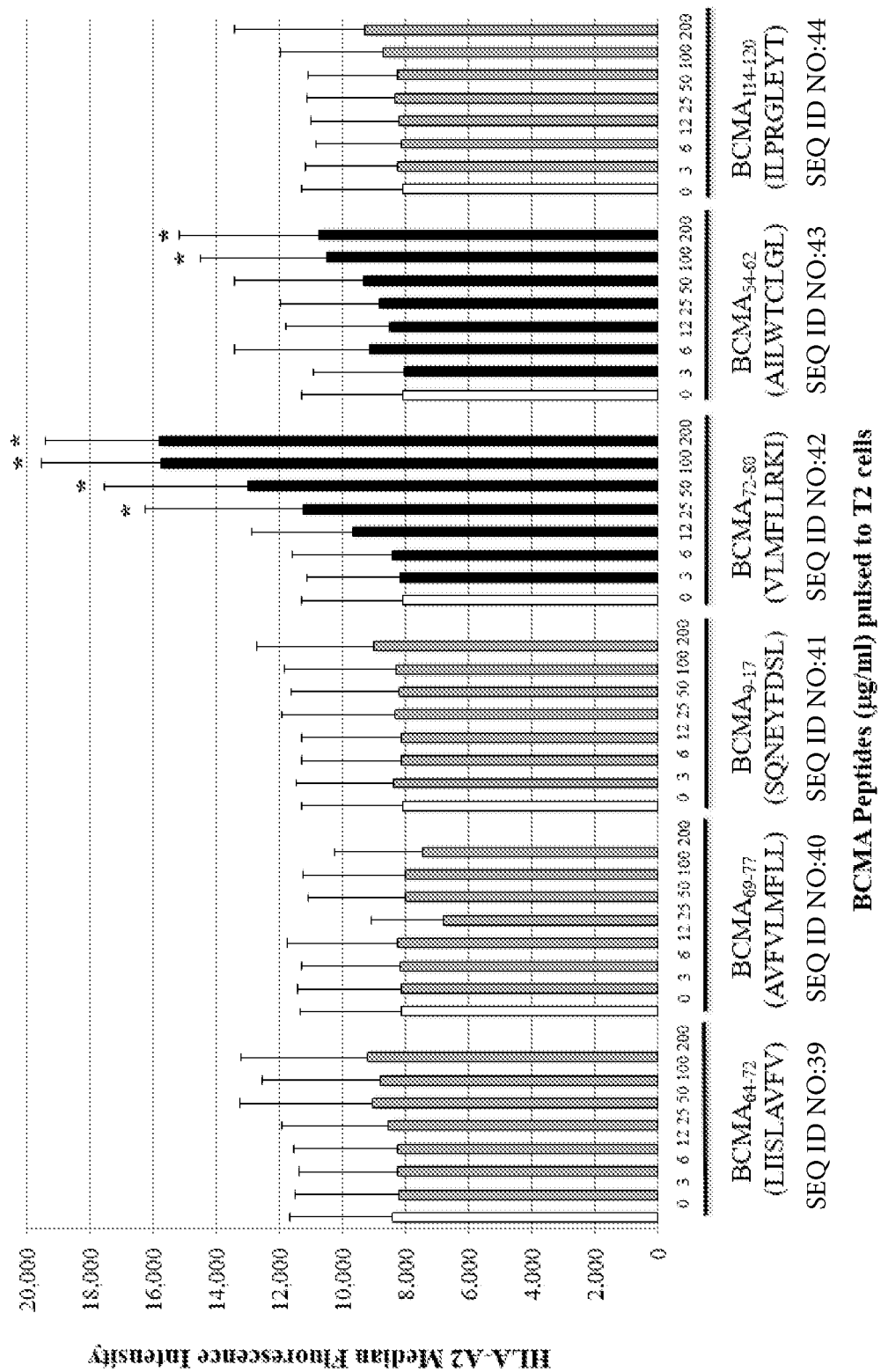
FIG. 2 shows binding affinity of native BCMA peptides (SEQ ID NOs: 39-44, respectively, in order of appearance) to HLA-A2.

The listed BCMA peptides were evaluated for HLA-A2-specific binding capacity using the T2 cell line. In the assay, T2 cells were washed, resuspended in serum-free AIM-V medium to a final concentration of $1 \times 10^6$ cells/ml and transferred into wells of a 24-well tissue culture plate. The cells were pulsed with different concentrations of respective BCMA peptide (0-200 μg/ml) plus 3 μg/ml human 132-microglobulin (Sigma) and incubated at 37° C., 5% $CO_2$ in humidified air. Following overnight incubation, the cells were washed, stained with mouse anti-human HLA-A2-FITC mAb for 15 minutes at 4° C., washed and analyzed using a FACSort™ flow cytometer with CellQuest™ v2.1 software (Becton Dickinson, San Jose, Calif.). Peptide binding to HLA-A2 was determined by the up-regulation of HLA-A2 molecules on T2 cells caused by HLA-A2 specific peptide binding and demonstrated by measuring mean fluorescence intensity (MFI) by flow cytometric analyses. Among the BCMA peptides evaluated, "#4. BCMA$_{72-80}$ (VLMFLLRKI (SEQ ID NO: 42))" showed the highest level of HLA-A2 specificity and "#5. BCMA$_{54-62}$ (AILWTCLGL (SEQ ID NO: 43))" showed the second highest level of the specificity. (FIG. 2).

Example 4. Stability of BCMA Native Peptides to HLA-A2 Molecule

In order to improve the stability of the peptide binding to HLA-A2 molecules, the following heteroclitic BCMA peptides were designed:

```
Heteroclitic #4. BCMA72-80
                                       (SEQ ID NO: 37)
(YLMFLLRKI)

Heteroclitic #5. BCMA54-62
                                       (SEQ ID NO: 45)
(YILWTCLGL)
```

Figure 3:
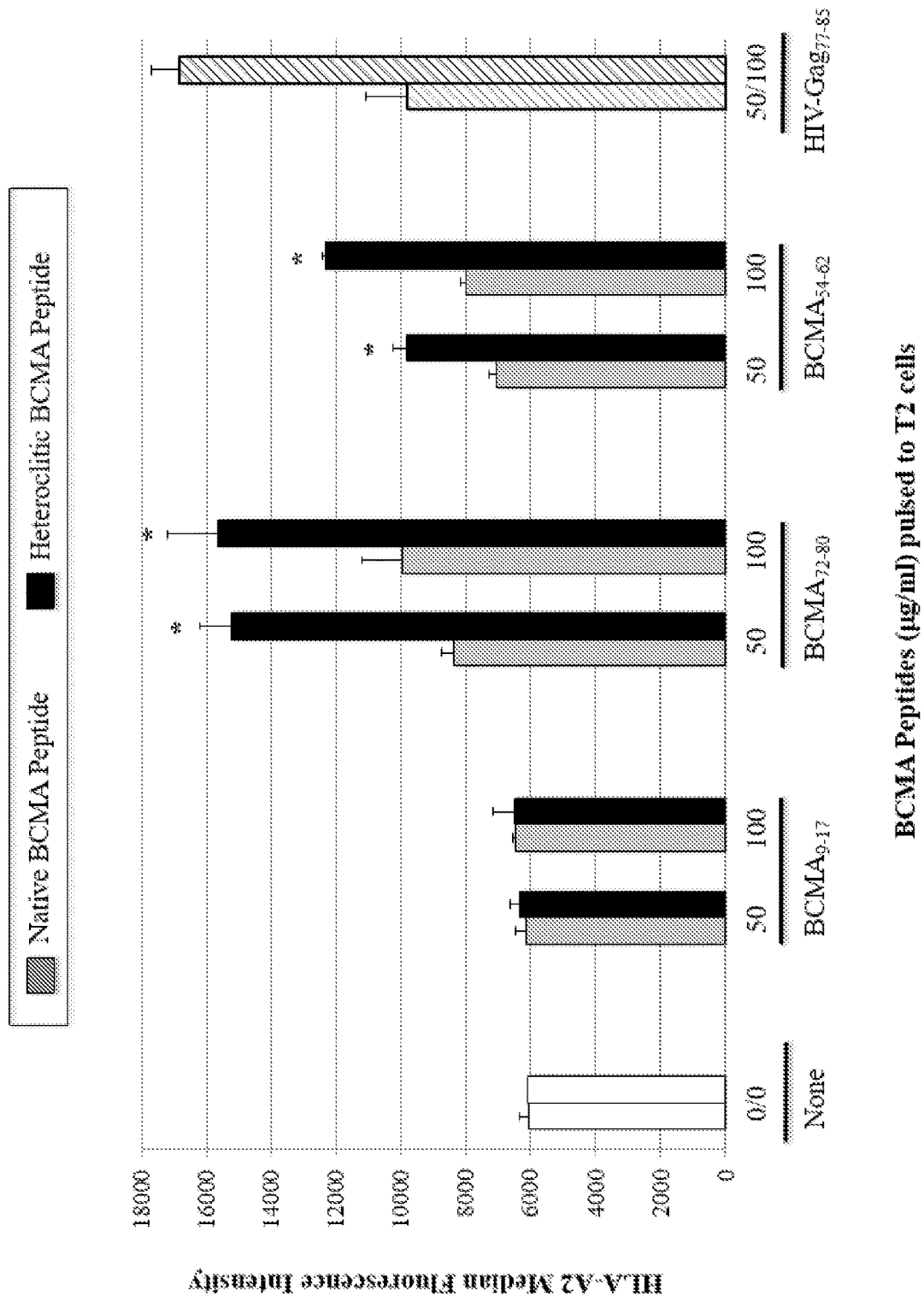
FIG. 3 shows binding affinity of BCMA peptides to HLA-A2: native peptide vs. heteroclitic peptide.
Figure 4:
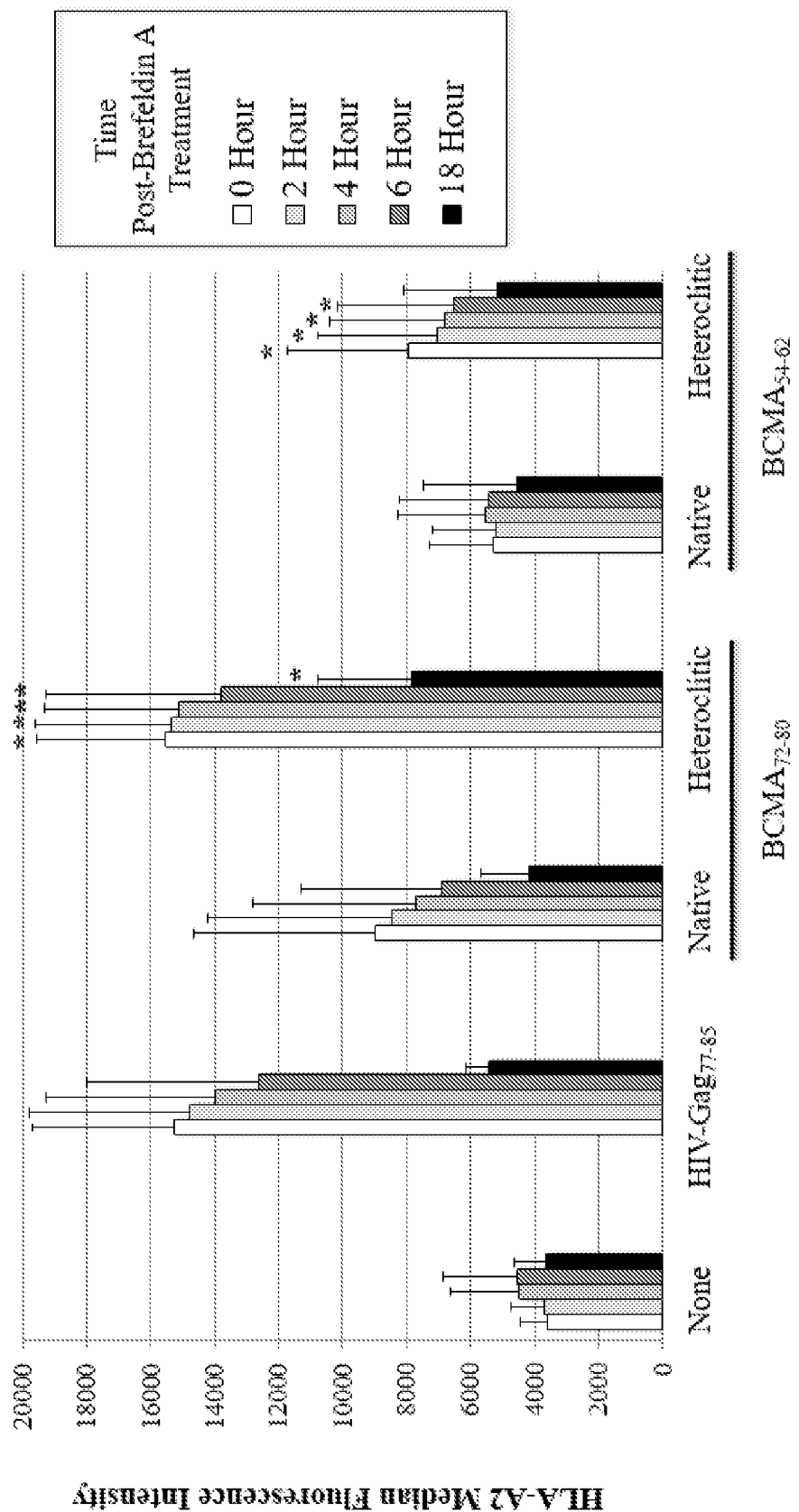
FIG. 4 shows HLA-A2 stability of BCMA #4 and #5 peptides: native peptide vs. heteroclitic peptide (50 ug/ml).

The native and heteroclitic BCMA peptides were examined for HLA-A2 binding stability using the T2 cell line. T2 cells were pulsed with the respective peptide. After overnight incubation, the cells were washed to remove unbound peptide; they were evaluated for binding affinity as shown above and stability as following. The cells were incubated with 10 μg/ml Brefeldin A (Sigma) at 37° C. and 5% $CO_2$ for 1 hour to block cell surface expression of newly synthesized HLA-A2 molecules. Peptide/HLA-A2 binding stability was evaluated at 0, 2, 4, 6 and 18 hours post-Brefeldin A treatment. Following the incubation period, the cells were harvested, washed, stained with mouse anti-human HLA-A2-FITC mAb and analyzed by flow cytometry. The HLA-A2 binding affinity of the "Heteroclitic #4 BCMA$_{72-80}$ (YLMFLLRKI (SEQ ID NO: 37))" and "Heteroclitic #5 BCMA$_{54-62}$ (YILWTCLGL (SEQ ID NO: 45))" was increased from their native peptide (FIG. 3). In terms of the binding stability, "Heteroclitic #4 BCMA$_{72-80}$ (YLMFLLRKI (SEQ ID NO: 37))" peptide showed a significant improvement in its HLA-A2 affinity at all the time points evaluated including 0, 2, 4, 6 and 18 hours compared to the native peptide (FIG. 4). Therefore, the Heteroclitic #4 BCMA$_{72-80}$ (YLMFLLRKI (SEQ ID NO: 37)) peptide was selected for further evaluation of its immunogenic potential to generate MM-specific cytotoxic T cells (CTLs).

Example 5. Induction of BCMA or TACI Peptide-Specific CD3$^+$CD8$^+$ CTL

The peptide-specific CTL were generated from different HLA-A2$^+$ normal donors for the evaluation of the functional activities targeting MM cell lines. To generate the peptide-specific CTL, mature dendritic cells (mDC) generated from the same donor were resuspended in serum-free AIM-V media and pulsed with 50 μg/ml of the Heteroclitic #4 BCMA$_{72-80}$ (YLMFLLRKI (SEQ ID NO: 37)) peptide, overnight at 37° C., 5% $CO_2$ in humidified air. The peptide-pulsed mDC were washed, counted, irradiated at 10 Gy and used to prime CD3$^+$ T cells at a 1:20 antigen-presenting cells/peptide-to-CD3$^+$ T cell ratio in AIM-V media supplemented with 10% human AB serum. The cultures were restimulated every seven days with irradiated T2 cells pulsed with peptide for a total of 4 cycles. To maintain the T cells ex vivo, IL-2 (50 U/ml) was added to the cultures two days after the second stimulation. Control T cell cultures were maintained under the same culture conditions in the presence of IL-2 (50 U/ml), but without peptide stimulation. Phenotype of the resulting CTL was evaluated one week after each cycle of peptide stimulation. Flow cytometric analysis showed a distinct change in the phenotype of the CD3$^+$CD8$^+$ T cell subsets stimulated with the Heteroclitic #4 BCMA$_{72-80}$ (YLMFLLRKI (SEQ ID NO: 37)) with a gradual increase in the population. The CD3$^+$CD8$^+$ T cell increases by the heteroclitic BCMA peptide was similar to those with the immunogenic CD138$_{260-268}$ (GLVGLIFAV (SEQ ID NO: 46)), which was previously identified as immunogenic peptide, suggesting the potential immunogenicity of the BCMA peptide. The BCMA peptide-specific CTL cultures contained a higher percentage of CD8$^+$ T cells (~80%) upon 4 cycle of peptide stimulation compared to non-peptide stimulated control T cells (~20%) (FIGS. 5A-5C).

Example 6. Decreased Naïve and Increased Memory CD3$^+$CD8$^+$ CTL by Heteroclitic BCMA$_{72-80}$ Peptide Stimulation Antigen-specific CTL can be phenotypically identified as activated/memory T cells from naïve T cells by their expression of distinct cell surface antigens. The phenotype of the BCMA-CTL were examined as potential effector cells by analyzing the phenotype of naïve and memory cells. BCMA peptide-specific CTL were generated by repeated stimulation of HLA-A2$^+$ normal donor's CD3$^+$ T cells weekly with antigen-presenting cells pulsed with 50 μg/ml heteroclitic BCMA$_{72-80}$ (YLMFLLRKI (SEQ ID NO: 37)). One week after each peptide stimulation, the resulting CTL were evaluated for their phenotypic profile by flow cytometry. The BCMA-CTL showed a decreased frequency of naive CD3$^+$CD8$^+$ T cells as compared to the control T cells (Donor 1:80% unstimulated to 2% upon 4 cycles of stimulation; Donor 2: 83% unstimulated to 2% upon 4 cycles of stimulation). A corresponding increase was observed in the frequency of the memory CD3$^+$CD8$^+$ T cells (Donor 1: 18% unstimulated to 86% upon 4 cycles of stimulation; Donor 2: 10% unstimulated to 92% upon 4 cycles of stimulation) with the heteroclitic BCMA$_{72-80}$ (YLMFLLRKI (SEQ ID NO: 37)) peptide. These phenotypic changes demonstrate that repeated stimulation of CD3$^+$ T cells with heteroclitic BCMA$_{72-80}$ (YLMFLLRKI (SEQ ID NO: 37)) resulted in an expansion of CD8$^+$ CTL with a phenotype of memory cells, indicating the immunogenicity of the BCMA peptide (FIGS. 6 and 7).

Figure 8A:
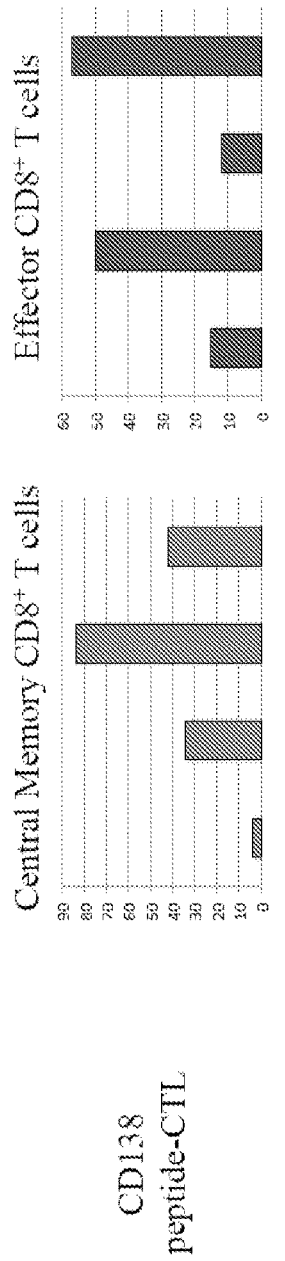
FIGS. 8A-8C show kinetics of CM vs. effector cells with heteroclitic BCMA #4 peptide stimulation.
Figure 8B:
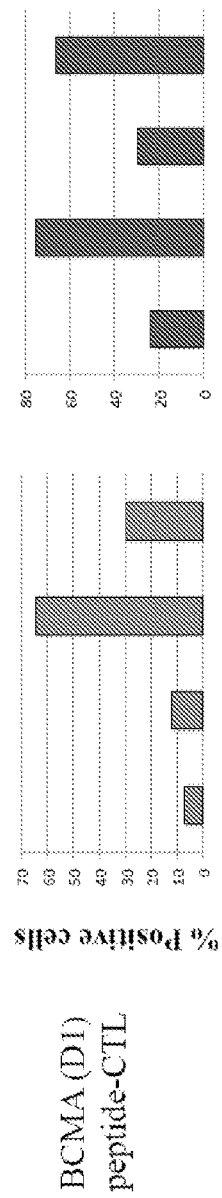
Figure 8C:
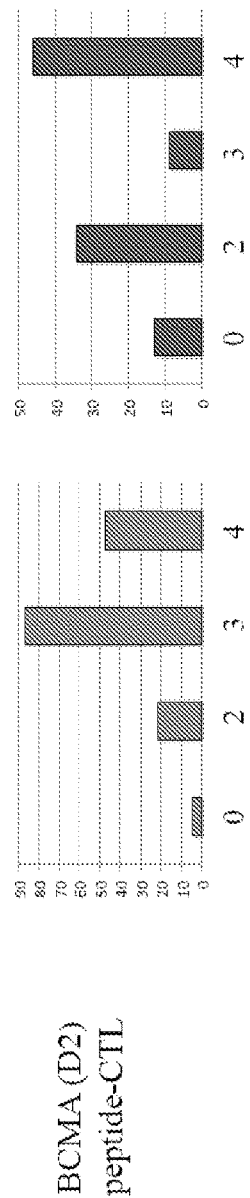

Example 7. Changes in Frequency of Central Memory and Effector CD3$^+$CD8$^+$ CTL by Heteroclitic BCMA$_{72-80}$ Peptide Stimulation Further evaluation of central memory and effector cells was performed, upon the stimulation of T cells with heteroclitic BCMA$_{72-80}$ (YLMFLLRKI (SEQ ID NO: 37)) peptide. The expansion of central memory CTL by the BCMA peptide was detected after 3 cycle of stimulation, which was aligned with a decrease of effector CTL. Upon 4 cycle of the peptide stimulation, a decrease in central memory CTL and increase in effector CTL including effector memory cells were also detected. The pattern of this phenotype change in the CD8+ T cells with the heteroclitic BCMA$_{72-80}$ (YLMFLLRKI (SEQ ID NO: 37)) peptide was similar to the cells stimulated with CD138$_{260-268}$ (GLVGLIFAV (SEQ ID NO: 46)) (FIGS. 8A-8C).

Figure 9:
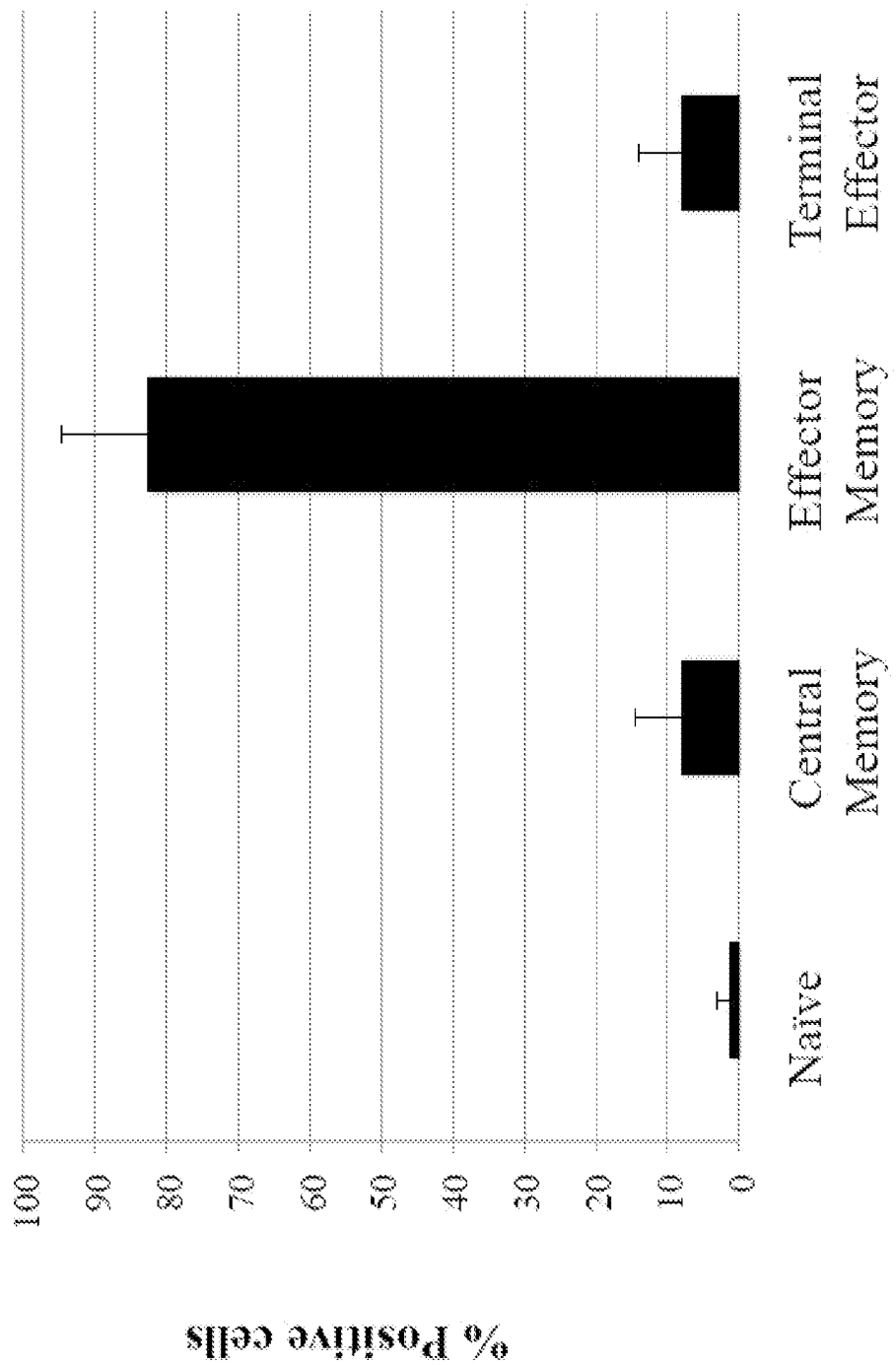
FIG. 9 shows induction of memory CD8+ CTL by heteroclitic BCMA #4 peptide.

Example 8. The Specific CTL Stimulated with Heteroclitic BCMA$_{72-80}$ (YLMFLLRKI—SEQ ID NO: 37) Peptide Display a Distinct Phenotype Representing Specific T Cell Subtypes We also observed distinct phenotypic changes in the CD3$^+$CD8$^+$ T cell subset within the CTL stimulated with heteroclitic BCMA$_{72-80}$ (YLMFLLRKI (SEQ ID NO: 37)) peptide in frequency of naïve (CD45RO$^-$/CCR7$^+$), central memory (CD45RO$^+$/CCR7$^+$), effector memory (CD45RO$^+$/CCR7$^-$) and terminal effector (CD45RO$^-$/CCR7$^-$) cells within the CD8$^+$ T cell subsets in the CD3$^+$ T cell cultures stimulated with the peptide. After 4 cycles of peptide stimulation, the frequency of effector memory CD3$^+$CD8$^+$ T cells was increased, associated with a corresponding decrease in naïve T cells (CD45RO$^-$CCR7$^+$/CD3$^+$CD8$^+$) and central memory T cells (CD45RO$^+$CCR7+/CD3+CD8+). Thus, these results demonstrate that repeated stimulation of CD3$^+$ T cells with the selected heteroclitic BCMA or TACI peptide results in distinct phenotypic changes and expansion of CD3$^+$CD8$^+$ T cell subsets characteristic of antigen-specific CTL. (FIG. 9).

Figure 10:
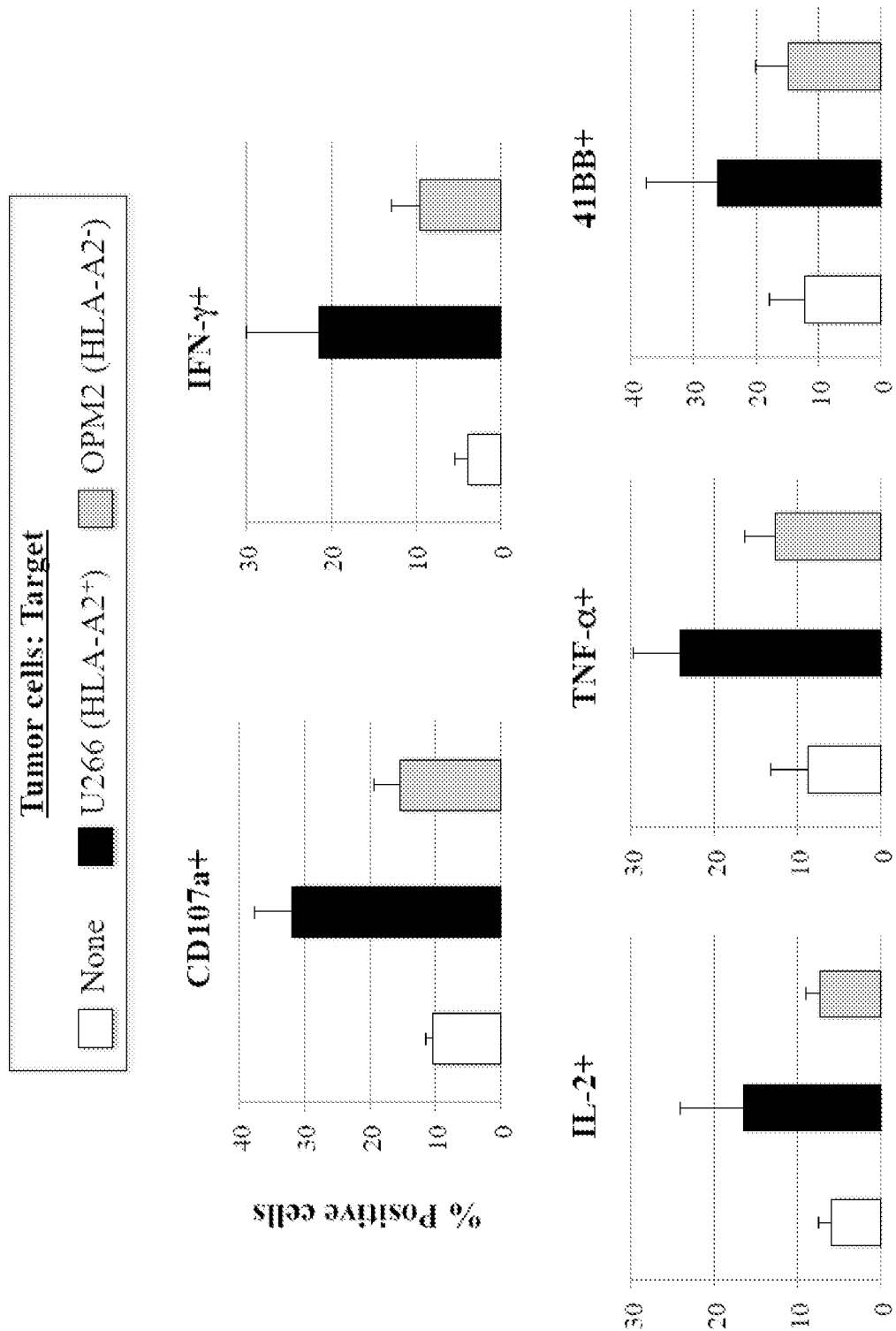
FIG. 10 shows anti-tumor activities of heteroclitic BCMA #4 peptide-CTL (N=5).

Example 9. BCMA-Specific CTL Induce Cytotoxic Activity, Produce Th1-Type of Cytokines (IFN-γ, IL-2, TNF-α) and Upregulate 41BB Expression to MM Cells, in an HLA-A2-Restricted Manner The peptide-specific CTL stimulated with heteroclitic BCMA$_{72-80}$ (YLMFLLRKI (SEQ ID NO: 37)) peptide were analyzed by flow cytometry for their ability to lyse myeloma cells and produce critical cytokines, which are involved in anti-tumor activities. The BCMA-CTL demonstrated a significant increase in the frequency of cells expressing CD107a degranulation marker, a measure of cytotoxic activity, upon recognition of HLA-A2$^+$ U266 cells, which was higher than HLA-A2$^-$ OPM2 cells. An increased level of IFN-γ, IL-2, and TNF-α production was detected in BCMA-specific CTL to HLA-A2$^+$ MM cells, but not to HLA-A2$^-$ MM cells, demonstrating the immune responses are in an HLA-A2 restricted manner (FIG. 10).

Example 10. BCMA-Specific CTL Proliferate in Response to MM Cells in HLA-A2 Restricted and Antigen-Specific Manner Functional activities of the peptide-specific CTL stimulated with heteroclitic BCMA$_{72-90}$ (YLMFLLRKI (SEQ ID NO: 37)) were further analyzed using a CFSE-proliferation assay. The proliferation of CD8$^+$ T cells in the BCMA peptide-specific CTL was measured on day 4, evidenced by a decrease in fluorescence of the CFSE-labeled CTL (gated CFSE low) following stimulation with HLA-A2$^+$ MM (U266), HLA-A2$^+$ breast cancer (MDA-MB231) or HLA-A2$^-$ MM (MM1S) cells. The BCMA-CTL induced a significant CD8$^+$ T cell proliferation in response to HLA-A2$^+$ U266 MM cell line (proliferating cells: 46%). However, the CD8$^+$ T cells proliferation was not induced in response to MDA-MB231 or MM1S and stayed at a low level (11%-14%) as the cells cultured in media alone (10%). Taken together, these results suggest that the BCMA-CTL respond to myeloma cells specifically and their CD8+ T cells proliferation is HLA-A2-restricted and antigen-specific (FIG. 11).

Figure 12:
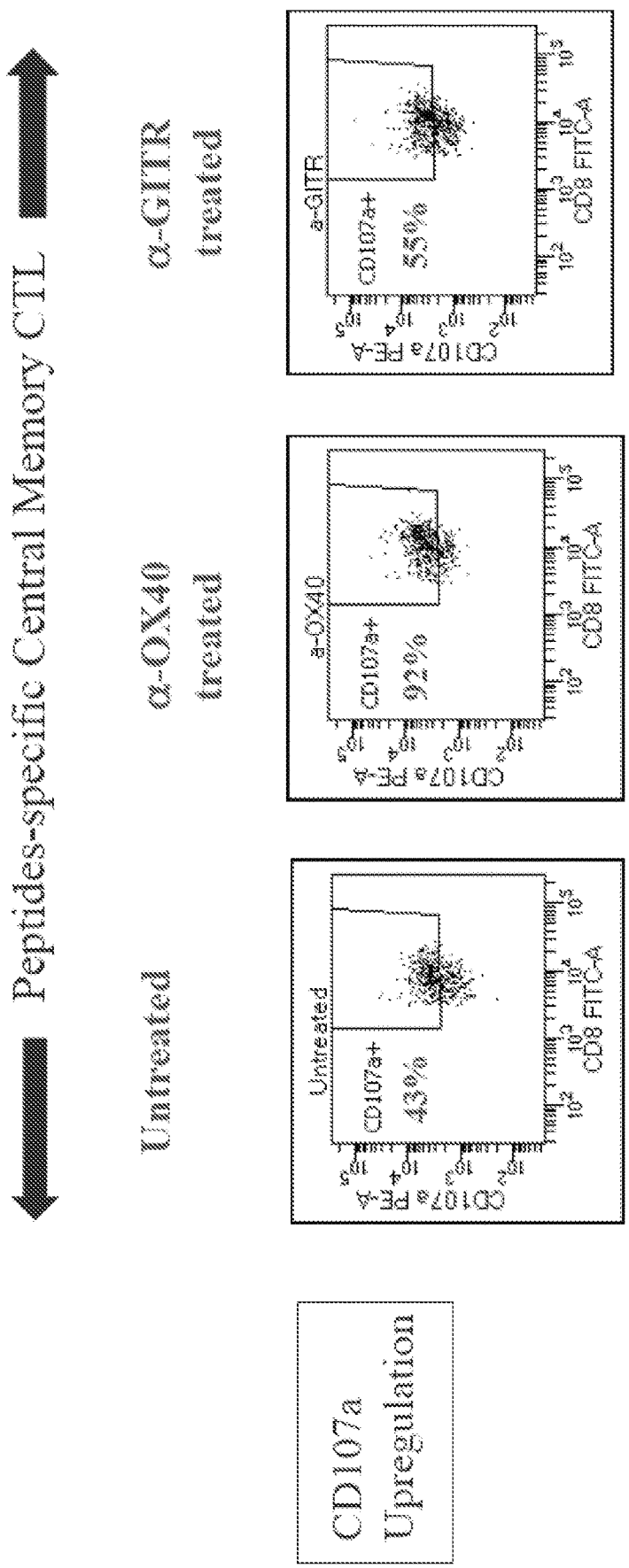
FIG. 12 shows enhanced α-tumor activities by central memory cells of BCMA-specific CTL treated w. α-OX40 or α-GITR.

Example 11. Higher Level of Cytotoxicity by BCMA-Specific CTL in Combination with Immune Agonist The activity of peptide-specific CTL stimulated with heteroclitic BCMA$_{72-80}$ (YLMFLLRKI (SEQ ID NO: 37)) was measured in treatment of the cells with anti-OX40 or anti-GITR for 48 hrs. The level of cytotoxicity was measured by CD107a degranulation in the CD3$^+$CD8$^+$ T cells gated. It was observed that the CD107a degranulation was increased upon the treatment of BCMA peptide-specific CTL with anti-OX40 (92%) or anti-GITR (55%) compared to untreated group (43%), suggesting that the combination treatment with immune agonists is helpful for inducing anti-tumor activity of BCMA-CTL (FIG. 12).

Example 12. Selective Targeting of Multiple Myeloma by BCMA-Specific Central Memory CD8+ Cytotoxic T Lymphocytes Despite recent advances in treatment of multiple myeloma (MM) incorporating novel therapies into the stem cell transplantation paradigm, ongoing DNA damage and genomic evolution underlie relapse in many patients. Novel therapeutic approaches with distinct mechanisms of action are therefore needed. The constitutive or evolving genetic complexity, coupled with immune responsiveness of B cell malignancies, has stimulated the development of immunotherapeutic options in MM including monoclonal antibodies, bispecific antibodies, immunotoxins, and CAR T cells. Although MM patient-specific CAR T cell therapy has achieved remarkable deep responses, durability of responses is not establishes and they are labor-intensive, time-consuming, and expensive. To overcome these limitations, this example provides immunogenic peptides-based cancer vaccines as an off-the-shelf immunotherapy for treating patients more widely and efficiently. The peptide-based therapeutic approach does not have limitations of recombinant proteins, mRNA, or DNA-based vaccines, which require the processes of internalization, degradation of protein into optimal immunogenic peptides to HLA, along with additional steps required for suitable translation (for mRNA) or transcription (for DNA). To overcome MHC restriction and treat a more diverse patient population using the immunogenic epitope vaccine approach, peptide cocktails were pooled to include major HLA subtypes. Moreover, lenalidomide can augment peptide vaccine specific immune responses and memory cytotoxic T cell (CTL) activities, setting the stage for combination approaches with checkpoint inhibitors and/or immune agonists. In addition, anti-tumor efficacy triggered by immunogenic peptides can be enhanced by their ability to induce "epitope spreading" upon the generation of effector cells, whereby targeted lysed cancer cells release new antigenic epitopes which are subsequently taken up, processed, and presented by antigen-presenting cells to a new repertoire of CTLs.

B cell maturation antigen (BCMA) is a member of the TNF receptor superfamily 17 (TNFRSF17) and is characterized as a type III trans-membrane protein containing cysteine-rich extracellular domains with a central role in regulating B-cell maturation and differentiation into plasma cells. As a receptor for the MM cell growth and survival factors B cell activating factor (BAFF) and a proliferation-inducing ligand (APRIL), BCMA is required for the survival of MM cells, making it a promising therapeutic target. Nearly all MM tumor cells express BCMA, and it has been proposed as a marker for identification of tumor cells. Its selective expression on a subset of mature B and long lived plasma cells further suggest a favorable therapeutic index for BCMA directed treatment approaches. At present BCMA is being targeted by several immunotherapeutic strategies including antibodies (naked antibodies, antibodies-drug conjugates, and bispecific antibodies) and cellular therapies (chimeric antigen receptor T-cells), with promising clinical results even in relapsed refractory MM. In addition, serum soluble BCMA is elevated among patients with MM and chronic lymphocytic leukemia and can serve as a prognostic marker and monitor of response. Finally, most recent studies indicate that BCMA is expressed in non-hemopoietic tissue: BCMA is abnormally expressed in non-small cell lung cancer cell lines and may play a role in the tumors through the ERK1/2 signaling pathway. These data support targeting BCMA in immunotherapeutic strategies in MM and potentially BCMA expressing solid tumors as well.

This example provides a peptide-based immunotherapeutic approach targeting BCMA by generating antigen-specific CD8$^+$ CTL with effective and long-lasting immunity against MM cells. Novel immunogenic native and heteroclitic HLA-A2-specific BCMA peptides capable of eliciting MM-specific responses with highly effective anti-tumor activities were identified. Importantly, the heteroclitic BCMA$_{72-80}$ (YLMFLLRKI (SEQ ID NO: 37)) peptide demonstrated the highest level of immunogenicity, with the greatest affinity/stability to HLA-A2 molecule and robust induction of BCMA-specific memory CTL with poly-functional activities against HLA-A2$^+$ patients' MM cells and MM cell lines. The experiments show the framework for clinical application of this novel engineered immunogenic BCMA$_{72-80}$ peptide in cancer vaccine and adoptive immunotherapeutic protocols, and provide long lasting memory anti-tumor immunity in patients with MM or BCMA expressing cancers.

Particularly, this results show that tumor-associated antigens on CD138$^+$ tumor cells obtained from newly diagnosed MM patients (N=616) can be used to expand the breadth and extent of current multiple myeloma (MM)-specific immunotherapy. These experiments are designed to target B-cell Maturation Antigen (BCMA), which promotes MM cell growth and survival, by generating BCMA-specific memory CD8$^+$ CTL which mediate effective and long-lasting immune response against MM cells. Here, the experiment shows novel engineered peptides specific to BCMA, BCMA$_{72-80}$ (YLMFLLRKI (SEQ ID NO: 37)) and BCMA$_{54-62}$ (YILWTCLGL (SEQ ID NO: 45)) display improved affinity/stability to HLA-A2 compared to their native peptides and induce BCMA-specific CTL with increased activation (CD38, CD69) and co-stimulatory (CD40L, OX40, GITR) molecule expression. Importantly, the heteroclitic BCMA$_{72-80}$ specific CTL demonstrated poly-functional Th1-specific immune activities [IFN-γ/IL-2/TNF-α production, proliferation, cytotoxicity] against MM, which were directly correlated with expansion of Tetramer$^+$ and memory CD8$^+$ CTL populations. When combined with anti-OX40 or anti-LAG3, the heteroclitic BCMA$_{72-80}$ specific CTL displayed increased cytotoxicity against MM, especially by central memory CTL. These results provide the framework for clinical application of heteroclitic BCMA$_{72-80}$ peptide, alone and in combination with anti-LAG3 and/or anti-OX40, in vaccination and adoptive immunotherapeutic strategies to generate long-lasting autologous anti-tumor immunity in patients with MM and other BCMA expressing tumors.

The following materials and methods were used in this example.

Materials and Methods

Cell Lines

The MM cell lines, MM1S, OPM2, OPM1, H929, OCIMY5, RPMI, U266, KMS1, HSB2, McCAR and ANBL6, and a breast cancer cell line MDA-MB-231 were obtained from ATCC (Manassas, Va.). The T2 cell line, a human B and T cell hybrid expressing HLA-A2 molecules, was provided by Dr. J. Molldrem (University of Texas M. D. Anderson Cancer Center, Houston, Tex.). The cell lines were cultured in DMEM (for MM and T2 cells; Gibco-Life Technologies, Rockville, Md.) or Leibovitz's L-15 (for MDA-MB231; ATCC, Manassas, Va.) media supplemented with 10% fetal calf serum (FCS; BioWhittaker, Walkersville, Md.), 100 IU/ml penicillin and 100 µg/ml streptomycin (Gibco-Life Technologies).

Reagents

Fluorochrome conjugated anti-human BCMA, HLA-A2, CD3, CD8, CD38, CD40L, CD69, 41BB, CCR7, CD45RO, CD107a, IFN-γ, IL-2, TNF-α, PD1, LAG3, OX40 and GITR monoclonal antibodies (mAbs) were purchased from Becton Dickinson (BD) (San Diego, Calif.), LifeSpan Bioscience (Seattle, Wash.) or BioLegend (San Diego, Calif.). Live/Dead Aqua stain kit was purchased from Molecular Probes (Grand Island, N.Y.). Recombinant human GM-CSF was obtained from Immunex (Seattle, Wash.); and human IL-2, IL-4, IFN-α, and TNF-α were purchased from R&D Systems (Minneapolis, Minn.). BCMA peptide-specific Tetramer-PE was synthesized by MBL International Corporation (Woburn, Mass.). Clinical grade mAb to LAG3 or OX40 was provided by Bristol-Myers Squibb (New York, N.Y.).

Synthetic Peptides

Native BCMA peptides [BCMA$_{64-72}$ (LIISLAVFV (SEQ ID NO: 39)), BCMA$_{69-77}$ (AVFVLMFLL (SEQ ID NO: 40)), BCMA$_{9-17}$ (SQNEYFDSL (SEQ ID NO: 41)), BCMA$_{72-80}$ (VLMFLLRKI (SEQ ID NO: 42)), BCMA$_{54-62}$ (AILWTCLGL (SEQ ID NO: 43)), BCMA$_{114-122}$ (ILPRGLEYT (SEQ ID NO: 44))], heteroclitic BCMA peptides [hBCMA$_{72-80}$ (YLMFLLRKI (SEQ ID NO: 37)), hBCMA$_{54-62}$ (YILWTCLGL (SEQ ID NO: 45)), hBCMA$_{9-17}$ (YQNEYFDSL (SEQ ID NO: 47))] and HIV-Gag$_{77-85}$ (SLYNTVATL (SEQ ID NO: 48)) were synthesized by standard fmoc (9-fluorenylmethyl-oxycarbonyl) chemistry, purified to >95% using reverse-phase chromatography, and validated by mass-spectrometry for molecular weight (Biosynthesis, Lewisville, Tex.).

HLA-A2 Affinity and Stability Assays

T2 cells were pulsed overnight with various doses of peptide plus β2-microglobulin (3 µg/ml) (Sigma, St Louis, Mo.). Following overnight incubation, the cells were stained with HLA-A2-PE mAb and analyzed using a FACSCanto™ flow cytometer (BD). Peptide/HLA-A2 complex stability was measured on peptide loaded T2 cells at 0, 2, 4, 6 and 14 hours post-brefeldin A treatment by staining with HLA-A2-PE mAb and flow cytometric analysis.

Generation of Dendritic Cells

Monocytes isolated from peripheral blood mononuclear cells (PBMC) were cultured for 7 days in the presence of 1,000 units/ml GM-CSF and 1,000 units/ml IL-4 in RPMI-1640 medium (Gibco-Life Technologies) supplemented with 10% FCS. Fresh media plus GM-CSF and IL-4 was added to the cultures every other day. Mature DC (mDC) were obtained on day 7, following 3 additional days incubation with 1,000 units/ml IFN-α plus 10 ng/ml TNF-α.

Induction of BCMA Peptide-Specific CTL

BCMA peptide-specific CTL (BCMA-CTL) were generated ex vivo by repeated stimulation of CD3+ T cells obtained from HLA-A2+ donors with peptide-pulsed antigen-presenting cells (APC). In brief, peptide (50 μg/ml)-pulsed APC were irradiated (10 Gy) and used to stimulate T cells at a 1 APC/peptide: 20 T cell ratio. The T cell cultures were restimulated every 7 days and maintained in AIM-V medium supplemented with 10% human AB serum (Bio-Whittaker) in the presence of IL-2 (50 units/ml).

Phenotypic Analysis of BCMA Peptide-Specific CTL or Tumor Cells

Phenotypic characterization was performed on BCMA-CTL after staining with Live/Dead Aqua stain kit and fluorochrome conjugated anti-human mAbs and Tetramer-PE. Alternatively, the MM and breast cancer cell lines were stained with fluorochrome-conjugated BCMA or HLA-A2 mAb. After staining, the cells were washed, fixed in 2% paraformaldehyde, and analyzed by flow cytometry.

Cell Proliferation by Carboxy Fluorescein Succinimidyl Ester (CFSE) Tracking

BCMA-CTL were labeled with CFSE (Molecular Probes) and co-incubated with irradiated (10 Gy) tumor cells or peptide-pulsed APC in the presence of IL-2 (10 units/ml). On day 4, 5, 6 or 8 of co-culture, cells were harvested and stained with Live/Dead Aqua stain kit and CD3/CD8/CD45RO/CCR7 mAbs. The level of CD3+CD8+ CTL proliferation was determined as a reduction in CFSE fluorescence intensity, as measured by flow cytometry.

CD107a Degranulation and Intracellular IFN-γ/IL-2/TNF-α Cytokines Production

The functional cytolytic activity of BCMA-CTL was measured by CD107a degranulation and Th1 cytokine production by flow cytometry. In brief, BCMA-CTL were co-incubated with tumor cells or T2/peptide in the presence of CD107a mAb. After 1 hour incubation, CD28/CD49d mAb, brefeldin A, and Monensin (BD) were added for an additional 5 h. Cells were harvested, washed in PBS, and incubated with mAbs specific to T cell antigens. After surface staining, cells were fixed/permeabilized, stained with anti-IFN-γ/IL-2/TNF-α mAbs, washed with Perm/Wash solution (BD), fixed in 2% paraformaldehyde, and analyzed by flow cytometry.

Statistical Analysis

Results are presented as mean±SE. Groups were compared using unpaired Student's t-test. Differences were considered significant when p<0.05.

BCMA Peptides Binding Affinity and Stability to HLA-A2 Molecules.

The full length BCMA protein sequence was evaluated to predict epitopes with HLA-A2 affinity, extended half-time disassociation rates, proteasomal C terminal cleavage, and TAP transport using various search software programs including BIMAS and NetCTL. Among the six native peptides selected [BCMA$_{64-72}$ (LIISLAVFV (SEQ ID NO: 39)), BCMA$_{69-77}$ (AVFVLMFLL (SEQ ID NO: 40)), BCMA$_{9-17}$ (SQNEYFDSL (SEQ ID NO: 41)), BCMA$_{72-80}$ (VLMFLLRKI (SEQ ID NO: 42)), BCMA$_{54-62}$ (AILWTCLGL (SEQ ID NO: 43)), BCMA$_{114-120}$ (ILPRGLEYT (SEQ ID NO: 44))], BCMA$_{72-80}$ (VLMFLLRKI (SEQ ID NO: 42)) and BCMA$_{54-62}$ (AILWTCLGL (SEQ ID NO: 43)) showed the highest HLA-A2 binding affinity in a dose-dependent manner. Among the heteroclitic peptides designed, heteroclitic BCMA$_{72-80}$ (YLMFLLRKI (SEQ ID NO: 37)) and heteroclitic hBCMA$_{54-62}$ (YILWTCLGL (SEQ ID NO: 45)) displayed the highest increase in HLA-A2 binding affinity, as compared to their native peptides (n=3, p<0.05). In contrast, replacing the anchor motif in the non-HLA-A2 specific BCMA$_{9-17}$ (SQNEYFDSL (SEQ ID NO:41)) to heteroclite BCMA$_{9-17}$ (YQNEYFDSL (SEQ ID NO: 47)) did not alter its HLA-A2 affinity status, indicating improved HLA-A2 affinity by modification only within the HLA-A2-specific peptides.

The HLA-A2 stability of BCMA$_{72-80}$ and BCMA$_{54-62}$ HLA-A2-specific peptides after brefeldin A treatment of the T2 cells pulsed with peptide was assessed. Native BCMA$_{72-80}$ and BCMA$_{54-62}$ peptides displayed extended HLA-A2 stability for greater than 6 hours, which was further enhanced by engineering into heteroclitic BCMA$_{72-80}$ (YLMFLLRKI (SEQ ID NO: 37)) and BCMA$_{54-62}$ (YILWTCLGL (SEQ ID NO: 45)). Overall, the highest level of HLA-A2 affinity and stability was detected with the BCMA$_{72-80}$ (YLMFLLRKI (SEQ ID NO: 37)) at each time point tested, which was higher than the HLA-A2 positive control HIV-Gag$_{77-85}$ peptide.

BCMA-Specific CTL Generated with Heteroclitic BCMA$_{72-80}$ (YLMFLLRKI (SEQ ID NO: 37)) or BCMA$_{54-62}$ (YILWTCLGL (SEQ ID NO: 45)) Show Increased T Cell Activation and Costimulatory Molecule Expression.

Figure 13A:
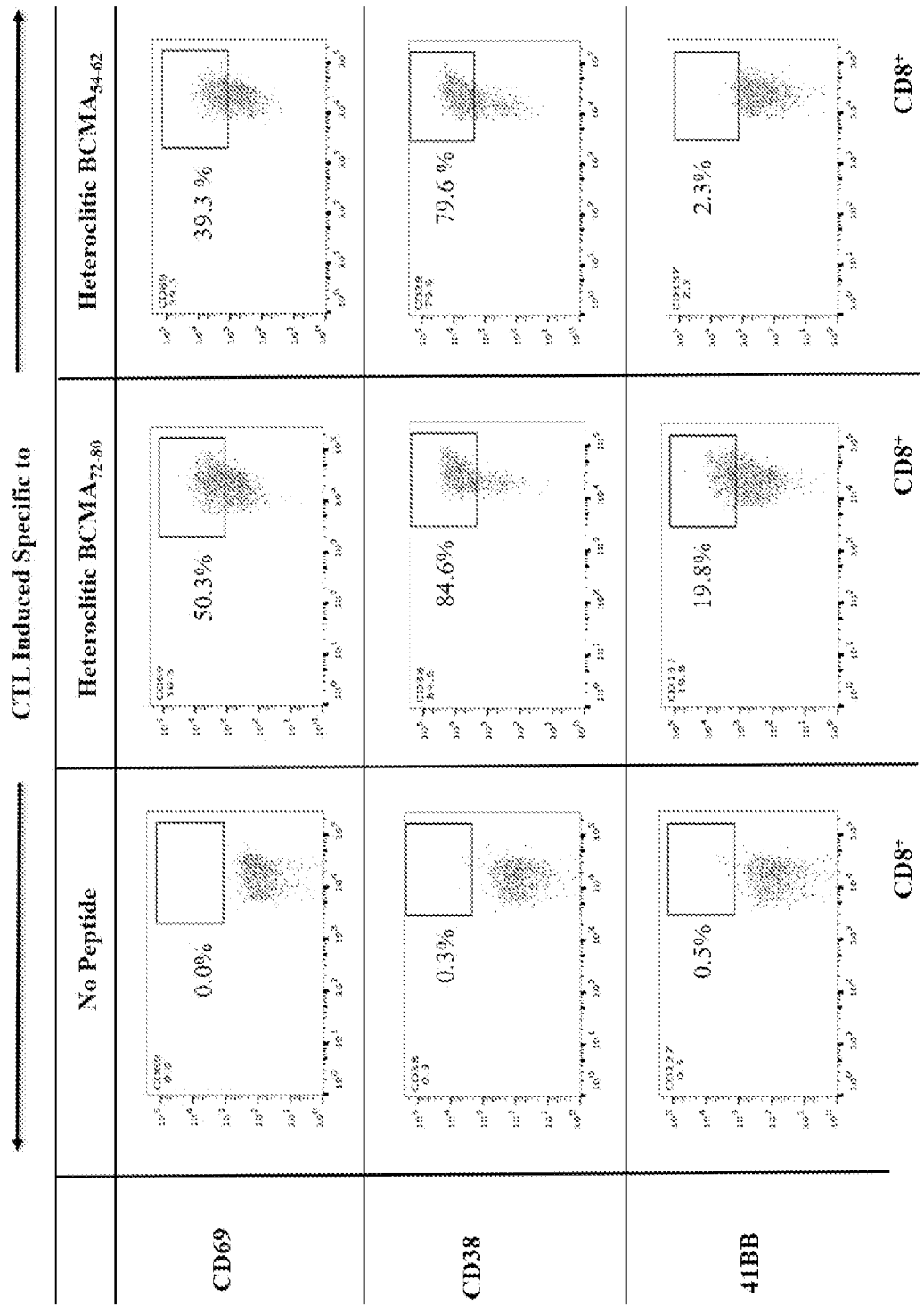
FIGS. 13A-13C show upregulation of critical T cells markers on BCMA peptide-specific CTL stimulated with heteroclitic BCMA peptides.

Phenotypic characterization of heteroclitic BCMA$_{72-80}$ peptide-specific CTL (hBCMA$_{72-80}$ CTL) or heteroclitic hBCMA$_{54-62}$ peptide-specific CTL (hBCMA$_{54-62}$ CTL) was performed after the fourth round of peptide stimulation using flow cytometry. Both CTL populations displayed increased activation marker (CD69, CD38) expression, with the highest upregulation detected on the hBCMA$_{72-80}$ CTL: CD38 increased to 80% from baseline 23%; and CD69 increased to 38% from baseline 7% (FIG. 13A). In addition, the hBCMA$_{72-80}$ CTL showed higher expression of 41BB, CD40L, OX30, and GITR co-stimulatory molecules than hBCMA$_{54-62}$ CTL (FIGS. 13B and 13C).

Figure 13B:
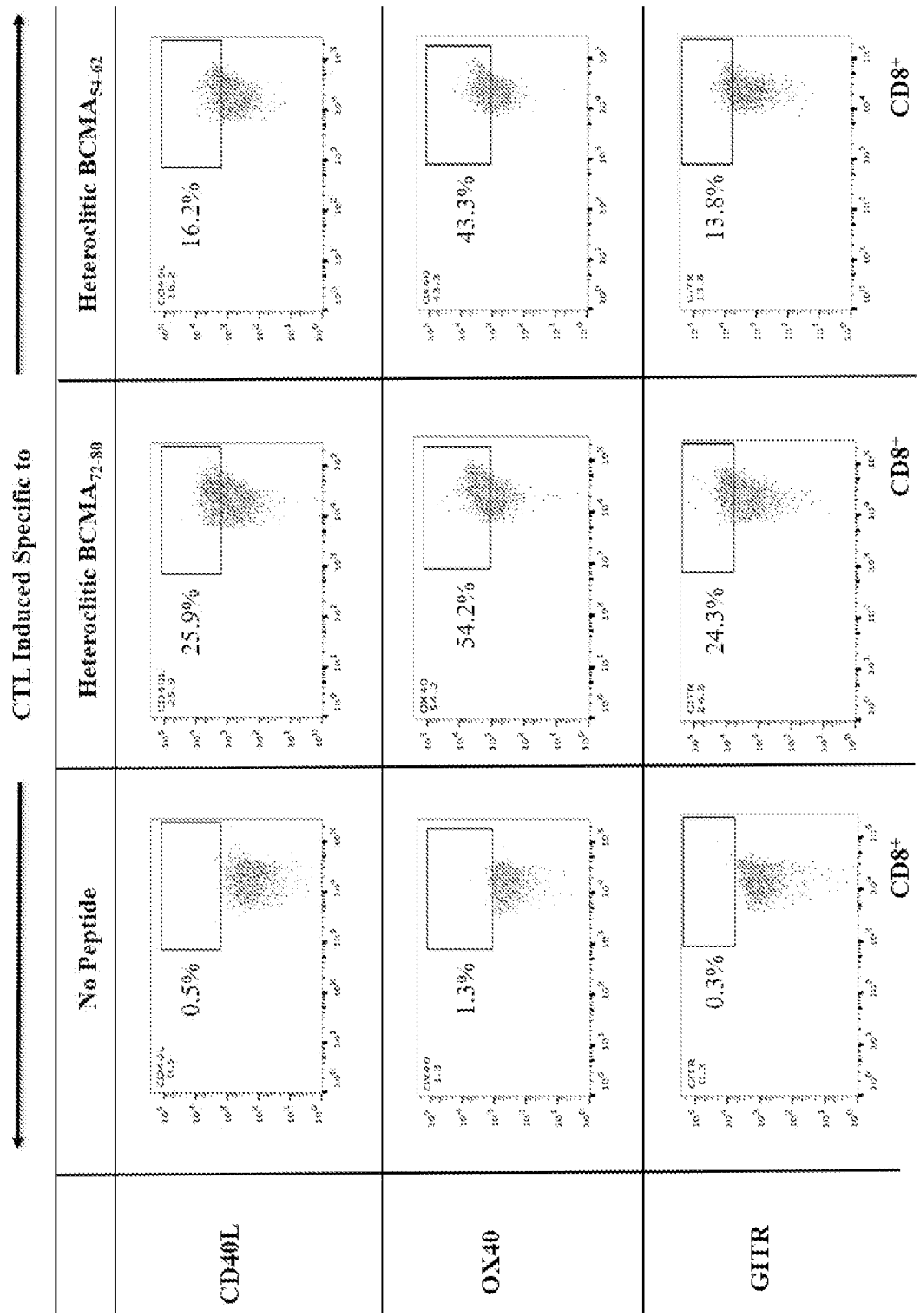
Figure 13C:
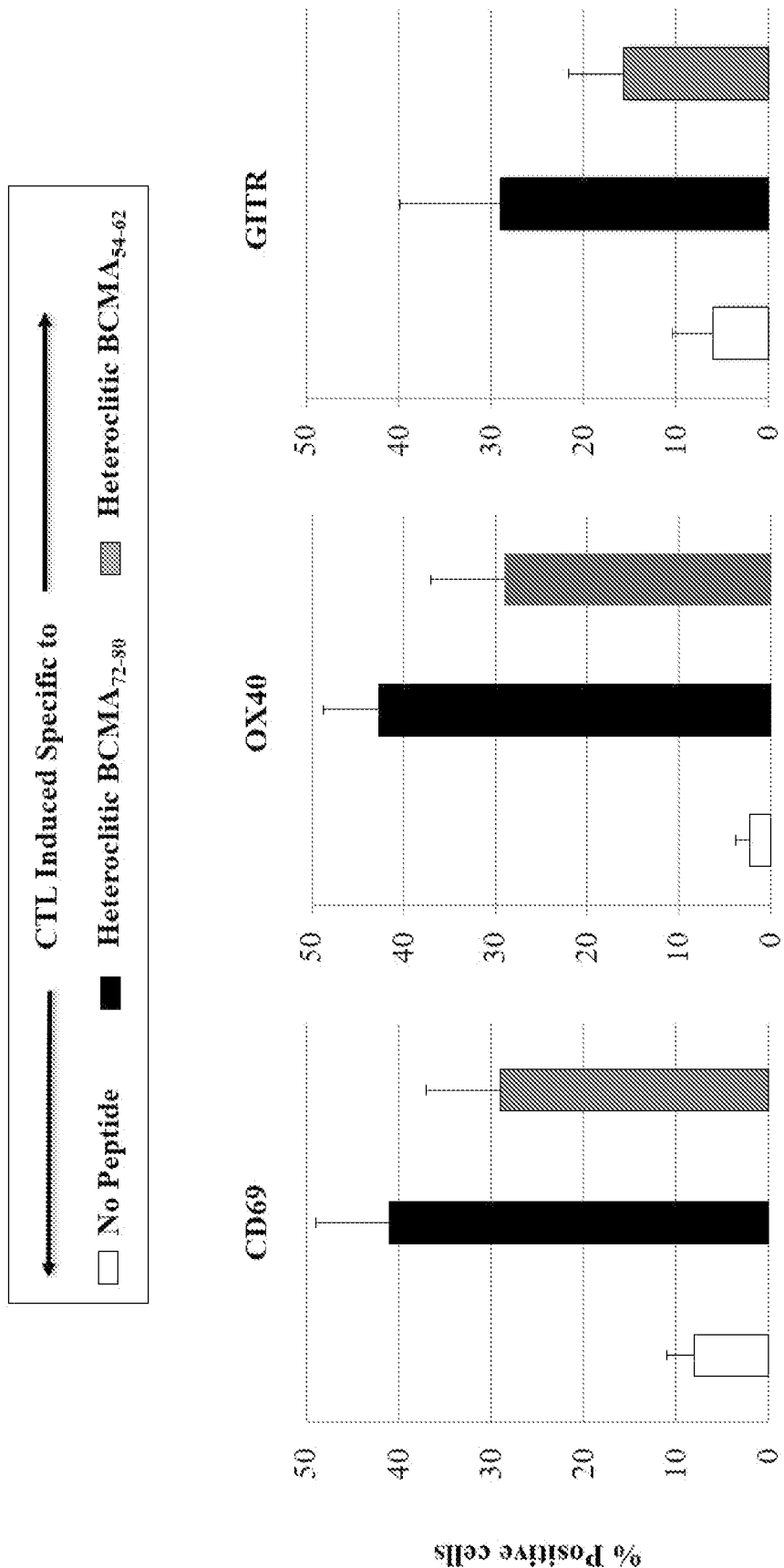

In FIGS. 13A-13C, the CD3+ T cells obtained from HLA-A2+ individuals were stimulated weekly with irradiated APC pulsed with respective heteroclitic BCMA peptide, either BCMA$_{72-80}$ (YLMFLLRKI (SEQ ID NO: 37)) or BCMA$_{54}$-62 (YILWTCLGL (SEQ ID NO: 45)). One week after the 4th cycle of stimulation, the CD3+CD8+ T cells were analyzed by flow cytometry. The expression of T cell activation markers (CD69, CD38) and costimulatory molecules (41BB, CD40L, OX30, GITR) were evaluated on CD8+ T cells. The results are demonstrated as a representative (FIGS. 13A and 13B) or a summary of three independent experiments using BCMA-CTL generated from different individuals (N=3) (FIG. 13C).

Heteroclitic BCMA$_{72-80}$ Specific CTL Display Antigen-Specific Anti-Tumor Activities in Response to MM Cell Lines.

Figure 14F:
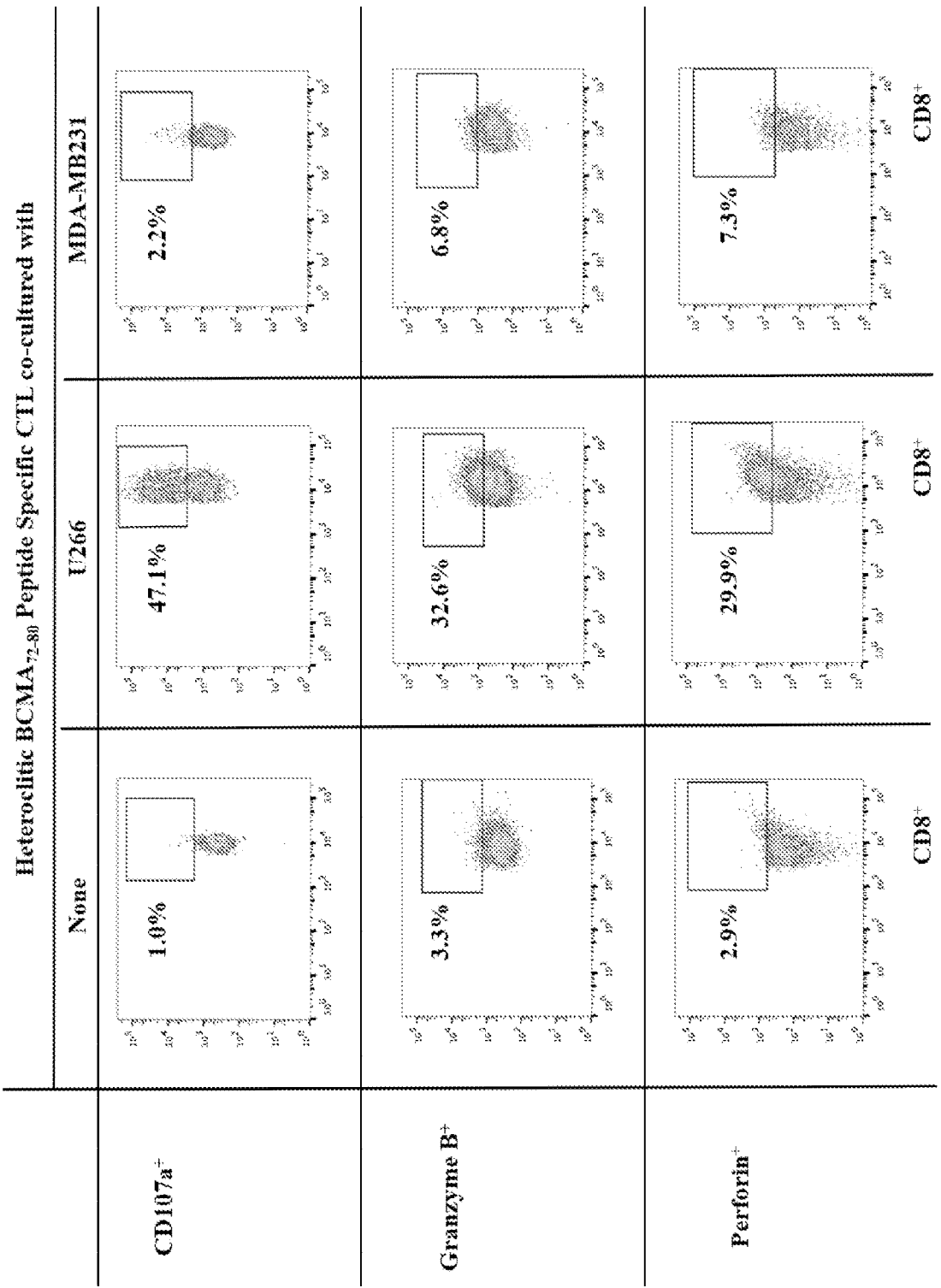
Figures 20A, 20B:
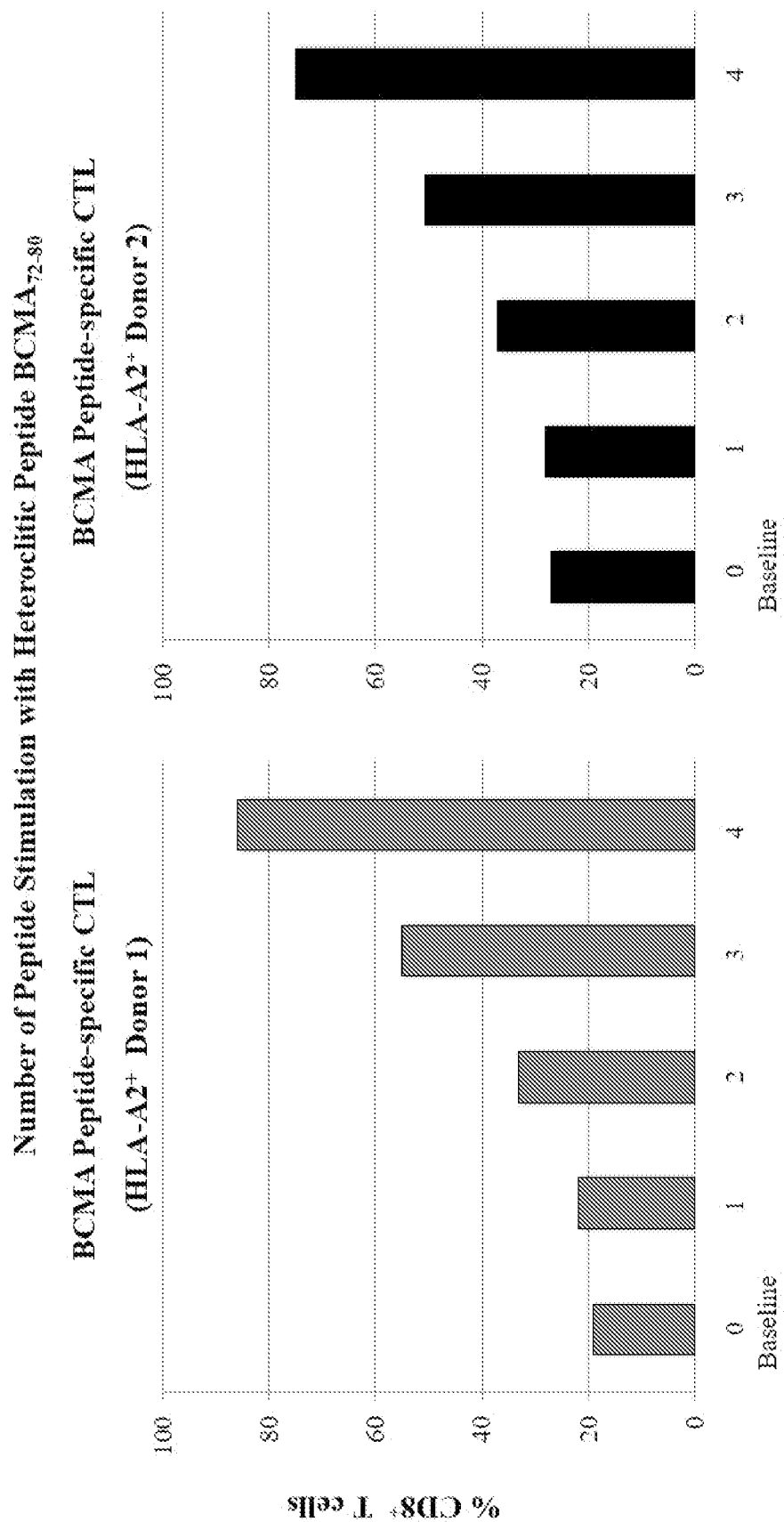
FIGS. 20A-20B. The percentage of CD3+CD8+ T cells after peptide stimulation with heteroclitic BCMA$_{72-80}$.
Figures 21A, 21B:
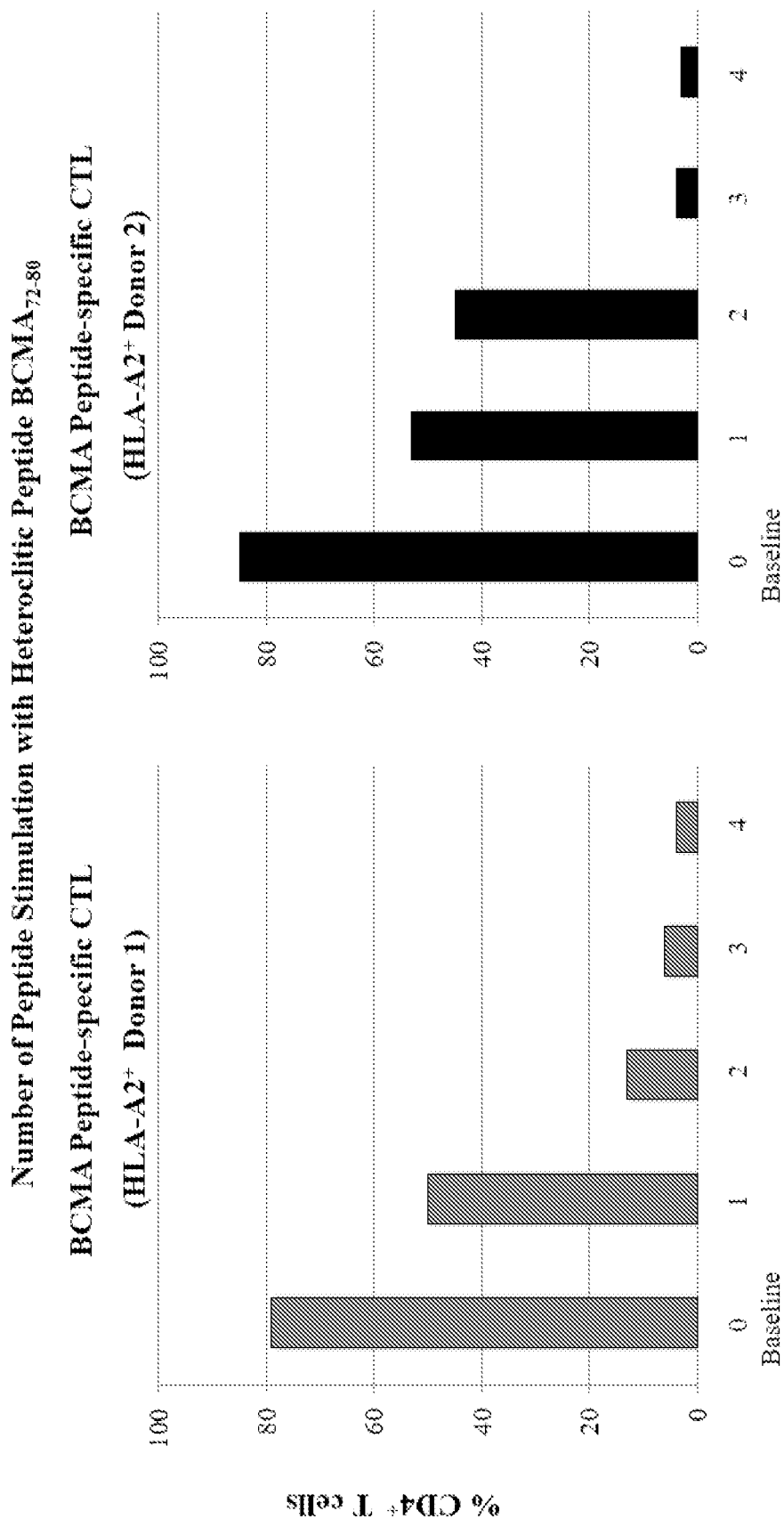
FIGS. 21A-21B. The percentage of CD3+CD4+ T cells after peptide stimulation with heteroclitic BCMA$_{72-80}$.
Figures 23A, 23B:
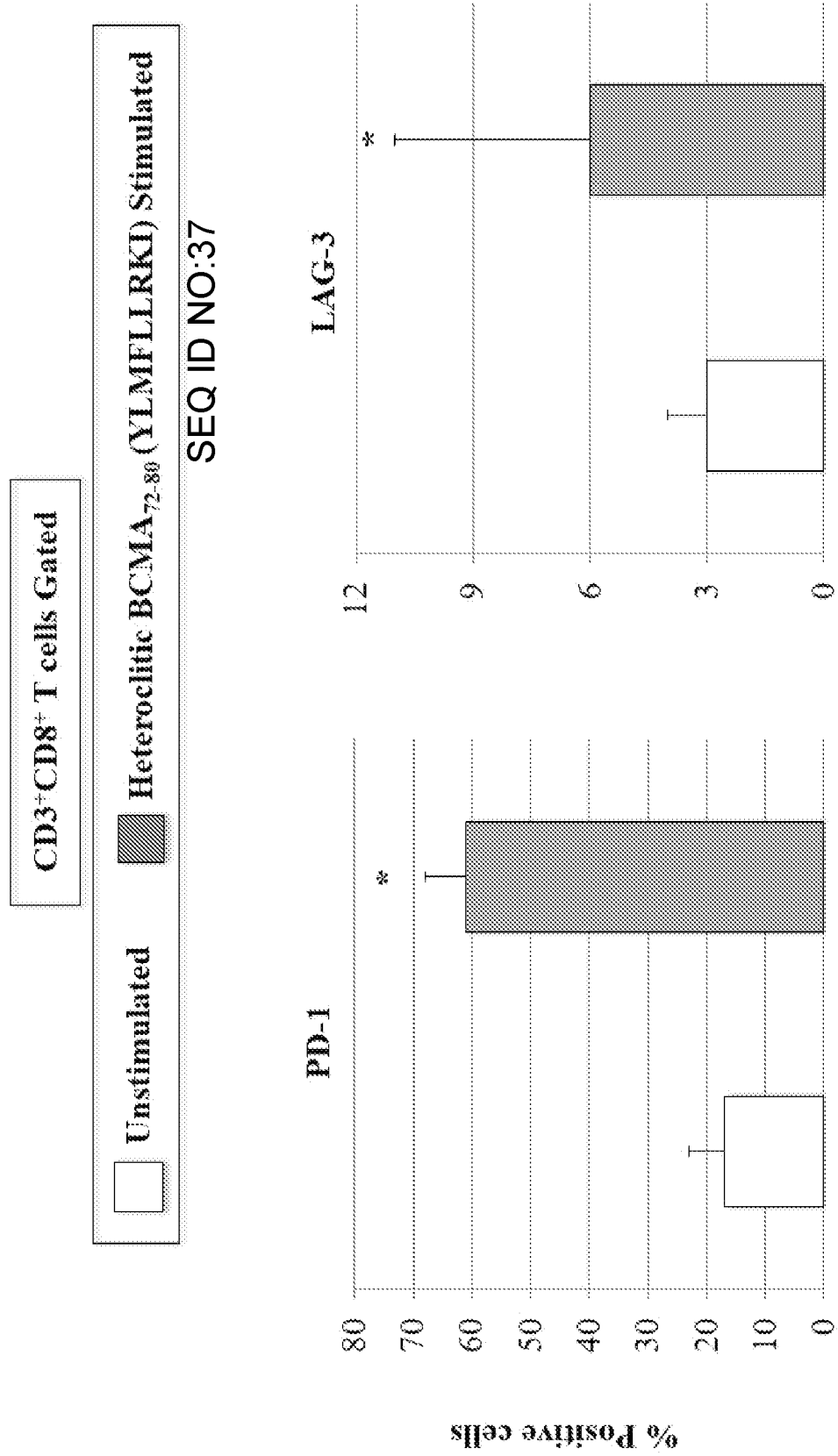
FIGS. 23A-23B show percentage of CD3+CD8+ T cells that express PD-1 and LAG-3 after peptide stimulation with heteroclitic BCMA$_{72-80}$ (SEQ ID NO: 37).

The phenotype and activities of hBCMA$_{72-80}$ CTL were assessed after each round of peptide stimulation. A gradual increase in the % CD3+CD8+ T cells (FIGS. 20A-20B) and a corresponding decrease in % CD3+CD4+ T cells (FIGS. 21A-21B) was observed upon stimulation with heteroclitic BCMA$_{72-80}$ (YLMFLLRKI (SEQ ID NO: 37)) in the specific CTL (n=3) generated. In parallel, phenotype analyses of target cells stained with BCMA mAb clones (ANC3B1, VICKY1, 19F2) showed high BCMA expression on H929, MMIS, U266 and OPM1 cell lines, but not on breast cancer cell line (MDA-MB231) (FIGS. 22A-22C). In evaluation of functional activities, hBCMA$_{72-80}$ CTL showed significantly (*p<0.05) higher CD3+CD8+ T cells proliferation in response to HLA-A2+ BCMA+ U266 (49%) compared to HLA-A2⁻ BCMA⁺ MM1S (7%), HLA-A2⁺ BCMA⁻ MDA-MB231 (9%), or media alone (6%) (FIGS. 14A-14D; Histogram). This HLA-A2-restricted and MM-specific CD8⁺ CTL proliferation was consistently observed in hBCMA$_{72-80}$ CTL generated from three HLA-A2⁺ individuals (FIG. 14E; Bar graphs). In addition, hBCMA$_{72-80}$ CTL demonstrated increases in CD8⁺ T cells expressing CD107a degranulation marker (47.1%) and producing Granzyme B (32.6%) and Perforin (29.9%) in response to HLA-A2⁺ U266, but not to HLA-A2⁺ MDA-MB231 cells (FIG. 14F). Consistent results in anti-tumor activities were observed in hBCMA$_{72-80}$ CTL generated from other HLA-A2⁺ individuals (N=5), as measured by IFN-γ/IL-2/TNF-α production, 41BB upregulation, and CD107a degranulation against BCMA⁺ MM cells in an HLA-A2 restricted manner. These data further demonstrate the induction of MM-specific immune responses by heteroclitic BCMA$_{72-80}$ peptide.

In FIGS. 14A-4F, the BCMA-specific CTL generated by repeated stimulation with heteroclitic BCMA$_{72-80}$ (YLMFLLRKI (SEQ ID NO: 37)) peptide were examined for their antigen-specific and HLA-A2-restricted CD8⁺ T cells responses by proliferation, CD107a degranulation, Granzyme B/perforin production, IFN-γ/IL-2/TNF-α production, and 41BB upregulation in response to BCMA⁺ MM cells or BCMA⁻ breast cancer cells. The results are demonstrated as a representative (FIGS. 14A-14F) or a summary of three independent experiments using BCMA-CTL generated from different individuals (N=3).

Heteroclitic BCMA$_{72-80}$ CTL Functional Immune Responses Against HLA-A2⁺ Patient MM Cells.

Figure 15A:
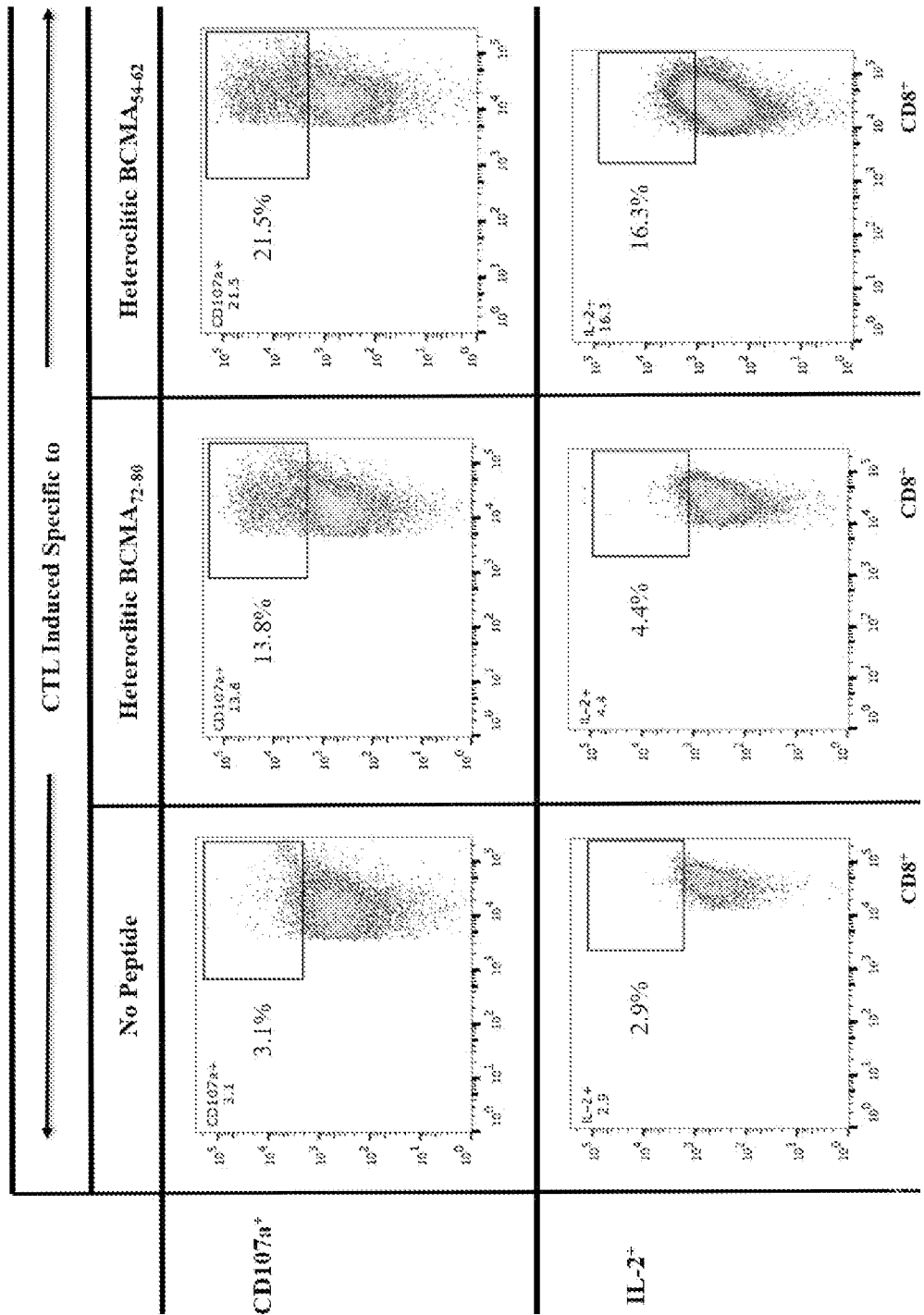
Figure 15B:
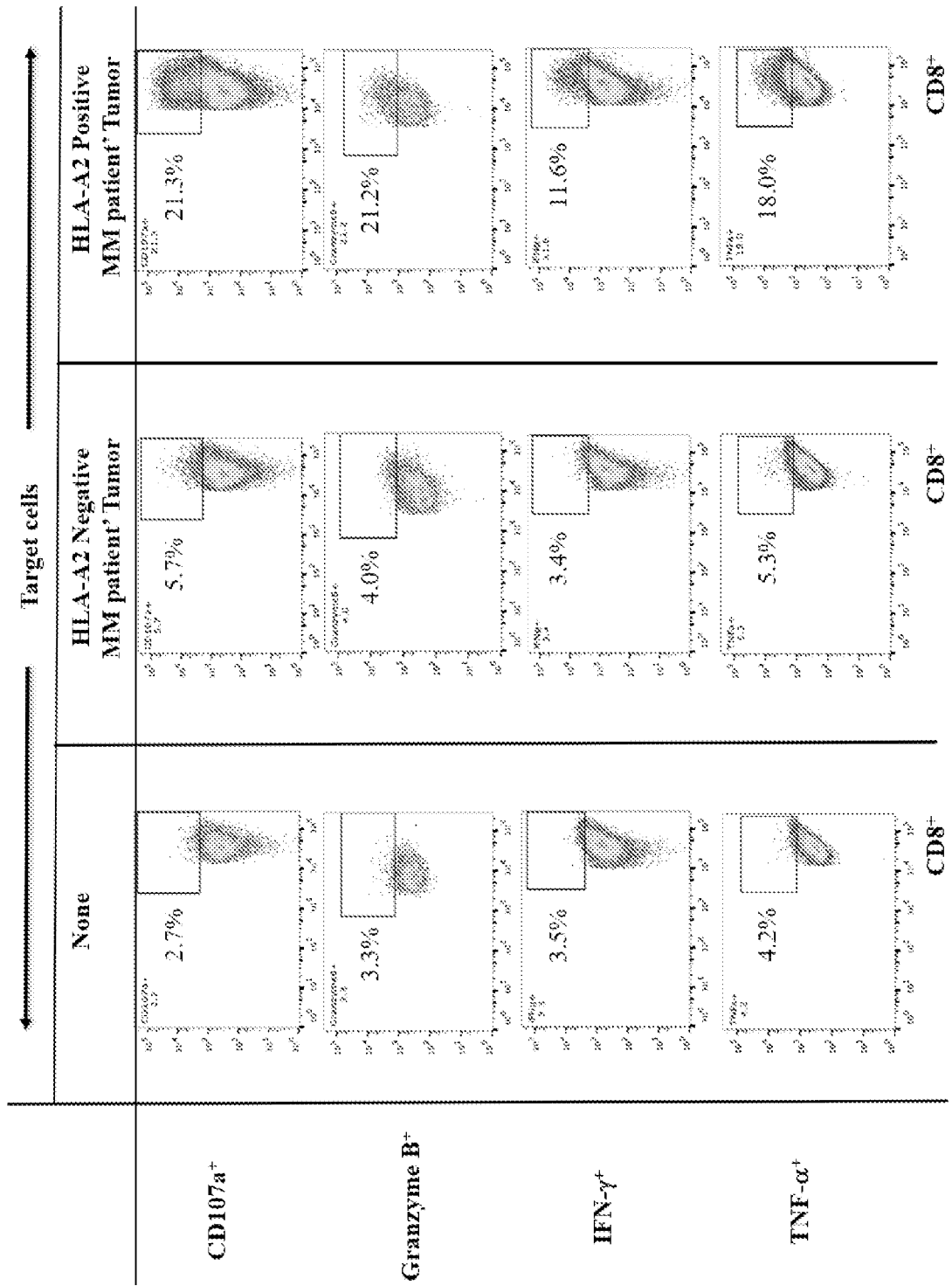

MM patients' CD138⁺ tumor cells were utilized as target cells to evaluate BCMA-specific CTL generated with respective heteroclitic peptides. Compared to heteroclitic BCMA$_{54-62}$, BCMA$_{72-80}$ peptide evoked more robust antigen-specific CTL and anti-tumor activities against patient MM cells, as measured by CD107a degranulation (hBCMA$_{54-62}$ CTL 13.8% vs. hBCMA$_{72-80}$ CTL 21.5%) and IL-2 production (4.4% vs. 16.3%, respectively) (FIG. 15A). The hBCMA$_{72-80}$ CTL consistently demonstrated higher anti-MM activities against patient cells including CD107a degranulation, Granzyme B/IFN-γ/TNF-α upregulation (FIG. 15B), and perforin/IL-2 production (n=3) (FIGS. 15C-15H) in an HLA-A2 restricted manner. Thus, the anti-MM responses detected in the hBCMA$_{72-80}$ CTL were consistent with higher activation (CD69, CD38) and co-stimulatory molecule expression (41BB, CD40L, OX40, GITR) (FIGS. 13A-13C). These data provide additional evidence on the immunogenicity of heteroclitic BCMA$_{72-80}$ and support its potential clinical application in novel MM treatments.

In FIGS. 15A-15H, the heteroclitic BCMA peptide-specific CTL were evaluated for their functional activities against patients' MM cells. The specific activities of BCMA-CTL were measured in response to CD138⁺ tumor cells obtained from HLA-A2 negative or HLA-A2 positive MM patients in relative to baseline response (stimulated with no tumor cells). The results are demonstrated as a representative (FIG. 15A, FIG. 15B) or a summary of three independent experiments using BCMA specific-CTL generated from different individuals (N=3) (FIGS. 1C-15H).

Heteroclitic BCMA$_{72-80}$ Specific CTL are Enriched for CD8⁺ Tetramer⁺ T Cells with Robust Anti-MM Activities.

Figure 16A:
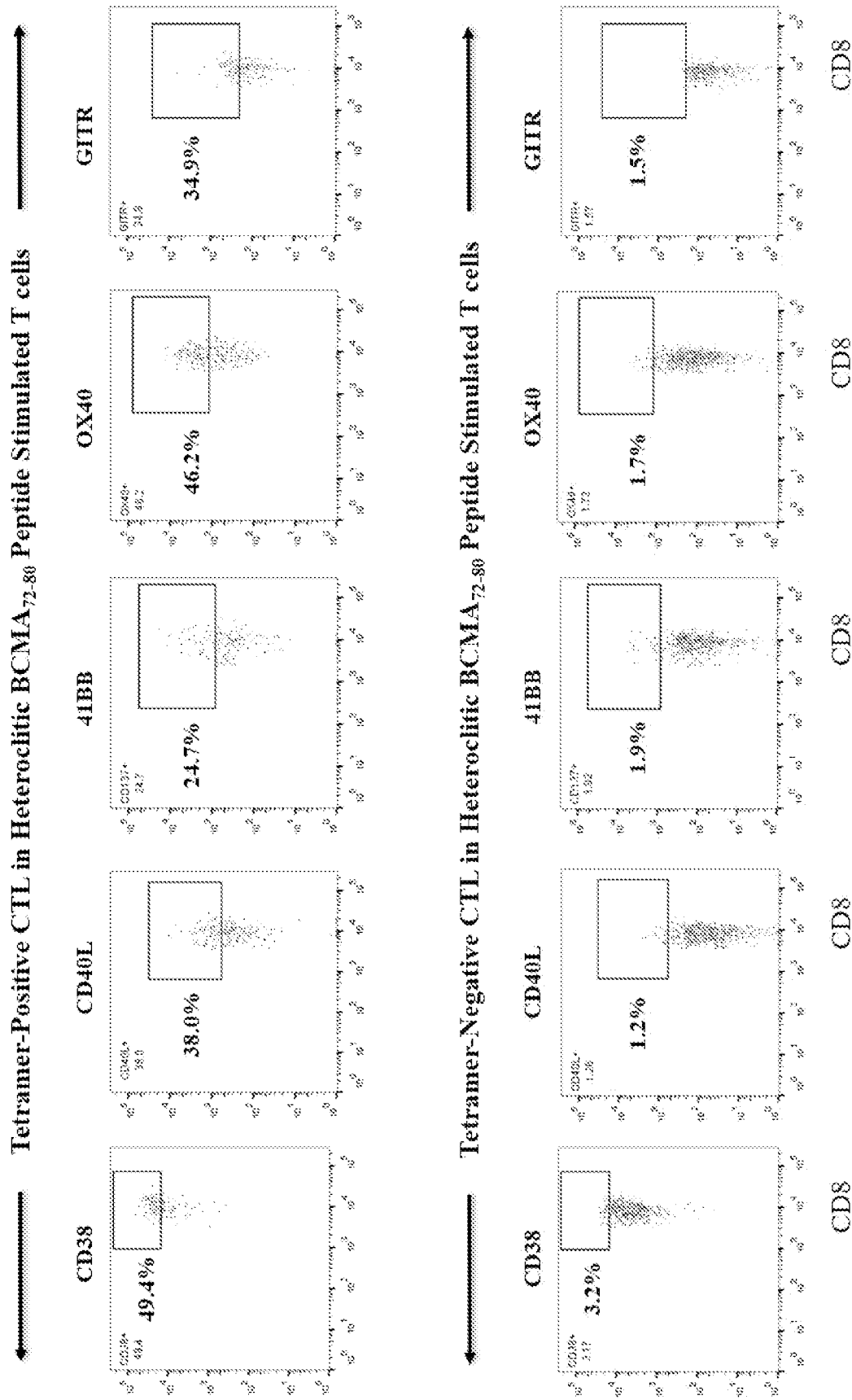
FIGS. 16A-16C. BCMA$_{72-80}$ specific Tetramer$^+$ CTL displaying distinct phenotypes and high level of anti-tumor activities against MM cells.
Figure 16B:
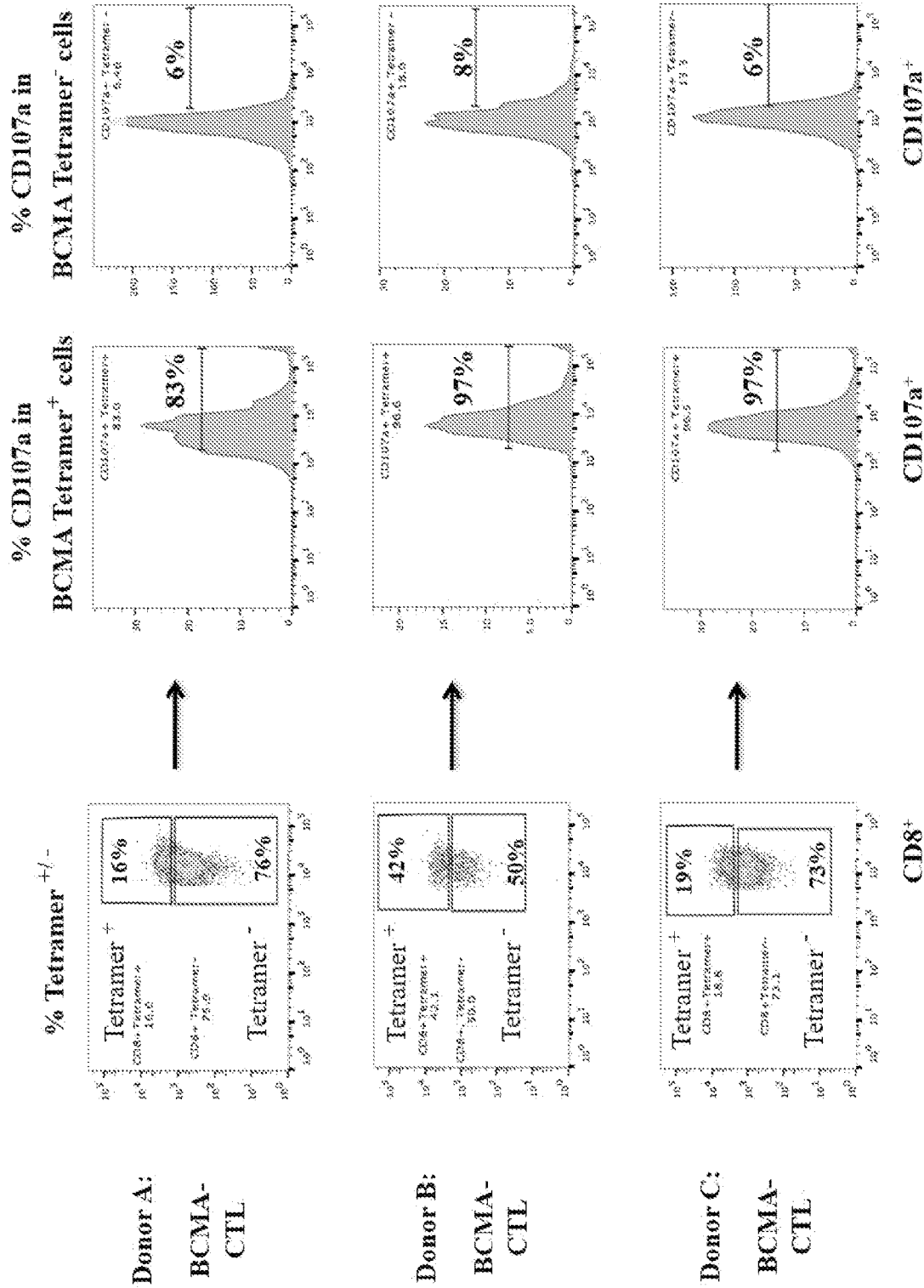
Figure 16C:
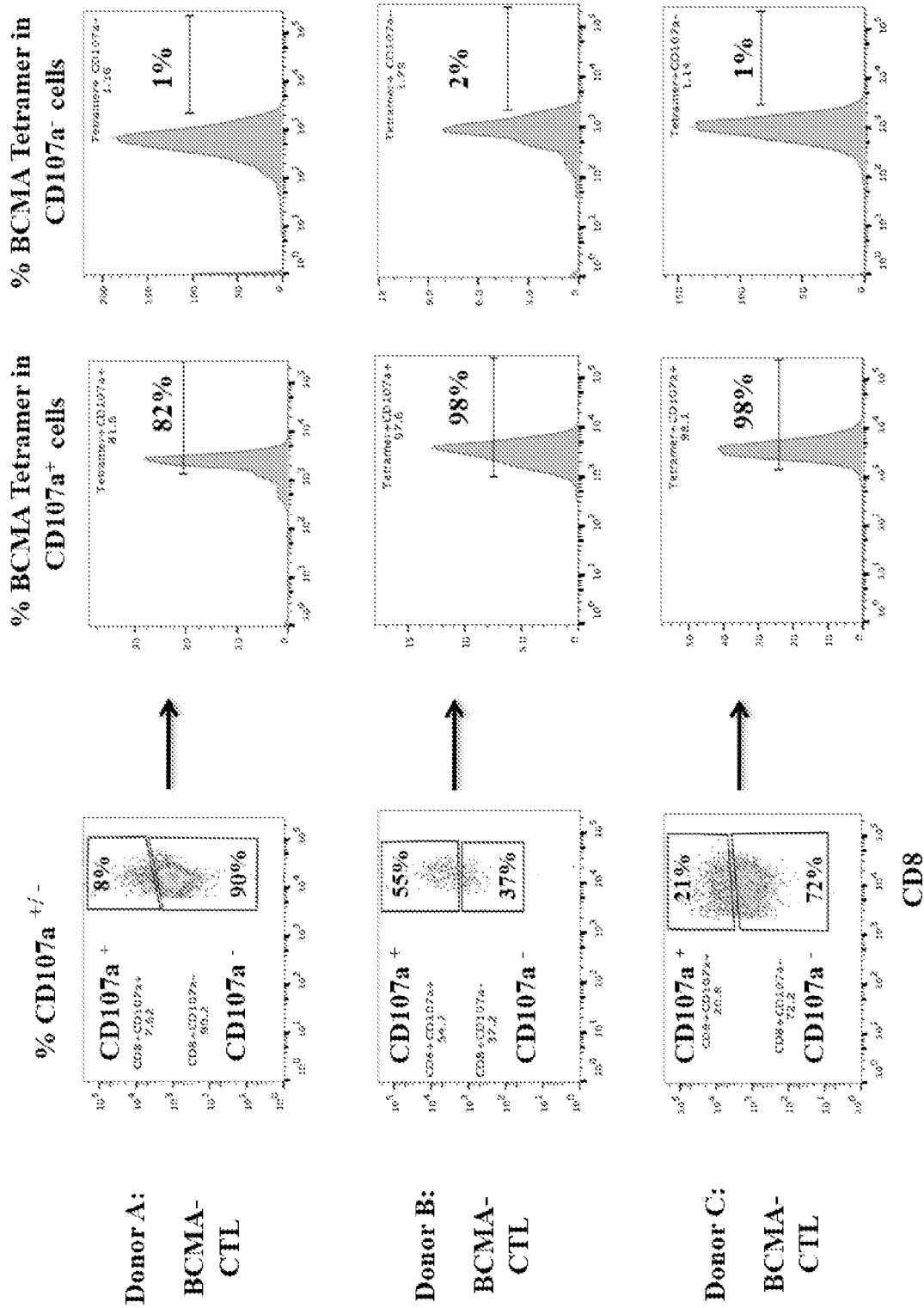

The hBCMA$_{72-80}$ CTL were further characterized for their phenotypes and anti-tumor activities within the Tetramer-positive population. The Tetramer-positive CTL displayed significantly increased the CD8⁺ T cells with activation (CD38⁺: Tetramer⁺ vs. Tetramer: 49.4% vs. 3.2%) and co-stimulatory molecule expression (CD40L⁺: 38.0% vs. 1.2%, 41BB: 24.7% vs. 1.9%, OX40: 46.2% vs. 1.7%, and GITR: 34.9% vs. 1.5%) (FIG. 16A). The hBCMA$_{72-80}$ CTL generated from several HLA-A2⁺ individuals (n=3) consistently demonstrated higher levels of anti-MM activities against U266 MM cells by Tetramer-positive cells (83%, 97%, 97%; Donor A, B or C BCMA-CTL), as compared to Tetramer-negative cells (6%, 18%, 13%; Donor A, B or C BCMA-CTL) (FIG. 16B). The frequency of Tetramer-positive cells within either CD107a-positive or CD107a-negative CD8⁺ CTL was further evaluated. It was observed a significantly higher frequency of Tetramer⁺ cells within the degranulating CD107a-positive CTL (82%, 98%, 98%; Donor A, B or C) compared to CD107a-negative CTL (1%, 2%, 1%; Donor A, B or C BCMA-CTL) (FIG. 16C). These results therefore confirm that the specific anti-MM activities of the h BCMA$_{72-80}$ CTL are contained within the BCMA peptide specific Tetramer-positive cells, which display upregulation of CTL activation and co-stimulatory molecules.

In FIGS. 16A-16C, the heteroclitic BCMA$_{72-80}$ recognizing Tetramer-positive CTL or non-recognizing Tetramer-negative CTL were analyzed for expression of CD38, CD40L, 41BB, OX40 and GITR on CD8⁺ T cells (FIG. 16A). Anti-tumor activities of the heteroclitic BCMA$_{72-80}$-specific CTL (N=3) were further characterized by measuring CD107 upregulation within Tetramer-positive CTL or Tetramer-negative CTL subset (FIG. 16B); and by evaluating the status of Tetramer-positivity within CD107a-positive CTL or CD107a-negative CTL (FIG. 16C).

Heteroclitic BCMA$_{72-80}$ peptide induces MM-specific memory CD8⁺ CTL.

Figure 17A:
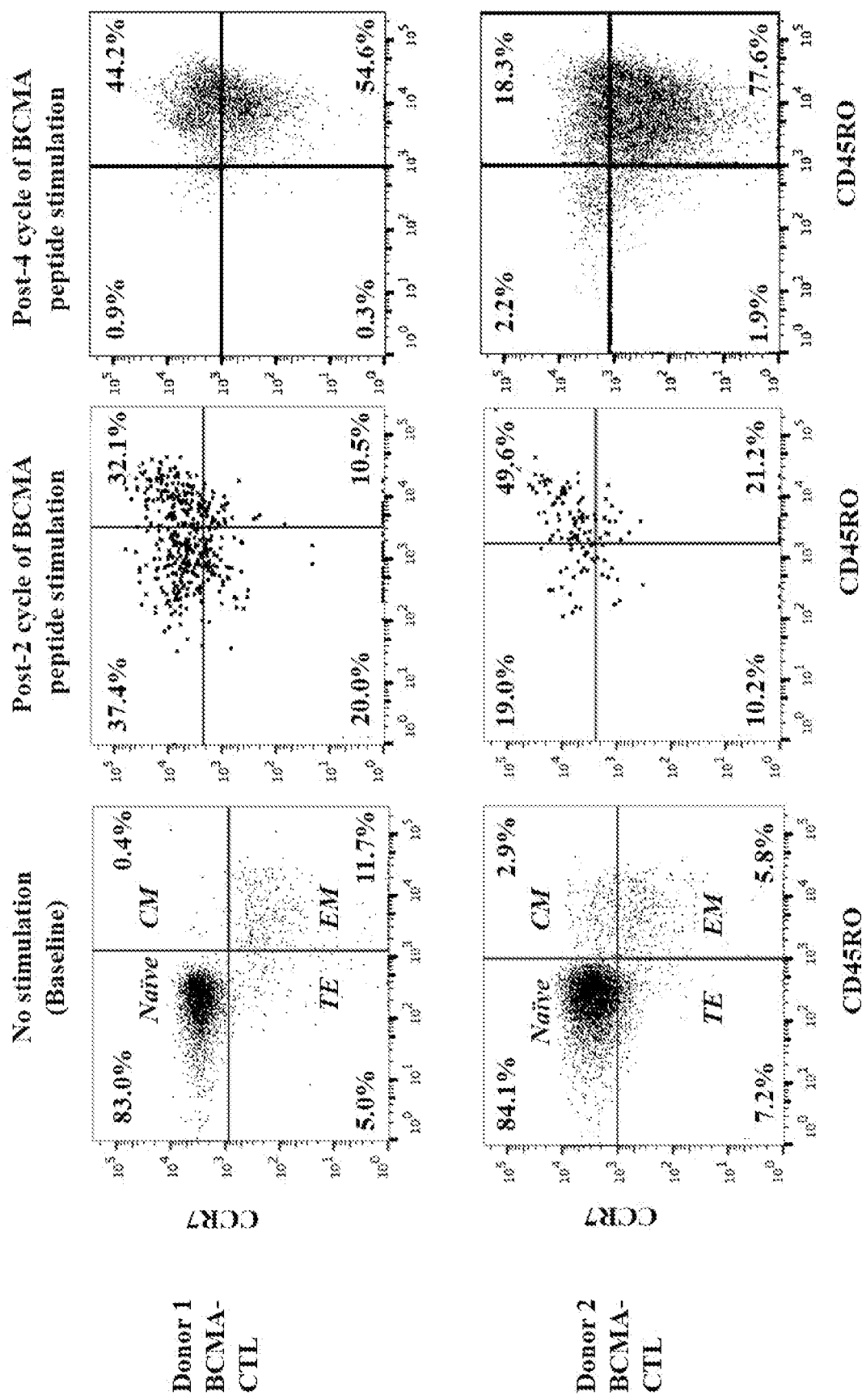
FIGS. 17A-17E. Differentiation of memory CD8$^+$ T cell of BCMA-specific CTL upon the stimulation with heteroclitic BCMA$_{72-80}$ peptide.
Figures 17B, 17C:
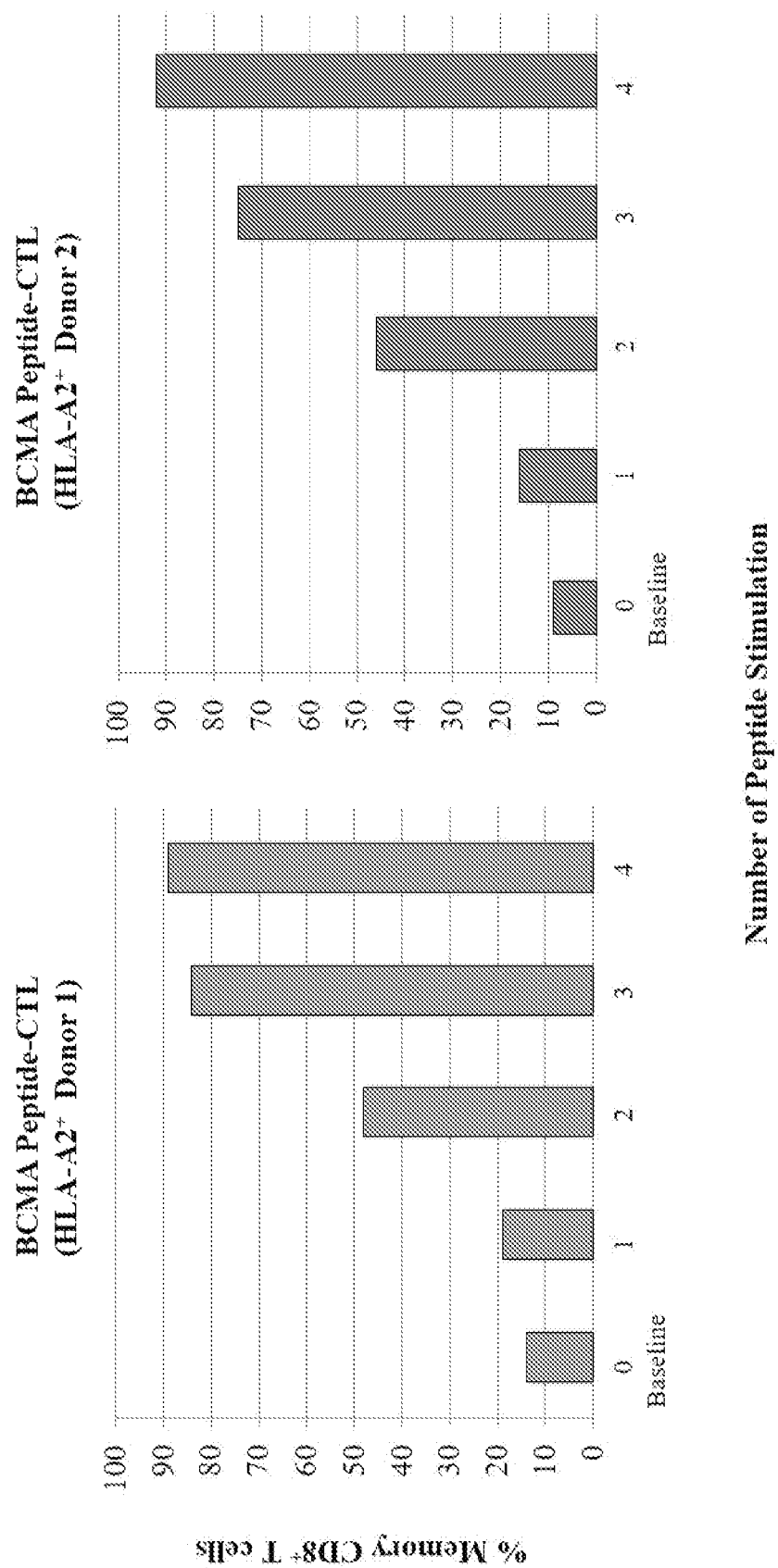
Figures 17D, 17E:
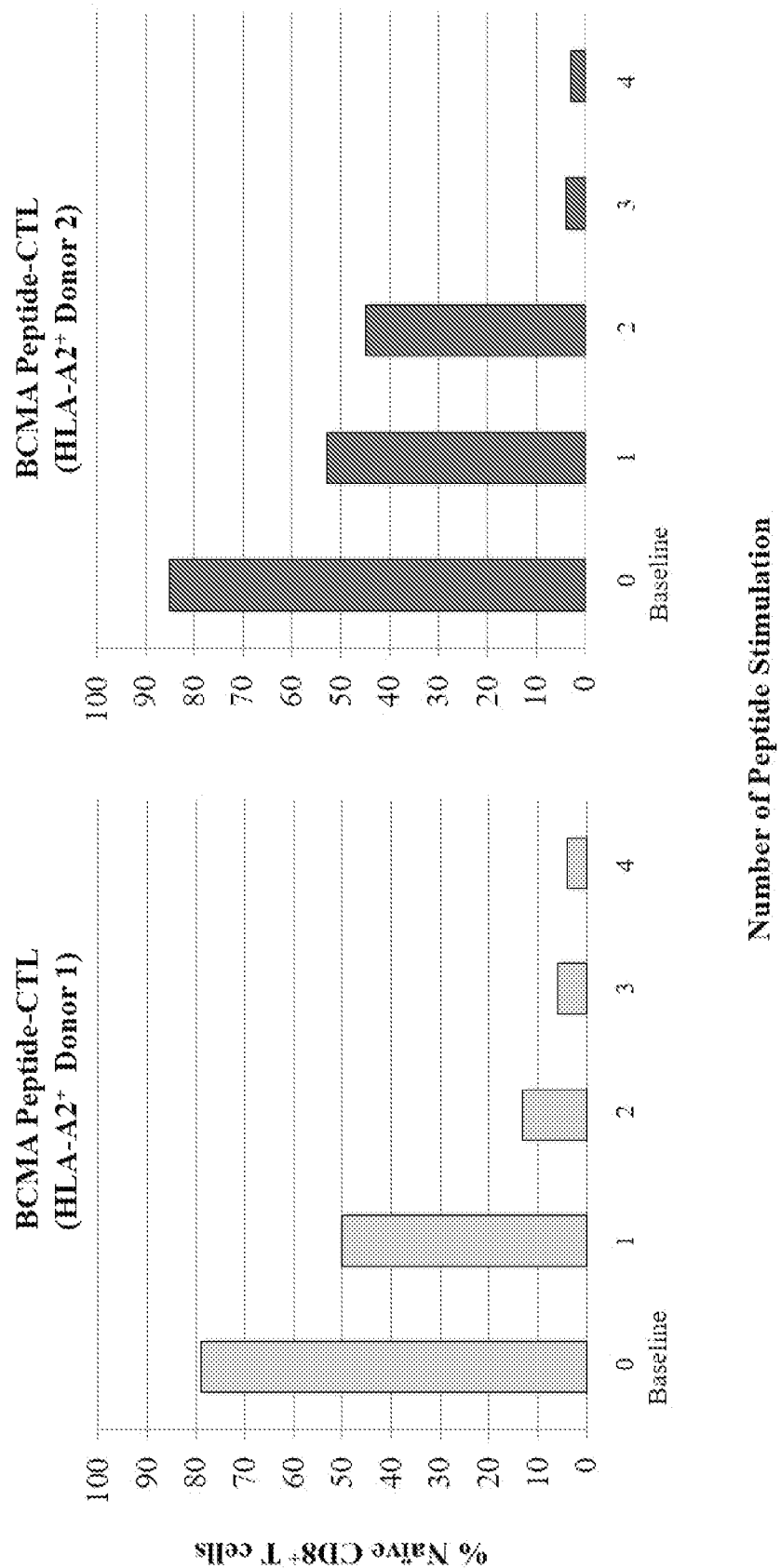

To characterize BCMA-specific CTL activities, experiments were performed to evaluate the composition of naïve: memory CTL subsets post-2 and post-4 cycles of peptide stimulation, compared to baseline. A gradual progressive phenotypic changes were detected within CD8⁺ T cells: progressing from naïve (CD45RO⁻ CCR7+) at baseline [Donor 1—Naïve: 83.0%, CM: 0.4%, Donor 2—Naïve: 84.1%]; to central memory (CM; CD45RO⁺CCR7⁺) after 2 cycles of peptide stimulation [Donor 1—Naïve: 37.4%, CM: 32.1%, Donor 2—Naïve: 19.0%, CM: 49.6%]; and then to effector memory (EM; CD45RO⁺CCR7⁻) CTL after 4 cycles of stimulation (Donor 1—CM: 44.2%, EM: 54.6%, Donor 2—CM: 18.3%, EM: 77.6%) (FIG. 17A). Overall, memory CD8⁺ CTL development was gradually increased following each round (post-1, 2, 3, 4 cycles) of heteroclitic BCMA$_{72-80}$ peptide stimulation (FIG. 17B-17C), associated with a corresponding decrease in naïve T cells (FIG. 17D-17E). These results therefore demonstrate induction and gradual development of memory CTL upon the stimulation of T cells with heteroclitic BCMA$_{72-80}$ peptide.

In FIG. 17A-17E, the naïve: memory phenotype of heteroclitic BCMA$_{72-80}$ CTL (Donor 1, Donor 2) were analyzed at baseline (no peptide stimulation) or one week after each cycle of peptide stimulation. The pattern of phenotype changes, differentiation from naïve into memory CD8⁺ T cells, and expansion of memory CTL were demonstrated in dot-plots (FIG. 17A) and bar graphs (FIGS. 17B-17E) after each cycle of BCMA peptide stimulation.

Central Memory hBCMA$_{72-80}$ CTL Demonstrate the Greatest Anti-MM Activities

The specific memory T cell subsets within BCMA-specific CTL generated from eight (N=8) different HLA-A2⁺ individuals were next characterized for their anti-MM activities. Compared to CD45RO⁻ non-memory CTL, CD45RO⁺ memory CTL demonstrated increased CD107a degranulation in response to HLA-A2$^+$ U266 MM cells (non-memory vs. memory: 7.25% vs. 28.2%) and HLA-A2$^+$ McCAR MM cells (non-memory vs. memory: 4.14% vs. 13.2%) (FIG. 18A; Donor A BCMA-CTL). The hBCMA$_{72-80}$ specific Tetramer$^+$ cells were mainly and consistently showed the CM phenotype in BCMA-CTL generated from different individuals (% CM within Tetramer$^+$ cells—Donor B: 88.2%, Donor C: 97.4%, Donor D: 100%) (FIG. 18B). The CM CTL were also evaluated for their functional activities against U266 MM cells. Importantly, the level of CD107a degranulation was directly associated with the frequency of CM cells (% CM within CD107a$^+$ cells—Donor E: 81.0%, Donor F: 82.6%, Donor G: 67.0%, Donor H: 41.5%) (FIG. 18C). In addition, the high responders (Donor E, Donor F) showing higher anti-MM activities displayed increased frequency of BCMA peptide-specific CM CTL compared to a mid-level responder (Donor G) or a low level responder (Donor H). These results thus further indicate the distinct peptide-specificity and anti-MM activities induced by the CM subset generated by the heteroclitic BCMA$_{72-80}$ peptide.

Figure 18A:
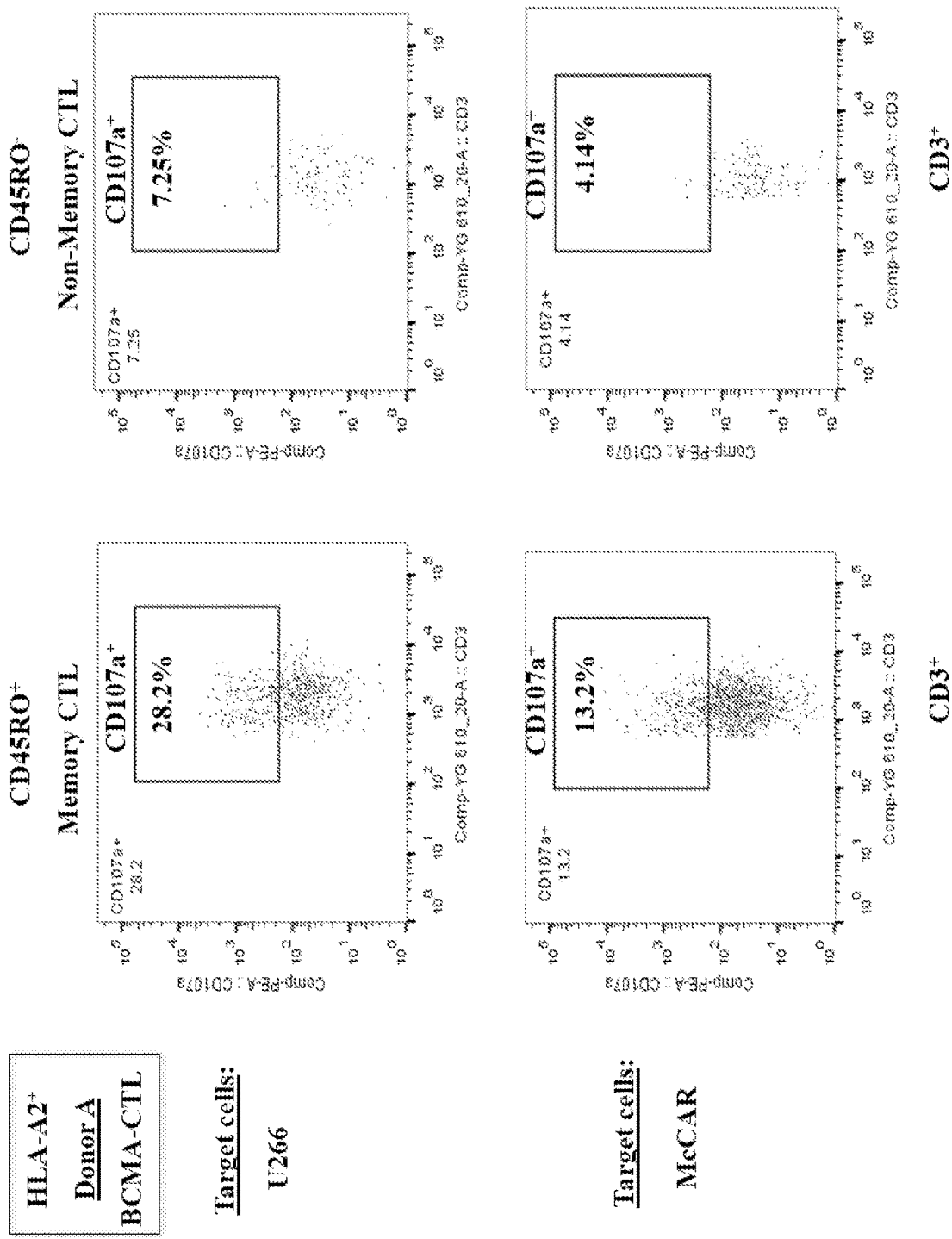
FIGS. 18A-18C. Characterization of high anti-tumor activities by BCMA-specific memory CTL (FIG. 18A) and the highest levels by central memory CTL (FIG. 18B, FIG. 18C).
Figure 18B:
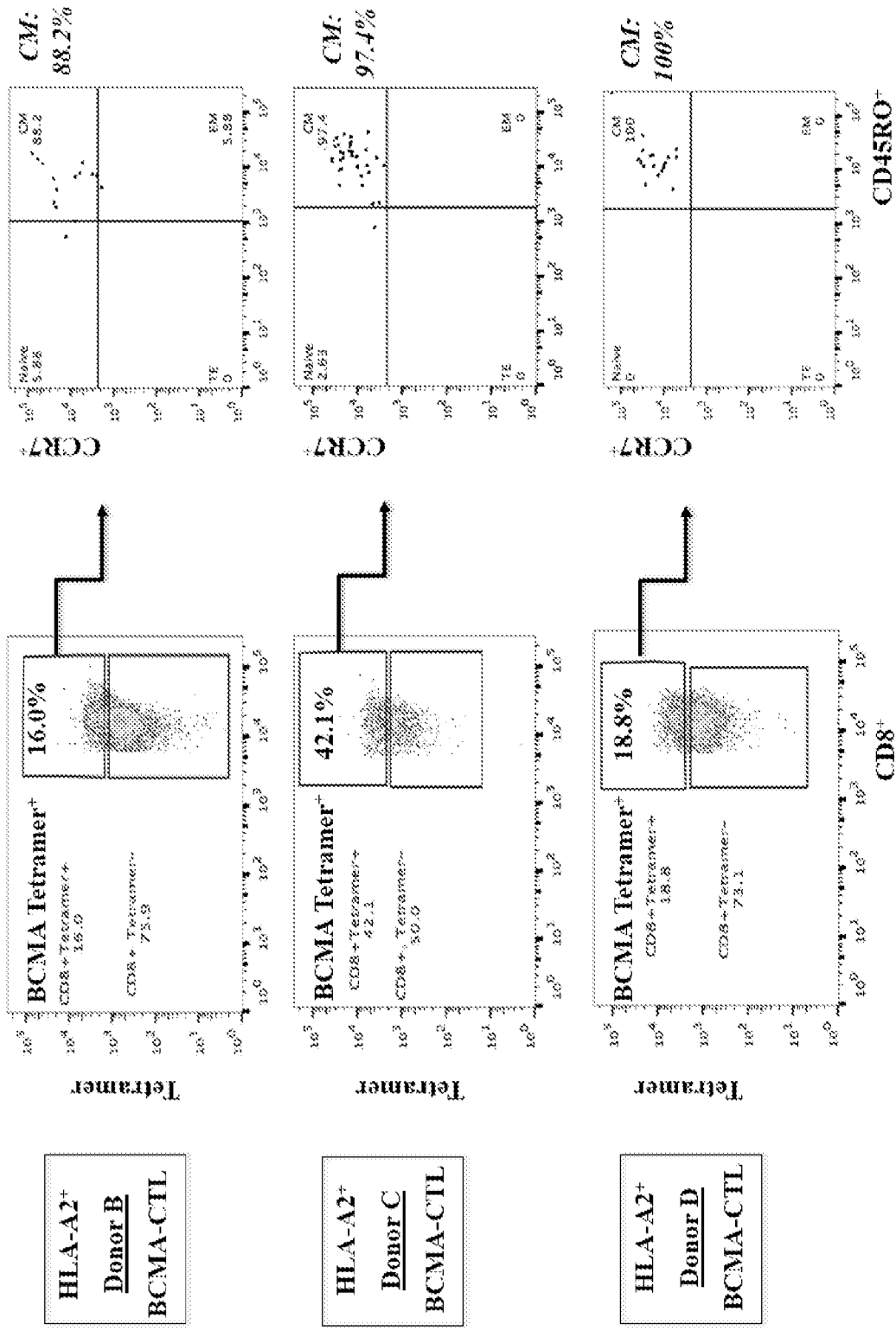
Figure 18C:
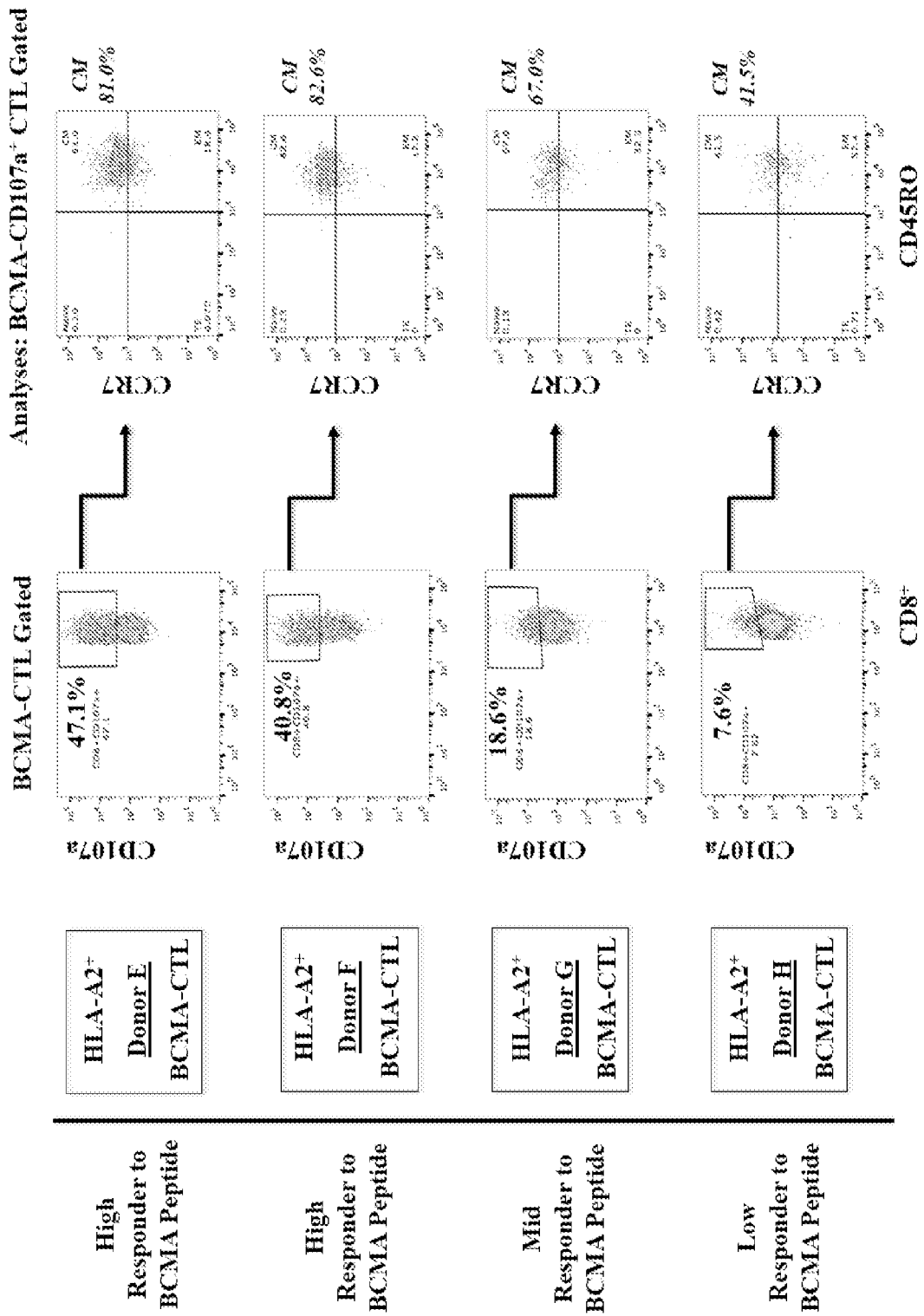

In FIGS. 18A-18C, anti-MM activity of heteroclitic BCMA$_{72-80}$ CTL was evaluated within the naïve: memory CD3$^+$CD8$^+$ T cell subsets in response to HLA-A2+MM cells (U266, McCAR; FIG. 18A). The frequency of central memory CD8$^+$ T cells was analyzed in different CTL subsets of heteroclitic BCMA$_{72-80}$ CTL (N=3); within Tetramer-positive or Tetramer-negative CTL subsets (FIG. 18B) and within CD107a-positive or CD107a-negative CTL subsets (FIG. 18C).

Inhibition of LAG3 or Stimulation of OX40 Enhances Proliferation and Anti-MM Activities of hBCMA$_{72-80}$ CTL Finally, experiments were performed to characterize the specific T cell subset of BCMA-CTL which are highly responsive to MM cells. The CD8$^+$ T cell subset was gated, demonstrating HLA-A2-restricted MM specific CTL proliferation, and their Naïve: Memory subsets were characterized. The most robust responding and highest proliferating hBCMA$_{72-80}$ CTL to U266 MM cells were mainly within the CM subset (Donor 1: 97.4%, Donor 2: 100%) (FIG. 19A), confirming the major role of CM subset within BCMA antigen-specific CTL in anti-MM activities. Next, experiments were performed to investigate the impact of a checkpoint inhibitor (anti-LAG3) or immune agonist (anti-OX40) on these memory T cells. The hBCMA$_{72-80}$ CTL treated with either anti-LAG3 or anti-OX40 demonstrated enhanced cytotoxic activity, especially by memory CTL against HLA-A2$^+$ U266 MM cells (Untreated 28.2% vs. anti-LAG3 treated 35.8% vs. anti-OX40 treated 39.5%); and against HLA-A2$^+$ McCAR MM cells (Untreated 13.2% vs. anti-LAG3 treated 14.5% vs. anti-OX40 treated 20.0%) (FIG. 19B). Interestingly, the checkpoint inhibitor and immune agonist did not induce enhance the anti-MM responses of non-memory cells within BCMA-CTL. Lastly, the beneficial effect of anti-LAG3 and anti-OX40 was further investigated within CM and EM subsets of hBCMA$_{72-80}$ CTL. Either treatment induced greater impact on BCMA-specific CM cells compared to EM cells, evidenced by higher CD107a degranulation in response to anti-LAG3 or anti-OX40 treatment (FIG. 19C). These results therefore support the utility of anti-LAG3 or anti-OX40 antibody in combination with hBCMA$_{72-80}$ peptide induced CTL to further enhance anti-MM activities within the BCMA-specific CM subset.

Figure 19A:
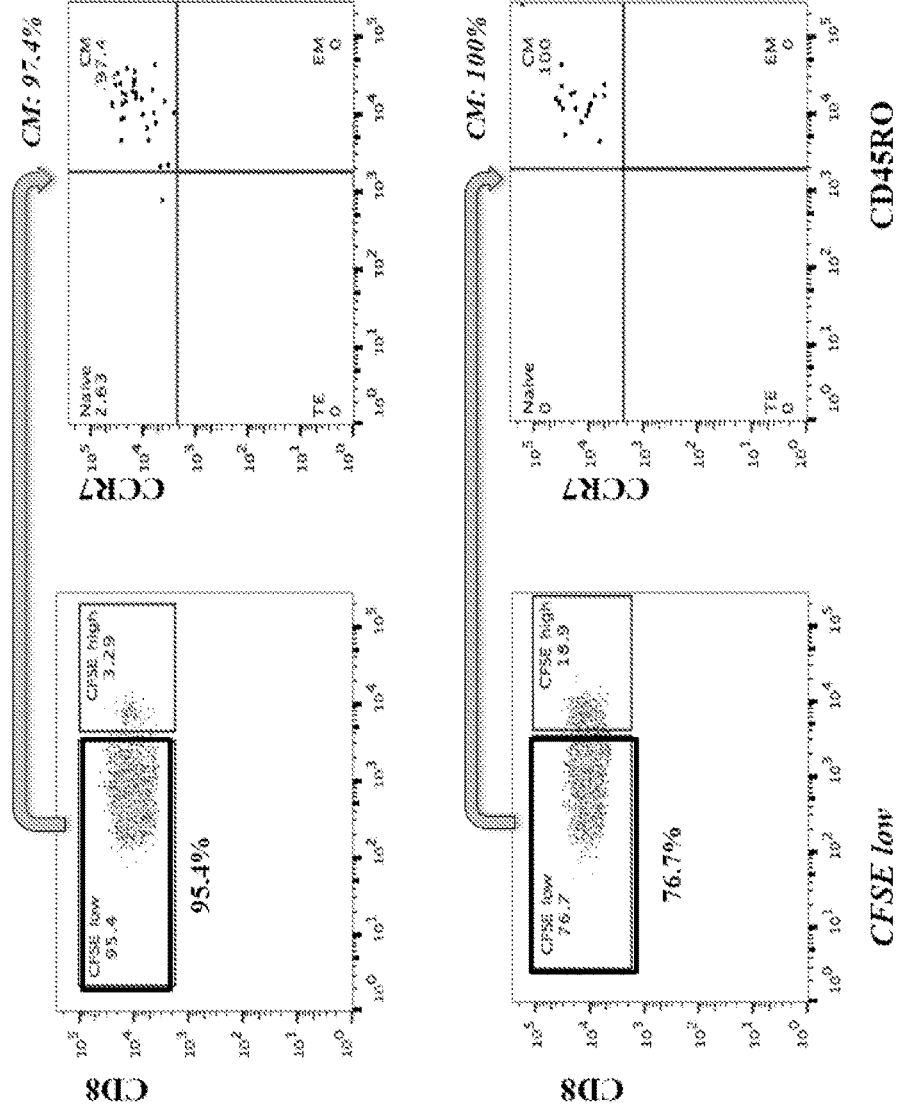
FIG. 19A. The results of BCMA peptide-specific CTL co-cultured (7 days) with 25 U266 cells.
Figure 19B:
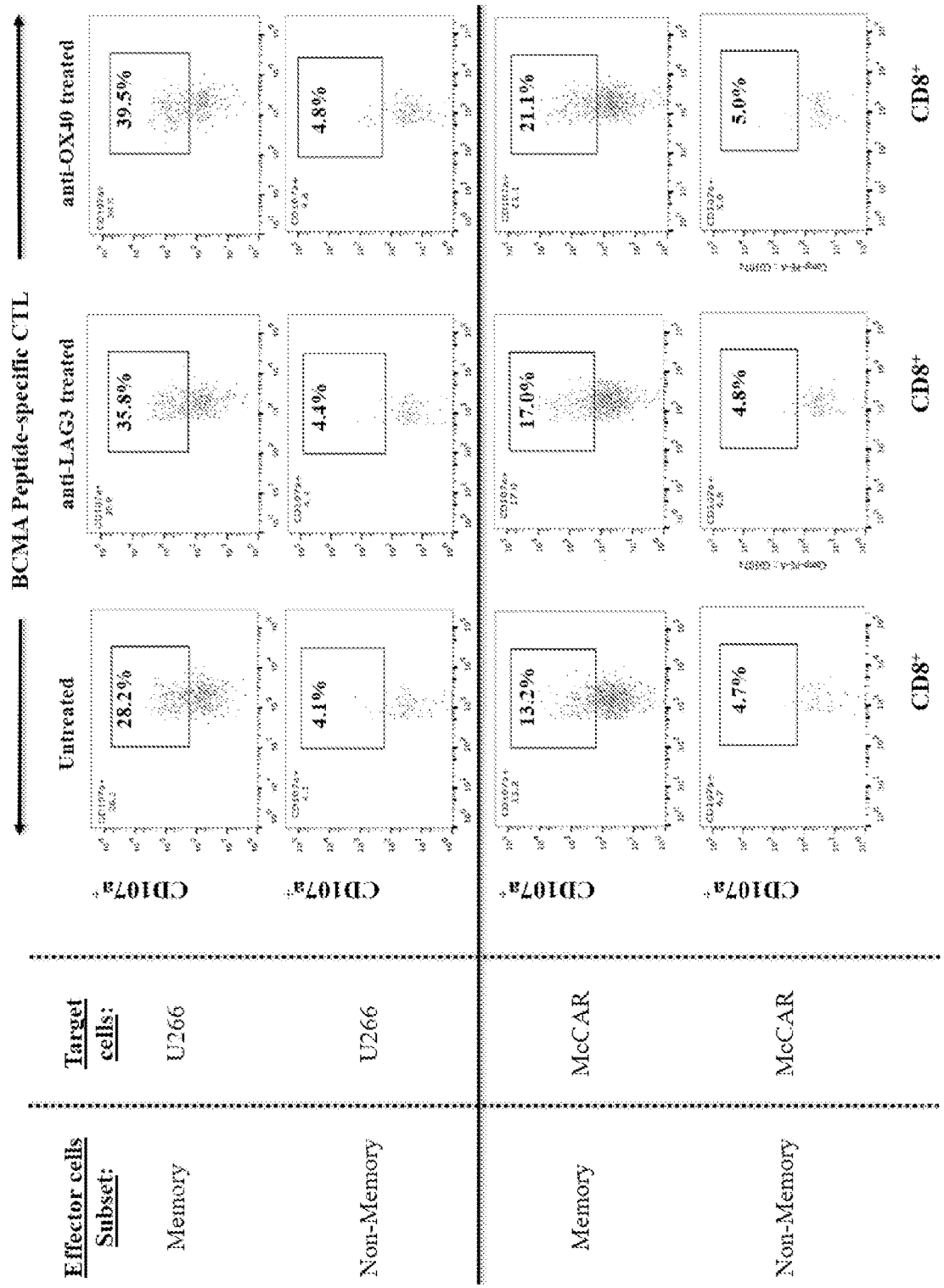
FIGS. 19B-19C. Enhanced anti-myeloma activities of memory CD8+ T cells of heteroclitic BCMA72-80 CTL [generated from one HLA-A2+ individual] in treatment with anti-LAG3 or anti-OX40.
Figure 19C:
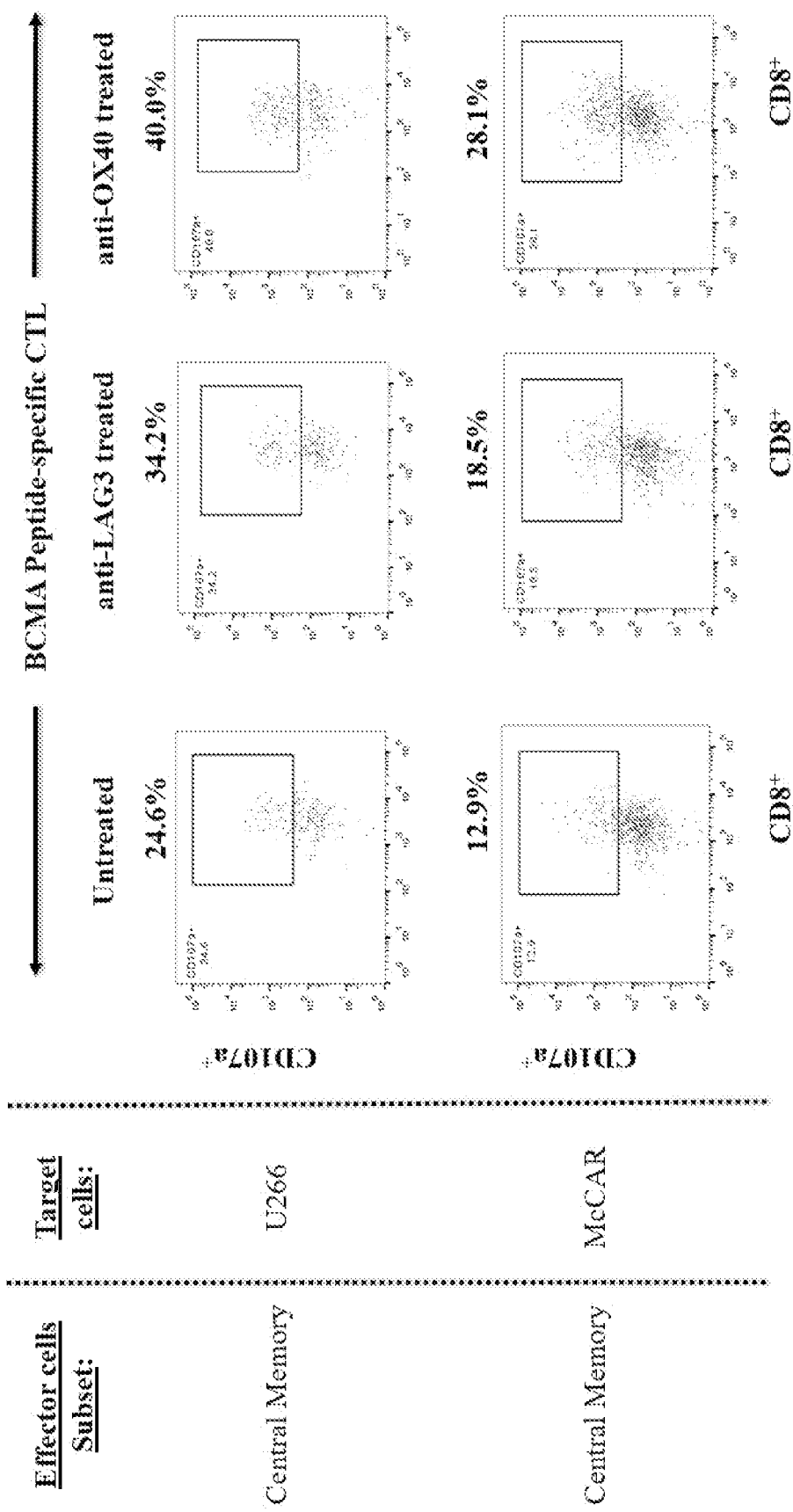
Figure 19D:
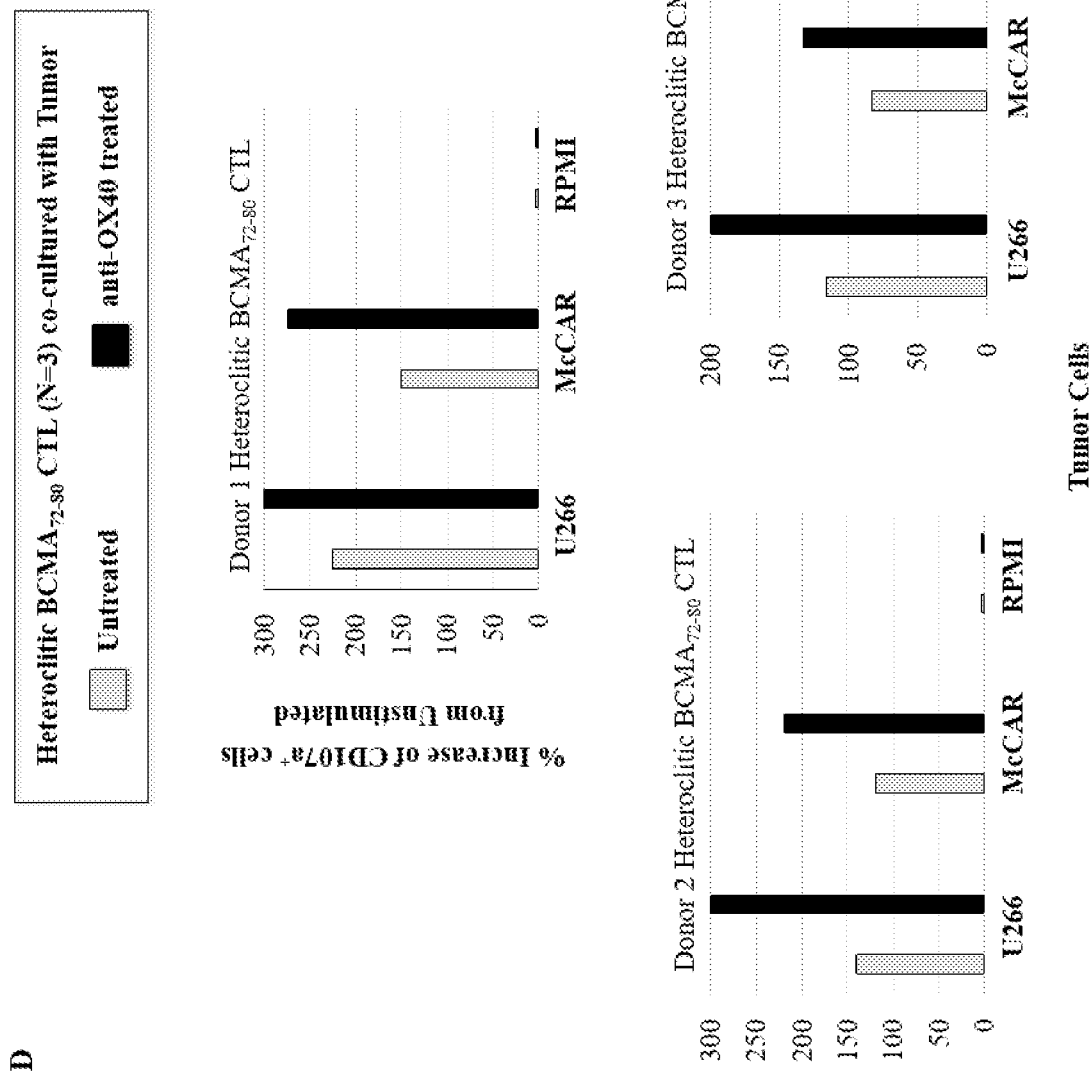
FIG. 19D. Enhanced anti-tumor activities of heteroclitic BCMA$_{72-80}$ CTL [generated from HLA-A2$^+$ Donor 1, Donor 2 or Donor 3] in treatment with anti-OX40 against myeloma cells in an HLA-A2-restricted manner.

In FIGS. 19A-19C, the specific subset inducing MM-specific CD8$^+$ T cell proliferation was identified within heteroclitic BCMA$_{72-80}$ specific CTL in response to U266 cells (FIG. 19A). Furthermore, the heteroclitic BCMA$_{72-80}$ CTL was evaluated in combination with anti-LAG3 or anti-OX40 for their modification of anti-myeloma activities by memory T cells (FIG. 19B) or central memory T cell subset (FIG. 19C).

Discussion

Even in patients with refractory MM relapsing after allotransplantation, long-lasting responses have been achieved with the infusion of donor lymphocytes (DLI). These early encouraging results of DLI have provided the framework for evaluation of active-specific immunotherapy approaches to treat MM. Cancer targeting vaccines, one such active-specific immunotherapy approach, have demonstrated the ability to induce highly effective CD8$^+$ CTL with anti-tumor activities. The success of vaccination depends on selection of the appropriate patient population, targeting antigens expressed selectively on tumor, and utilizing combination approaches to effectively induce and maintain antigen-specific memory anti-tumor immune responses. This disclosure provides immunogenic HLA-A2 and HLA-A24 specific peptides derived from XBP1, CD138 and CS1 antigens, which are highly over-expressed in MM and solid tumors including breast, pancreatic, and colon cancers, and demonstrated their ability to induce the peptides-specific CD8$^+$ CTL with anti-tumor activities against HLA-A2$^+$ or HLA-A24$^+$ tumor cells both in preclinical and clinical studies. In addition, combination studies of peptide stimulation/vaccination with immune modulatory drugs such as lenalidomide or with histone deacetylase 6 inhibitor ACY241 enhanced the peptides-specific CTL activities against tumor cells. The experiments demonstrated that combinations of peptide stimulation with either Lenalidomide or ACY241 augmented antigens-specific CD8$^+$ T cell activity associated with upregulation of transcriptional regulators such as T-bet/Eomes and with activation of AKT, which links antigen-specific CTL differentiation to FOXO, mTOR and Wnt/β-catenin signaling pathways. Importantly, these effects were confined primarily to antigen-specific CD45RO$^+$ memory CTL, with the most robust increases in IFN-γ and granzyme B production and CD8$^+$ T cell proliferation in response to tumor cells observed mainly within the specific CM subset.

Due to the encouraging preclinical results, the XBP1/CD138/CS1 multipeptide vaccine has been evaluated, alone and in combination with lenalidomide, in clinical trials to treat patients with smoldering MM (SMM), as well as in combination with anti-PD1 in clinical trials to treat patients with triple negative breast cancer. In patients with SMM, the multipeptide vaccine was well tolerated and immunogenic as a monotherapy, evidenced by enhanced frequency of Tetramer$^+$ CD8$^+$ CTL with IFN-γ production; moreover, combination with lenalidomide triggered higher mean fold increases in CD8$^+$ T cells with tetramer-positivity and IFN-γ production. Importantly, CD45RO$^+$ memory CTL specific to the XBP1/CD138/CS1 peptides were induced by the peptide vaccine, and further enhanced in combination with lenalidomide. Although stable disease and responses have been observed in SMM, randomized trials are needed to assess whether time to progression from SMM to active disease can be prolonged by the peptide vaccination.

To expand the MM-specific immunotherapy beyond XBP1/CD138/CS1 antigens, the disclosure also identified additional tumor associated antigens on CD138$^+$ tumor cells from newly diagnosed MM patients (N=616). Here the disclosure provides the identification and characterization of an immunotherapeutic strategy targeting BCMA, selectively expressed on normal and malignant plasma cells and the target of several current immune treatments in MM. The examples provide highly immunogenic engineered BCMA-specific nanopeptides, heteroclitic BCMA$_{72-80}$ (YLMFLLRKI (SEQ ID NO: 37)) and BCMA$_{54-62}$ (YILWT-CLGL (SEQ ID NO: 45)) with highly improved HLA-A2 affinity/stability from their native BCMA peptides. These peptides evoke BCMA-specific CTL, increased BCMA-specific Tetramer$^+$ cells, enhanced CD107 degranulation, Th1-type cytokines (IFN-γ/IL-2/TNF-α) production, and proliferation to MM cells in an HLA-A2-restricted manner. Most importantly, the increase of BCMA-specific memory CD8$^+$ CTL, both CM and EM cells, along with the capacity of self-renewal and response to MM cells, strongly support the potential of heteroclitic BCMA peptide in novel vaccination and/or immunotherapeutic approaches in MM. Indeed, the disclosure provides clinical protocols with heteroclitic BCMA$_{72-80}$ peptide vaccination, harvest and expansion of BCMA-specific CM cells ex vivo, reinfusion of these CM cells as adoptive immunotherapy, and then vaccination with the BCMA peptide as needed thereafter to assure their persistence to effectively treat MM patients.

It has been observed that BCMA-specific memory CD8$^+$ CTL expressed key molecules modulating T cells function, both for co-stimulation and immune suppression. The highest induction of co-stimulatory and immune checkpoint molecules was detected on CM subset within hBCMA$_{72-80}$ peptide-specific CTL, which is the population demonstrated highly effective poly-functional activities against MM. Importantly, these findings indicated the potential of combination therapy of BCMA-CTL with checkpoint inhibitors or immune agonists to enhance their functional anti-MM activities. This may be particularly relevant, given the recent concerns when combining PD-1 checkpoint inhibitor with immunomodulatory drugs lenalidomide or pomalidomide or with Ab daratumumab, where toxicities have curtailed studies. Here, the examples attempted to targeting alternative inhibitory receptors and suppressive mechanisms within the MM tumor microenvironment. In particular, LAG3 (CD223) is the third inhibitory receptor to be targeted in the clinic, following CTLA and PD1/PD-L1 and was expressed on BCMA-specific CM CTLs. In parallel, immune agonists, especially the co-stimulatory tumor necrosis factor receptors targeting OX40 (CD134), 41BB (CD137) and GITR (CD357), have received considerable attention for their therapeutic utility in enhancing anti-tumor immune responses; among these, anti-OX40 mAb has recently demonstrated encouraging efficacy in induction of tumor regression by boosting effector T cell expansion and functional anti-tumor activities in several pre-clinical studies. Importantly, a clinical grade anti-LAG3 and anti-OX40 (provided by Bristol-Myers Squibb; New York, N.Y.) was used to evaluate functional activities of heteroclitic BCMA$_{72-80}$ specific CTL to MM cells. The ex vivo experiments demonstrated that both anti-LAG3 and anti-OX40 increased functional activity specifically of memory CTL within the BCMA-CTL against MM cells, without affecting the activity of non-memory CTL. The impact on BCMA-CTL generated from multiple HLA-A2$^+$ individuals' T cells was greater after treatment with anti-OX40 than anti-LAG3, and greater on CM versus EM subset within BCMA specific CTL. These studies provide the framework for scientifically-informed combination clinical trials of BCMA peptide specific immunotherapy with the immune agonist or checkpoint inhibitor.

In summary, these experiments identified and validated novel immunogenic HLA-A2-specific engineered BCMA peptides, which are capable of inducing antigen-specific CD8$^+$ CTL with functional anti-tumor activities against MM cells. These results provide the framework for therapeutic application of these highly immunogenic heteroclitic BCMA peptides in MM patients as vaccines and/or as stimuli for expansion of autologous antigen-specific memory CTL. They further support the potential utility of combinations incorporating BCMA peptide vaccine or BCMA-specific adoptive T cells immunotherapy with anti-OX40 and/or anti-LAG3 to enhance BCMA directed anti-MM responses.

Example 13. BCMA-Specific TCRs

Adoptive cell therapy has emerged as one of the most promising therapeutic approaches for harnessing the power of a patients' immune response against cancer. Advances in technologies have allowed for treatment with expanded activated T cells targeting tumor associated antigens and achievement minimal residual disease negative responses, as demonstrated following CD19 chimeric antigen receptor (CAR) T cell therapies for B-cell acute lymphoblastic leukemia and diffuse large B-cell lymphoma (Lee et al. 2015, Kochenderfer et al. 2015, Turtle et al. 2016). These T-cell engineering and expansion approaches have now been approved by the FDA. However, the CAR-based therapeutic approach is associated with toxicity (e.g., cytokine release syndrome) and short-term persistence of CAR T cells, which might limit the effectiveness of this therapy. In addition, this approach has not yet mediated benefit in patients with non-hematopoietic solid tumors. As an alternative approach from CAR, adoptive transfer of ex vivo expanded tumor-infiltrating lymphocytes (TIL) can reproducibly mediate anti-tumor effects in melanoma, but TILs are difficult to obtain and generate in some solid tumors. Beyond small studies demonstrating activity of virus-specific TIL in cervical cancer (Stevanovic et al. 2015) or a TIL product enriched for mutations in hepatobiliary carcinoma (Tran et al. 2014), the efficacy of adoptive therapy using TIL has not been convincingly demonstrated beyond melanoma.

T cells expressing engineered T cell receptors (TCRs) represent a promising approach to overcome the challenges associated with generating TIL and the theoretical limitations of low-affinity TCR for tumor-associated self-antigens present in the natural T-cell repertoire (Aleksic et al., 2014). Patients' lymphocytes have been genetically engineered to express tumor antigen-specific TCR that consists of α and β chains of TCR genes derived from a tumor-reactive T-cell clone. Adoptive therapy with TCR-engineered T cells has shown promising results in the treatment of patients with tumors, and the number of TCRs amenable for clinical testing is expanding rapidly. Currently, we are developing strategies to introduce TCR into T cells, engineering large numbers of T cells to be tumor-reactive.

The highly immunogenic heteroclitic BCMA$_{72-80}$ peptide has the capacity to evoke BCMA antigen-specific CD8+ cytotoxic T lymphocytes with robust anti-tumor activities against multiple myeloma. This example demonstrates the production of TCRs specific to BCMA. These TCRs may be used to engineer autologous T cells to express BCMA-specific TCR reactive against the BCMA peptide, which are then expanded to tumor specific adoptive immunotherapy.

Materials and Method

Induction of Heteroclitic BCMA$_{72-80}$ Peptide-Specific CTL

Heteroclitic BCMA$_{72-80}$ peptide-specific CTL (hBCMA-CTL) were generated ex vivo by repeated stimulation of enriched CD3 T cells obtained from HLA-A2+ donors with peptide-pulsed antigen-presenting cells (APC). In brief, peptide (50 μg/ml)-pulsed APC were irradiated (10 Gy) and used to stimulate T cells at a 1 APC/peptide: 20 T cell ratio.

The T cell cultures were restimulated every 7 days and maintained in AIM-V medium supplemented with 10% human AB serum (BioWhittaker) in the presence of recombinant human IL-2 (50 units/ml).

Isolation of BCMA Antigen-Specific IFN-γ Producing CD3+CD8+ T Cells from Heteroclitic hBCMA$_{72-80}$ CTL Heteroclitic hBCMA$_{72}$-80 CTL were stimulated in vitro with their cognate BCMA72-80 (YLMFLLRKI (SEQ ID NO:37) peptide at a concentration of 50 µg/mL, and incubated for 4 hours at 37° C. and 5% CO2. Cells were then collected and processed using the IFN-γ Secretion Assay Enrichment Kit (Miltenyi, Somerville, Mass.) per the manufacturer's instructions. Briefly, in vitro BCMA peptide stimulated hBCMA72-80 CTL were incubated for 5 minutes with IFN-γ Catch Reagent, and then incubated for 45 minutes at room temperature under slow rotation to allow the secretion of IFN-γ. Subsequently, the cells were stained following standard protocols and manufacturer's instructions using the following antibodies: CD3-APC (BD), CD8 FITC (BD), IFN-γ PE (Miltenyi), and LIVE/DEAD Aqua Stain (Life Technologies). The IFN-γ secreting Live CD3+ CD8+ T cells were isolated by sorting on a BD Aria II SORP flow cytometer. When possible, FCS files (100,000 events) were recorded and then analyzed with FlowJo v10 software (Tree Star).

Identification of hBCMA$_{72}$-80 Specific TCR Sequences

The enriched BCMA$_{72-80}$ (YLMFLLRKI (SEQ ID NO:37)) peptide-specific IFN-γ cells (5,000 sorted CD3+ CD8+ IFN-γ+ cells) were used for single-cell barcoding by 10× αβ TCR analysis. Subsequent TCR amplification and library generation was performed according to standardized protocols by 10× Genomics (Pleasanton, Calif.). The targeted TCR α and β were followed with nested PCR primers (not-multiplexed), and then Illumina compatible libraries were generated. Illumina sequencing was performed at the Center for Cancer Genome Discovery at DFCI. The data was analyzed in house with the Cell Ranger analysis package provided by 10× Genomics, which transforms raw Illumina reads to annotated TCR clonotypes for assessment of the TCR repertoire. The identified TCR sequences were sent to GenScript (Piscataway Township, N.J.) for production of the respective plasmids. The identified sequences are provided in Tables 1, 2, 3, 7, and 8.

Immunosequencing and Identification of T Cell Receptors (TCRs).

Genomic DNA was extracted from peripheral blood samples using the Qiagen DNeasy Blood Extraction kit (Qiagen). The CDR3 region of rearranged TCRβ genes, defined according to IMGT (Yousfi Monod et al. 2004), was amplified and sequenced using previously described protocols (Robins et al. 2009). Briefly, a multiplexed PCR method that uses a mixture of 60 forward primers specific to TCR V$_β$ gene segments and 13 reverse primers specific to TCR J$_β$ gene segments was employed. Statistical learning framework for the identification of TCRs associated was defined by immunoSEQ by adoptive biotech with particular subject phenotypes.

Plasmid Preparation for Evaluation of TCR Function

A total of 14 Plasmid clones were received from GenScript on May 1, 2018. Then, each plasmid preparation was transfected into E. coli strain DHα-5. The specific colonies were selected from the plates and transferred into LB media with Amp (conc. 100 µg/ml) for expansion. After overnight incubation, plasmid DNA purification was performed using the Maxi QIAGEN kit (Qiagen, Germantown, Md.).

Results

TCR repertoire data was processed with the 10× Genomics Cell Ranger software package, which converts raw reads to FastaQ files, as well as assembles and annotates TCR sequence. TCR α and β chains with common barcodes were identified as paired. Paired end sequencing was performed using the manufacturer's recommended parameters for Chromium Single Cell 3' Reagent v2 chemistry for TCR sequencing. The TCR sequences (α and β chains) of a total of 14 (fourteen) clones were determined (see Tables 1, 2, 7, and 8). The TCR α and β chain CDR3 sequences of a total of 32 (thirty-two) clones were determined (see Tables 3 and 9). The TCR α and β chain sequences or α and β chain CDR3 sequences are used to generate T cells with functional activities against multiple myeloma or other cancers expressing BCMA.

Example 14. FURTHER BCMA-Specific TCRs

T cells are primary effector cells of antigen-specific immunity against cancer and other diseases. Thus, characterization of the specific immune response includes TCR diversity and heterogeneity. A TCR interacts with a peptide antigen bound to a major histocompatibility complex (MHC) or HLA molecule mainly through the paired alpha- and beta-CDR3s (see, Moss & Bell, *Immunogenetics,* 42:10-18(1995)). Here, the antigen specificity of a T cell involves determining the sequence of the CDR3 segments was characterized using heteroclitic BCMA$_{72-80}$ (YLMFLLRKI; SEQ ID NO:37) peptide.

The following materials and methods were used in this example.

Materials and Methods

Reagents

Fluorochrome conjugated anti-human monoclonal antibody (mAb) specific to BCMA, HLA-A2, CD3, CD8, CD38, CD40L, CD69, 41BB, CCR7, CD45RO, CD107a, IFN-γ, IL-2, TNF-α, PD1, LAG3, OX40 or GITR was purchased from Becton Dickinson (BD) (San Diego, Calif.), LifeSpan Bioscience (Seattle, Wash.) or BioLegend (San Diego, Calif.). Live/Dead Aqua stain kit was purchased from Molecular Probes (Grand Island, N.Y.).

Synthetic Peptides

The immunogenic heteroclitic BCMA peptide, BCMA$_{72-80}$ (YLMFLLRKI; SEQ ID NO:37), was synthesized by standard fmoc (9-fluorenylmethyl-oxycarbonyl) chemistry, purified to >95% using reverse-phase chromatography, and validated by mass-spectrometry for molecular weight (Biosynthesis, Lewisville, Tex.).

Induction of Heteroclitic BCMA Peptide-Specific CTL

Peripheral blood mononuclear cells (PBMC) were isolated by standard density gradient centrifugation over Ficoll-Paque™ Plus (Amersham Pharmacia Biotech AB, Uppsala Sweden) from leukopaks obtained from multiple HLA-A2+ normal donors. Heteroclitic BCMA peptide-specific CTL (hBCMA-CTL) were generated ex vivo by repeated stimulation of the PBMC (as "effector cells") with the BCMA peptide or BCMA peptide-pulsed PBMC (as "antigen-presenting cells") upon irradiation (10 Gy). The T cell cultures were restimulated every 7 days and maintained in AIM-V medium supplemented with 10% human AB serum (BioWhittaker) in the presence of IL-2 (50 units/ml).

Enrichment of IFN-γ+ T Cells Upon Stimulation with Heteroclitic BCMA Peptide

IFN-γ producing BCMA-specific CD3+CD8+ T cells were isolated, either by an IFN-γ secretion assay (Miltenyi)

and flow cell sorter (BD), upon the third stimulation of PBMC from HLA-A2+ donors with the heteroclitic BCMA peptide.

Identification of Alpha and Beta TCR Repertoire

The RNA samples were utilized from BCMA-specific CTL generated different HLA-A2+ donors, upon the isolation of the specific CD8+ T cells via Miltenyi or flow sorter. RNase H-dependent T-cell receptor sequencing (rhTCRseq) was used to determine alpha and beta TCR repertoire analysis in the RNA samples. TCR-specific amplification and addition of dual-index barcodes was achieved in a single PCR step with the enhanced specificity of RNase H-dependent PCR (rhPCR). The sorting and cDNA library steps were performed with a reverse-transcriptase reaction that adds a unique molecular identifier (UMI) to each cDNA molecule to improve the accuracy of repertoire-frequency measurements (Li et al., Nat Protoc. 2019; 14(8):2571-2594).

Results

New Sequences Identified as the BCMA-Specific TCR Repertoire

The TCR alpha and/or beta chain CDR3 sequences of a total of 114 (one hundred fourteen) alpha and beta-chains were determined (see Tables 5 and 6). The TCR alpha and beta chain sequences or alpha and beta chain CDR3 sequences are used to generate T cells with functional activities against multiple myeloma or other cancers expressing BCMA.

REFERENCE

Lee D W, Kochenderfer J N, Stetler-Stevenson M, Cui Y K, Delbrook C, Feldman S A, et al. T cells expressing CD19 chimeric antigen receptors for acute lymphoblastic leukaemia in children and young adults: a phase 1 dose-escalation trial. *Lancet* 2015; 385:517-28.

Kochenderfer J N, Dudley M E, Kassim S H, Somerville R P, Carpenter R O, Stetler-Stevenson M, et al. Chemotherapy-refractory diffuse large B-cell lymphoma and indolent B-cell malignancies can be effectively treated with autologous T cells expressing an anti-CD19 chimeric antigen receptor. *J Clin Oncol* 2015; 33:540-9.

Turtle C J, Hanafi L A, Berger C, Gooley T A, Cherian S, Hudecek M, et al. CD19 CAR-T cells of defined CD4+: CD8+ composition in adult B cell ALL patients. *J Clin Invest* 2016; 126:2123-38.

Stevanovic S, Draper L M, Langhan M M, Campbell T E, Kwong M L, Wunderlich J R, et al. Complete regression of metastatic cervical cancer after treatment with human papillomavirus-targeted tumor-infiltrating T cells. *J Clin Oncol* 2015; 33:1543-50.

Tran E, Turcotte S, Gros A, Robbins P F, Lu Y C, Dudley M E, et al. Cancer immunotherapy based on mutation-specific CD4+ T cells in a patient with epithelial cancer. *Science* 2014; 344:641-5.

Aleksic M, Liddy N, Molloy P E, Pumphrey N, Vuidepot A, Chang K M, et al. Different affinity windows for virus and cancer-specific T-cell receptors: implications for therapeutic strategies. *Eur J Immunol* 2012; 42:3174-9.

Yousfi Monod, M., Giudicelli, V., Chaume, D. & Lefranc, M. P. IMGT/JunctionAnalysis: the first tool for the analysis of the immunoglobulin and T cell receptor complex V-J and V-D-J JUNCTIONs. *Bioinformatics* 20 (Suppl. 1), i379-i385 (2004).

Robins, H. S. et al. Comprehensive assessment of T-cell receptor β-chain diversity in αβ T cells. *Blood* 114, 4099-4107 (2009).

Li S., et al. RNase H-dependent PCR-enabled T-cell receptor sequencing for highly specific and efficient targeted sequencing of T-cell receptor mRNA for single-cell and repertoire analysis. *Nat Protoc.;* 14(8):2571-2594 (2019).

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A T cell receptor (TCR) comprising:
   (a) a T cell receptor alpha chain (TCA) variable domain which is specific for B-cell maturation antigen (BCMA) and which comprises the amino acid sequence set forth in SEQ ID NO:27 and a T cell receptor beta chain (TCB) variable domain comprising the amino acid sequence set forth in SEQ ID NO: 19;
   (b) a TCA variable domain comprising the amino acid sequence set forth in SEQ ID NO: 28 and a TCB variable domain comprising the amino acid sequence set forth in SEQ ID NO:20, or differing by 1 to 10 amino acids;
   (c) a TCA variable domain comprising the amino acid sequence set forth in SEQ ID NO: 29 and a TCB variable domain comprising the amino acid sequence set forth in SEQ ID NO:21, or differing by 1 to 10 amino acids;
   (d) a TCA variable domain comprising the amino acid sequence set forth in SEQ ID NO: 30 and a TCB variable domain comprising the amino acid sequence set forth in SEQ ID NO:22;
   (e) a TCA variable domain comprising the amino acid sequence set forth in SEQ ID NO: 31 and a TCB variable domain comprising the amino acid sequence set forth in SEQ ID NO:23, or differing by 1 to 10 amino acids;
   (f) a TCA variable domain comprising the amino acid sequence set forth in SEQ ID NO: 32 and a TCB variable domain comprising the amino acid sequence set forth in SEQ ID NO:24;
   (g) a TCA variable domain comprising the amino acid sequence set forth in SEQ ID NO: 33 and a TCB variable domain comprising-the amino acid sequence set forth in SEQ ID NO:25 or;
   (h) a TCA variable domain comprising the amino acid sequence set forth in SEQ ID NO: 34 and a TCB variable domain comprising the amino acid sequence set forth in SEQ ID NO:26.

2. A composition comprising the TCR of claim 1 and a second agent.

3. A cultured cell comprising the TCR of claim 1.

4. A T cell comprising the TCR of claim 1.

5. A method of killing a target cell, the method comprising:
   contacting the target cell with the T cell of claim 4, wherein the target cell expresses or overexpresses B-cell maturation antigen (BCMA) and expresses human leukocyte antigen A (HLA-A).

6. The TCR of claim 1, wherein the TCR is specific for a peptide of human BCMA (SEQ ID NO: 38).

7. The TCR of claim 1, wherein the TCR is specific for the heteroclitic BCMA72-80 YLMFLLRKI peptide (SEQ ID NO:37).

8. The TCR of claim 1, wherein the TCR is specific for the heteroclitic BCMA72-80 YLMFLLRKI peptide (SEQ ID NO:37) bound to HLA-A2.

9. The TCR of claim 1, wherein the TCR is a single-chain variable fragment (scFv).

10. A method of treating a human subject having a B-cell maturation antigen (BCMA)-expressing hematological cancer, the method comprising administering to the human subject the T cell of claim 4.

11. A pharmaceutical composition comprising the T cell of claim 4 and a pharmaceutically acceptable carrier.

* * * * *